US012689994B2

(12) United States Patent
Rastegardoost et al.

(10) Patent No.: US 12,689,994 B2
(45) Date of Patent: Jul. 21, 2026

(54) AUTOMATIC GAIN CONTROL FOR SIDELINK COMMUNICATIONS

(71) Applicant: Comcast Cable Communications, LLC, Philadelphia, PA (US)

(72) Inventors: Nazanin Rastegardoost, McLean, VA (US); Hyukjin Chae, Fairfax, VA (US); Esmael Hejazi Dinan, McLean, VA (US); Hyoungsuk Jeon, Centreville, VA (US); Bing Hui, Herndon, VA (US); Taehun Kim, Fairfax, VA (US); Jongwoo Hong, Vienna, VA (US); Hua Zhou, Vienna, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 430 days.

(21) Appl. No.: 18/140,709

(22) Filed: Apr. 28, 2023

(65) Prior Publication Data

US 2023/0354220 A1 Nov. 2, 2023

Related U.S. Application Data

(60) Provisional application No. 63/336,047, filed on Apr. 28, 2022.

(51) Int. Cl.
*H04W 76/20* (2018.01)
*H04W 52/52* (2009.01)
*H04W 74/0816* (2024.01)

(52) U.S. Cl.
CPC ....... *H04W 52/52* (2013.01); *H04W 74/0816* (2013.01); *H04W 76/20* (2018.02)

(58) Field of Classification Search
CPC . H04W 52/52; H04W 74/0816; H04W 76/20; H04W 92/18
See application file for complete search history.

(56) References Cited

U.S. PATENT DOCUMENTS

| | | | |
|---|---|---|---|
| 11,329,750 B2 | 5/2022 | Wu et al. | |
| 2021/0112505 A1 | 4/2021 | Li et al. | |
| 2021/0410085 A1 | 12/2021 | Li et al. | |
| 2022/0070921 A1 | 3/2022 | Xue et al. | |

(Continued)

FOREIGN PATENT DOCUMENTS

| | | |
|---|---|---|
| CN | 113632582 A | 11/2021 |
| EP | 3603247 A4 | 1/2021 |

(Continued)

OTHER PUBLICATIONS

RP-211656 3GPP TSG RAN#93e, Electronic Meeting, Sep. 13-17, 2021, Title: Moderator's summary for discussion [RAN93e-R18Prep-06] Sidelink enhancements (excluding positioning), Source: Moderator (LG Electronics).

(Continued)

*Primary Examiner* — Sam Bhattacharya
(74) *Attorney, Agent, or Firm* — Banner & Witcoff, Ltd.

(57) ABSTRACT

A wireless device may communicate with one or more other wireless devices via a sidelink. Automatic gain control (AGC) may be performed by a receiving wireless device. A symbol in a sidelink transmission may be duplicated for AGC if the sidelink transmission overlaps in time with the beginning of another sidelink transmission.

33 Claims, 48 Drawing Sheets

(56)                  References Cited

U.S. PATENT DOCUMENTS

| | | | |
|---|---|---|---|
| 2022/0086782 A1 | 3/2022 | Chen et al. | |
| 2024/0147455 A1* | 5/2024 | Zhao | H04L 5/0044 |

FOREIGN PATENT DOCUMENTS

| | | |
|---|---|---|
| WO | 2018030947 A1 | 2/2018 |
| WO | 2021208031 A1 | 10/2021 |
| WO | 2021223072 A1 | 11/2021 |
| WO | 2021237515 A1 | 12/2021 |
| WO | 2023/137251 A1 | 7/2023 |

OTHER PUBLICATIONS

Mario H. Castañeda Garcia, et al. "A Tutorial on 5G NR V2X Communications" IEEE Communications Surveys & Tutorials ( vol. 23, Issue: 3, Date of Publication: Feb. 3, 2021).

3GPP TS 38.211 V17.0.0 (Dec. 2021), 3rd Generation Partnership Project; Technical Specification Group Radio Access Network; NR; Physical channels and modulation (Release 17).

3GPP TS 38.212 V17.1.0 (Mar. 2022), 3rd Generation Partnership Project; Technical Specification Group Radio Access Network; NR; Multiplexing and channel coding (Release 17).

3GPP TS 38.213 V17.1.0 (Mar. 2022), 3rd Generation Partnership Project;Technical Specification Group Radio Access Network; NR; Physical layer procedures for control (Release 17).

3GPP TS 38.214 V17.1.0 (Mar. 2022) 3rd Generation Partnership Project; Technical Specification Group Radio Access Network; NR; Physical layer procedures for data (Release 17).

3GPP TS 38.300 V17.0.0 (Mar. 2022), 3rd Generation Partnership Project;Technical Specification Group Radio Access Network;NR; NR and NG-RAN Overall Description;Stage 2 (Release 17).

3GPP TS 38.321 V17.0.0 (Mar. 2022), 3rd Generation Partnership Project;Technical Specification Group Radio Access Network;NR;Medium Access Control (MAC) protocol specification (Release 17).

3GPP TS 38.331 V17.0.0 (Mar. 2022) 3rd Generation Partnership Project; Technical Specification Group Radio Access Network; NR; Radio Resource Control (RRC) protocol specification (Release 17).

RP-211796 3GPP TSG RAN Meeting #93-e Electronic Meeting, Sep. 13-17, 2021, Title: Sidelink enhancement for Rel-18, Source: Samsung.

RP-211811 3GPP TSG RAN #93-e, e-Meeting, Sep. 13-17, 2021, Title: Discussion on R18 SL enhancement areas, Source: OPPO.

RP 212044, 3GPP TSG RAN meeting #93e, Electronic meeting, Sep. 13 17, 2021 A.I. 9.0.2, Title: Views on NR Sidelink enhancements for Rel 18, Source: Qualcomm.

RP-212057 3GPP TSG RAN Meeting #93e, 3GPP TSG RAN Meeting #93e, Title: 3GPP TSG RAN Meeting #93e, Source: Lenovo, Motorola Mobility.

RP-212060 3GPP TSG RAN Meeting #93-e, Electronic Meeting, Sep. 13-17, 2021, Discussion on further SL enhancement in Rel-18, Source: Lenovo, Motorola Mobility.

RP-212066 3GPP TSG RAN Meeting #93-e, Electronic Meeting, Sep. 13-17, 2021, Discussion on unlicensed spectrum for sidelink communication for Rel-18, Source: Lenovo, Motoroa Mobility.

RP-212133 3GPP TSG RAN Meeting #93-e, Electronic Meeting, Sep. 13-17, 2021, Title: Updated views on Rel-18 sidelink enhancements, Source: Huawei, HiSilicon.

RP-212217 3GPP TSG RAN#93e Sep. 13-17, 2021, On sidelink enhancements in Rel 18, Source: Tim Innovation Lab.

RP-212260 3GPP TSG RAN Meeting #93-e, Electronic Meeting, Sep. 13-17, 2021, Views on Rel-18 Sidelink enhancement, Source: China Academy of Telecommunications Technology (CATT).

RP-212295 3GPP TSG-RAN Meeting #93-e, Electronic Meeting, Sep. 13-17, 2021, Title: Sidelink Enhancements in Rel-18 for Automotive and IIoT, Source: Robert Bosch GmbH.

RP-212321 3GPP TSG RAN#93e, Sep. 13-17, 2021, Title: Rel-18 Sidelink Enhancements, Source: MediaTek Inc.

RP-212338 3GPP TSG RAN Meeting #93-e, Sep. 13-17, 2021, Title: Rel-18 NR Sidelink, Source: Intel Corporation.

RP-212378 3GPP TSG RAN Meeting #93-e, Electronic Meeting, Sep. 13-17, 2021, Title: Views on Rel-18 Sidelink Enhancement, Source: ZTE, Saneships.

RP-212432 3GPP TSG RAN Meeting #93-e, Electronic Meeting, Sep. 13-17, 2021, Title: Views on Rel-18 Sidelink enhancement, Source: NEC.

RP-212451 3GPP TSG RAN Meeting #93-e, Electronic Meeting, Sep. 13-17, 2021, Title: On Rel-18 Sidelink Enhancement, Source: Apple.

RP-213678 3GPP TSG RAN Meeting #94e, Electronic Meeting, Dec. 6-17, 2021, Title: New WID on NR sidelink evolution, Source: Oppo, LG Electronics.

Oct. 9, 2023—European Search Report—EP App. No. 23170717.5.

* cited by examiner

IP Packets

QoS
Flows

SDAP
215/225

QoS Flow Handling

Radio
Bearers

PDCP
214/224

Header Comp.,
Ciphering

Header Comp.,
Ciphering

Reordering,
Retransmission

Reordering,
Retransmission

RLC
Channels

RLC
213/223

Segmentation,
ARQ

Segmentation,
ARQ

Logical
Channels

Multiplexing

MAC
212/222

HARQ

Transport
Channel

PHY
211/221

Coding, Resource Mapping

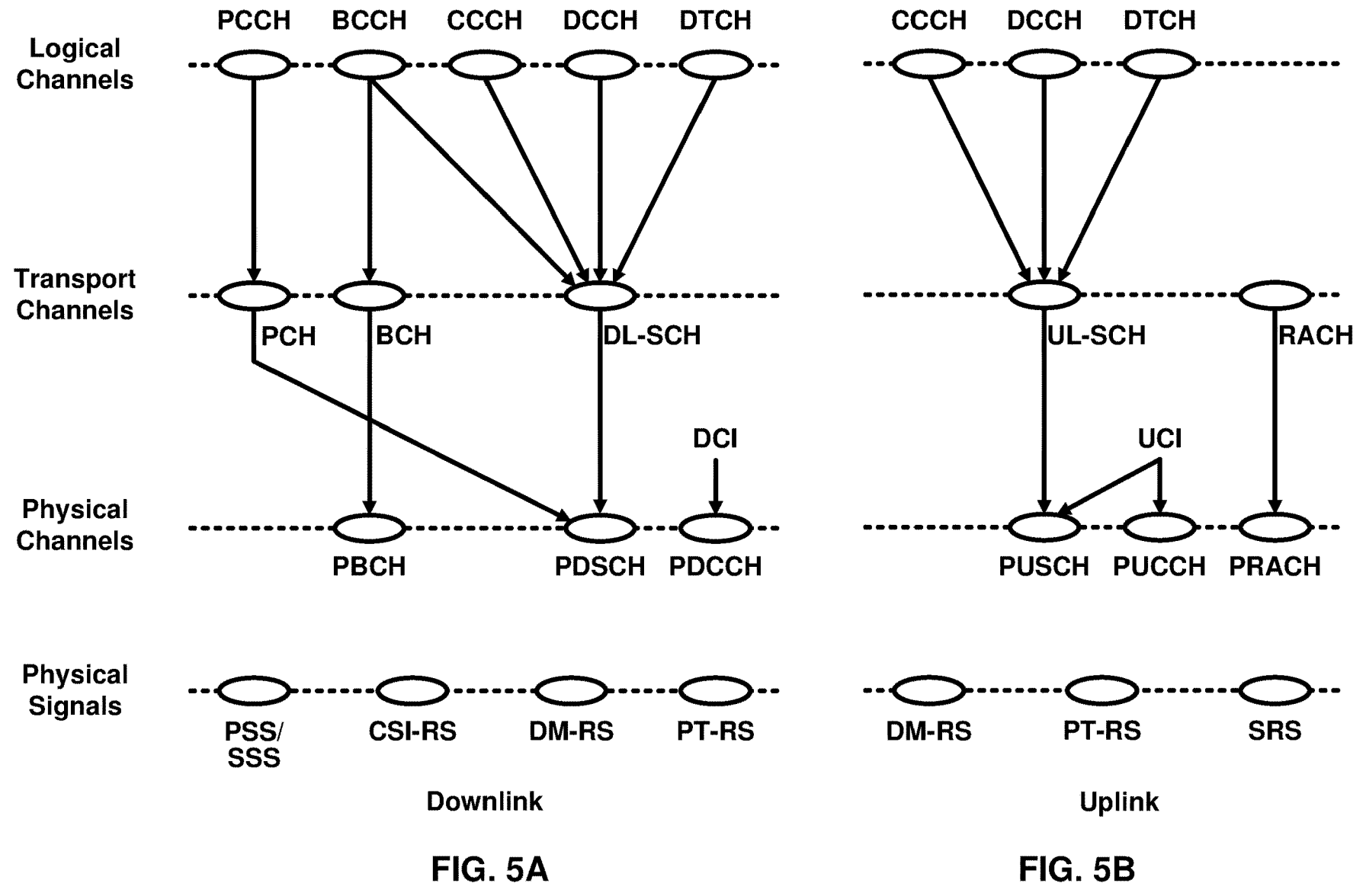

Logical Channels

Transport Channels

Physical Channels

Physical Signals

PCCH   BCCH   CCCH   DCCH   DTCH

PCH   BCH   DL-SCH

PBCH   PDSCH   PDCCH

DCI

PSS/SSS   CSI-RS   DM-RS   PT-RS

Downlink

FIG. 5A

CCCH   DCCH   DTCH

UL-SCH   RACH

PUSCH   PUCCH   PRACH

UCI

DM-RS   PT-RS   SRS

Uplink

Resource Element (RE)
1 Symbol x 1 Subcarrier

Resource Block (RB)
12 Subcarriers

One Slot (14 Symbols)

NR Carrier Bandwidth
(Up to 3300 Subcarriers)

Time

Frequency

```
SL-ResourcePool::=        SEQUENCE {
    ...
    sl-UE-SelectedConfigRP        SL-UE-SelectedConfigRP
    ...
    sl-PreemptionEnable        ENUMERATED {enabled, p11, p12, p13, p14,
p15, p16, p17, p18}
    ...
    sl-TxPercentageList        SL-TxPercentageList
    ...
} sl-UE-SelectedConfigRP ::=        SEQUENCE {
    ...
    sl-ThresPSSCH-RSRP-List        SL-ThresPSSCH-RSRP-List
    sl-MultiReserveResource        ENUMERATED {enabled}
    sl-MaxNumPerReserve        ENUMERATED {n2, n3}
    sl-SensingWindow        ENUMERATED {ms100, ms1100}
    sl-SelectionWindowList        SL-SelectionWindowList
    sl-ResourceReservePeriodList        SEQUENCE (SIZE (1..16)) OF SL-
ResourceReservePeriod
    sl-RS-ForSensing        ENUMERATED {pscch, pssch},
    ...
}
```

FIG. 21

```
SL-ResourceReservePeriod ::=      CHOICE {
    sl-ResourceReservePeriod1         ENUMERATED {ms0, ms100, ms200,
ms300, ms400, ms500, ms600, ms700, ms800, ms900, ms1000},
    sl-ResourceReservePeriod2         INTEGER (1..99)
}

SL-SelectionWindowList ::=        SEQUENCE (SIZE (8)) OF SL-
SelectionWindowConfig SL-SelectionWindowConfig ::=      SEQUENCE {
    sl-Priority                       INTEGER (1..8),
    sl-SelectionWindow                ENUMERATED {n1, n5, n10, n20}
}

SL-TxPercentageList ::=           SEQUENCE (SIZE (8)) OF SL-
TxPercentageConfig

SL-TxPercentageConfig ::=         SEQUENCE {
    sl-Priority                       INTEGER (1..8),
    sl-TxPercentage                   ENUMERATED {p20, p35, p50}
}
```

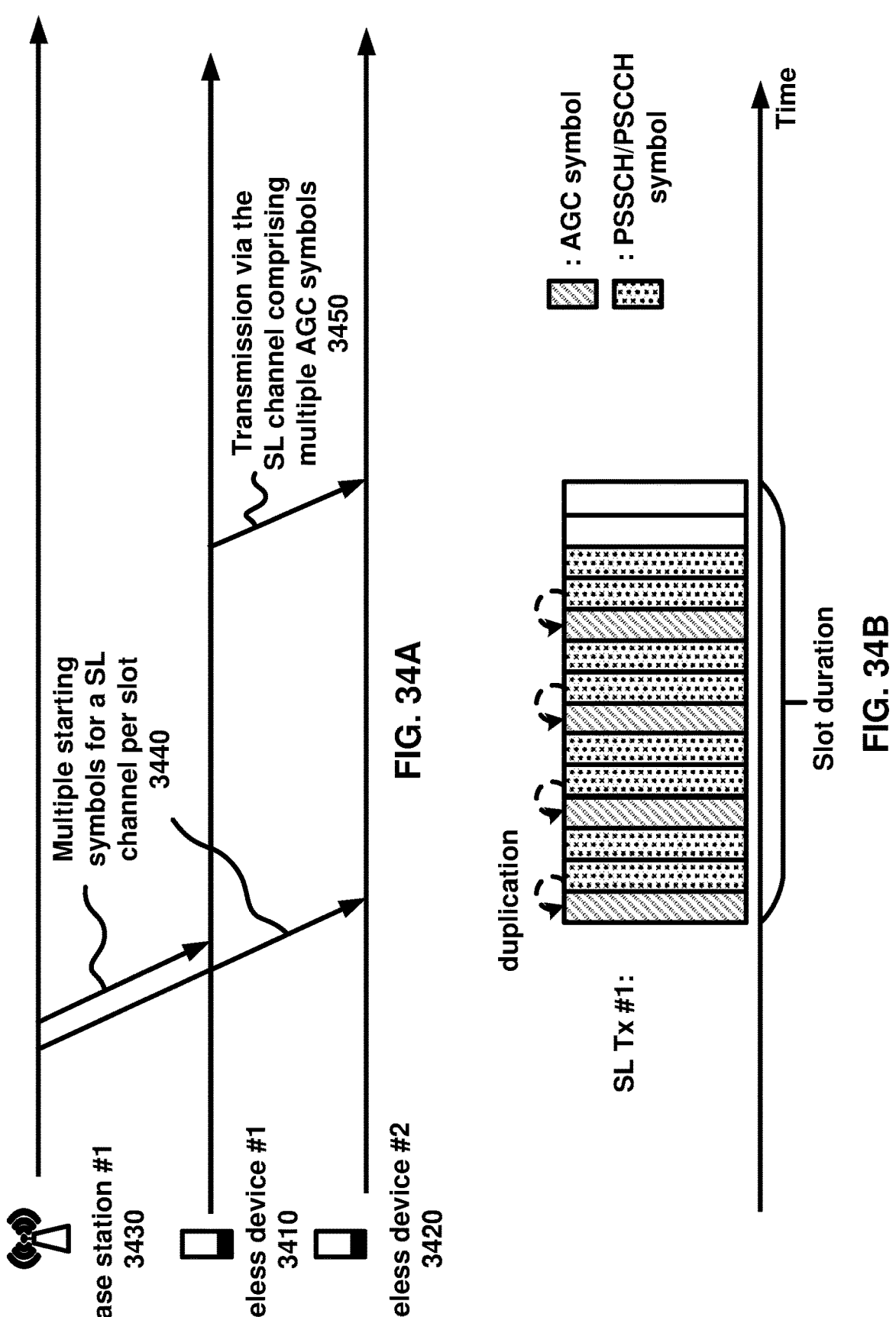

⊠ : PSSCH/PSCCH
▨ : AGC symbol
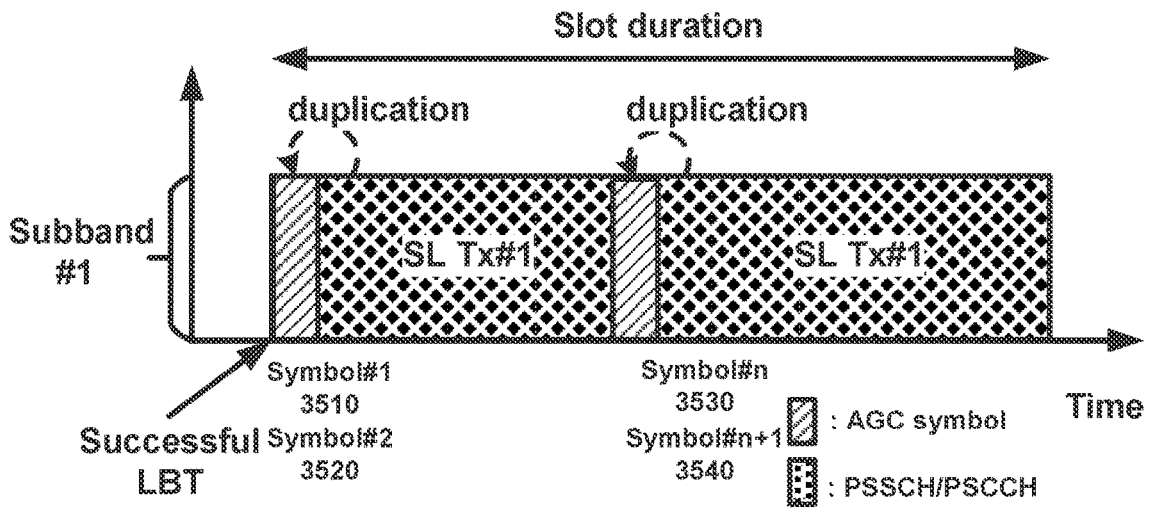
FIG. 35A
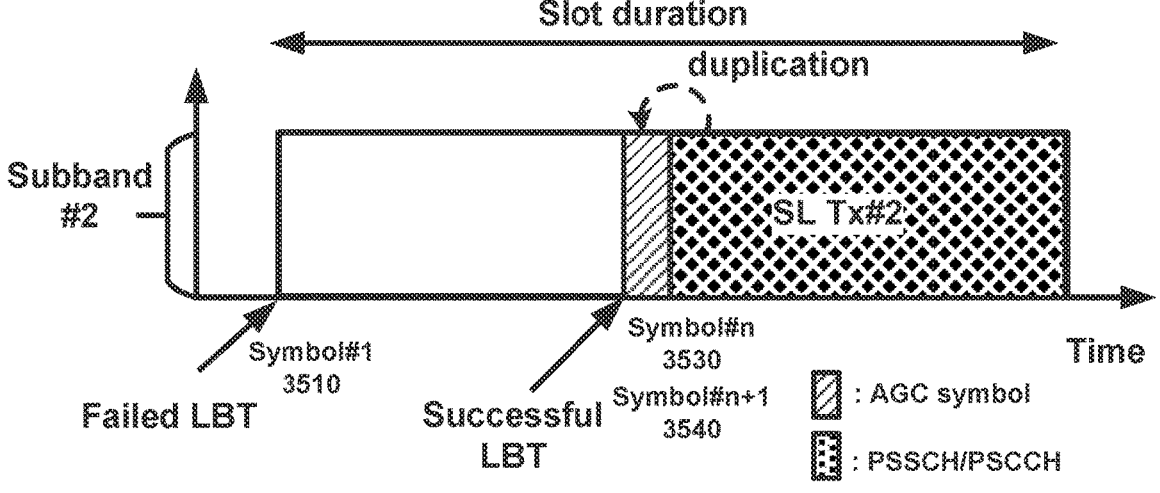
FIG. 35B

AUTOMATIC GAIN CONTROL FOR SIDELINK COMMUNICATIONS

CROSS-REFERENCE TO RELATED APPLICATIONS

This application claims the benefit of U.S. Provisional Application No. 63/336,047, filed on Apr. 28, 2022. The above-referenced application is hereby incorporated by reference in its entirety.

BACKGROUND

Wireless devices communicate with each other via a sidelink. A receiving wireless device measures a power level of a received sidelink transmission.

SUMMARY

The following summary presents a simplified summary of certain features. The summary is not an extensive overview and is not intended to identify key or critical elements.

Wireless devices may communicate with each other via a sidelink. A slot for sidelink transmission may comprise a plurality of starting symbols. Each of the starting symbols in a slot may be duplicated into another symbol of the slot, and that duplication may be used for automatic gain control (AGC) by a device that receives the sidelink transmission. For example, a device transmitting the sidelink transmission may duplicate a symbol for AGC for each instance that a sidelink transmission overlaps in time with the beginning of another sidelink transmission. For example, a first sidelink transmission may comprise a first duplicated symbol for AGC at the beginning of the first sidelink transmission during a symbol that does not overlap with another sidelink transmission, and the first sidelink transmission may comprise a second duplicated symbol for AGC during a later symbol that overlaps with the beginning of a second sidelink transmission. A receiving wireless device may update AGC for each sidelink transmission based on an overlap in time with one or more other sidelink transmissions.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 5A shows an example mapping for downlink channels.

FIG. 5B shows an example mapping for uplink channels.

FIG. 7 shows an example configuration of a frame.

FIG. 21 shows an example of configuration information for sidelink communication.

FIG. 22 shows an example of configuration information for sidelink communication.

FIG. 25 shows an example timing of a resource selection procedure.

FIGS. 34A and 34B show an example of a multi-AGC sidelink transmission.

FIGS. 35A, 35B, and 35C show examples of sidelink transmission according to multi-AGC configuration.

DETAILED DESCRIPTION

Figures 1A, 1B:
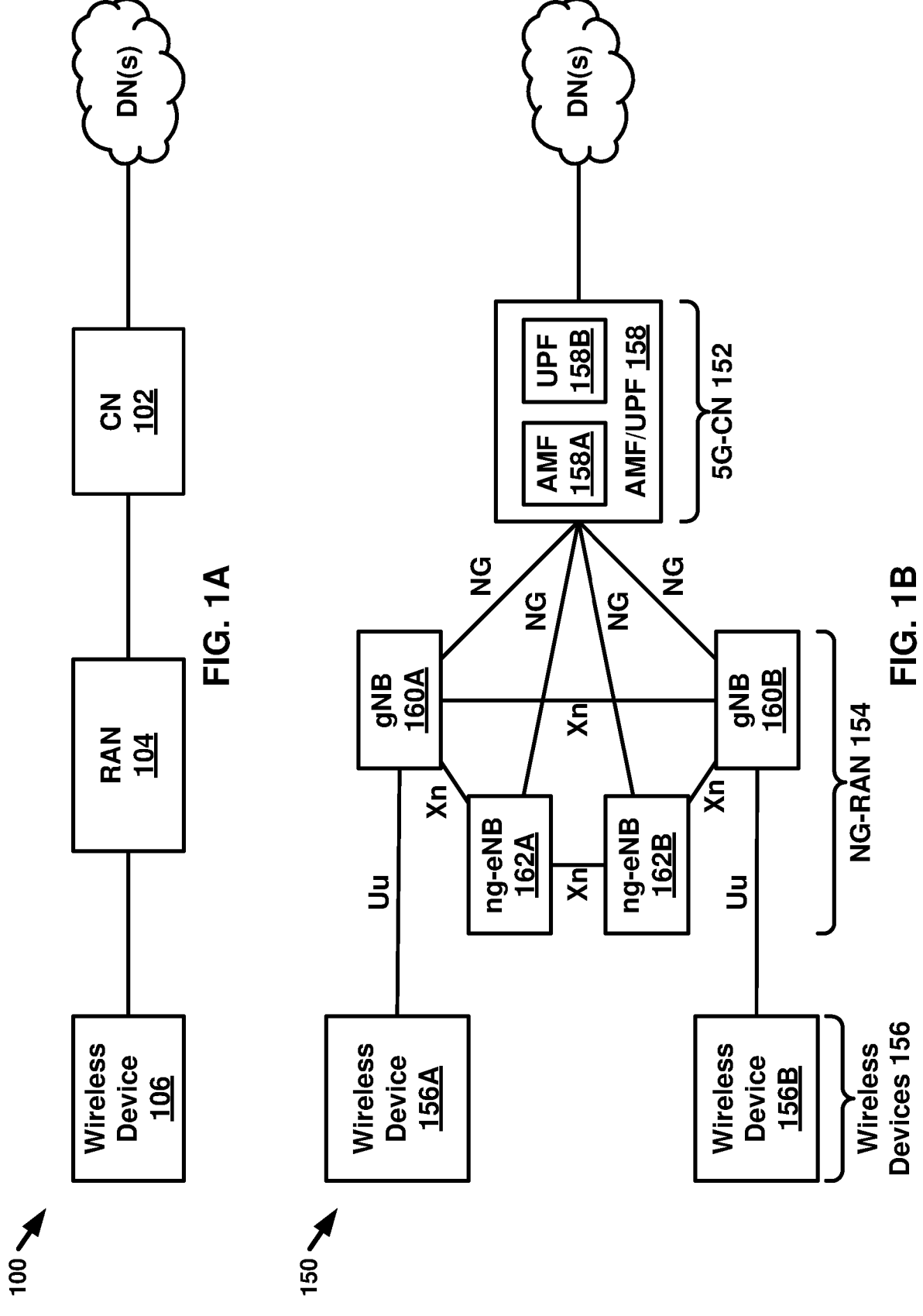
FIG. 1A and FIG. 1B show example communication networks.

The accompanying drawings and descriptions provide examples. It is to be understood that the examples shown in the drawings and/or described are non-exclusive, and that features shown and described may be practiced in other examples. Examples are provided for operation of wireless communication systems, which may be used in the technical field of multicarrier communication systems. More particularly, the technology disclosed herein may relate to wireless communication exposure detection and/or reporting.

FIG. 1A shows an example communication network 100. The communication network 100 may comprise a mobile communication network). The communication network 100 may comprise, for example, a public land mobile network (PLMN) operated/managed/run by a network operator. The communication network 100 may comprise one or more of a core network (CN) 102, a radio access network (RAN) 104, and/or a wireless device 106. The communication network 100 may comprise, and/or a device within the communication network 100 may communicate with (e.g., via CN 102), one or more data networks (DN(s)) 108. The wireless device 106 may communicate with one or more DNs 108, such as public DNs (e.g., the Internet), private DNs, and/or intra-operator DNs. The wireless device 106 may communicate with the one or more DNs 108 via the RAN 104 and/or via the CN 102. The CN 102 may provide/configure the wireless device 106 with one or more interfaces to the one or more DNs 108. As part of the interface functionality, the CN 102 may set up end-to-end connections between the wireless device 106 and the one or more DNs 108, authenticate the wireless device 106, provide/configure charging functionality, etc.

The wireless device 106 may communicate with the RAN 104 via radio communications over an air interface. The RAN 104 may communicate with the CN 102 via various communications (e.g., wired communications and/or wireless communications). The wireless device 106 may establish a connection with the CN 102 via the RAN 104. The RAN 104 may provide/configure scheduling, radio resource management, and/or retransmission protocols, for example, as part of the radio communications. The communication direction from the RAN 104 to the wireless device 106 over/via the air interface may be referred to as the downlink and/or downlink communication direction. The communication direction from the wireless device 106 to the RAN 104 over/via the air interface may be referred to as the uplink and/or uplink communication direction. Downlink transmissions may be separated and/or distinguished from uplink transmissions, for example, based on at least one of: frequency division duplexing (FDD), time-division duplexing (TDD), any other duplexing schemes, and/or one or more combinations thereof.

As used throughout, the term "wireless device" may comprise one or more of: a mobile device, a fixed (e.g., non-mobile) device for which wireless communication is configured or usable, a computing device, a node, a device capable of wirelessly communicating, or any other device capable of sending and/or receiving signals. As non-limiting examples, a wireless device may comprise, for example: a telephone, a cellular phone, a Wi-Fi phone, a smartphone, a tablet, a computer, a laptop, a sensor, a meter, a wearable device, an Internet of Things (IoT) device, a hotspot, a cellular repeater, a vehicle road side unit (RSU), a relay node, an automobile, a wireless user device (e.g., user equipment (UE), a user terminal (UT), etc.), an access terminal (AT), a mobile station, a handset, a wireless transmit and receive unit (WTRU), a wireless communication device, and/or any combination thereof.

The RAN 104 may comprise one or more base stations (not shown). As used throughout, the term "base station" may comprise one or more of: a base station, a node, a Node B (NB), an evolved NodeB (eNB), a gNB, an ng-eNB, a relay node (e.g., an integrated access and backhaul (IAB) node), a donor node (e.g., a donor eNB, a donor gNB, etc.), an access point (e.g., a Wi-Fi access point), a transmission and reception point (TRP), a computing device, a device capable of wirelessly communicating, or any other device capable of sending and/or receiving signals. A base station may comprise one or more of each element listed above. For example, a base station may comprise one or more TRPs. As other non-limiting examples, a base station may comprise for example, one or more of: a Node B (e.g., associated with Universal Mobile Telecommunications System (UMTS) and/or third-generation (3G) standards), an Evolved Node B (eNB) (e.g., associated with Evolved-Universal Terrestrial Radio Access (E-UTRA) and/or fourth-generation (4G) standards), a remote radio head (RRH), a baseband processing unit coupled to one or more remote radio heads (RRHs), a repeater node or relay node used to extend the coverage area of a donor node, a Next Generation Evolved Node B (ng-eNB), a Generation Node B (gNB) (e.g., associated with NR and/or fifth-generation (5G) standards), an access point (AP) (e.g., associated with, for example, Wi-Fi or any other suitable wireless communication standard), any other generation base station, and/or any combination thereof. A base station may comprise one or more devices, such as at least one base station central device (e.g., a gNB Central Unit (gNB-CU)) and at least one base station distributed device (e.g., a gNB Distributed Unit (gNB-DU)).

A base station (e.g., in the RAN 104) may comprise one or more sets of antennas for communicating with the wireless device 106 wirelessly (e.g., via an over the air interface). One or more base stations may comprise sets (e.g., three sets or any other quantity of sets) of antennas to respectively control multiple cells or sectors (e.g., three cells, three sectors, any other quantity of cells, or any other quantity of sectors). The size of a cell may be determined by a range at which a receiver (e.g., a base station receiver) may successfully receive transmissions from a transmitter (e.g., a wireless device transmitter) operating in the cell. One or more cells of base stations (e.g., by alone or in combination with other cells) may provide/configure a radio coverage to the wireless device 106 over a wide geographic area to support wireless device mobility. A base station comprising three sectors (e.g., or n-sector, where n refers to any quantity n) may be referred to as a three-sector site (e.g., or an n-sector site) or a three-sector base station (e.g., an n-sector base station).

One or more base stations (e.g., in the RAN 104) may be implemented as a sectored site with more or less than three sectors. One or more base stations of the RAN 104 may be implemented as an access point, as a baseband processing device/unit coupled to several RRHs, and/or as a repeater or relay node used to extend the coverage area of a node (e.g., a donor node). A baseband processing device/unit coupled to RRHs may be part of a centralized or cloud RAN architecture, for example, where the baseband processing device/unit may be centralized in a pool of baseband processing devices/units or virtualized. A repeater node may amplify and send (e.g., transmit, retransmit, rebroadcast, etc.) a radio signal received from a donor node. A relay node may perform the substantially the same/similar functions as a repeater node. The relay node may decode the radio signal received from the donor node, for example, to remove noise before amplifying and sending the radio signal.

The RAN 104 may be deployed as a homogenous network of base stations (e.g., macrocell base stations) that have similar antenna patterns and/or similar high-level transmit powers. The RAN 104 may be deployed as a heterogeneous network of base stations (e.g., different base stations that have different antenna patterns). In heterogeneous networks, small cell base stations may be used to provide/configure small coverage areas, for example, coverage areas that overlap with comparatively larger coverage areas provided/configured by other base stations (e.g., macrocell base stations). The small coverage areas may be provided/configured in areas with high data traffic (or so-called "hotspots") or in areas with a weak macrocell coverage. Examples of small cell base stations may comprise, in order of decreasing coverage area, microcell base stations, picocell base stations, and femtocell base stations or home base stations.

Examples described herein may be used in a variety of types of communications. For example, communications may be in accordance with the Third-Generation Partnership Project (3GPP) (e.g., one or more network elements similar to those of the communication network 100), communications in accordance with Institute of Electrical and Electronics Engineers (IEEE), communications in accordance with International Telecommunication Union (ITU), communications in accordance with International Organization for Standardization (ISO), etc. The 3GPP has produced specifications for multiple generations of mobile networks: a 3G network known as UMTS, a 4G network known as Long-Term Evolution (LTE) and LTE Advanced (LTE-A), and a 5G network known as 5G System (5GS) and NR system. 3GPP may produce specifications for additional generations of communication networks (e.g., 6G and/or any other generation of communication network). Examples may be described with reference to one or more elements (e.g., the RAN) of a 3GPP 5G network, referred to as a next-generation RAN (NG-RAN), or any other communication network, such as a 3GPP network and/or a non-3GPP network. Examples described herein may be applicable to other communication networks, such as 3G and/or 4G networks, and communication networks that may not yet be finalized/specified (e.g., a 3GPP 6G network), satellite communication networks, and/or any other communication network. NG-RAN implements and updates 5G radio access technology referred to as NR and may be provisioned to implement 4G radio access technology and/or other radio access technologies, such as other 3GPP and/or non-3GPP radio access technologies.

FIG. 1B shows an example communication network 150. The communication network may comprise a mobile communication network. The communication network 150 may comprise, for example, a PLMN operated/managed/run by a network operator. The communication network 150 may comprise one or more of: a CN 152 (e.g., a 5G core network (5G-CN)), a RAN 154 (e.g., an NG-RAN), and/or wireless devices 156A and 156B (collectively wireless device(s) 156). The communication network 150 may comprise, and/or a device within the communication network 150 may communicate with (e.g., via CN 152), one or more data networks (DN(s)) 170. These components may be implemented and operate in substantially the same or similar manner as corresponding components described with respect to FIG. 1A.

The CN 152 (e.g., 5G-CN) may provide/configure the wireless device(s) 156 with one or more interfaces to one or more DNs 170, such as public DNs (e.g., the Internet), private DNs, and/or intra-operator DNs. As part of the interface functionality, the CN 152 (e.g., 5G-CN) may set up end-to-end connections between the wireless device(s) 156 and the one or more DNs, authenticate the wireless device(s) 156, and/or provide/configure charging functionality. The CN 152 (e.g., the 5G-CN) may be a service-based architecture, which may differ from other CNs (e.g., such as a 3GPP 4G CN). The architecture of nodes of the CN 152 (e.g., 5G-CN) may be defined as network functions that offer services via interfaces to other network functions. The network functions of the CN 152 (e.g., 5G CN) may be implemented in several ways, for example, as network elements on dedicated or shared hardware, as software instances running on dedicated or shared hardware, and/or as virtualized functions instantiated on a platform (e.g., a cloud-based platform).

The CN 152 (e.g., 5G-CN) may comprise an Access and Mobility Management Function (AMF) device 158A and/or a User Plane Function (UPF) device 158B, which may be separate components or one component AMF/UPF device 158. The UPF device 158B may serve as a gateway between a RAN 154 (e.g., NG-RAN) and the one or more DNs 170. The UPF device 158B may perform functions, such as: packet routing and forwarding, packet inspection and user plane policy rule enforcement, traffic usage reporting, uplink classification to support routing of traffic flows to the one or more DNs 170, quality of service (QoS) handling for the user plane (e.g., packet filtering, gating, uplink/downlink rate enforcement, and uplink traffic verification), downlink packet buffering, and/or downlink data notification triggering. The UPF device 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The wireless device(s) 156 may be configured to receive services via a PDU session, which may be a logical connection between a wireless device and a DN.

The AMF device 158A may perform functions, such as: Non-Access Stratum (NAS) signaling termination, NAS signaling security, Access Stratum (AS) security control, inter-CN node signaling for mobility between access networks (e.g., 3GPP access networks and/or non-3GPP networks), idle mode wireless device reachability (e.g., idle mode UE reachability for control and execution of paging retransmission), registration area management, intra-system and inter-system mobility support, access authentication, access authorization including checking of roaming rights, mobility management control (e.g., subscription and policies), network slicing support, and/or session management function (SMF) selection. NAS may refer to the functionality operating between a CN and a wireless device, and AS may refer to the functionality operating between a wireless device and a RAN.

The CN 152 (e.g., 5G-CN) may comprise one or more additional network functions that may not be shown in FIG. 1B. The CN 152 (e.g., 5G-CN) may comprise one or more devices implementing at least one of: a Session Management Function (SMF), an NR Repository Function (NRF), a Policy Control Function (PCF), a Network Exposure Function (NEF), a Unified Data Management (UDM), an Application Function (AF), an Authentication Server Function (AUSF), and/or any other function.

The RAN 154 (e.g., NG-RAN) may communicate with the wireless device(s) 156 via radio communications (e.g., an over the air interface). The wireless device(s) 156 may communicate with the CN 152 via the RAN 154. The RAN 154 (e.g., NG-RAN) may comprise one or more first-type base stations (e.g., gNBs comprising a gNB 160A and a gNB 160B (collectively gNBs 160)) and/or one or more second-type base stations (e.g., ng eNBs comprising an ng-eNB 162A and an ng-eNB 162B (collectively ng eNBs 162)). The RAN 154 may comprise one or more of any quantity of types of base station. The gNBs 160 and ng eNBs 162 may be referred to as base stations. The base stations (e.g., the gNBs 160 and ng eNBs 162) may comprise one or more sets of antennas for communicating with the wireless device(s) 156 wirelessly (e.g., an over an air interface). One or more base stations (e.g., the gNBs 160 and/or the ng eNBs 162) may comprise multiple sets of antennas to respectively control multiple cells (or sectors). The cells of the base stations (e.g., the gNBs 160 and the ng-eNBs 162) may provide a radio coverage to the wireless device(s) 156 over a wide geographic area to support wireless device mobility.

The base stations (e.g., the gNBs 160 and/or the ng-eNBs 162) may be connected to the CN 152 (e.g., 5G CN) via a first interface (e.g., an NG interface) and to other base stations via a second interface (e.g., an Xn interface). The NG and Xn interfaces may be established using direct physical connections and/or indirect connections over an underlying transport network, such as an internet protocol (IP) transport network. The base stations (e.g., the gNBs 160 and/or the ng-eNBs 162) may communicate with the wireless device(s) 156 via a third interface (e.g., a Uu interface). A base station (e.g., the gNB 160A) may communicate with the wireless device 156A via a Uu interface. The NG, Xn, and Uu interfaces may be associated with a protocol stack. The protocol stacks associated with the interfaces may be used by the network elements shown in FIG. 1B to exchange data and signaling messages. The protocol stacks may comprise two planes: a user plane and a control plane. Any other quantity of planes may be used (e.g., in a protocol stack). The user plane may handle data of interest to a user. The control plane may handle signaling messages of interest to the network elements.

One or more base stations (e.g., the gNBs 160 and/or the ng-eNBs 162) may communicate with one or more AMF/ UPF devices, such as the AMF/UPF 158, via one or more interfaces (e.g., NG interfaces). A base station (e.g., the gNB 160A) may be in communication with, and/or connected to, the UPF 158B of the AMF/UPF 158 via an NG-User plane (NG-U) interface. The NG-U interface may provide/perform delivery (e.g., non-guaranteed delivery) of user plane PDUs between a base station (e.g., the gNB 160A) and a UPF device (e.g., the UPF 158B). The base station (e.g., the gNB 160A) may be in communication with, and/or connected to, an AMF device (e.g., the AMF 158A) via an NG-Control plane (NG-C) interface. The NG-C interface may provide/ perform, for example, NG interface management, wireless device context management (e.g., UE context management), wireless device mobility management (e.g., UE mobility management), transport of NAS messages, paging, PDU session management, configuration transfer, and/or warning message transmission.

A wireless device may access the base station, via an interface (e.g., Uu interface), for the user plane configuration and the control plane configuration. The base stations (e.g., gNBs 160) may provide user plane and control plane protocol terminations towards the wireless device(s) 156 via the Uu interface. A base station (e.g., the gNB 160A) may provide user plane and control plane protocol terminations toward the wireless device 156A over a Uu interface associated with a first protocol stack. A base station (e.g., the ng-eNBs 162) may provide Evolved UMTS Terrestrial Radio Access (E UTRA) user plane and control plane protocol terminations towards the wireless device(s) 156 via a Uu interface (e.g., where E UTRA may refer to the 3GPP 4G radio-access technology). A base station (e.g., the ng-eNB 162B) may provide E UTRA user plane and control plane protocol terminations towards the wireless device 156B via a Uu interface associated with a second protocol stack. The user plane and control plane protocol terminations may comprise, for example, NR user plane and control plane protocol terminations, 4G user plane and control plane protocol terminations, etc.

The CN 152 (e.g., 5G-CN) may be configured to handle one or more radio accesses (e.g., NR, 4G, and/or any other radio accesses). It may also be possible for an NR network/ device (or any first network/device) to connect to a 4G core network/device (or any second network/device) in a non-standalone mode (e.g., non-standalone operation). In a non-standalone mode/operation, a 4G core network may be used to provide (or at least support) control-plane functionality (e.g., initial access, mobility, and/or paging). Although only one AMF/UPF 158 is shown in FIG. 1B, one or more base stations (e.g., one or more gNBs and/or one or more ng-eNBs) may be connected to multiple AMF/UPF nodes, for example, to provide redundancy and/or to load share across the multiple AMF/UPF nodes.

An interface (e.g., Uu, Xn, and/or NG interfaces) between network elements (e.g., the network elements shown in FIG. 1B) may be associated with a protocol stack that the network elements may use to exchange data and signaling messages. A protocol stack may comprise two planes: a user plane and a control plane. Any other quantity of planes may be used (e.g., in a protocol stack). The user plane may handle data associated with a user (e.g., data of interest to a user). The control plane may handle data associated with one or more network elements (e.g., signaling messages of interest to the network elements).

The communication network 100 in FIG. 1A and/or the communication network 150 in FIG. 1B may comprise any quantity/number and/or type of devices, such as, for example, computing devices, wireless devices, mobile devices, handsets, tablets, laptops, internet of things (IoT)

devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, a satellite network, and/or any other network for wireless communications (e.g., any 3GPP network and/ or any non-3GPP network). Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network.

Figure 2A:
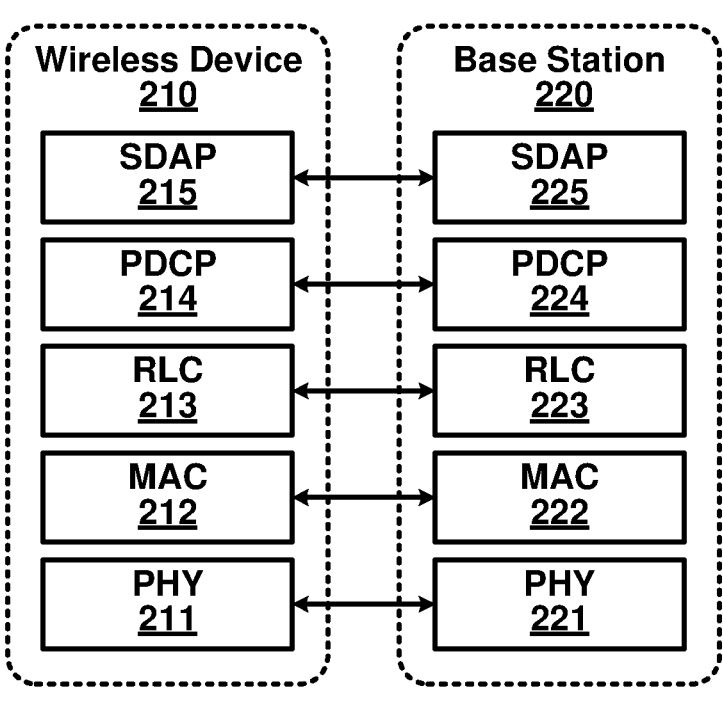
FIG. 2A shows an example user plane.
Figure 2B:
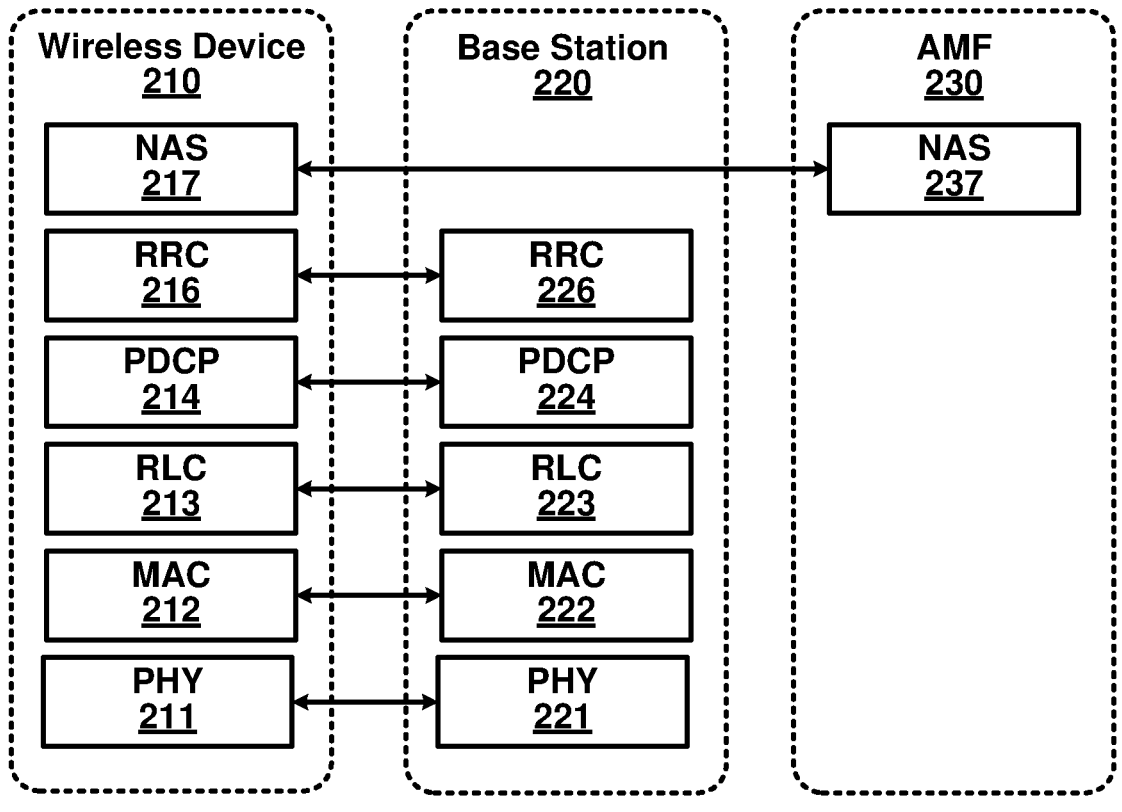
FIG. 2B shows an example control plane configuration.

FIG. 2A shows an example user plane configuration. The user plane configuration may comprise, for example, an NR user plane protocol stack. FIG. 2B shows an example control plane configuration. The control plane configuration may comprise, for example, an NR control plane protocol stack. One or more of the user plane configuration and/or the control plane configuration may use a Uu interface that may be between a wireless device 210 and a base station 220. The protocol stacks shown in FIG. 2A and FIG. 2B may be substantially the same or similar to those used for the Uu interface between, for example, the wireless device 156A and the base station 160A shown in FIG. 1B.

A user plane configuration (e.g., an NR user plane protocol stack) may comprise multiple layers (e.g., five layers or any other quantity of layers) implemented in the wireless device 210 and the base station 220 (e.g., as shown in FIG. 2A). At the bottom of the protocol stack, physical layers (PHYs) 211 and 221 may provide transport services to the higher layers of the protocol stack and may correspond to layer 1 of the Open Systems Interconnection (OSI) model. The protocol layers above PHY 211 may comprise a medium access control layer (MAC) 212, a radio link control layer (RLC) 213, a packet data convergence protocol layer (PDCP) 214, and/or a service data application protocol layer (SDAP) 215. The protocol layers above PHY 221 may comprise a medium access control layer (MAC) 222, a radio link control layer (RLC) 223, a packet data convergence protocol layer (PDCP) 224, and/or a service data application protocol layer (SDAP) 225. One or more of the four protocol layers above PHY 211 may correspond to layer 2, or the data link layer, of the OSI model. One or more of the four protocol layers above PHY 221 may correspond to layer 2, or the data link layer, of the OSI model.

Figure 3:
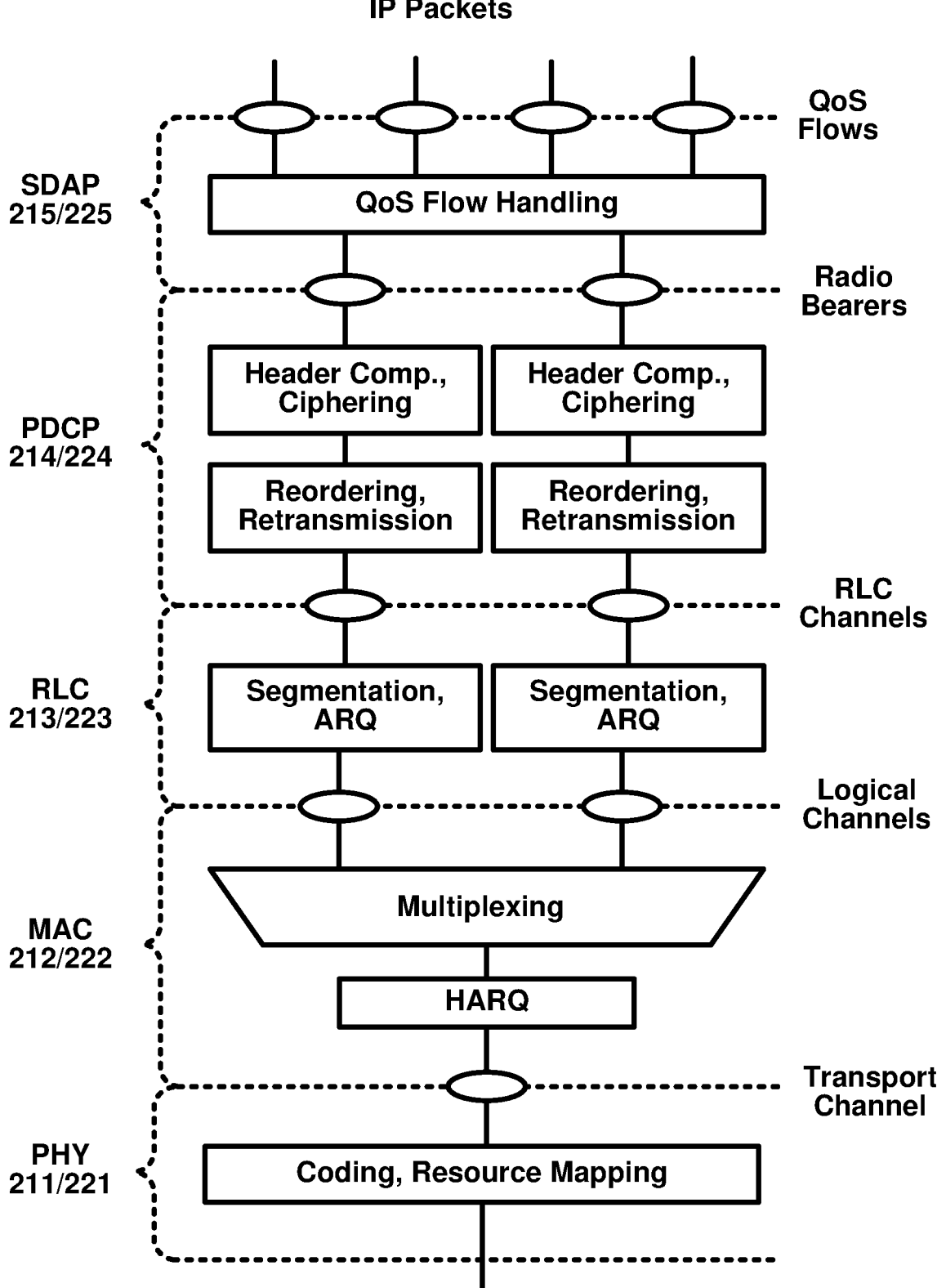
FIG. 3 shows example of protocol layers.

FIG. 3 shows an example of protocol layers. The protocol layers may comprise, for example, protocol layers of the NR user plane protocol stack. One or more services may be provided between protocol layers. SDAPs (e.g., SDAPS 215 and 225 shown in FIG. 2A and FIG. 3) may perform Quality of Service (QoS) flow handling. A wireless device (e.g., the wireless devices 106, 156A, 156B, and 210) may receive services through/via a PDU session, which may be a logical connection between the wireless device and a DN. The PDU session may have one or more QoS flows 310. A UPF (e.g., the UPF 158B) of a CN may map IP packets to the one or more QoS flows of the PDU session, for example, based on one or more QoS requirements (e.g., in terms of delay, data rate, error rate, and/or any other quality/service requirement). The SDAPs 215 and 225 may perform mapping/de-mapping between the one or more QoS flows 310 and one or more radio bearers 320 (e.g., data radio bearers). The mapping/de-mapping between the one or more QoS flows 310 and the radio bearers 320 may be determined by the SDAP 225 of the base station 220. The SDAP 215 of the wireless device 210 may be informed of the mapping between the QoS flows 310 and the radio bearers 320 via reflective mapping and/or control signaling received from the base station 220. For reflective mapping, the SDAP 225 of the base station 220 may mark the downlink packets with a QoS flow indicator (QFI), which may be monitored/ detected/identified/indicated/observed by the SDAP 215 of the wireless device 210 to determine the mapping/de-mapping between the one or more QoS flows 310 and the radio bearers 320.

PDCPs (e.g., the PDCPs 214 and 224 shown in FIG. 2A and FIG. 3) may perform header compression/decompression, for example, to reduce the amount of data that may need to be transmitted (e.g., sent) over the air interface, ciphering/deciphering to prevent unauthorized decoding of data transmitted (e.g., sent) over the air interface, and/or integrity protection (e.g., to ensure control messages originate from intended sources). The PDCPs 214 and 224 may perform retransmissions of undelivered packets, in-sequence delivery and reordering of packets, and/or removal of packets received in duplicate due to, for example, a handover (e.g., an intra-gNB handover). The PDCPs 214 and 224 may perform packet duplication, for example, to improve the likelihood of the packet being received. A receiver may receive the packet in duplicate and may remove any duplicate packets. Packet duplication may be useful for certain services, such as services that require high reliability.

The PDCP layers (e.g., PDCPs 214 and 224) may perform mapping/de-mapping between a split radio bearer and RLC channels (e.g., RLC channels 330) (e.g., in a dual connectivity scenario/configuration). Dual connectivity may refer to a technique that allows a wireless device to communicate with multiple cells (e.g., two cells) or, more generally, multiple cell groups comprising: a master cell group (MCG) and a secondary cell group (SCG). A split bearer may be configured and/or used, for example, if a single radio bearer (e.g., such as one of the radio bearers provided/configured by the PDCPs 214 and 224 as a service to the SDAPs 215 and 225) is handled by cell groups in dual connectivity. The PDCPs 214 and 224 may map/de-map between the split radio bearer and RLC channels 330 belonging to the cell groups.

RLC layers (e.g., RLCs 213 and 223) may perform segmentation, retransmission via Automatic Repeat Request (ARQ), and/or removal of duplicate data units received from MAC layers (e.g., MACs 212 and 222, respectively). The RLC layers (e.g., RLCs 213 and 223) may support multiple transmission modes (e.g., three transmission modes: transparent mode (TM); unacknowledged mode (UM); and acknowledged mode (AM)). The RLC layers may perform one or more of the noted functions, for example, based on the transmission mode an RLC layer is operating. The RLC configuration may be per logical channel. The RLC configuration may not depend on numerologies and/or Transmission Time Interval (TTI) durations (or other durations). The RLC layers (e.g., RLCs 213 and 223) may provide/ configure RLC channels as a service to the PDCP layers (e.g., PDCPs 214 and 224, respectively), such as shown in FIG. 3.

The MAC layers (e.g., MACs 212 and 222) may perform multiplexing/demultiplexing of logical channels and/or mapping between logical channels and transport channels. The multiplexing/demultiplexing may comprise multiplexing/demultiplexing of data units/data portions, belonging to the one or more logical channels, into/from Transport Blocks (TBs) delivered to/from the PHY layers (e.g., PHYs 211 and 221, respectively). The MAC layer of a base station (e.g., MAC 222) may be configured to perform scheduling, scheduling information reporting, and/or priority handling between wireless devices via dynamic scheduling. Scheduling may be performed by a base station (e.g., the base station 220 at the MAC 222) for downlink/or and uplink. The MAC layers (e.g., MACs 212 and 222) may be configured to perform error correction(s) via Hybrid Automatic Repeat Request (HARQ) (e.g., one HARQ entity per carrier in case of Carrier Aggregation (CA)), priority handling between logical channels of the wireless device 210 via logical channel prioritization and/or padding. The MAC layers (e.g., MACs 212 and 222) may support one or more numerologies and/or transmission timings. Mapping restrictions in a logical channel prioritization may control which numerology and/or transmission timing a logical channel may use. The MAC layers (e.g., the MACs 212 and 222) may provide/configure logical channels 340 as a service to the RLC layers (e.g., the RLCs 213 and 223).

The PHY layers (e.g., PHYs 211 and 221) may perform mapping of transport channels to physical channels and/or digital and analog signal processing functions, for example, for sending and/or receiving information (e.g., via an over the air interface). The digital and/or analog signal processing functions may comprise, for example, coding/decoding and/or modulation/demodulation. The PHY layers (e.g., PHYs 211 and 221) may perform multi-antenna mapping. The PHY layers (e.g., the PHYs 211 and 221) may provide/configure one or more transport channels (e.g., transport channels 350) as a service to the MAC layers (e.g., the MACs 212 and 222, respectively).

Figures 4A, 4B:
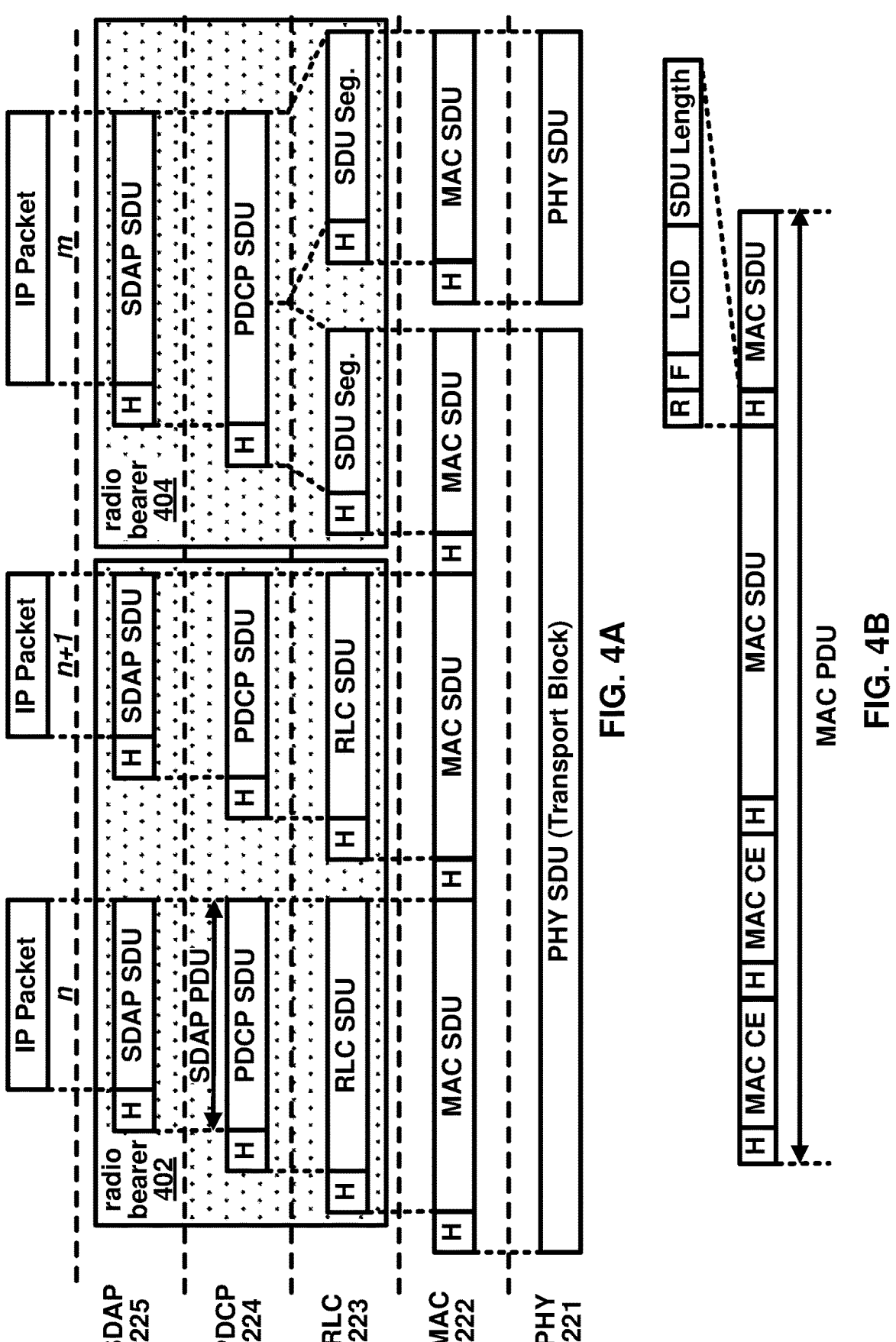
FIG. 4A shows an example downlink data flow for a user plane configuration.
FIG. 4B shows an example format of a Medium Access Control (MAC) subheader in a MAC Protocol Data Unit (PDU).

FIG. 4A shows an example downlink data flow for a user plane configuration. The user plane configuration may comprise, for example, the NR user plane protocol stack shown in FIG. 2A. One or more TBs may be generated, for example, based on a data flow via a user plane protocol stack. As shown in FIG. 4A, a downlink data flow of three IP packets (n, n+1, and m) via the NR user plane protocol stack may generate two TBs (e.g., at the base station 220). An uplink data flow via the NR user plane protocol stack may be similar to the downlink data flow shown in FIG. 4A. The three IP packets (n, n+1, and m) may be determined from the two TBs, for example, based on the uplink data flow via an NR user plane protocol stack. A first quantity of packets (e.g., three or any other quantity) may be determined from a second quantity of TBs (e.g., two or another quantity).

The downlink data flow may begin, for example, if the SDAP 225 receives the three IP packets (or other quantity of IP packets) from one or more QoS flows and maps the three packets (or other quantity of packets) to radio bearers (e.g., radio bearers 402 and 404). The SDAP 225 may map the IP packets n and n+1 to a first radio bearer 402 and map the IP packet m to a second radio bearer 404. An SDAP header (labeled with "H" preceding each SDAP SDU shown in FIG. 4A) may be added to an IP packet to generate an SDAP PDU, which may be referred to as a PDCP SDU. The data unit transferred from/to a higher protocol layer may be referred to as a service data unit (SDU) of the lower protocol layer, and the data unit transferred to/from a lower protocol layer may be referred to as a protocol data unit (PDU) of the higher protocol layer. As shown in FIG. 4A, the data unit from the SDAP 225 may be an SDU of lower protocol layer PDCP 224 (e.g., PDCP SDU) and may be a PDU of the SDAP 225 (e.g., SDAP PDU).

Each protocol layer (e.g., protocol layers shown in FIG. 4A) or at least some protocol layers may: perform its own function(s) (e.g., one or more functions of each protocol layer described with respect to FIG. 3), add a corresponding header, and/or forward a respective output to the next lower layer (e.g., its respective lower layer). The PDCP 224 may perform an IP-header compression and/or ciphering. The PDCP 224 may forward its output (e.g., a PDCP PDU, which is an RLC SDU) to the RLC 223. The RLC 223 may optionally perform segmentation (e.g., as shown for IP packet m in FIG. 4A). The RLC 223 may forward its outputs (e.g., two RLC PDUs, which are two MAC SDUs, generated by adding respective subheaders to two SDU segments (SDU Segs)) to the MAC 222. The MAC 222 may multiplex a number of RLC PDUs (MAC SDUs). The MAC 222 may attach a MAC subheader to an RLC PDU (MAC SDU) to form a TB. The MAC subheaders may be distributed across the MAC PDU (e.g., in an NR configuration as shown in FIG. 4A). The MAC subheaders may be entirely located at the beginning of a MAC PDU (e.g., in an LTE configuration). The NR MAC PDU structure may reduce a processing time and/or associated latency, for example, if the MAC PDU subheaders are computed before assembling the full MAC PDU.

FIG. 4B shows an example format of a MAC subheader in a MAC PDU. A MAC PDU may comprise a MAC subheader (H) and a MAC SDU. Each of one or more MAC subheaders may comprise an SDU length field for indicating the length (e.g., in bytes) of the MAC SDU to which the MAC subheader corresponds; a logical channel identifier (LCID) field for identifying/indicating the logical channel from which the MAC SDU originated to aid in the demultiplexing process; a flag (F) for indicating the size of the SDU length field; and a reserved bit (R) field for future use.

One or more MAC control elements (CEs) may be added to, or inserted into, the MAC PDU by a MAC layer, such as MAC 223 or MAC 222. As shown in FIG. 4B, two MAC CEs may be inserted/added before two MAC PDUs. The MAC CEs may be inserted/added at the beginning of a MAC PDU for downlink transmissions (as shown in FIG. 4B). One or more MAC CEs may be inserted/added at the end of a MAC PDU for uplink transmissions. MAC CEs may be used for in band control signaling. Example MAC CEs may comprise scheduling-related MAC CEs, such as buffer status reports and power headroom reports; activation/deactivation MAC CEs (e.g., MAC CEs for activation/deactivation of PDCP duplication detection, channel state information (CSI) reporting, sounding reference signal (SRS) transmission, and prior configured components); discontinuous reception (DRX)-related MAC CEs; timing advance MAC CEs; and random access-related MAC CEs. A MAC CE may be preceded by a MAC subheader with a similar format as described for the MAC subheader for MAC SDUs and may be identified with a reserved value in the LCID field that indicates the type of control information included in the corresponding MAC CE.

FIG. 5A shows an example mapping for downlink channels. The mapping for uplink channels may comprise mapping between channels (e.g., logical channels, transport channels, and physical channels) for downlink. FIG. 5B shows an example mapping for uplink channels. The mapping for uplink channels may comprise mapping between channels (e.g., logical channels, transport channels, and physical channels) for uplink. Information may be passed through/via channels between the RLC, the MAC, and the PHY layers of a protocol stack (e.g., the NR protocol stack). A logical channel may be used between the RLC and the MAC layers. The logical channel may be classified/indicated as a control channel that may carry control and/or configuration information (e.g., in the NR control plane), or as a traffic channel that may carry data (e.g., in the NR user plane). A logical channel may be classified/indicated as a dedicated logical channel that may be dedicated to a specific wireless device, and/or as a common logical channel that may be used by more than one wireless device (e.g., a group of wireless device).

A logical channel may be defined by the type of information it carries. The set of logical channels (e.g., in an NR configuration) may comprise one or more channels described below. A paging control channel (PCCH) may comprise/carry one or more paging messages used to page a wireless device whose location is not known to the network on a cell level. A broadcast control channel (BCCH) may comprise/carry system information messages in the form of a master information block (MIB) and several system information blocks (SIBs). The system information messages may be used by wireless devices to obtain information about how a cell is configured and how to operate within the cell. A common control channel (CCCH) may comprise/carry control messages together with random access. A dedicated control channel (DCCH) may comprise/carry control messages to/from a specific wireless device to configure the wireless device with configuration information. A dedicated traffic channel (DTCH) may comprise/carry user data to/from a specific wireless device.

Transport channels may be used between the MAC and PHY layers. Transport channels may be defined by how the information they carry is sent/transmitted (e.g., via an over the air interface). The set of transport channels (e.g., that may be defined by an NR configuration or any other configuration) may comprise one or more of the following channels. A paging channel (PCH) may comprise/carry paging messages that originated from the PCCH. A broadcast channel (BCH) may comprise/carry the MIB from the BCCH. A downlink shared channel (DL-SCH) may comprise/carry downlink data and signaling messages, including the SIBs from the BCCH. An uplink shared channel (UL-SCH) may comprise/carry uplink data and signaling messages. A random access channel (RACH) may provide a wireless device with an access to the network without any prior scheduling.

The PHY layer may use physical channels to pass/transfer information between processing levels of the PHY layer. A physical channel may have an associated set of time-frequency resources for carrying the information of one or more transport channels. The PHY layer may generate control information to support the low-level operation of the PHY layer. The PHY layer may provide/transfer the control information to the lower levels of the PHY layer via physical control channels (e.g., referred to as L1/L2 control channels). The set of physical channels and physical control channels (e.g., that may be defined by an NR configuration or any other configuration) may comprise one or more of the following channels. A physical broadcast channel (PBCH) may comprise/carry the MIB from the BCH. A physical downlink shared channel (PDSCH) may comprise/carry downlink data and signaling messages from the DL-SCH, as well as paging messages from the PCH. A physical downlink control channel (PDCCH) may comprise/carry downlink control information (DCI), which may comprise downlink scheduling commands, uplink scheduling grants, and uplink power control commands A physical uplink shared channel (PUSCH) may comprise/carry uplink data and signaling messages from the UL-SCH and in some instances uplink control information (UCI) as described below. A physical uplink control channel (PUCCH) may comprise/carry UCI, which may comprise HARQ acknowledgments, channel quality indicators (CQI), pre-coding matrix indicators (PMI), rank indicators (RI), and scheduling requests (SR). A physical random access channel (PRACH) may be used for random access.

The physical layer may generate physical signals to support the low-level operation of the physical layer, which may be similar to the physical control channels. As shown in FIG. 5A and FIG. 5B, the physical layer signals (e.g., that may be defined by an NR configuration or any other configuration) may comprise primary synchronization signals (PSS), secondary synchronization signals (SSS), channel state information reference signals (CSI-RS), demodulation reference signals (DM-RS), sounding reference signals (SRS), phase-tracking reference signals (PT RS), and/or any other signals.

One or more of the channels (e.g., logical channels, transport channels, physical channels, etc.) may be used to carry out functions associated with the control plan protocol stack (e.g., NR control plane protocol stack). FIG. 2B shows an example control plane configuration (e.g., an NR control plane protocol stack). As shown in FIG. 2B, the control plane configuration (e.g., the NR control plane protocol stack) may use substantially the same/similar one or more protocol layers (e.g., PHY 211 and 221, MAC 212 and 222, RLC 213 and 223, and PDCP 214 and 224) as the example user plane configuration (e.g., the NR user plane protocol stack). Similar four protocol layers may comprise the PHYs 211 and 221, the MACs 212 and 222, the RLCs 213 and 223, and the PDCPs 214 and 224. The control plane configuration (e.g., the NR control plane stack) may have radio resource controls (RRCs) 216 and 226 and NAS protocols 217 and 237 at the top of the control plane configuration (e.g., the NR control plane protocol stack), for example, instead of having the SDAPs 215 and 225. The control plane configuration may comprise an AMF 230 comprising the NAS protocol 237.

The NAS protocols 217 and 237 may provide control plane functionality between the wireless device 210 and the AMF 230 (e.g., the AMF 158A or any other AMF) and/or, more generally, between the wireless device 210 and a CN (e.g., the CN 152 or any other CN). The NAS protocols 217 and 237 may provide control plane functionality between the wireless device 210 and the AMF 230 via signaling messages, referred to as NAS messages. There may be no direct path between the wireless device 210 and the AMF 230 via which the NAS messages may be transported. The NAS messages may be transported using the AS of the Uu and NG interfaces. The NAS protocols 217 and 237 may provide control plane functionality, such as authentication, security, a connection setup, mobility management, session management, and/or any other functionality.

The RRCs 216 and 226 may provide/configure control plane functionality between the wireless device 210 and the base station 220 and/or, more generally, between the wireless device 210 and the RAN (e.g., the base station 220). The RRC layers 216 and 226 may provide/configure control plane functionality between the wireless device 210 and the base station 220 via signaling messages, which may be referred to as RRC messages. The RRC messages may be sent/transmitted between the wireless device 210 and the RAN (e.g., the base station 220) using signaling radio bearers and the same/similar PDCP, RLC, MAC, and PHY protocol layers. The MAC layer may multiplex control-plane and user-plane data into the same TB. The RRC layers 216 and 226 may provide/configure control plane functionality, such as one or more of the following functionalities: broadcast of system information related to AS and NAS; paging initiated by the CN or the RAN; establishment, maintenance and release of an RRC connection between the wireless device 210 and the RAN (e.g., the base station 220); security functions including key management; establishment, configuration, maintenance and release of signaling radio bearers and data radio bearers; mobility functions; QoS management functions; wireless device measurement reporting (e.g., the wireless device measurement reporting) and control of the reporting; detection of and recovery from radio link failure (RLF); and/or NAS message transfer. As part of establishing an RRC connection, RRC layers 216 and 226 may establish an RRC context, which may involve configuring parameters for communication between the wireless device 210 and the RAN (e.g., the base station 220).

Figure 6:
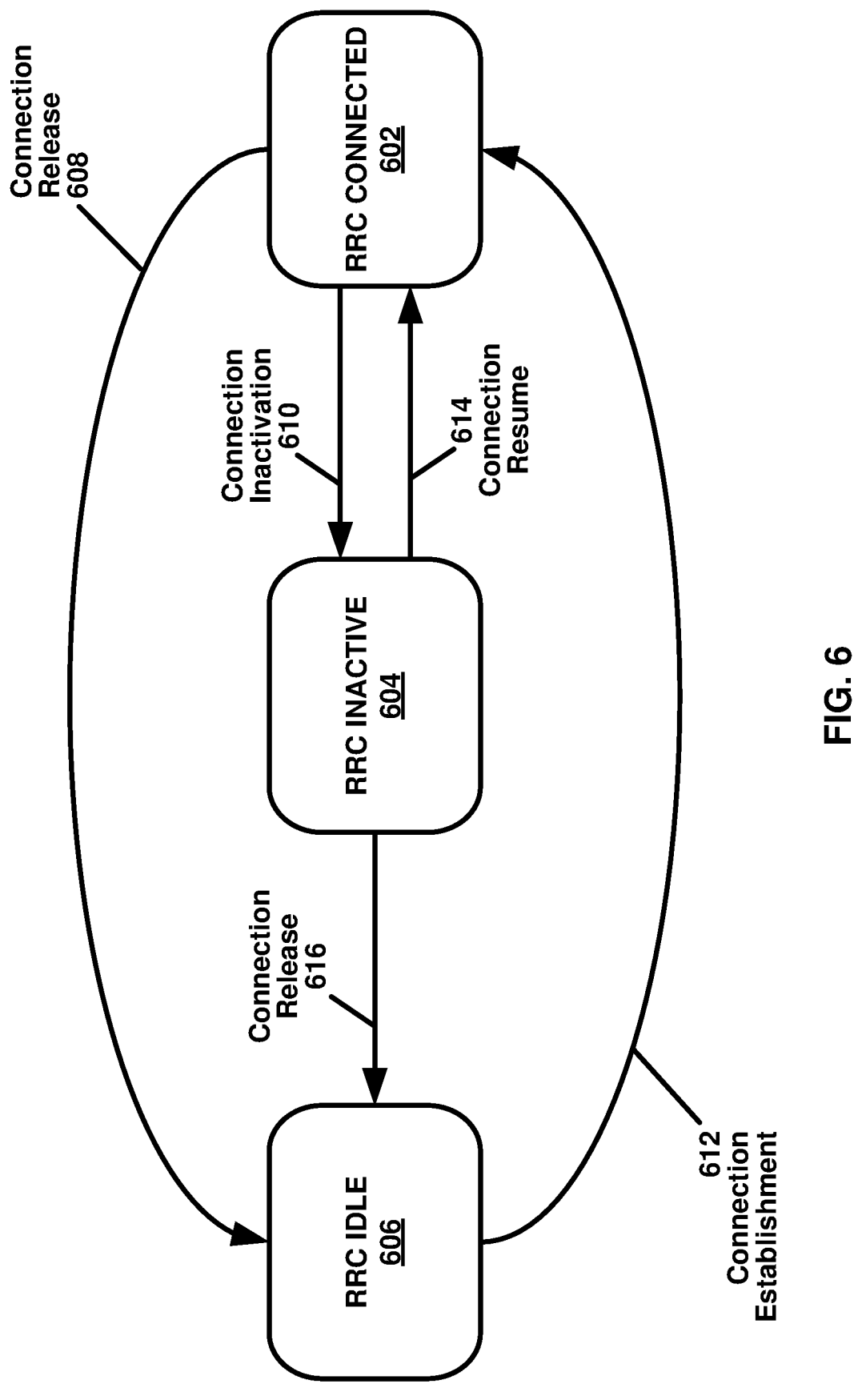
FIG. 6 shows example radio resource control (RRC) states and RRC state transitions.

FIG. 6 shows example RRC states and RRC state transitions. An RRC state of a wireless device may be changed to another RRC state (e.g., RRC state transitions of a wireless device). The wireless device may be substantially the same or similar to the wireless device 106, 210, or any other wireless device. A wireless device may be in at least one of a plurality of states, such as three RRC states comprising RRC connected 602 (e.g., RRC_CONNECTED), RRC idle 606 (e.g., RRC_IDLE), and RRC inactive 604 (e.g., RRC_I-NACTIVE). The RRC inactive 604 may be RRC connected but inactive.

An RRC connection may be established for the wireless device. For example, this may be during an RRC connected state. During the RRC connected state (e.g., during the RRC connected 602), the wireless device may have an established RRC context and may have at least one RRC connection with a base station. The base station may be similar to one of the one or more base stations (e.g., one or more base stations of the RAN 104 shown in FIG. 1A, one of the gNBs 160 or ng-eNBs 162 shown in FIG. 1B, the base station 220 shown in FIG. 2A and FIG. 2B, or any other base stations). The base station with which the wireless device is connected (e.g., has established an RRC connection) may have the RRC context for the wireless device. The RRC context, which may be referred to as a wireless device context (e.g., the UE context), may comprise parameters for communication between the wireless device and the base station. These parameters may comprise, for example, one or more of: AS contexts; radio link configuration parameters; bearer configuration information (e.g., relating to a data radio bearer, a signaling radio bearer, a logical channel, a QoS flow, and/or a PDU session); security information; and/or layer configuration information (e.g., PHY, MAC, RLC, PDCP, and/or SDAP layer configuration information). During the RRC connected state (e.g., the RRC connected 602), mobility of the wireless device may be managed/controlled by an RAN (e.g., the RAN 104 or the NG RAN 154). The wireless device may measure received signal levels (e.g., reference signal levels, reference signal received power, reference signal received quality, received signal strength indicator, etc.) based on one or more signals sent from a serving cell and neighboring cells. The wireless device may report these measurements to a serving base station (e.g., the base station currently serving the wireless device). The serving base station of the wireless device may request a handover to a cell of one of the neighboring base stations, for example, based on the reported measurements. The RRC state may transition from the RRC connected state (e.g., RRC connected 602) to an RRC idle state (e.g., the RRC idle 606) via a connection release procedure 608. The RRC state may transition from the RRC connected state (e.g., RRC connected 602) to the RRC inactive state (e.g., RRC inactive 604) via a connection inactivation procedure 610.

An RRC context may not be established for the wireless device. For example, this may be during the RRC idle state. During the RRC idle state (e.g., the RRC idle 606), an RRC context may not be established for the wireless device. During the RRC idle state (e.g., the RRC idle 606), the wireless device may not have an RRC connection with the base station. During the RRC idle state (e.g., the RRC idle 606), the wireless device may be in a sleep state for the majority of the time (e.g., to conserve battery power). The wireless device may wake up periodically (e.g., once in every discontinuous reception (DRX) cycle) to monitor for paging messages (e.g., paging messages set from the RAN). Mobility of the wireless device may be managed by the wireless device via a procedure of a cell reselection. The RRC state may transition from the RRC idle state (e.g., the RRC idle 606) to the RRC connected state (e.g., the RRC connected 602) via a connection establishment procedure 612, which may involve a random access procedure.

A previously established RRC context may be maintained for the wireless device. For example, this may be during the RRC inactive state. During the RRC inactive state (e.g., the RRC inactive 604), the RRC context previously established may be maintained in the wireless device and the base station. The maintenance of the RRC context may enable/allow a fast transition to the RRC connected state (e.g., the RRC connected 602) with reduced signaling overhead as compared to the transition from the RRC idle state (e.g., the RRC idle 606) to the RRC connected state (e.g., the RRC connected 602). During the RRC inactive state (e.g., the RRC inactive 604), the wireless device may be in a sleep state and mobility of the wireless device may be managed/controlled by the wireless device via a cell reselection. The RRC state may transition from the RRC inactive state (e.g., the RRC inactive 604) to the RRC connected state (e.g., the RRC connected 602) via a connection resume procedure 614. The RRC state may transition from the RRC inactive state (e.g., the RRC inactive 604) to the RRC idle state (e.g., the RRC idle 606) via a connection release procedure 616 that may be the same as or similar to connection release procedure 608.

An RRC state may be associated with a mobility management mechanism. During the RRC idle state (e.g., RRC idle 606) and the RRC inactive state (e.g., the RRC inactive 604), mobility may be managed/controlled by the wireless device via a cell reselection. The purpose of mobility management during the RRC idle state (e.g., the RRC idle 606) or during the RRC inactive state (e.g., the RRC inactive 604) may be to enable/allow the network to be able to notify the wireless device of an event via a paging message without having to broadcast the paging message over the entire mobile communications network. The mobility management mechanism used during the RRC idle state (e.g., the RRC idle 606) or during the RRC idle state (e.g., the RRC inactive 604) may enable/allow the network to track the wireless device on a cell-group level, for example, so that the paging message may be broadcast over the cells of the cell group that the wireless device currently resides within (e.g. instead of sending the paging message over the entire mobile communication network). The mobility management mechanisms for the RRC idle state (e.g., the RRC idle 606) and the RRC inactive state (e.g., the RRC inactive 604) may track the wireless device on a cell-group level. The mobility management mechanisms may do the tracking, for example, using different granularities of grouping. There may be a plurality of levels of cell-grouping granularity (e.g., three levels of cell-grouping granularity: individual cells; cells within a RAN area identified by a RAN area identifier (RAI); and cells within a group of RAN areas, referred to as a tracking area and identified by a tracking area identifier (TAI)).

Tracking areas may be used to track the wireless device (e.g., tracking the location of the wireless device at the CN level). The CN (e.g., the CN 102, the 5G CN 152, or any other CN) may send to the wireless device a list of TAIs associated with a wireless device registration area (e.g., a UE registration area). A wireless device may perform a registration update with the CN to allow the CN to update the location of the wireless device and provide the wireless device with a new the UE registration area, for example, if the wireless device moves (e.g., via a cell reselection) to a cell associated with a TAI that may not be included in the list of TAIs associated with the UE registration area.

RAN areas may be used to track the wireless device (e.g., the location of the wireless device at the RAN level). For a wireless device in an RRC inactive state (e.g., the RRC inactive 604), the wireless device may be assigned/provided/configured with a RAN notification area. A RAN notification area may comprise one or more cell identities (e.g., a list of RAIs and/or a list of TAIs). A base station may belong to one or more RAN notification areas. A cell may belong to one or more RAN notification areas. A wireless device may perform a notification area update with the RAN to update the RAN notification area of the wireless device, for example, if the wireless device moves (e.g., via a cell reselection) to a cell not included in the RAN notification area assigned/provided/configured to the wireless device.

A base station storing an RRC context for a wireless device or a last serving base station of the wireless device may be referred to as an anchor base station. An anchor base station may maintain an RRC context for the wireless device at least during a period of time that the wireless device stays in a RAN notification area of the anchor base station and/or during a period of time that the wireless device stays in an RRC inactive state (e.g., RRC inactive 604).

A base station (e.g., gNBs 160 in FIG. 1B or any other base station) may be split in two parts: a central unit (e.g., a base station central unit, such as a gNB CU) and one or more distributed units (e.g., a base station distributed unit, such as a gNB DU). A base station central unit (CU) may be coupled to one or more base station distributed units (DUs) using an F1 interface (e.g., an F1 interface defined in an NR configuration). The base station CU may comprise the RRC, the PDCP, and the SDAP layers. A base station distributed unit (DU) may comprise the RLC, the MAC, and the PHY layers.

The physical signals and physical channels (e.g., described with respect to FIG. 5A and FIG. 5B) may be mapped onto one or more symbols (e.g., orthogonal frequency divisional multiplexing (OFDM) symbols in an NR configuration or any other symbols). OFDM is a multicarrier communication scheme that sends/transmits data over F orthogonal subcarriers (or tones). The data may be mapped to a series of complex symbols (e.g., M-quadrature amplitude modulation (M-QAM) symbols or M-phase shift keying (M PSK) symbols or any other modulated symbols), referred to as source symbols, and divided into F parallel symbol streams, for example, before transmission of the data. The F parallel symbol streams may be treated as if they are in the frequency domain. The F parallel symbols may be used as inputs to an Inverse Fast Fourier Transform (IFFT) block that transforms them into the time domain. The IFFT block may take in F source symbols at a time, one from each of the F parallel symbol streams. The IFFT block may use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. An OFDM symbol provided/output by the IFFT block may be sent/transmitted over the air interface on a carrier frequency, for example, after one or more processes (e.g., addition of a cyclic prefix) and up-conversion. The F parallel symbol streams may be mixed, for example, using a Fast Fourier Transform (FFT) block before being processed by the IFFT block. This operation may produce Discrete Fourier Transform (DFT)-precoded OFDM symbols and may be used by one or more wireless devices in the uplink to reduce the peak to average power ratio (PAPR). Inverse processing may be performed on the OFDM symbol at a receiver using an FFT block to recover the data mapped to the source symbols.

Figure 7:
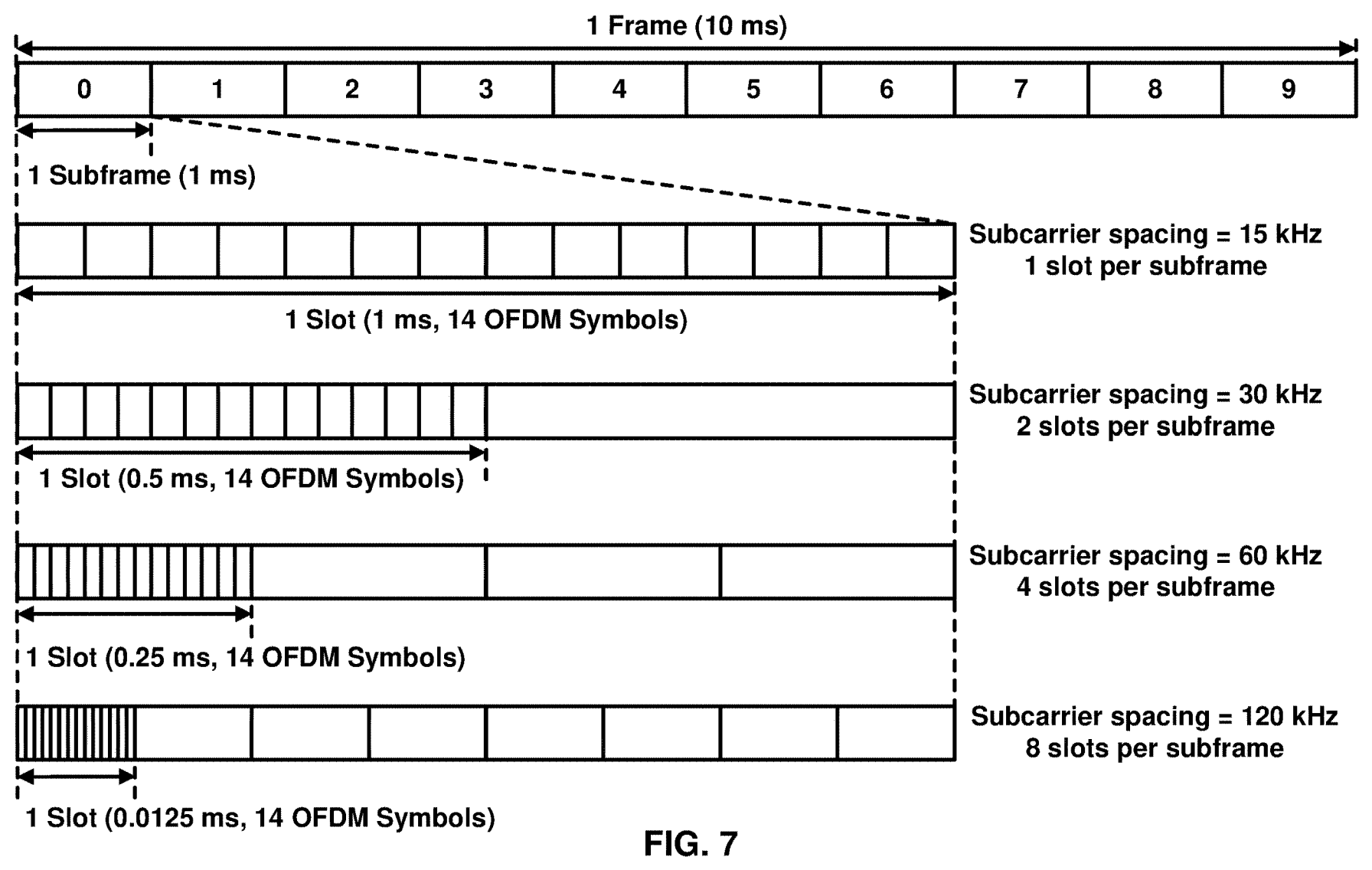

FIG. 7 shows an example configuration of a frame. The frame may comprise, for example, an NR radio frame into which OFDM symbols may be grouped. A frame (e.g., an NR radio frame) may be identified/indicated by a system frame number (SFN) or any other value. The SFN may repeat with a period of 1024 frames. One NR frame may be 10 milliseconds (ms) in duration and may comprise 10 subframes that are 1 ms in duration. A subframe may be divided into one or more slots (e.g., depending on numerologies and/or different subcarrier spacings). Each of the one or more slots may comprise, for example, 14 OFDM symbols per slot. Any quantity of symbols, slots, or duration may be used for any time interval.

The duration of a slot may depend on the numerology used for the OFDM symbols of the slot. A flexible numerology may be supported, for example, to accommodate different deployments (e.g., cells with carrier frequencies below 1 GHz up to cells with carrier frequencies in the mm-wave range). A flexible numerology may be supported, for example, in an NR configuration or any other radio configurations. A numerology may be defined in terms of subcarrier spacing and/or cyclic prefix duration. Subcarrier spacings may be scaled up by powers of two from a baseline subcarrier spacing of 15 kHz. Cyclic prefix durations may be scaled down by powers of two from a baseline cyclic prefix duration of 4.7 µs, for example, for a numerology in an NR configuration or any other radio configurations. Numerologies may be defined with the following subcarrier spacing/cyclic prefix duration combinations: 15 kHz/4.7 µs; 30 kHz/2.3 µs; 60 kHz/1.2 µs; 120 kHz/0.59 µs; 240 kHz/0.29 µs, and/or any other subcarrier spacing/cyclic prefix duration combinations.

A slot may have a fixed number/quantity of OFDM symbols (e.g., 14 OFDM symbols). A numerology with a higher subcarrier spacing may have a shorter slot duration and more slots per subframe. Examples of numerology-dependent slot duration and slots-per-subframe transmission structure are shown in FIG. 7 (the numerology with a subcarrier spacing of 240 kHz is not shown in FIG. 7). A subframe (e.g., in an NR configuration) may be used as a numerology-independent time reference. A slot may be used as the unit upon which uplink and downlink transmissions are scheduled. Scheduling (e.g., in an NR configuration) may be decoupled from the slot duration. Scheduling may start at any OFDM symbol. Scheduling may last for as many symbols as needed for a transmission, for example, to support low latency. These partial slot transmissions may be referred to as mini-slot or sub-slot transmissions.

Figure 8:
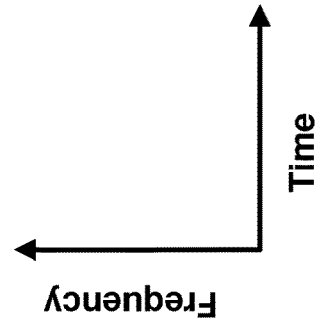
FIG. 8 shows an example resource configuration of one or more carriers.

FIG. 8 shows an example resource configuration of one or more carriers. The resource configuration of may comprise a slot in the time and frequency domain for an NR carrier or any other carrier. The slot may comprise resource elements (REs) and resource blocks (RBs). A resource element (RE) may be the smallest physical resource (e.g., in an NR configuration). An RE may span one OFDM symbol in the time domain by one subcarrier in the frequency domain, such as shown in FIG. 8. An RB may span twelve consecutive REs in the frequency domain, such as shown in FIG. 8. A carrier (e.g., an NR carrier) may be limited to a width of a certain quantity of RBs and/or subcarriers (e.g., 275 RBs or 275×12=3300 subcarriers). Such limitation(s), if used, may limit the carrier (e.g., NR carrier) frequency based on subcarrier spacing (e.g., carrier frequency of 50, 100, 200, and 400 MHz for subcarrier spacings of 15, 30, 60, and 120 kHz, respectively). A 400 MHz bandwidth may be set based on a 400 MHz per carrier bandwidth limit. Any other bandwidth may be set based on a per carrier bandwidth limit.

A single numerology may be used across the entire bandwidth of a carrier (e.g., an NR such as shown in FIG. 8). In other example configurations, multiple numerologies may be supported on the same carrier. NR and/or other access technologies may support wide carrier bandwidths (e.g., up to 400 MHz for a subcarrier spacing of 120 kHz). Not all wireless devices may be able to receive the full carrier bandwidth (e.g., due to hardware limitations and/or different wireless device capabilities). Receiving and/or utilizing the full carrier bandwidth may be prohibitive, for example, in terms of wireless device power consumption. A wireless device may adapt the size of the receive bandwidth of the wireless device, for example, based on the amount of traffic the wireless device is scheduled to receive (e.g., to reduce power consumption and/or for other purposes). Such an adaptation may be referred to as bandwidth adaptation.

Configuration of one or more bandwidth parts (BWPs) may support one or more wireless devices not capable of receiving the full carrier bandwidth. BWPs may support bandwidth adaptation, for example, for such wireless devices not capable of receiving the full carrier bandwidth. A BWP (e.g., a BWP of an NR configuration) may be defined by a subset of contiguous RBs on a carrier. A wireless device may be configured (e.g., via an RRC layer) with one or more downlink BWPs per serving cell and one or more uplink BWPs per serving cell (e.g., up to four downlink BWPs per serving cell and up to four uplink BWPs per serving cell). One or more of the configured BWPs for a serving cell may be active, for example, at a given time. The one or more BWPs may be referred to as active BWPs of the serving cell. A serving cell may have one or more first active BWPs in the uplink carrier and one or more second active BWPs in the secondary uplink carrier, for example, if the serving cell is configured with a secondary uplink carrier.

A downlink BWP from a set of configured downlink BWPs may be linked with an uplink BWP from a set of configured uplink BWPs (e.g., for unpaired spectra). A downlink BWP and an uplink BWP may be linked, for example, if a downlink BWP index of the downlink BWP and an uplink BWP index of the uplink BWP are the same. A wireless device may expect that the center frequency for a downlink BWP is the same as the center frequency for an uplink BWP (e.g., for unpaired spectra).

A base station may configure a wireless device with one or more control resource sets (CORESETs) for at least one search space. The base station may configure the wireless device with one or more CORESETS, for example, for a downlink BWP in a set of configured downlink BWPs on a primary cell (PCell) or on a secondary cell (SCell). A search space may comprise a set of locations in the time and frequency domains where the wireless device may monitor/find/detect/identify control information. The search space may be a wireless device-specific search space (e.g., a UE-specific search space) or a common search space (e.g., potentially usable by a plurality of wireless devices or a group of wireless user devices). A base station may configure a group of wireless devices with a common search space, on a PCell or on a primary secondary cell (PSCell), in an active downlink BWP.

A base station may configure a wireless device with one or more resource sets for one or more PUCCH transmissions, for example, for an uplink BWP in a set of configured uplink BWPs. A wireless device may receive downlink receptions (e.g., PDCCH or PDSCH) in a downlink BWP, for example, according to a configured numerology (e.g., a configured subcarrier spacing and/or a configured cyclic prefix duration) for the downlink BWP. The wireless device may send/transmit uplink transmissions (e.g., PUCCH or PUSCH) in an uplink BWP, for example, according to a configured numerology (e.g., a configured subcarrier spacing and/or a configured cyclic prefix length for the uplink BWP).

One or more BWP indicator fields may be provided/comprised in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a wireless device with a default downlink BWP within a set of configured downlink BWPs associated with a PCell. A default downlink BWP may be an initial active downlink BWP, for example, if the base station does not provide/configure a default downlink BWP to/for the wireless device. The wireless device may determine which BWP is the initial active downlink BWP, for example, based on a CORESET configuration obtained using the PBCH.

A base station may configure a wireless device with a BWP inactivity timer value for a PCell. The wireless device may start or restart a BWP inactivity timer at any appropriate time. The wireless device may start or restart the BWP inactivity timer, for example, if one or more conditions are satisfied. The one or more conditions may comprise at least one of: the wireless device detects DCI indicating an active downlink BWP other than a default downlink BWP for a paired spectra operation; the wireless device detects DCI indicating an active downlink BWP other than a default downlink BWP for an unpaired spectra operation; and/or the wireless device detects DCI indicating an active uplink BWP other than a default uplink BWP for an unpaired spectra operation. The wireless device may start/run the BWP inactivity timer toward expiration (e.g., increment from zero to the BWP inactivity timer value, or decrement from the BWP inactivity timer value to zero), for example, if the wireless device does not detect DCI during a time interval (e.g., 1 ms or 0.5 ms). The wireless device may switch from the active downlink BWP to the default downlink BWP, for example, if the BWP inactivity timer expires.

A base station may semi-statically configure a wireless device with one or more BWPs. A wireless device may switch an active BWP from a first BWP to a second BWP, for example, based on (e.g., after or in response to) receiving DCI indicating the second BWP as an active BWP. A wireless device may switch an active BWP from a first BWP to a second BWP, for example, based on (e.g., after or in response to) an expiry of the BWP inactivity timer (e.g., if the second BWP is the default BWP).

A downlink BWP switching may refer to switching an active downlink BWP from a first downlink BWP to a second downlink BWP (e.g., the second downlink BWP is activated and the first downlink BWP is deactivated). An uplink BWP switching may refer to switching an active uplink BWP from a first uplink BWP to a second uplink BWP (e.g., the second uplink BWP is activated and the first uplink BWP is deactivated). Downlink and uplink BWP switching may be performed independently (e.g., in paired spectrum/spectra). Downlink and uplink BWP switching may be performed simultaneously (e.g., in unpaired spectrum/spectra). Switching between configured BWPs may occur, for example, based on RRC signaling, DCI signaling, expiration of a BWP inactivity timer, and/or an initiation of random access.

Figure 9:
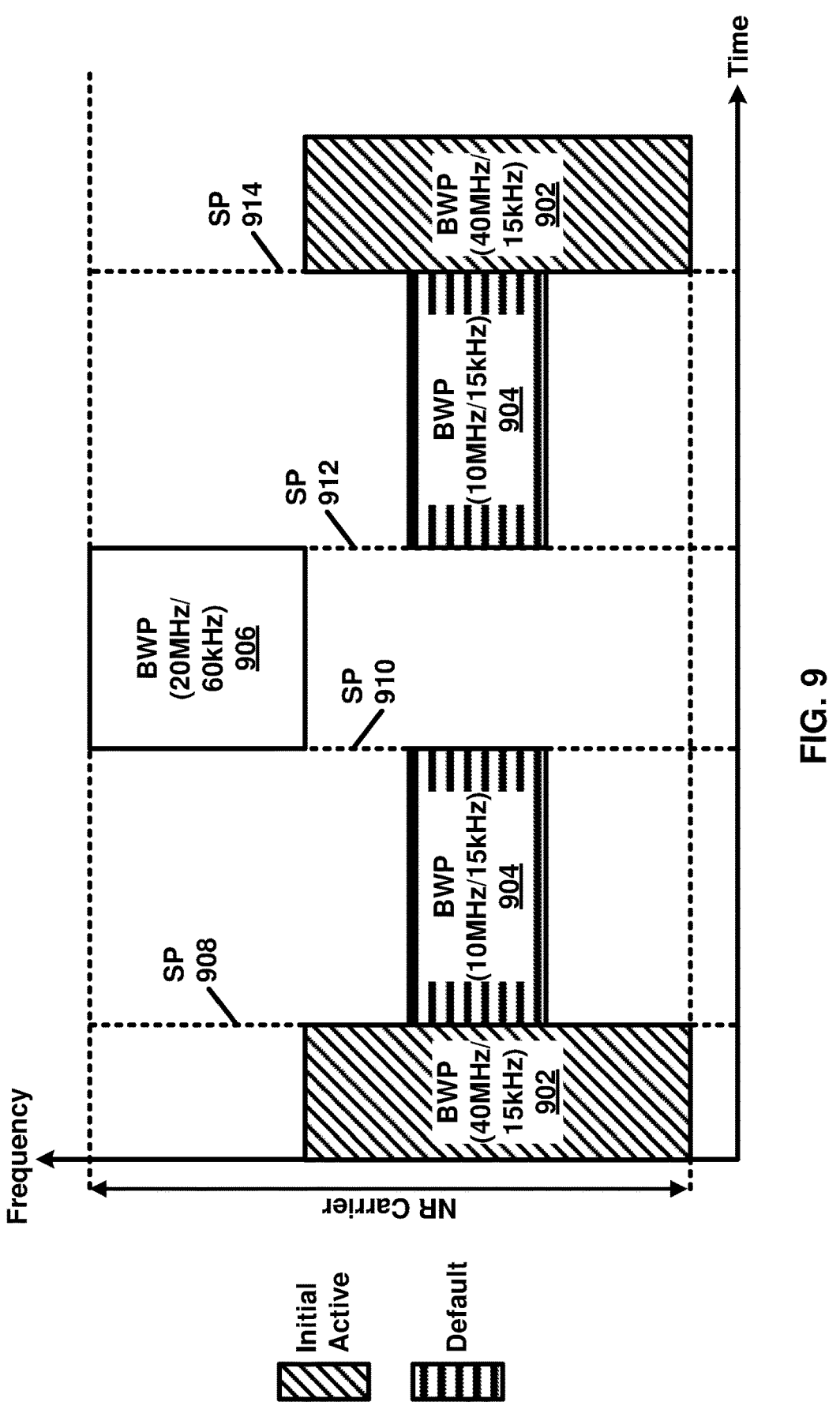
FIG. 9 shows an example configuration of bandwidth parts (BWPs).

FIG. 9 shows an example of configured BWPs. Bandwidth adaptation using multiple BWPs (e.g., three configured BWPs for an NR carrier) may be available. A wireless device configured with multiple BWPs (e.g., the three BWPs) may switch from one BWP to another BWP at a switching point. The BWPs may comprise: a BWP 902 having a bandwidth of 40 MHz and a subcarrier spacing of 15 kHz; a BWP 904 having a bandwidth of 10 MHz and a subcarrier spacing of 15 kHz; and a BWP 906 having a bandwidth of 20 MHz and a subcarrier spacing of 60 kHz. The BWP 902 may be an initial active BWP, and the BWP 904 may be a default BWP. The wireless device may switch between BWPs at switching points. The wireless device may switch from the BWP 902 to the BWP 904 at a switching point 908. The switching at the switching point 908 may occur for any suitable reasons. The switching at a switching point 908 may occur, for example, based on (e.g., after or in response to) an expiry of a BWP inactivity timer (e.g., indicating switching to the default BWP). The switching at the switching point 908 may occur, for example, based on (e.g., after or in response to) receiving DCI indicating BWP 904 as the active BWP. The wireless device may switch at a switching point 910 from an active BWP 904 to the BWP 906, for example, after or in response receiving DCI indicating BWP 906 as a new active BWP. The wireless device may switch at a switching point 912 from an active BWP 906 to the BWP 904, for example, a based on (e.g., after or in response to) an expiry of a BWP inactivity timer. The wireless device may switch at the switching point 912 from an active BWP 906 to the BWP 904, for example, after or in response receiving DCI indicating BWP 904 as a new active BWP. The wireless device may switch at a switching point 914 from an active BWP 904 to the BWP 902, for example, after or in response receiving DCI indicating the BWP 902 as a new active BWP.

Wireless device procedures for switching BWPs on a secondary cell may be the same/similar as those on a primary cell, for example, if the wireless device is configured for a secondary cell with a default downlink BWP in a set of configured downlink BWPs and a timer value. The wireless device may use the timer value and the default downlink BWP for the secondary cell in the same/similar manner as the wireless device uses the timer value and/or default BWPs for a primary cell. The timer value (e.g., the BWP inactivity timer) may be configured per cell (e.g., for one or more BWPs), for example, via RRC signaling or any other signaling. One or more active BWPs may switch to another BWP, for example, based on an expiration of the BWP inactivity timer.

Two or more carriers may be aggregated and data may be simultaneously sent/transmitted to/from the same wireless device using carrier aggregation (CA) (e.g., to increase data rates). The aggregated carriers in CA may be referred to as component carriers (CCs). There may be a number/quantity of serving cells for the wireless device (e.g., one serving cell for a CC), for example, if CA is configured/used. The CCs may have multiple configurations in the frequency domain.

Figure 10A:
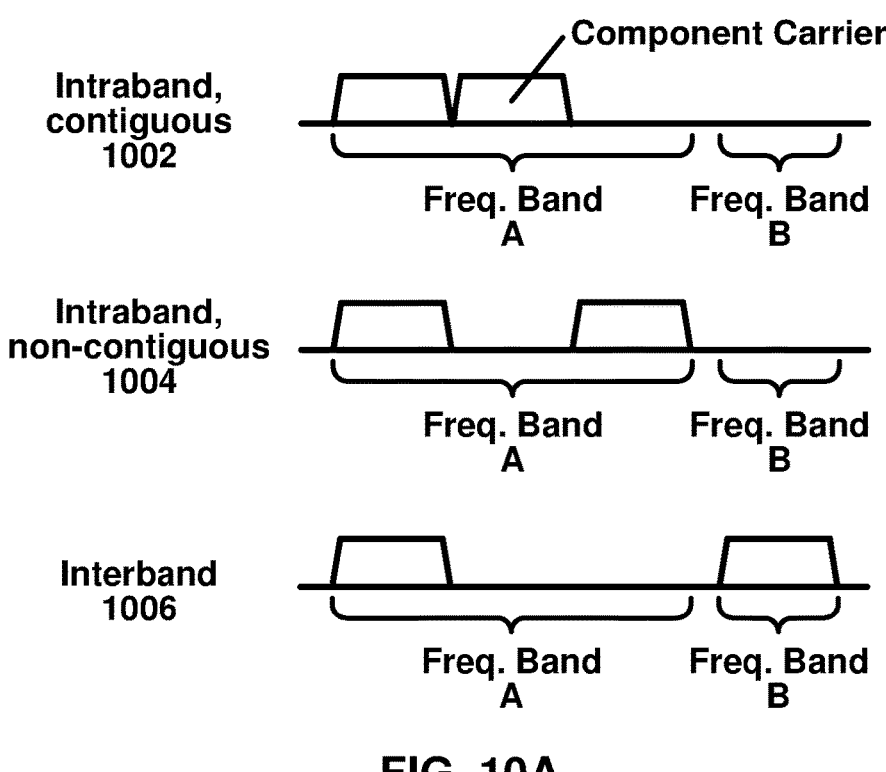
FIG. 10A shows example carrier aggregation configurations based on component carriers.

FIG. 10A shows example CA configurations based on CCs. As shown in FIG. 10A, three types of CA configurations may comprise an intraband (contiguous) configuration 1002, an intraband (non-contiguous) configuration 1004, and/or an interband configuration 1006. In the intraband (contiguous) configuration 1002, two CCs may be aggregated in the same frequency band (frequency band A) and may be located directly adjacent to each other within the frequency band. In the intraband (non-contiguous) configuration 1004, two CCs may be aggregated in the same frequency band (frequency band A) but may be separated from each other in the frequency band by a gap. In the interband configuration 1006, two CCs may be located in different frequency bands (e.g., frequency band A and frequency band B, respectively).

A network may set the maximum quantity of CCs that can be aggregated (e.g., up to 32 CCs may be aggregated in NR, or any other quantity may be aggregated in other systems). The aggregated CCs may have the same or different bandwidths, subcarrier spacing, and/or duplexing schemes (TDD, FDD, or any other duplexing schemes). A serving cell for a wireless device using CA may have a downlink CC. One or more uplink CCs may be optionally configured for a serving cell (e.g., for FDD). The ability to aggregate more downlink carriers than uplink carriers may be useful, for example, if the wireless device has more data traffic in the downlink than in the uplink.

One of the aggregated cells for a wireless device may be referred to as a primary cell (PCell), for example, if a CA is configured. The PCell may be the serving cell that the wireless initially connects to or access to, for example, during or at an RRC connection establishment, an RRC connection reestablishment, and/or a handover. The PCell may provide/configure the wireless device with NAS mobility information and the security input. Wireless device may have different PCells. For the downlink, the carrier corresponding to the PCell may be referred to as the downlink primary CC (DL PCC). For the uplink, the carrier corresponding to the PCell may be referred to as the uplink primary CC (UL PCC). The other aggregated cells (e.g., associated with CCs other than the DL PCC and UL PCC) for the wireless device may be referred to as secondary cells (SCells). The SCells may be configured, for example, after the PCell is configured for the wireless device. An SCell may be configured via an RRC connection reconfiguration procedure. For the downlink, the carrier corresponding to an SCell may be referred to as a downlink secondary CC (DL SCC). For the uplink, the carrier corresponding to the SCell may be referred to as the uplink secondary CC (UL SCC).

Configured SCells for a wireless device may be activated or deactivated, for example, based on traffic and channel conditions. Deactivation of an SCell may cause the wireless device to stop PDCCH and PDSCH reception on the SCell and PUSCH, SRS, and CQI transmissions on the SCell. Configured SCells may be activated or deactivated, for example, using a MAC CE (e.g., the MAC CE described with respect to FIG. 4B). A MAC CE may use a bitmap (e.g., one bit per SCell) to indicate which SCells (e.g., in a subset of configured SCells) for the wireless device are activated or deactivated. Configured SCells may be deactivated, for example, based on (e.g., after or in response to) an expiration of an SCell deactivation timer (e.g., one SCell deactivation timer per SCell may be configured).

DCI may comprise control information, such as scheduling assignments and scheduling grants, for a cell. DCI may be sent/transmitted via the cell corresponding to the scheduling assignments and/or scheduling grants, which may be referred to as a self-scheduling. DCI comprising control information for a cell may be sent/transmitted via another cell, which may be referred to as a cross-carrier scheduling. Uplink control information (UCI) may comprise control information, such as HARQ acknowledgments and channel state feedback (e.g., CQI, PMI, and/or RI) for aggregated cells. UCI may be sent/transmitted via an uplink control channel (e.g., a PUCCH) of the PCell or a certain SCell (e.g., an SCell configured with PUCCH). For a larger number of aggregated downlink CCs, the PUCCH of the PCell may become overloaded. Cells may be divided into multiple PUCCH groups.

Figure 10B:
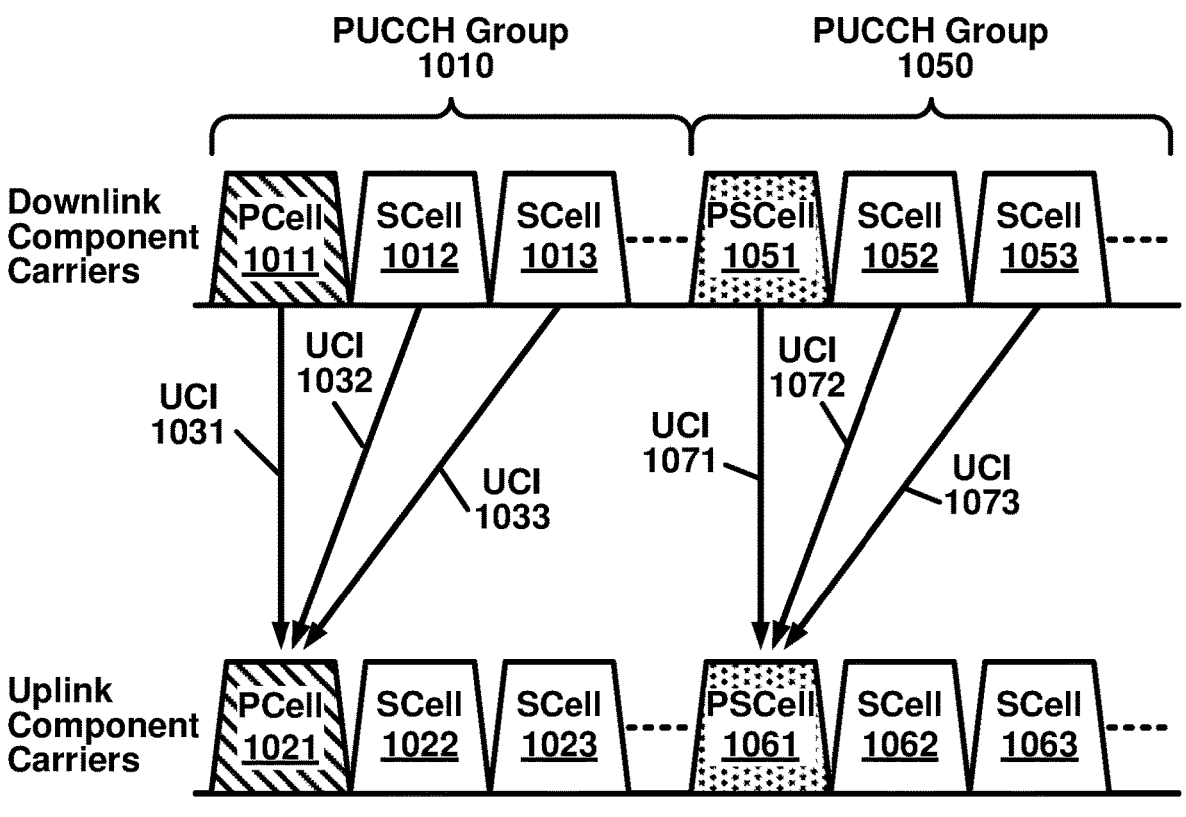
FIG. 10B shows example group of cells.

FIG. 10B shows example group of cells. Aggregated cells may be configured into one or more PUCCH groups (e.g., as shown in FIG. 10B). One or more cell groups or one or more uplink control channel groups (e.g., a PUCCH group 1010 and a PUCCH group 1050) may comprise one or more downlink CCs, respectively. The PUCCH group 1010 may comprise one or more downlink CCs, for example, three downlink CCs: a PCell 1011 (e.g., a DL PCC), an SCell 1012 (e.g., a DL SCC), and an SCell 1013 (e.g., a DL SCC). The PUCCH group 1050 may comprise one or more downlink CCs, for example, three downlink CCs: a PUCCH SCell (or PSCell) 1051 (e.g., a DL SCC), an SCell 1052 (e.g., a DL SCC), and an SCell 1053 (e.g., a DL SCC). One or more uplink CCs of the PUCCH group 1010 may be configured as a PCell 1021 (e.g., a UL PCC), an SCell 1022 (e.g., a UL SCC), and an SCell 1023 (e.g., a UL SCC). One or more uplink CCs of the PUCCH group 1050 may be configured as a PUCCH SCell (or PSCell) 1061 (e.g., a UL SCC), an SCell 1062 (e.g., a UL SCC), and an SCell 1063 (e.g., a UL SCC). UCI related to the downlink CCs of the PUCCH group 1010, shown as UCI 1031, UCI 1032, and UCI 1033, may be sent/transmitted via the uplink of the PCell 1021 (e.g., via the PUCCH of the PCell 1021). UCI related to the downlink CCs of the PUCCH group 1050, shown as UCI 1071, UCI 1072, and UCI 1073, may be sent/transmitted via the uplink of the PUCCH SCell (or PSCell) 1061 (e.g., via the PUCCH of the PUCCH SCell 1061). A single uplink PCell may be configured to send/transmit UCI relating to the six downlink CCs, for example, if the aggregated cells shown in FIG. 10B are not divided into the PUCCH group 1010 and the PUCCH group 1050. The PCell 1021 may become overloaded, for example, if the UCIs 1031, 1032, 1033, 1071, 1072, and 1073 are sent/transmitted via the PCell 1021. By dividing transmissions of UCI between the PCell 1021 and the PUCCH SCell (or PSCell) 1061, overloading may be prevented and/or reduced.

A PCell may comprise a downlink carrier (e.g., the PCell 1011) and an uplink carrier (e.g., the PCell 1021). An SCell may comprise only a downlink carrier. A cell, comprising a downlink carrier and optionally an uplink carrier, may be assigned with a physical cell ID and a cell index. The physical cell ID or the cell index may indicate/identify a downlink carrier and/or an uplink carrier of the cell, for example, depending on the context in which the physical cell ID is used. A physical cell ID may be determined, for example, using a synchronization signal (e.g., PSS and/or SSS) sent/transmitted via a downlink component carrier. A cell index may be determined, for example, using one or more RRC messages. A physical cell ID may be referred to as a carrier ID, and a cell index may be referred to as a carrier index. A first physical cell ID for a first downlink carrier may refer to the first physical cell ID for a cell comprising the first downlink carrier. Substantially the same/similar concept may apply to, for example, a carrier activation. Activation of a first carrier may refer to activation of a cell comprising the first carrier.

A multi-carrier nature of a PHY layer may be exposed/indicated to a MAC layer (e.g., in a CA configuration). A HARQ entity may operate on a serving cell. A transport block may be generated per assignment/grant per serving cell. A transport block and potential HARQ retransmissions of the transport block may be mapped to a serving cell.

For the downlink, a base station may send/transmit (e.g., unicast, multicast, and/or broadcast), to one or more wireless devices, one or more reference signals (RSs) (e.g., PSS, SSS, CSI-RS, DM-RS, and/or PT-RS). For the uplink, the one or more wireless devices may send/transmit one or more RSs to the base station (e.g., DM-RS, PT-RS, and/or SRS). The PSS and the SSS may be sent/transmitted by the base station and used by the one or more wireless devices to synchronize the one or more wireless devices with the base station. A synchronization signal (SS)/physical broadcast channel (PBCH) block may comprise the PSS, the SSS, and the PBCH. The base station may periodically send/transmit a burst of SS/PBCH blocks, which may be referred to as SSBs.

Figure 11A:
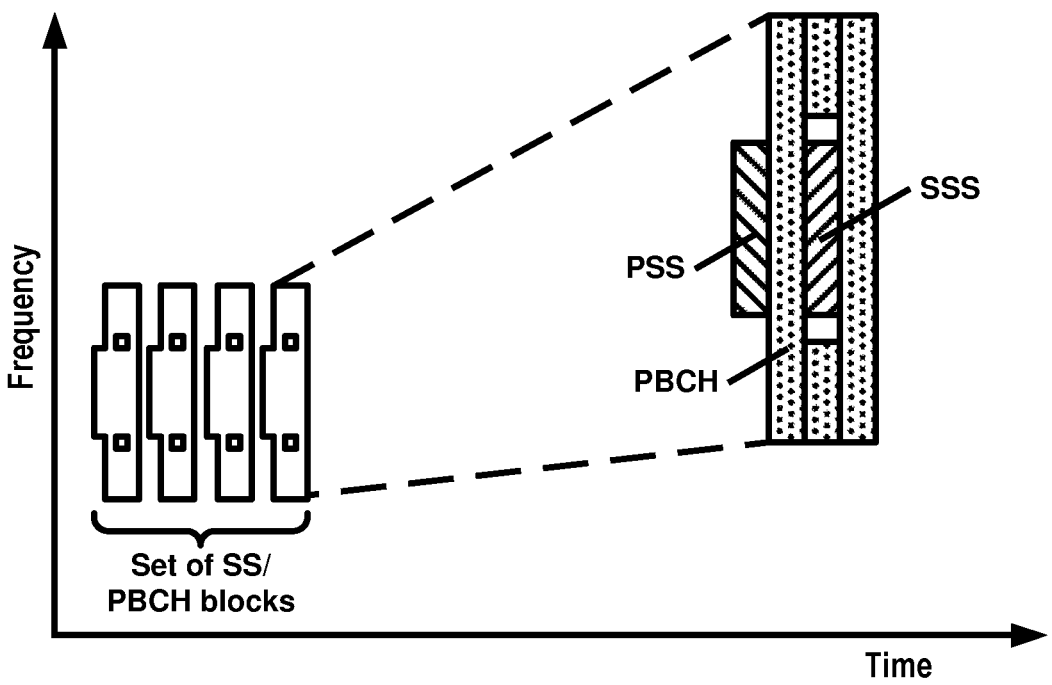
FIG. 11A shows an example mapping of one or more synchronization signal/physical broadcast channel (SS/PBCH) blocks.

FIG. 11A shows an example mapping of one or more SS/PBCH blocks. A burst of SS/PBCH blocks may comprise one or more SS/PBCH blocks (e.g., 4 SS/PBCH blocks, as shown in FIG. 11A). Bursts may be sent/transmitted periodically (e.g., every 2 frames, 20 ms, or any other durations). A burst may be restricted to a half-frame (e.g., a first half-frame having a duration of 5 ms). Such parameters (e.g., the number of SS/PBCH blocks per burst, periodicity of bursts, position of the burst within the frame) may be configured, for example, based on at least one of: a carrier frequency of a cell in which the SS/PBCH block is sent/transmitted; a numerology or subcarrier spacing of the cell; a configuration by the network (e.g., using RRC signaling); and/or any other suitable factor(s). A wireless device may assume a subcarrier spacing for the SS/PBCH block based on the carrier frequency being monitored, for example, unless the radio network configured the wireless device to assume a different subcarrier spacing.

The SS/PBCH block may span one or more OFDM symbols in the time domain (e.g., 4 OFDM symbols, as shown in FIG. 11A or any other quantity/number of symbols) and may span one or more subcarriers in the frequency domain (e.g., 240 contiguous subcarriers or any other quantity/number of subcarriers). The PSS, the SSS, and the PBCH may have a common center frequency. The PSS may be sent/transmitted first and may span, for example, 1 OFDM symbol and 127 subcarriers. The SSS may be sent/transmitted after the PSS (e.g., two symbols later) and may span 1 OFDM symbol and 127 subcarriers. The PBCH may be sent/transmitted after the PSS (e.g., across the next 3 OFDM symbols) and may span 240 subcarriers (e.g., in the second and fourth OFDM symbols as shown in FIG. 11A) and/or may span fewer than 240 subcarriers (e.g., in the third OFDM symbols as shown in FIG. 11A).

The location of the SS/PBCH block in the time and frequency domains may not be known to the wireless device (e.g., if the wireless device is searching for the cell). The wireless device may monitor a carrier for the PSS, for example, to find and select the cell. The wireless device may monitor a frequency location within the carrier. The wireless device may search for the PSS at a different frequency location within the carrier, for example, if the PSS is not found after a certain duration (e.g., 20 ms). The wireless device may search for the PSS at a different frequency location within the carrier, for example, as indicated by a synchronization raster. The wireless device may determine the locations of the SSS and the PBCH, respectively, for example, based on a known structure of the SS/PBCH block if the PSS is found at a location in the time and frequency domains. The SS/PBCH block may be a cell-defining SS block (CD-SSB). A primary cell may be associated with a CD-SSB. The CD-SSB may be located on a synchronization raster. A cell selection/search and/or reselection may be based on the CD-SSB.

The SS/PBCH block may be used by the wireless device to determine one or more parameters of the cell. The wireless device may determine a physical cell identifier (PCI) of the cell, for example, based on the sequences of the PSS and the SSS, respectively. The wireless device may determine a location of a frame boundary of the cell, for example, based on the location of the SS/PBCH block. The SS/PBCH block may indicate that it has been sent/transmitted in accordance with a transmission pattern. An SS/PBCH block in the transmission pattern may be a known distance from the frame boundary (e.g., a predefined distance for a RAN configuration among one or more networks, one or more base stations, and one or more wireless devices).

The PBCH may use a QPSK modulation and/or forward error correction (FEC). The FEC may use polar coding. One or more symbols spanned by the PBCH may comprise/carry one or more DM-RSs for demodulation of the PBCH. The PBCH may comprise an indication of a current system frame number (SFN) of the cell and/or a SS/PBCH block timing index. These parameters may facilitate time synchronization of the wireless device to the base station. The PBCH may comprise a MIB used to send/transmit to the wireless device one or more parameters. The MIB may be used by the wireless device to locate remaining minimum system information (RMSI) associated with the cell. The RMSI may comprise a System Information Block Type 1 (SIB1). The SIB1 may comprise information for the wireless device to access the cell. The wireless device may use one or more parameters of the MIB to monitor a PDCCH, which may be used to schedule a PDSCH. The PDSCH may comprise the SIB1. The SIB1 may be decoded using parameters provided/comprised in the MIB. The PBCH may indicate an absence of SIB1. The wireless device may be pointed to a frequency, for example, based on the PBCH indicating the absence of SIB1. The wireless device may search for an SS/PBCH block at the frequency to which the wireless device is pointed.

The wireless device may assume that one or more SS/PBCH blocks sent/transmitted with a same SS/PBCH block index are quasi co-located (QCLed) (e.g., having substantially the same/similar Doppler spread, Doppler shift, average gain, average delay, and/or spatial Rx parameters). The wireless device may not assume QCL for SS/PBCH block transmissions having different SS/PBCH block indices. SS/PBCH blocks (e.g., those within a half-frame) may be sent/transmitted in spatial directions (e.g., using different beams that span a coverage area of the cell).

A first SS/PBCH block may be sent/transmitted in a first spatial direction using a first beam, a second SS/PBCH block may be sent/transmitted in a second spatial direction using a second beam, a third SS/PBCH block may be sent/transmitted in a third spatial direction using a third beam, a fourth SS/PBCH block may be sent/transmitted in a fourth spatial direction using a fourth beam, etc.

A base station may send/transmit a plurality of SS/PBCH blocks, for example, within a frequency span of a carrier. A first PCI of a first SS/PBCH block of the plurality of SS/PBCH blocks may be different from a second PCI of a second SS/PBCH block of the plurality of SS/PBCH blocks. The PCIs of SS/PBCH blocks sent/transmitted in different frequency locations may be different or substantially the same.

The CSI-RS may be sent/transmitted by the base station and used by the wireless device to acquire/obtain/determine channel state information (CSI). The base station may configure the wireless device with one or more CSI-RSs for channel estimation or any other suitable purpose. The base station may configure a wireless device with one or more of the same/similar CSI-RSs. The wireless device may measure the one or more CSI-RSs. The wireless device may estimate a downlink channel state and/or generate a CSI report, for example, based on the measuring of the one or more downlink CSI-RSs. The wireless device may send/transmit the CSI report to the base station (e.g., based on periodic CSI reporting, semi-persistent CSI reporting, and/or aperiodic CSI reporting). The base station may use feedback provided by the wireless device (e.g., the estimated downlink channel state) to perform a link adaptation.

The base station may semi-statically configure the wireless device with one or more CSI-RS resource sets. A CSI-RS resource may be associated with a location in the time and frequency domains and a periodicity. The base station may selectively activate and/or deactivate a CSI-RS resource. The base station may indicate to the wireless device that a CSI-RS resource in the CSI-RS resource set is activated and/or deactivated.

The base station may configure the wireless device to report CSI measurements. The base station may configure the wireless device to provide CSI reports periodically, aperiodically, or semi-persistently. For periodic CSI reporting, the wireless device may be configured with a timing and/or periodicity of a plurality of CSI reports. For aperiodic CSI reporting, the base station may request a CSI report. The base station may command the wireless device to measure a configured CSI-RS resource and provide a CSI report relating to the measurement(s). For semi-persistent CSI reporting, the base station may configure the wireless device to send/transmit periodically, and selectively activate or deactivate the periodic reporting (e.g., via one or more activation/deactivation MAC CEs and/or one or more DCIs). The base station may configure the wireless device with a CSI-RS resource set and CSI reports, for example, using RRC signaling.

The CSI-RS configuration may comprise one or more parameters indicating, for example, up to 32 antenna ports (or any other quantity of antenna ports). The wireless device may be configured to use/employ the same OFDM symbols for a downlink CSI-RS and a CORESET, for example, if the downlink CSI-RS and CORESET are spatially QCLed and resource elements associated with the downlink CSI-RS are outside of the physical resource blocks (PRBs) configured for the CORESET. The wireless device may be configured to use/employ the same OFDM symbols for a downlink CSI-RS and SS/PBCH blocks, for example, if the downlink CSI-RS and SS/PBCH blocks are spatially QCLed and resource elements associated with the downlink CSI-RS are outside of PRBs configured for the SS/PBCH blocks.

Downlink DM-RSs may be sent/transmitted by a base station and received/used by a wireless device for a channel estimation. The downlink DM-RSs may be used for coherent demodulation of one or more downlink physical channels (e.g., PDSCH). A network (e.g., an NR network) may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., one or two adjacent OFDM symbols). A base station may semi-statically configure the wireless device with a number/quantity (e.g. a maximum number/quantity) of front-loaded DM-RS symbols for a PDSCH. A DM-RS configuration may support one or more DM-RS ports. A DM-RS configuration may support up to eight orthogonal downlink DM-RS ports per wireless device (e.g., for single user-MIMO). A D M-RS configuration may support up to 4 orthogonal downlink DM-RS ports per wireless device (e.g., for multiuser-MIMO). A radio network may support (e.g., at least for CP-OFDM) a common DM-RS structure for downlink and uplink. A DM-RS location, a DM-RS pattern, and/or a scrambling sequence may be the same or different. The base station may send/transmit a downlink DM-RS and a corresponding PDSCH, for example, using the same precoding matrix. The wireless device may use the one or more downlink DM-RSs for coherent demodulation/channel estimation of the PDSCH.

A transmitter (e.g., a transmitter of a base station) may use a precoder matrices for a part of a transmission bandwidth. The transmitter may use a first precoder matrix for a first bandwidth and a second precoder matrix for a second bandwidth. The first precoder matrix and the second precoder matrix may be different, for example, based on the first bandwidth being different from the second bandwidth. The wireless device may assume that a same precoding matrix is used across a set of PRBs. The set of PRBs may be determined/indicated/identified/denoted as a precoding resource block group (PRG).

A PDSCH may comprise one or more layers. The wireless device may assume that at least one symbol with DM-RS is present on a layer of the one or more layers of the PDSCH. A higher layer may configure one or more DM-RSs for a PDSCH (e.g., up to 3 DMRSs for the PDSCH). Downlink PT-RS may be sent/transmitted by a base station and used by a wireless device, for example, for a phase-noise compensation. Whether a downlink PT-RS is present or not may depend on an RRC configuration. The presence and/or the pattern of the downlink PT-RS may be configured on a wireless device-specific basis, for example, using a combination of RRC signaling and/or an association with one or more parameters used/employed for other purposes (e.g., modulation and coding scheme (MCS)), which may be indicated by DCI. A dynamic presence of a downlink PT-RS, if configured, may be associated with one or more DCI parameters comprising at least MCS. A network (e.g., an NR network) may support a plurality of PT-RS densities defined in the time and/or frequency domains. A frequency domain density (if configured/present) may be associated with at least one configuration of a scheduled bandwidth. The wireless device may assume a same precoding for a DM-RS port and a PT-RS port. The quantity/number of PT-RS ports may be fewer than the quantity/number of DM-RS ports in a scheduled resource. Downlink PT-RS may be configured/allocated/confined in the scheduled time/frequency duration for the wireless device. Downlink PT-RS may be sent/transmitted via symbols, for example, to facilitate a phase tracking at the receiver.

The wireless device may send/transmit an uplink DM-RS to a base station, for example, for a channel estimation. The base station may use the uplink DM-RS for coherent demodulation of one or more uplink physical channels. The wireless device may send/transmit an uplink DM-RS with a PUSCH and/or a PUCCH. The uplink DM-RS may span a range of frequencies that is similar to a range of frequencies associated with the corresponding physical channel. The base station may configure the wireless device with one or more uplink DM-RS configurations. At least one DM-RS configuration may support a front-loaded DM-RS pattern. The front-loaded DM-RS may be mapped over one or more OFDM symbols (e.g., one or two adjacent OFDM symbols). One or more uplink DM-RSs may be configured to send/transmit at one or more symbols of a PUSCH and/or a PUCCH. The base station may semi-statically configure the wireless device with a number/quantity (e.g., the maximum number/quantity) of front-loaded DM-RS symbols for the PUSCH and/or the PUCCH, which the wireless device may use to schedule a single-symbol DM-RS and/or a double-symbol DM-RS. A network (e.g., an NR network) may support (e.g., for cyclic prefix orthogonal frequency division multiplexing (CP-OFDM)) a common DM-RS structure for downlink and uplink. A DM-RS location, a DM-RS pattern, and/or a scrambling sequence for the DM-RS may be substantially the same or different.

A PUSCH may comprise one or more layers. A wireless device may send/transmit at least one symbol with DM-RS present on a layer of the one or more layers of the PUSCH. A higher layer may configure one or more DM-RSs (e.g., up to three DMRSs) for the PUSCH. Uplink PT-RS (which may be used by a base station for a phase tracking and/or a phase-noise compensation) may or may not be present, for example, depending on an RRC configuration of the wireless device. The presence and/or the pattern of an uplink PT-RS may be configured on a wireless device-specific basis (e.g., a UE-specific basis), for example, by a combination of RRC signaling and/or one or more parameters configured/employed for other purposes (e.g., MCS), which may be indicated by DCI. A dynamic presence of an uplink PT-RS, if configured, may be associated with one or more DCI parameters comprising at least MCS. A radio network may support a plurality of uplink PT-RS densities defined in time/frequency domain. A frequency domain density (if configured/present) may be associated with at least one configuration of a scheduled bandwidth. The wireless device may assume a same precoding for a DM-RS port and a PT-RS port. A quantity/number of PT-RS ports may be less than a quantity/number of DM-RS ports in a scheduled resource. An uplink PT-RS may be configured/allocated/confined in the scheduled time/frequency duration for the wireless device.

One or more SRSs may be sent/transmitted by a wireless device to a base station, for example, for a channel state estimation to support uplink channel dependent scheduling and/or a link adaptation. SRS sent/transmitted by the wireless device may enable/allow a base station to estimate an uplink channel state at one or more frequencies. A scheduler at the base station may use/employ the estimated uplink channel state to assign one or more resource blocks for an uplink PUSCH transmission for the wireless device. The base station may semi-statically configure the wireless device with one or more SRS resource sets. For an SRS resource set, the base station may configure the wireless device with one or more SRS resources. An SRS resource set applicability may be configured, for example, by a higher layer (e.g., RRC) parameter. An SRS resource in a SRS resource set of the one or more SRS resource sets (e.g., with the same/similar time domain behavior, periodic, aperiodic, and/or the like) may be sent/transmitted at a time instant (e.g., simultaneously), for example, if a higher layer parameter indicates beam management. The wireless device may send/transmit one or more SRS resources in SRS resource sets. A network (e.g., an NR network) may support aperiodic, periodic, and/or semi-persistent SRS transmissions. The wireless device may send/transmit SRS resources, for example, based on one or more trigger types. The one or more trigger types may comprise higher layer signaling (e.g., RRC) and/or one or more DCI formats. At least one DCI format may be used/employed for the wireless device to select at least one of one or more configured SRS resource sets. An SRS trigger type 0 may refer to an SRS triggered based on higher layer signaling. An SRS trigger type 1 may refer to an SRS triggered based on one or more DCI formats. The wireless device may be configured to send/transmit an SRS, for example, after a transmission of a PUSCH and a corresponding uplink DM-RS if a PUSCH and an SRS are sent/transmitted in a same slot. A base station may semi-statically configure a wireless device with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; an offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port may be determined/defined such that the channel over which a symbol on the antenna port is conveyed can be inferred from the channel over which another symbol on the same antenna port is conveyed. The receiver may infer/determine the channel (e.g., fading gain, multipath delay, and/or the like) for conveying a second symbol on an antenna port, from the channel for conveying a first symbol on the antenna port, for example, if the first symbol and the second symbol are sent/transmitted on the same antenna port. A first antenna port and a second antenna port may be referred to as quasi co-located (QCLed), for example, if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming may require beam management. Beam management may comprise a beam measurement, a beam selection, and/or a beam indication. A beam may be associated with one or more reference signals. A beam may be identified by one or more beamformed reference signals. The wireless device may perform a downlink beam measurement, for example, based on one or more downlink reference signals (e.g., a CSI-RS) and generate a beam measurement report. The wireless device may perform the downlink beam measurement procedure, for example, after an RRC connection is set up with a base station.

Figure 11B:
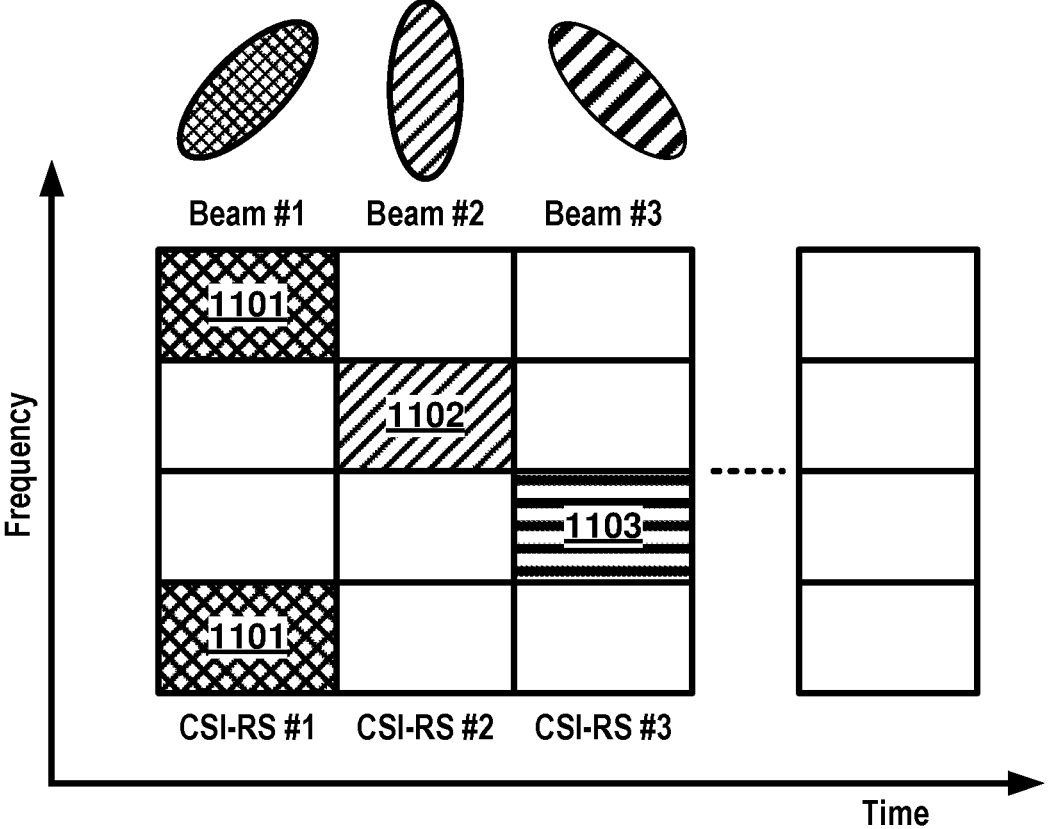
FIG. 11B shows an example mapping of one or more channel state information reference signals (CSI-RSs).

FIG. 11B shows an example mapping of one or more CSI-RSs. The CSI-RSs may be mapped in the time and frequency domains. Each rectangular block shown in FIG. 11B may correspond to a resource block (RB) within a bandwidth of a cell. A base station may send/transmit one or more RRC messages comprising CSI-RS resource configuration parameters indicating one or more CSI-RSs. One or more of parameters may be configured by higher layer signaling (e.g., RRC and/or MAC signaling) for a CSI-RS resource configuration. The one or more of the parameters may comprise at least one of: a CSI-RS resource configuration identity, a number of CSI-RS ports, a CSI-RS configuration (e.g., symbol and resource element (RE) locations in a subframe), a CSI-RS subframe configuration (e.g., a subframe location, an offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

One or more beams may be configured for a wireless device in a wireless device-specific configuration. Three beams are shown in FIG. 11B (beam #1, beam #2, and beam #3), but more or fewer beams may be configured. Beam #1 may be allocated with CSI-RS 1101 that may be sent/transmitted in one or more subcarriers in an RB of a first symbol. Beam #2 may be allocated with CSI-RS 1102 that may be sent/transmitted in one or more subcarriers in an RB of a second symbol. Beam #3 may be allocated with CSI-RS 1103 that may be sent/transmitted in one or more subcarriers in an RB of a third symbol. A base station may use other subcarriers in the same RB (e.g., those that are not used to send/transmit CSI-RS 1101) to transmit another CSI-RS associated with a beam for another wireless device, for example, by using frequency division multiplexing (FDM). Beams used for a wireless device may be configured such that beams for the wireless device use symbols different from symbols used by beams of other wireless devices, for example, by using time domain multiplexing (TDM). A wireless device may be served with beams in orthogonal symbols (e.g., no overlapping symbols), for example, by using the TDM.

CSI-RSs (e.g., CSI-RSs 1101, 1102, 1103) may be sent/transmitted by the base station and used by the wireless device for one or more measurements. The wireless device may measure an RSRP of configured CSI-RS resources. The base station may configure the wireless device with a reporting configuration, and the wireless device may report the RSRP measurements to a network (e.g., via one or more base stations) based on the reporting configuration. The base station may determine, based on the reported measurement results, one or more transmission configuration indication (TCI) states comprising a number of reference signals. The base station may indicate one or more TCI states to the wireless device (e.g., via RRC signaling, a MAC CE, and/or DCI). The wireless device may receive a downlink transmission with an Rx beam determined based on the one or more TCI states. The wireless device may or may not have a capability of beam correspondence. The wireless device may determine a spatial domain filter of a transmit (Tx) beam, for example, based on a spatial domain filter of the corresponding Rx beam, if the wireless device has the capability of beam correspondence. The wireless device may perform an uplink beam selection procedure to determine the spatial domain filter of the Tx beam, for example, if the wireless device does not have the capability of beam correspondence. The wireless device may perform the uplink beam selection procedure, for example, based on one or more sounding reference signal (SRS) resources config-ured to the wireless device by the base station. The base station may select and indicate uplink beams for the wireless device, for example, based on measurements of the one or more SRS resources sent/transmitted by the wireless device.

A wireless device may determine/assess (e.g., measure) a channel quality of one or more beam pair links, for example, in a beam management procedure. A beam pair link may comprise a Tx beam of a base station and an Rx beam of the wireless device. The Tx beam of the base station may send/transmit a downlink signal, and the Rx beam of the wireless device may receive the downlink signal. The wire-less device may send/transmit a beam measurement report, for example, based on the assessment/determination. The beam measurement report may indicate one or more beam pair quality parameters comprising at least one of: one or more beam identifications (e.g., a beam index, a reference signal index, or the like), an RSRP, a precoding matrix indicator (PMI), a channel quality indicator (CQI), and/or a rank indicator (RI).

Figures 12A, 12B:
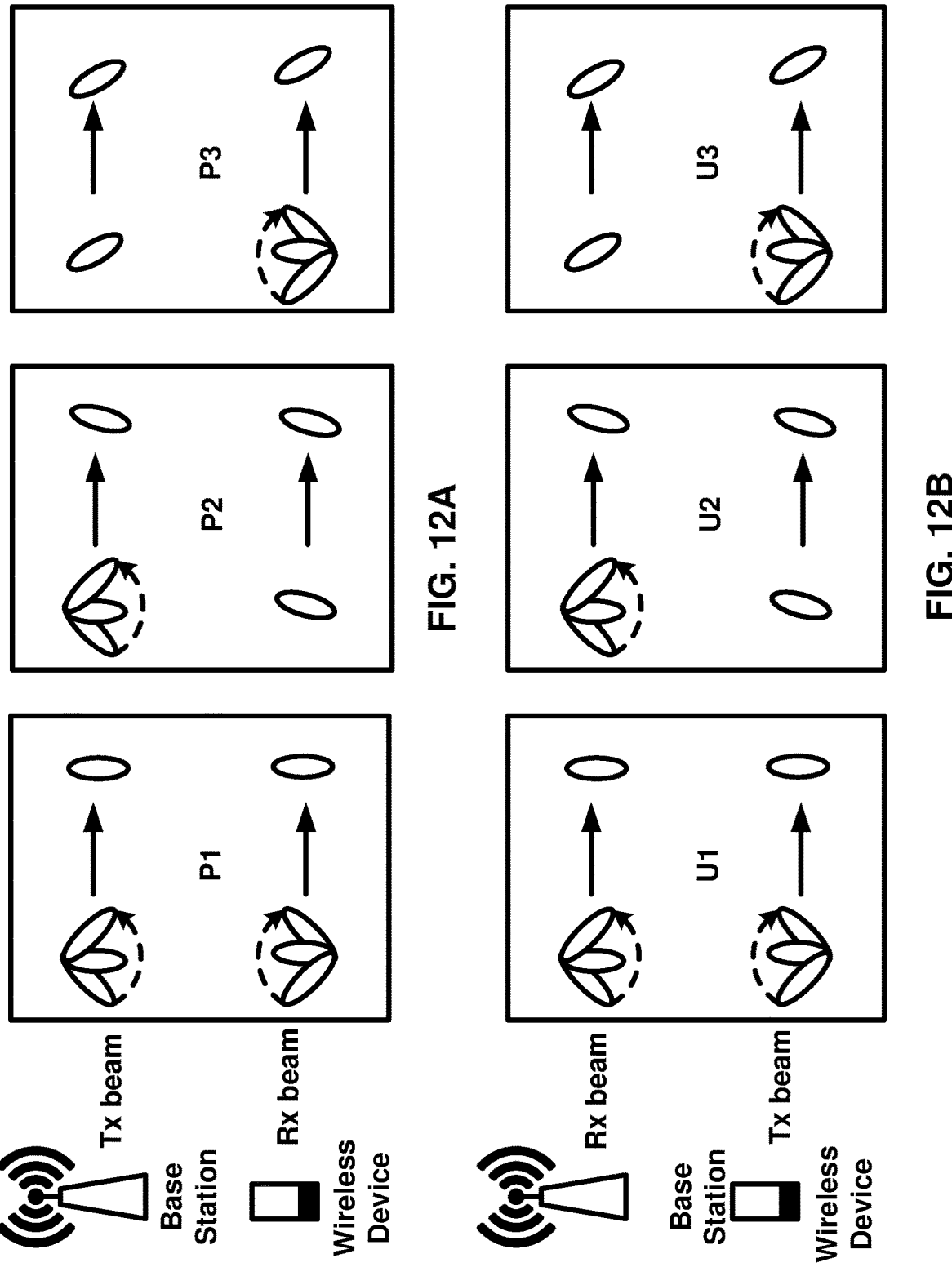
FIG. 12A shows examples of downlink beam management procedures.
FIG. 12B shows examples of uplink beam management procedures.

FIG. 12A shows examples of downlink beam manage-ment procedures. One or more downlink beam management procedures (e.g., downlink beam management procedures P1, P2, and P3) may be performed. Procedure P1 may enable a measurement (e.g., a wireless device measurement) on Tx beams of a TRP (or multiple TRPs) (e.g., to support a selection of one or more base station Tx beams and/or wireless device Rx beams). The Tx beams of a base station and the Rx beams of a wireless device are shown as ovals in the top row of P1 and bottom row of P1, respectively. Beamforming (e.g., at a TRP) may comprise a Tx beam sweep for a set of beams (e.g., the beam sweeps shown, in the top rows of P1 and P2, as ovals rotated in a counter-clockwise direction indicated by the dashed arrows). Beam-forming (e.g., at a wireless device) may comprise an Rx beam sweep for a set of beams (e.g., the beam sweeps shown, in the bottom rows of P1 and P3, as ovals rotated in a clockwise direction indicated by the dashed arrows). Procedure P2 may be used to enable a measurement (e.g., a wireless device measurement) on Tx beams of a TRP (shown, in the top row of P2, as ovals rotated in a counter-clockwise direction indicated by the dashed arrow). The wireless device and/or the base station may perform proce-dure P2, for example, using a smaller set of beams than the set of beams used in procedure P1, or using narrower beams than the beams used in procedure P1. Procedure P2 may be referred to as a beam refinement. The wireless device may perform procedure P3 for an Rx beam determination, for example, by using the same Tx beam(s) of the base station and sweeping Rx beam(s) of the wireless device.

FIG. 12B shows examples of uplink beam management procedures. One or more uplink beam management proce-dures (e.g., uplink beam management procedures U1, U2, and U3) may be performed. Procedure U1 may be used to enable a base station to perform a measurement on Tx beams of a wireless device (e.g., to support a selection of one or more Tx beams of the wireless device and/or Rx beams of the base station). The Tx beams of the wireless device and the Rx beams of the base station are shown as ovals in the top row of U1 and bottom row of U1, respectively). Beam-forming (e.g., at the wireless device) may comprise one or more beam sweeps, for example, a Tx beam sweep from a set of beams (shown, in the bottom rows of U1 and U3, as ovals rotated in a clockwise direction indicated by the dashed arrows). Beamforming (e.g., at the base station) may comprise one or more beam sweeps, for example, an Rx beam sweep from a set of beams (shown, in the top rows of U1 and U2, as ovals rotated in a counter-clockwise direction indicated by the dashed arrows). Procedure U2 may be used to enable the base station to adjust its Rx beam, for example, if the wireless device (e.g., UE) uses a fixed Tx beam. The wireless device and/or the base station may perform proce-dure U2, for example, using a smaller set of beams than the set of beams used in procedure P1, or using narrower beams than the beams used in procedure P1. Procedure U2 may be referred to as a beam refinement. The wireless device may perform procedure U3 to adjust its Tx beam, for example, if the base station uses a fixed Rx beam.

A wireless device may initiate/start/perform a beam fail-ure recovery (BFR) procedure, for example, based on detect-ing a beam failure. The wireless device may send/transmit a BFR request (e.g., a preamble, UCI, an SR, a MAC CE, and/or the like), for example, based on the initiating the BFR procedure. The wireless device may detect the beam failure, for example, based on a determination that a quality of beam pair link(s) of an associated control channel is unsatisfactory (e.g., having an error rate higher than an error rate threshold, a received signal power lower than a received signal power threshold, an expiration of a timer, and/or the like).

The wireless device may measure a quality of a beam pair link, for example, using one or more reference signals (RSs) comprising one or more SS/PBCH blocks, one or more CSI-RS resources, and/or one or more DM-RSs. A quality of the beam pair link may be based on one or more of a block error rate (BLER), an RSRP value, a signal to interference plus noise ratio (SINR) value, an RSRQ value, and/or a CSI value measured on RS resources. The base station may indicate that an RS resource is QCLed with one or more DM-RSs of a channel (e.g., a control channel, a shared data channel, and/or the like). The RS resource and the one or more DM-RSs of the channel may be QCLed, for example, if the channel characteristics (e.g., Doppler shift, Doppler spread, an average delay, delay spread, a spatial Rx param-eter, fading, and/or the like) from a transmission via the RS resource to the wireless device are similar or the same as the channel characteristics from a transmission via the channel to the wireless device.

A network (e.g., an NR network comprising a gNB and/or an ng-eNB) and/or the wireless device may initiate/start/perform a random access procedure. A wireless device in an RRC idle (e.g., an RRC_IDLE) state and/or an RRC inactive (e.g., an RRC_INACTIVE) state may initiate/perform the random access procedure to request a connection setup to a network. The wireless device may initiate/start/perform the random access procedure from an RRC connected (e.g., an RRC_CONNECTED) state. The wireless device may initi-ate/start/perform the random access procedure to request uplink resources (e.g., for uplink transmission of an SR if there is no PUCCH resource available) and/or acquire/obtain/determine an uplink timing (e.g., if an uplink syn-chronization status is non-synchronized). The wireless device may initiate/start/perform the random access proce-dure to request one or more system information blocks (SIBs) (e.g., other system information blocks, such as SIB2, SIB3, and/or the like). The wireless device may initiate/start/perform the random access procedure for a beam failure recovery request. A network may initiate/start/per-form a random access procedure, for example, for a han-dover and/or for establishing time alignment for an SCell addition.

Figures 13A, 13B, 13C:
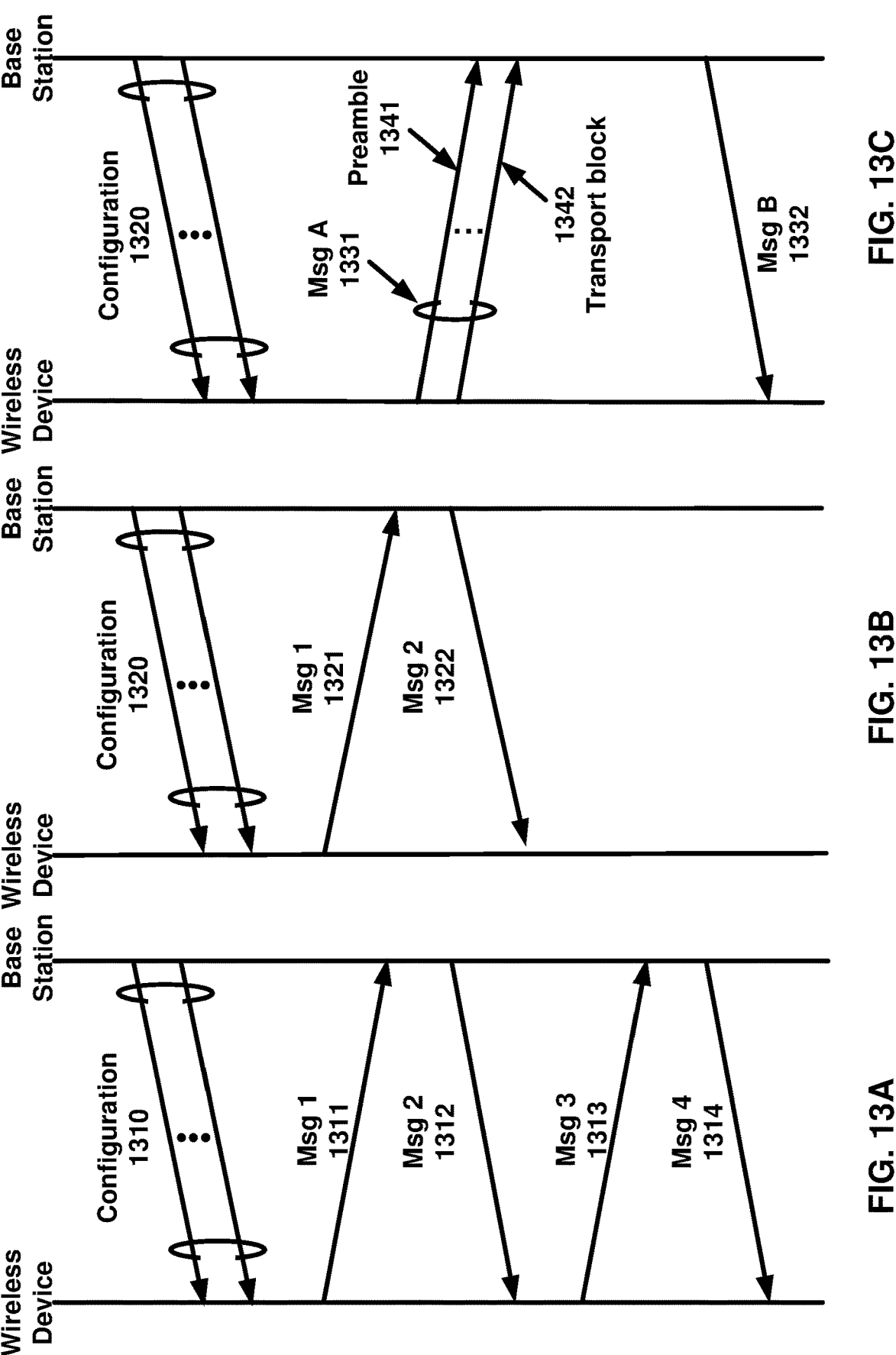
FIG. 13A shows an example four-step random access procedure.
FIG. 13B shows an example two-step random access procedure.
FIG. 13C shows an example two-step random access procedure.

FIG. 13A shows an example four-step random access procedure. The four-step random access procedure may comprise a four-step contention-based random access pro-cedure. A base station may send/transmit a configuration message 1310 to a wireless device, for example, before initiating the random access procedure. The four-step random access procedure may comprise transmissions of four messages comprising: a first message (e.g., Msg 1 1311), a second message (e.g., Msg 2 1312), a third message (e.g., Msg 3 1313), and a fourth message (e.g., Msg 4 1314). The first message (e.g., Msg 1 1311) may comprise a preamble (or a random access preamble). The first message (e.g., Msg 1 1311) may be referred to as a preamble. The second message (e.g., Msg 2 1312) may comprise as a random access response (RAR). The second message (e.g., Msg 2 1312) may be referred to as an RAR.

The configuration message 1310 may be sent/transmitted, for example, using one or more RRC messages. The one or more RRC messages may indicate one or more random access channel (RACH) parameters to the wireless device. The one or more RACH parameters may comprise at least one of: general parameters for one or more random access procedures (e.g., RACH-configGeneral); cell-specific parameters (e.g., RACH-ConfigCommon); and/or dedicated parameters (e.g., RACH-configDedicated). The base station may send/transmit (e.g., broadcast or multicast) the one or more RRC messages to one or more wireless devices. The one or more RRC messages may be wireless device-specific. The one or more RRC messages that are wireless device-specific may be, for example, dedicated RRC messages sent/transmitted to a wireless device in an RRC connected (e.g., an RRC_CONNECTED) state and/or in an RRC inactive (e.g., an RRC_INACTIVE) state. The wireless devices may determine, based on the one or more RACH parameters, a time-frequency resource and/or an uplink transmit power for transmission of the first message (e.g., Msg 1 1311) and/or the third message (e.g., Msg 3 1313). The wireless device may determine a reception timing and a downlink channel for receiving the second message (e.g., Msg 2 1312) and the fourth message (e.g., Msg 4 1314), for example, based on the one or more RACH parameters.

The one or more RACH parameters provided/configured/comprised in the configuration message 1310 may indicate one or more Physical RACH (PRACH) occasions available for transmission of the first message (e.g., Msg 1 1311). The one or more PRACH occasions may be predefined (e.g., by a network comprising one or more base stations). The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. The one or more RACH parameters may indicate a quantity/number of SS/PBCH blocks mapped to a PRACH occasion and/or a quantity/number of preambles mapped to a SS/PBCH blocks.

The one or more RACH parameters provided/configured/comprised in the configuration message 1310 may be used to determine an uplink transmit power of first message (e.g., Msg 1 1311) and/or third message (e.g., Msg 3 1313). The one or more RACH parameters may indicate a reference power for a preamble transmission (e.g., a received target power and/or an initial power of the preamble transmission). There may be one or more power offsets indicated by the one or more RACH parameters. The one or more RACH parameters may indicate: a power ramping step; a power offset between SSB and CSI-RS; a power offset between transmissions of the first message (e.g., Msg 1 1311) and the third message (e.g., Msg 3 1313); and/or a power offset value between preamble groups. The one or more RACH parameters may indicate one or more thresholds, for example, based on which the wireless device may determine at least one reference signal (e.g., an SSB and/or CSI-RS) and/or an uplink carrier (e.g., a normal uplink (NUL) carrier and/or a supplemental uplink (SUL) carrier).

The first message (e.g., Msg 1 1311) may comprise one or more preamble transmissions (e.g., a preamble transmission and one or more preamble retransmissions). An RRC message may be used to configure one or more preamble groups (e.g., group A and/or group B). A preamble group may comprise one or more preambles. The wireless device may determine the preamble group, for example, based on a pathloss measurement and/or a size of the third message (e.g., Msg 3 1313). The wireless device may measure an RSRP of one or more reference signals (e.g., SSBs and/or CSI-RSs) and determine at least one reference signal having an RSRP above an RSRP threshold (e.g., rsrp-ThresholdSSB and/or rsrp-ThresholdCSI-RS). The wireless device may select at least one preamble associated with the one or more reference signals and/or a selected preamble group, for example, if the association between the one or more preambles and the at least one reference signal is configured by an RRC message.

The wireless device may determine the preamble, for example, based on the one or more RACH parameters provided/configured/comprised in the configuration message 1310. The wireless device may determine the preamble, for example, based on a pathloss measurement, an RSRP measurement, and/or a size of the third message (e.g., Msg 3 1313). The one or more RACH parameters may indicate: a preamble format; a maximum quantity/number of preamble transmissions; and/or one or more thresholds for determining one or more preamble groups (e.g., group A and group B). A base station may use the one or more RACH parameters to configure the wireless device with an association between one or more preambles and one or more reference signals (e.g., SSBs and/or CSI-RSs). The wireless device may determine the preamble to be comprised in first message (e.g., Msg 1 1311), for example, based on the association if the association is configured. The first message (e.g., Msg 1 1311) may be sent/transmitted to the base station via one or more PRACH occasions. The wireless device may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The wireless device may perform a preamble retransmission, for example, if no response is received based on (e.g., after or in response to) a preamble transmission (e.g., for a period of time, such as a monitoring window for monitoring an RAR). The wireless device may increase an uplink transmit power for the preamble retransmission. The wireless device may select an initial preamble transmit power, for example, based on a pathloss measurement and/or a target received preamble power configured by the network. The wireless device may determine to resend/retransmit a preamble and may ramp up the uplink transmit power. The wireless device may receive one or more RACH parameters (e.g., PREAMBLE_POWER_RAMPING_STEP) indicating a ramping step for the preamble retransmission. The ramping step may be an amount of incremental increase in uplink transmit power for a retransmission. The wireless device may ramp up the uplink transmit power, for example, if the wireless device determines a reference signal (e.g., SSB and/or CSI-RS) that is the same as a previous preamble transmission. The wireless device may count the quantity/number of preamble transmissions and/or retransmissions, for example, using a counter parameter (e.g., PREAMBLE_TRANSMISSION_COUNTER). The wireless device may determine that a random access procedure has been completed unsuccessfully, for example, if the quantity/number of preamble transmissions exceeds a threshold configured by the one or more RACH parameters (e.g., preambleTransMax) without receiving a successful response (e.g., an RAR).

The second message (e.g., Msg 2 1312) (e.g., received by the wireless device) may comprise an RAR. The second message (e.g., Msg 2 1312) may comprise multiple RARs corresponding to multiple wireless devices. The second message (e.g., Msg 2 1312) may be received, for example, based on (e.g., after or in response to) the sending/transmitting of the first message (e.g., Msg 1 1311). The second message (e.g., Msg 2 1312) may be scheduled on the DL-SCH and may be indicated by a PDCCH, for example, using a random access radio network temporary identifier (RA RNTI). The second message (e.g., Msg 2 1312) may indicate that the first message (e.g., Msg 1 1311) was received by the base station. The second message (e.g., Msg 2 1312) may comprise a time-alignment command that may be used by the wireless device to adjust the transmission timing of the wireless device, a scheduling grant for transmission of the third message (e.g., Msg 3 1313), and/or a Temporary Cell RNTI (TC-RNTI). The wireless device may determine/start a time window (e.g., ra-ResponseWindow) to monitor a PDCCH for the second message (e.g., Msg 2 1312), for example, after sending/transmitting the first message (e.g., Msg 1 1311) (e.g., a preamble). The wireless device may determine the start time of the time window, for example, based on a PRACH occasion that the wireless device uses to send/transmit the first message (e.g., Msg 1 1311) (e.g., the preamble). The wireless device may start the time window one or more symbols after the last symbol of the first message (e.g., Msg 1 1311) comprising the preamble (e.g., the symbol in which the first message (e.g., Msg 1 1311) comprising the preamble transmission was completed or at a first PDCCH occasion from an end of a preamble transmission). The one or more symbols may be determined based on a numerology. The PDCCH may be mapped in a common search space (e.g., a Type1-PDCCH common search space) configured by an RRC message. The wireless device may identify/determine the RAR, for example, based on an RNTI. Radio network temporary identifiers (RNTIs) may be used depending on one or more events initiating/starting the random access procedure. The wireless device may use a RA-RNTI, for example, for one or more communications associated with random access or any other purpose. The RA-RNTI may be associated with PRACH occasions in which the wireless device sends/transmits a preamble. The wireless device may determine the RA-RNTI, for example, based on at least one of: an OFDM symbol index; a slot index; a frequency domain index; and/or a UL carrier indicator of the PRACH occasions. An example RA-RNTI may be determined as follows:

$$\text{RA-RNTI} = 1 + s\_id + 14 \times t\_id + 14 \times 80 \times f\_id + 14 \times 80 \times 8 \times ul\_carrier\_id$$

where s_id may be an index of a first OFDM symbol of the PRACH occasion (e.g., $0 \le s\_id < 14$), t_id may be an index of a first slot of the PRACH occasion in a system frame (e.g., $0 \le t\_id < 80$), f_id may be an index of the PRACH occasion in the frequency domain (e.g., $0 \le f\_id < 8$), and ul_carrier_id may be a UL carrier used for a preamble transmission (e.g., 0 for an NUL carrier, and 1 for an SUL carrier).

The wireless device may send/transmit the third message (e.g., Msg 3 1313), for example, based on (e.g., after or in response to) a successful reception of the second message (e.g., Msg 2 1312) (e.g., using resources identified in the Msg 2 1312). The third message (e.g., Msg 3 1313) may be used, for example, for contention resolution in the contention-based random access procedure. A plurality of wireless devices may send/transmit the same preamble to a base station, and the base station may send/transmit an RAR that corresponds to a wireless device. Collisions may occur, for example, if the plurality of wireless device interpret the RAR as corresponding to themselves. Contention resolution (e.g., using the third message (e.g., Msg 3 1313) and the fourth message (e.g., Msg 4 1314)) may be used to increase the likelihood that the wireless device does not incorrectly use an identity of another the wireless device. The wireless device may comprise a device identifier in the third message (e.g., Msg 3 1313) (e.g., a C-RNTI if assigned, a TC RNTI comprised in the second message (e.g., Msg 2 1312), and/or any other suitable identifier), for example, to perform contention resolution.

The fourth message (e.g., Msg 4 1314) may be received, for example, based on (e.g., after or in response to) the sending/transmitting of the third message (e.g., Msg 3 1313). The base station may address the wireless on the PDCCH (e.g., the base station may send the PDCCH to the wireless device) using a C-RNTI, for example, If the C-RNTI was included in the third message (e.g., Msg 3 1313). The random access procedure may be determined to be successfully completed, for example, if the unique C RNTI of the wireless device is detected on the PDCCH (e.g., the PDCCH is scrambled by the C-RNTI). fourth message (e.g., Msg 4 1314) may be received using a DL-SCH associated with a TC RNTI, for example, if the TC RNTI is comprised in the third message (e.g., Msg 3 1313) (e.g., if the wireless device is in an RRC idle (e.g., an RRC_IDLE) state or not otherwise connected to the base station). The wireless device may determine that the contention resolution is successful and/or the wireless device may determine that the random access procedure is successfully completed, for example, if a MAC PDU is successfully decoded and a MAC PDU comprises the wireless device contention resolution identity MAC CE that matches or otherwise corresponds with the CCCH SDU sent/transmitted in third message (e.g., Msg 3 1313).

The wireless device may be configured with an SUL carrier and/or an NUL carrier. An initial access (e.g., random access) may be supported via an uplink carrier. A base station may configure the wireless device with multiple RACH configurations (e.g., two separate RACH configurations comprising: one for an SUL carrier and the other for an NUL carrier). For random access in a cell configured with an SUL carrier, the network may indicate which carrier to use (NUL or SUL). The wireless device may determine to use the SUL carrier, for example, if a measured quality of one or more reference signals (e.g., one or more reference signals associated with the NUL carrier) is lower than a broadcast threshold. Uplink transmissions of the random access procedure (e.g., the first message (e.g., Msg 1 1311) and/or the third message (e.g., Msg 3 1313)) may remain on, or may be performed via, the selected carrier. The wireless device may switch an uplink carrier during the random access procedure (e.g., between the Msg 1 1311 and the Msg 3 1313). The wireless device may determine and/or switch an uplink carrier for the first message (e.g., Msg 1 1311) and/or the third message (e.g., Msg 3 1313), for example, based on a channel clear assessment (e.g., a listen-before-talk).

FIG. 13B shows a two-step random access procedure. The two-step random access procedure may comprise a two-step contention-free random access procedure. Similar to the four-step contention-based random access procedure, a base station may, prior to initiation of the procedure, send/transmit a configuration message 1320 to the wireless device. The configuration message 1320 may be analogous in some respects to the configuration message 1310. The procedure shown in FIG. 13B may comprise transmissions of two messages: a first message (e.g., Msg 1 1321) and a second message (e.g., Msg 2 1322). The first message (e.g., Msg 1 1321) and the second message (e.g., Msg 2 1322) may be analogous in some respects to the first message (e.g., Msg 1 1311) and a second message (e.g., Msg 2 1312), respectively. The two-step contention-free random access procedure may not comprise messages analogous to the third message (e.g., Msg 3 1313) and/or the fourth message (e.g., Msg 4 1314).

The two-step (e.g., contention-free) random access procedure may be configured/initiated for a beam failure recovery, other SI request, an SCell addition, and/or a handover. A base station may indicate, or assign to, the wireless device a preamble to be used for the first message (e.g., Msg 1 1321). The wireless device may receive, from the base station via a PDCCH and/or an RRC, an indication of the preamble (e.g., ra-PreambleIndex).

The wireless device may start a time window (e.g., ra-ResponseWindow) to monitor a PDCCH for the RAR, for example, based on (e.g., after or in response to) sending/transmitting the preamble. The base station may configure the wireless device with one or more beam failure recovery parameters, such as a separate time window and/or a separate PDCCH in a search space indicated by an RRC message (e.g., recoverySearchSpaceId). The base station may configure the one or more beam failure recovery parameters, for example, in association with a beam failure recovery request. The separate time window for monitoring the PDCCH and/or an RAR may be configured to start after sending/transmitting a beam failure recovery request (e.g., the window may start any quantity of symbols and/or slots after sending/transmitting the beam failure recovery request). The wireless device may monitor for a PDCCH transmission addressed to a Cell RNTI (C-RNTI) on the search space. During the two-step (e.g., contention-free) random access procedure, the wireless device may determine that a random access procedure is successful, for example, based on (e.g., after or in response to) sending/transmitting first message (e.g., Msg 1 1321) and receiving a corresponding second message (e.g., Msg 2 1322). The wireless device may determine that a random access procedure has successfully been completed, for example, if a PDCCH transmission is addressed to a corresponding C-RNTI. The wireless device may determine that a random access procedure has successfully been completed, for example, if the wireless device receives an RAR comprising a preamble identifier corresponding to a preamble sent/transmitted by the wireless device and/or the RAR comprises a MAC sub-PDU with the preamble identifier. The wireless device may determine the response as an indication of an acknowledgement for an SI request.

FIG. 13C shows an example two-step random access procedure. Similar to the random access procedures shown in FIGS. 13A and 13B, a base station may, prior to initiation of the procedure, send/transmit a configuration message

1330 to the wireless device. The configuration message 1330 may be analogous in some respects to the configuration message 1310 and/or the configuration message 1320. The procedure shown in FIG. 13C may comprise transmissions of multiple messages (e.g., two messages comprising: a first message (e.g., Msg A 1331) and a second message (e.g., Msg B 1332)).

Msg A 1320 may be sent/transmitted in an uplink transmission by the wireless device. Msg A 1320 may comprise one or more transmissions of a preamble 1341 and/or one or more transmissions of a transport block 1342. The transport block 1342 may comprise contents that are similar and/or equivalent to the contents of the third message (e.g., Msg 3 1313) (e.g., shown in FIG. 13A). The transport block 1342 may comprise UCI (e.g., an SR, a HARQ ACK/NACK, and/or the like). The wireless device may receive the second message (e.g., Msg B 1332), for example, based on (e.g., after or in response to) sending/transmitting the first message (e.g., Msg A 1331). The second message (e.g., Msg B 1332) may comprise contents that are similar and/or equivalent to the contents of the second message (e.g., Msg 2 1312) (e.g., an RAR shown in FIGS. 13A), the contents of the second message (e.g., Msg 2 1322) (e.g., an RAR shown in FIG. 13B) and/or the fourth message (e.g., Msg 4 1314) (e.g., shown in FIG. 13A).

The wireless device may start/initiate the two-step random access procedure (e.g., the two-step random access procedure shown in FIG. 13C) for a licensed spectrum and/or an unlicensed spectrum. The wireless device may determine, based on one or more factors, whether to start/initiate the two-step random access procedure. The one or more factors may comprise at least one of: a radio access technology in use (e.g., LTE, NR, and/or the like); whether the wireless device has a valid TA or not; a cell size; the RRC state of the wireless device; a type of spectrum (e.g., licensed vs. unlicensed); and/or any other suitable factors.

The wireless device may determine, based on two-step RACH parameters comprised in the configuration message 1330, a radio resource and/or an uplink transmit power for the preamble 1341 and/or the transport block 1342 (e.g., comprised in the first message (e.g., Msg A 1331)). The RACH parameters may indicate an MCS, a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the wireless device to determine a reception timing and a downlink channel for monitoring for and/or receiving second message (e.g., Msg B 1332).

The transport block 1342 may comprise data (e.g., delay-sensitive data), an identifier of the wireless device, security information, and/or device information (e.g., an International Mobile Subscriber Identity (IMSI)). The base station may send/transmit the second message (e.g., Msg B 1332) as a response to the first message (e.g., Msg A 1331). The second message (e.g., Msg B 1332) may comprise at least one of: a preamble identifier; a timing advance command; a power control command; an uplink grant (e.g., a radio resource assignment and/or an MCS); a wireless device identifier (e.g., a UE identifier for contention resolution); and/or an RNTI (e.g., a C-RNTI or a TC-RNTI). The wireless device may determine that the two-step random access procedure is successfully completed, for example, if a preamble identifier in the second message (e.g., Msg B 1332) corresponds to, or is matched to, a preamble sent/ transmitted by the wireless device and/or the identifier of the wireless device in second message (e.g., Msg B 1332) corresponds to, or is matched to, the identifier of the wireless device in the first message (e.g., Msg A 1331) (e.g., the transport block 1342).

A wireless device and a base station may exchange control signaling (e.g., control information). The control signaling may be referred to as L1/L2 control signaling and may originate from the PHY layer (e.g., layer 1) and/or the MAC layer (e.g., layer 2) of the wireless device or the base station. The control signaling may comprise downlink control signaling sent/transmitted from the base station to the wireless device and/or uplink control signaling sent/transmitted from the wireless device to the base station.

The downlink control signaling may comprise at least one of: a downlink scheduling assignment; an uplink scheduling grant indicating uplink radio resources and/or a transport format; slot format information; a preemption indication; a power control command; and/or any other suitable signaling. The wireless device may receive the downlink control signaling in a payload sent/transmitted by the base station via a PDCCH. The payload sent/transmitted via the PDCCH may be referred to as downlink control information (DCI). The PDCCH may be a group common PDCCH (GC-PDCCH) that is common to a group of wireless devices. The GC-PDCCH may be scrambled by a group common RNTI.

A base station may attach one or more cyclic redundancy check (CRC) parity bits to DCI, for example, in order to facilitate detection of transmission errors. The base station may scramble the CRC parity bits with an identifier of a wireless device (or an identifier of a group of wireless devices), for example, if the DCI is intended for the wireless device (or the group of the wireless devices). Scrambling the CRC parity bits with the identifier may comprise Modulo-2 addition (or an exclusive-OR operation) of the identifier value and the CRC parity bits. The identifier may comprise a 16-bit value of an RNTI.

DCIs may be used for different purposes. A purpose may be indicated by the type of an RNTI used to scramble the CRC parity bits. DCI having CRC parity bits scrambled with a paging RNTI (P-RNTI) may indicate paging information and/or a system information change notification. The P-RNTI may be predefined as "FFFE" in hexadecimal DCI having CRC parity bits scrambled with a system information RNTI (SI-RNTI) may indicate a broadcast transmission of the system information. The SI-RNTI may be predefined as "FFFF" in hexadecimal. DCI having CRC parity bits scrambled with a random access RNTI (RA-RNTI) may indicate a random access response (RAR). DCI having CRC parity bits scrambled with a cell RNTI (C-RNTI) may indicate a dynamically scheduled unicast transmission and/or a triggering of PDCCH-ordered random access. DCI having CRC parity bits scrambled with a temporary cell RNTI (TC-RNTI) may indicate a contention resolution (e.g., a Msg 3 analogous to the Msg 3 1313 shown in FIG. 13A). Other RNTIs configured for a wireless device by a base station may comprise a Configured Scheduling RNTI (CS RNTI), a Transmit Power Control-PUCCH RNTI (TPC PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C RNTI), and/or the like.

A base station may send/transmit DCIs with one or more DCI formats, for example, depending on the purpose and/or content of the DCIs. DCI format 0_0 may be used for scheduling of a PUSCH in a cell. DCI format 0_0 may be a fallback DCI format (e.g., with compact DCI payloads). DCI format 0_1 may be used for scheduling of a PUSCH in a cell (e.g., with more DCI payloads than DCI format 0_0). DCI format 1_0 may be used for scheduling of a PDSCH in a cell. DCI format 1_0 may be a fallback DCI format (e.g., with compact DCI payloads). DCI format 1_1 may be used for scheduling of a PDSCH in a cell (e.g., with more DCI payloads than DCI format 1_0). DCI format 2_0 may be used for providing a slot format indication to a group of wireless devices. DCI format 2_1 may be used for informing/notifying a group of wireless devices of a physical resource block and/or an OFDM symbol where the group of wireless devices may assume no transmission is intended to the group of wireless devices. DCI format 2_2 may be used for transmission of a transmit power control (TPC) command for PUCCH or PUSCH. DCI format 2_3 may be used for transmission of a group of TPC commands for SRS transmissions by one or more wireless devices. DCI format (s) for new functions may be defined in future releases. DCI formats may have different DCI sizes, or may share the same DCI size.

The base station may process the DCI with channel coding (e.g., polar coding), rate matching, scrambling and/or QPSK modulation, for example, after scrambling the DCI with an RNTI. A base station may map the coded and modulated DCI on resource elements used and/or configured for a PDCCH. The base station may send/transmit the DCI via a PDCCH occupying a number of contiguous control channel elements (CCEs), for example, based on a payload size of the DCI and/or a coverage of the base station. The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figures 14A, 14B:
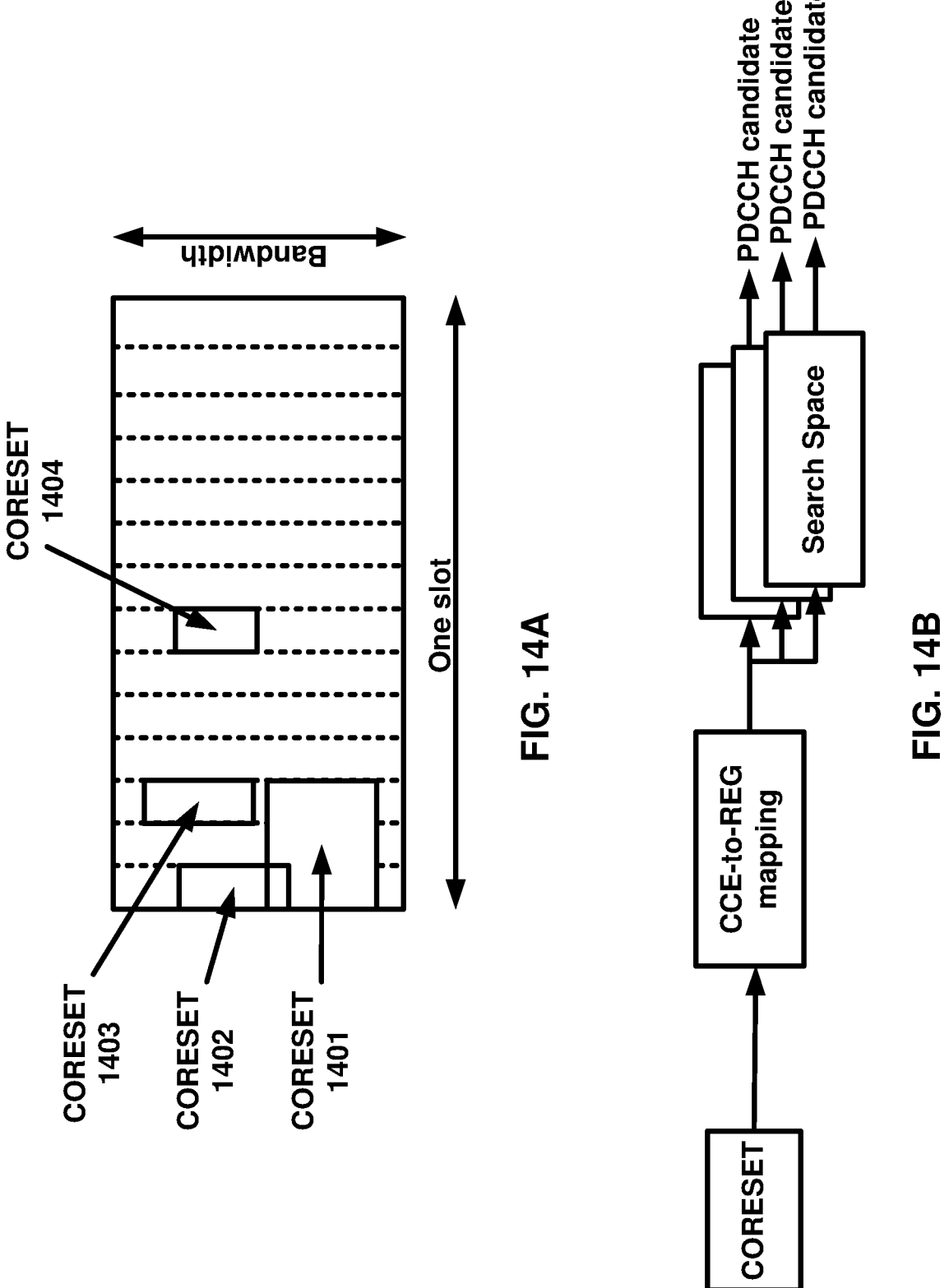
FIG. 14A shows an example of control resource set (CORESET) configurations.
FIG. 14B shows an example of a control channel element to resource element group (CCE-to-REG) mapping.

FIG. 14A shows an example of CORESET configurations. The CORESET configurations may be for a bandwidth part or any other frequency bands. The base station may send/transmit DCI via a PDCCH on one or more control resource sets (CORESETs). A CORESET may comprise a time-frequency resource in which the wireless device attempts/tries to decode DCI using one or more search spaces. The base station may configure a size and a location of the CORESET in the time-frequency domain. A first CORESET 1401 and a second CORESET 1402 may occur or may be set/configured at the first symbol in a slot. The first CORE-SET 1401 may overlap with the second CORESET 1402 in the frequency domain. A third CORESET 1403 may occur or may be set/configured at a third symbol in the slot. A fourth CORESET 1404 may occur or may be set/configured at the seventh symbol in the slot. CORESETs may have a different number of resource blocks in frequency domain.

FIG. 14B shows an example of a CCE-to-REG mapping. The CCE-to-REG mapping may be performed for DCI transmission via a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping (e.g., by an RRC configuration). A CORESET may be configured with an antenna port QCL parameter. The antenna port QCL parameter may indicate QCL information of a DM-RS for a PDCCH reception via the CORESET.

The base station may send/transmit, to the wireless device, one or more RRC messages comprising configuration parameters of one or more CORESETs and one or more search space sets. The configuration parameters may indicate an association between a search space set and a CORESET. A search space set may comprise a set of PDCCH candidates formed by CCEs (e.g., at a given aggregation level). The configuration parameters may indicate at least one of: a number of PDCCH candidates to be monitored per aggregation level; a PDCCH monitoring periodicity and a PDCCH monitoring pattern; one or more DCI formats to be monitored by the wireless device; and/or whether a search space set is a common search space set or a wireless device-specific search space set (e.g., a UE-specific search space set). A set of CCEs in the common search space set may be predefined and known to the wireless device. A set of CCEs in the wireless device-specific search space set (e.g., the UE-specific search space set) may be configured, for example, based on the identity of the wireless device (e.g., C-RNTI).

As shown in FIG. 14B, the wireless device may determine a time-frequency resource for a CORESET based on one or more RRC messages. The wireless device may determine a CCE-to-REG mapping (e.g., interleaved or non-interleaved, and/or mapping parameters) for the CORESET, for example, based on configuration parameters of the CORESET. The wireless device may determine a number (e.g., at most 10) of search space sets configured on/for the CORESET, for example, based on the one or more RRC messages. The wireless device may monitor a set of PDCCH candidates according to configuration parameters of a search space set. The wireless device may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding DCI content of one or more PDCCH candidates with possible (or configured) PDCCH locations, possible (or configured) PDCCH formats (e.g., the number of CCEs, the number of PDCCH candidates in common search spaces, and/or the number of PDCCH candidates in the wireless device-specific search spaces) and possible (or configured) DCI formats. The decoding may be referred to as blind decoding. The wireless device may determine DCI as valid for the wireless device, for example, based on (e.g., after or in response to) CRC checking (e.g., scrambled bits for CRC parity bits of the DCI matching an RNTI value). The wireless device may process information comprised in the DCI (e.g., a scheduling assignment, an uplink grant, power control, a slot format indication, a downlink preemption, and/or the like).

The may send/transmit uplink control signaling (e.g., UCI) to a base station. The uplink control signaling may comprise HARQ acknowledgements for received DL-SCH transport blocks. The wireless device may send/transmit the HARQ acknowledgements, for example, based on (e.g., after or in response to) receiving a DL-SCH transport block. Uplink control signaling may comprise CSI indicating a channel quality of a physical downlink channel. The wireless device may send/transmit the CSI to the base station. The base station, based on the received CSI, may determine transmission format parameters (e.g., comprising multi-antenna and beamforming schemes) for downlink transmission(s). Uplink control signaling may comprise scheduling requests (SR). The wireless device may send/transmit an SR indicating that uplink data is available for transmission to the base station. The wireless device may send/transmit UCI (e.g., HARQ acknowledgements (HARQ-ACK), CSI report, SR, and the like) via a PUCCH or a PUSCH. The wireless device may send/transmit the uplink control signaling via a PUCCH using one of several PUCCH formats.

There may be multiple PUCCH formats (e.g., five PUCCH formats). A wireless device may determine a PUCCH format, for example, based on a size of UCI (e.g., a quantity/number of uplink symbols of UCI transmission and a number of UCI bits). PUCCH format 0 may have a length of one or two OFDM symbols and may comprise two or fewer bits. The wireless device may send/transmit UCI via a PUCCH resource, for example, using PUCCH format 0 if the transmission is over/via one or two symbols and the quantity/number of HARQ-ACK information bits with positive or negative SR (HARQ-ACK/SR bits) is one or two. PUCCH format 1 may occupy a number of OFDM symbols (e.g., between four and fourteen OFDM symbols) and may comprise two or fewer bits. The wireless device may use PUCCH format 1, for example, if the transmission is over/via four or more symbols and the number of HARQ-ACK/SR bits is one or two. PUCCH format 2 may occupy one or two OFDM symbols and may comprise more than two bits. The wireless device may use PUCCH format 2, for example, if the transmission is over/via one or two symbols and the quantity/number of UCI bits is two or more. PUCCH format 3 may occupy a number of OFDM symbols (e.g., between four and fourteen OFDM symbols) and may comprise more than two bits. The wireless device may use PUCCH format 3, for example, if the transmission is four or more symbols, the quantity/number of UCI bits is two or more, and the PUCCH resource does not comprise an orthogonal cover code (OCC). PUCCH format 4 may occupy a number of OFDM symbols (e.g., between four and fourteen OFDM symbols) and may comprise more than two bits. The wireless device may use PUCCH format 4, for example, if the transmission is four or more symbols, the quantity/number of UCI bits is two or more, and the PUCCH resource comprises an OCC.

The base station may send/transmit configuration parameters to the wireless device for a plurality of PUCCH resource sets, for example, using an RRC message. The plurality of PUCCH resource sets (e.g., up to four sets in NR, or up to any other quantity of sets in other systems) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the wireless device may send/transmit using one of the plurality of PUCCH resources in the PUCCH resource set. The wireless device may select one of the plurality of PUCCH resource sets, for example, based on a total bit length of the UCI information bits (e.g., HARQ-ACK, SR, and/or CSI) if configured with a plurality of PUCCH resource sets. The wireless device may select a first PUCCH resource set having a PUCCH resource set index equal to "0," for example, if the total bit length of UCI information bits is two or fewer. The wireless device may select a second PUCCH resource set having a PUCCH resource set index equal to "1," for example, if the total bit length of UCI information bits is greater than two and less than or equal to a first configured value. The wireless device may select a third PUCCH resource set having a PUCCH resource set index equal to "2," for example, if the total bit length of UCI information bits is greater than the first configured value and less than or equal to a second configured value. The wireless device may select a fourth PUCCH resource set having a PUCCH resource set index equal to "3," for example, if the total bit length of UCI information bits is greater than the second configured value and less than or equal to a third value (e.g., 1406, 1706, or any other quantity of bits).

The wireless device may determine a PUCCH resource from the PUCCH resource set for UCI (HARQ-ACK, CSI, and/or SR) transmission, for example, after determining a PUCCH resource set from a plurality of PUCCH resource sets. The wireless device may determine the PUCCH resource, for example, based on a PUCCH resource indicator in DCI (e.g., with DCI format 1_0 or DCI for 1_1) received on/via a PDCCH. An n-bit (e.g., a three-bit) PUCCH resource indicator in the DCI may indicate one of multiple (e.g., eight) PUCCH resources in the PUCCH resource set. The wireless device may send/transmit the UCI (HARQ-ACK, CSI and/or SR) using a PUCCH resource indicated by the PUCCH resource indicator in the DCI, for example, based on the PUCCH resource indicator.

Figure 15A:
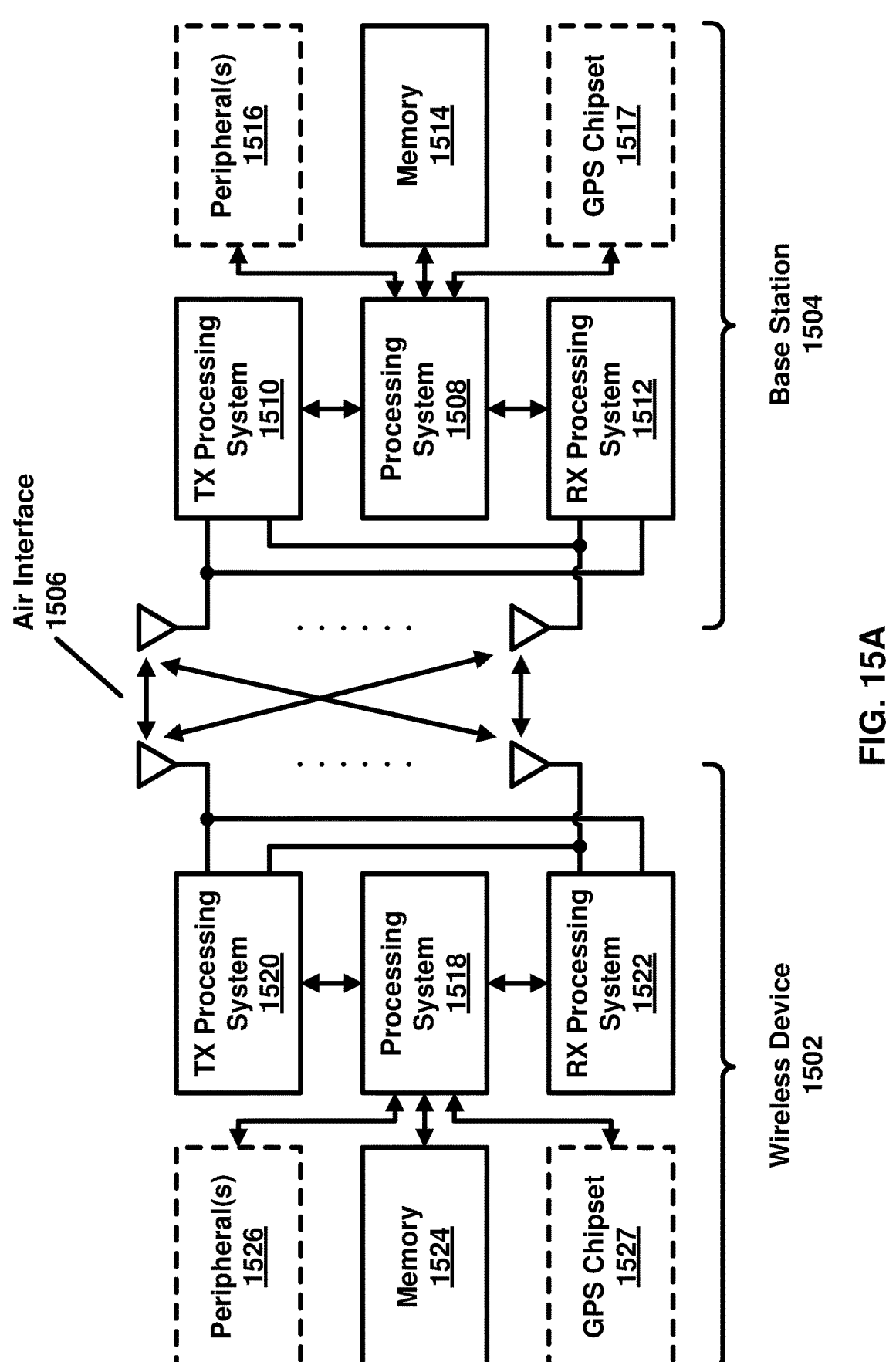
FIG. 15A shows an example of communications between a wireless device and a base station.

FIG. 15A shows an example communications between a wireless device and a base station. A wireless device 1502 and a base station 1504 may be part of a communication network, such as the communication network 100 shown in FIG. 1A, the communication network 150 shown in FIG. 1B, or any other communication network. A communication network may comprise more than one wireless device and/or more than one base station, with substantially the same or similar configurations as those shown in FIG. 15A.

The base station 1504 may connect the wireless device 1502 to a core network (not shown) via radio communications over the air interface (or radio interface) 1506. The communication direction from the base station 1504 to the wireless device 1502 over the air interface 1506 may be referred to as the downlink. The communication direction from the wireless device 1502 to the base station 1504 over the air interface may be referred to as the uplink. Downlink transmissions may be separated from uplink transmissions, for example, using various duplex schemes (e.g., FDD, TDD, and/or some combination of the duplexing techniques).

For the downlink, data to be sent to the wireless device 1502 from the base station 1504 may be provided/transferred/sent to the processing system 1508 of the base station 1504. The data may be provided/transferred/sent to the processing system 1508 by, for example, a core network. For the uplink, data to be sent to the base station 1504 from the wireless device 1502 may be provided/transferred/sent to the processing system 1518 of the wireless device 1502. The processing system 1508 and the processing system 1518 may implement layer 3 and layer 2 OSI functionality to process the data for transmission. Layer 2 may comprise an SDAP layer, a PDCP layer, an RLC layer, and a MAC layer, for example, described with respect to FIG. 2A, FIG. 2B, FIG. 3, and FIG. 4A. Layer 3 may comprise an RRC layer, for example, described with respect to FIG. 2B.

The data to be sent to the wireless device 1502 may be provided/transferred/sent to a transmission processing system 1510 of base station 1504, for example, after being processed by the processing system 1508. The data to be sent to base station 1504 may be provided/transferred/sent to a transmission processing system 1520 of the wireless device 1502, for example, after being processed by the processing system 1518. The transmission processing system 1510 and the transmission processing system 1520 may implement layer 1 OSI functionality. Layer 1 may comprise a PHY layer, for example, described with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

A reception processing system 1512 of the base station 1504 may receive the uplink transmission from the wireless device 1502. The reception processing system 1512 of the base station 1504 may comprise one or more TRPs. A reception processing system 1522 of the wireless device 1502 may receive the downlink transmission from the base station 1504. The reception processing system 1522 of the wireless device 1502 may comprise one or more antenna panels. The reception processing system 1512 and the reception processing system 1522 may implement layer 1 OSI functionality. Layer 1 may include a PHY layer, for example, described with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

The base station 1504 may comprise multiple antennas (e.g., multiple antenna panels, multiple TRPs, etc.). The wireless device 1502 may comprise multiple antennas (e.g., multiple antenna panels, etc.). The multiple antennas may be used to perform one or more MIMO or multi-antenna techniques, such as spatial multiplexing (e.g., single-user MIMO or multi-user MIMO), transmit/receive diversity, and/or beamforming. The wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518, respectively, to carry out one or more of the functionalities (e.g., one or more functionalities described herein and other functionalities of general computers, processors, memories, and/or other peripherals). The transmission processing system 1510 and/or the reception processing system 1512 may be coupled to the memory 1514 and/or another memory (e.g., one or more non-transitory computer readable mediums) storing computer program instructions or code that may be executed to carry out one or more of their respective functionalities. The transmission processing system 1520 and/or the reception processing system 1522 may be coupled to the memory 1524 and/or another memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and/or the base station 1504 to operate in a wireless environment.

The processing system 1508 may be connected to one or more peripherals 1516. The processing system 1518 may be connected to one or more peripherals 1526. The one or more peripherals 1516 and the one or more peripherals 1526 may comprise software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive input data (e.g., user input data) from, and/or provide output data (e.g., user output data) to, the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 may be connected to a Global Positioning System (GPS) chipset 1517. The processing system 1518 may be connected to a Global Positioning System (GPS) chipset 1527. The GPS chipset 1517 and the GPS chipset 1527 may be configured to determine and provide geographic location information of the wireless device 1502 and the base station 1504, respectively.

Figure 15B:
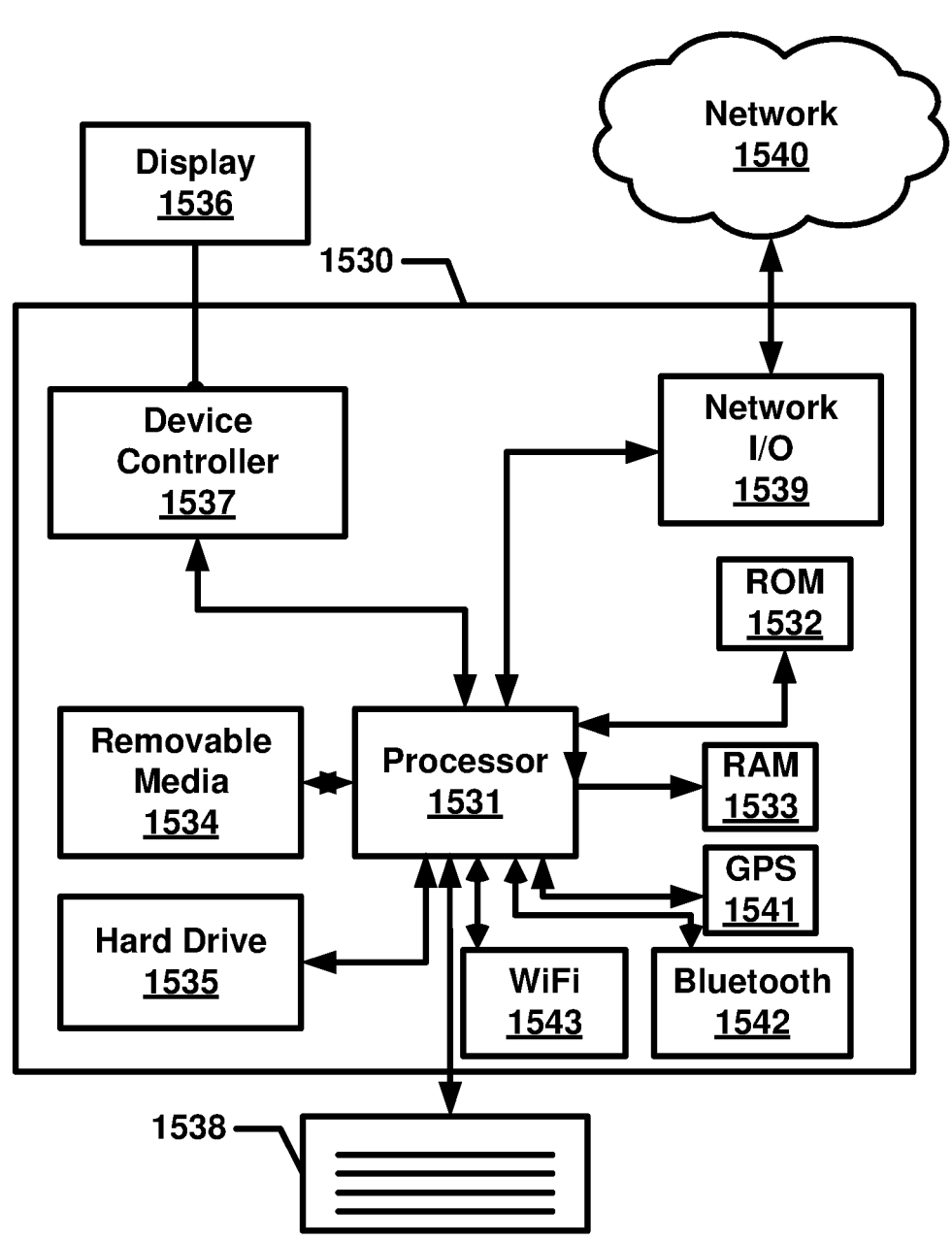
FIG. 15B shows example elements of a computing device that may be used to implement any of the various devices described herein

FIG. 15B shows example elements of a computing device that may be used to implement any of the various devices described herein, including, for example, the base station 160A, 160B, 162A, 162B, 220, 1504, 3410, 3510, and/or 3610, the wireless device 106, 156A, 156B, 210, 1502, 3210, 3220, 3310, 3320, 3330, 3410, 3420, 3430, 3510, 3520, 3530, 3610, 3620, and/or 3630 MAC, or any other base station, wireless device, AMF, UPF, network device, or computing device described herein. The computing device 1530 may include one or more processors 1531, which may execute instructions stored in the random-access memory (RAM) 1533, the removable media 1534 (such as a Universal Serial Bus (USB) drive, compact disk (CD) or digital versatile disk (DVD), or floppy disk drive), or any other desired storage medium. Instructions may also be stored in an attached (or internal) hard drive 1535. The computing device 1530 may also include a security processor (not shown), which may execute instructions of one or more computer programs to monitor the processes executing on the processor 1531 and any process that requests access to any hardware and/or software components of the computing device 1530 (e.g., ROM 1532, RAM 1533, the removable media 1534, the hard drive 1535, the device controller 1537, a network interface 1539, a GPS 1541, a Bluetooth interface 1542, a WiFi interface 1543, etc.). The computing device 1530 may include one or more output devices, such as the display 1536 (e.g., a screen, a display device, a monitor, a television, etc.), and may include one or more output device controllers 1537, such as a video processor. There may also be one or more user input devices 1538, such as a remote control, keyboard, mouse, touch screen, microphone, etc. The computing device 1530 may also include one or more network interfaces, such as a network interface 1539, which may be a wired interface, a wireless interface, or a combination of the two. The network interface 1539 may provide an interface for the computing device 1530 to communicate with a network 1540 (e.g., a RAN, or any other network). The network interface 1539 may include a modem (e.g., a cable modem), and the external network 1540 may include communication links, an external network, an in-home network, a provider's wireless, coaxial, fiber, or hybrid fiber/coaxial distribution system (e.g., a DOCSIS network), or any other desired network. Additionally, the computing device 1530 may include a location-detecting device, such as a global positioning system (GPS) microprocessor 1541, which may be configured to receive and process global positioning signals and determine, with possible assistance from an external server and antenna, a geographic position of the computing device 1530.

The example in FIG. 15B may be a hardware configuration, although the components shown may be implemented as software as well. Modifications may be made to add, remove, combine, divide, etc. components of the computing device 1530 as desired. Additionally, the components may be implemented using basic computing devices and components, and the same components (e.g., processor 1531, ROM storage 1532, display 1536, etc.) may be used to implement any of the other computing devices and components described herein. For example, the various components described herein may be implemented using computing devices having components such as a processor executing computer-executable instructions stored on a computer-readable medium, as shown in FIG. 15B. Some or all of the entities described herein may be software based, and may co-exist in a common physical platform (e.g., a requesting entity may be a separate software process and program from a dependent entity, both of which may be executed as software on a common computing device).

Figures 16A, 16B, 16C, 16D:
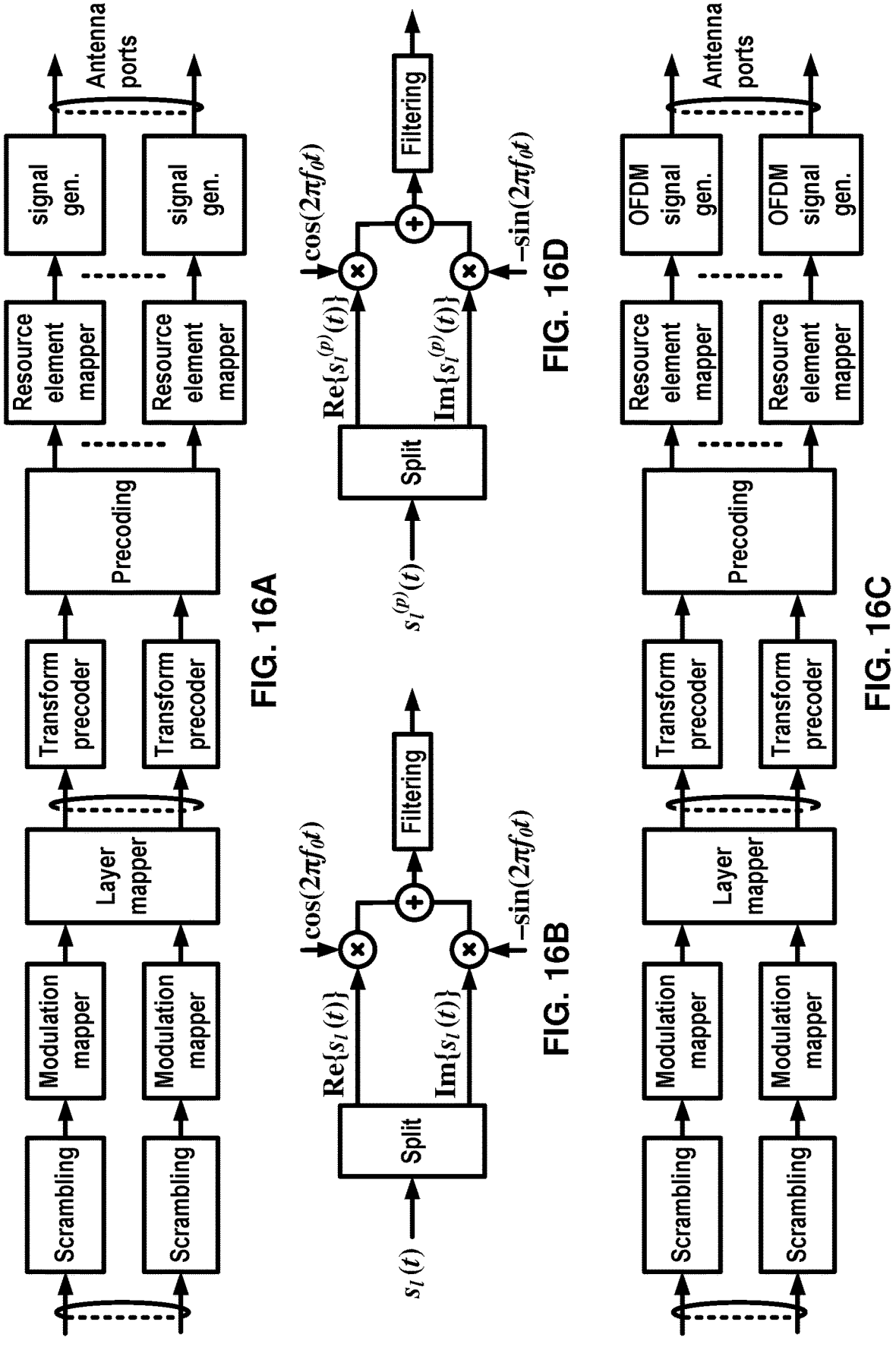
FIG. 16A, FIG. 16B, FIG. 16C, and FIG. 16D show examples of uplink and downlink signal transmission.

FIG. 16A shows an example structure for uplink transmission. Processing of a baseband signal representing a physical uplink shared channel may comprise/perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA), CP-OFDM signal for an antenna port, or any other signals; and/or the like. An SC-FDMA signal for uplink transmission may be generated, for example, if transform precoding is enabled. A CP-OFDM signal for uplink transmission may be generated, for example, if transform precoding is not enabled (e.g., as shown in FIG. 16A). These functions are examples and other mechanisms for uplink transmission may be implemented.

FIG. 16B shows an example structure for modulation and up-conversion of a baseband signal to a carrier frequency. The baseband signal may be a complex-valued SC-FDMA, CP-OFDM baseband signal (or any other baseband signals) for an antenna port and/or a complex-valued Physical Random Access Channel (PRACH) baseband signal. Filtering may be performed/employed, for example, prior to transmission.

FIG. 16C shows an example structure for downlink transmissions. Processing of a baseband signal representing a physical downlink channel may comprise/perform one or more functions. The one or more functions may comprise: scrambling of coded bits in a codeword to be sent/transmitted on/via a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are examples and other mechanisms for downlink transmission may be implemented.

FIG. 16D shows an example structure for modulation and up-conversion of a baseband signal to a carrier frequency. The baseband signal may be a complex-valued OFDM baseband signal for an antenna port or any other signal. Filtering may be performed/employed, for example, prior to transmission.

A wireless device may receive, from a base station, one or more messages (e.g. RRC messages) comprising configuration parameters of a plurality of cells (e.g., a primary cell, one or more secondary cells). The wireless device may communicate with at least one base station (e.g., two or more base stations in dual-connectivity) via the plurality of cells. The one or more messages (e.g. as a part of the configuration parameters) may comprise parameters of PHY, MAC, RLC, PCDP, SDAP, RRC layers for configuring the wireless device. The configuration parameters may comprise parameters for configuring PHY and MAC layer channels, bearers, etc. The configuration parameters may comprise parameters indicating values of timers for PHY, MAC, RLC, PCDP, SDAP, RRC layers, and/or communication channels.

A timer may begin running, for example, once it is started and continue running until it is stopped or until it expires. A timer may be started, for example, if it is not running or restarted if it is running A timer may be associated with a value (e.g., the timer may be started or restarted from a value or may be started from zero and expire once it reaches the value). The duration of a timer may not be updated, for example, until the timer is stopped or expires (e.g., due to BWP switching). A timer may be used to measure a time period/window for a process. With respect to an implementation and/or procedure related to one or more timers or other parameters, it will be understood that there may be multiple ways to implement the one or more timers or other parameters. One or more of the multiple ways to implement a timer may be used to measure a time period/window for the procedure. A random access response window timer may be used for measuring a window of time for receiving a random access response. The time difference between two time stamps may be used, for example, instead of starting a random access response window timer and determine the expiration of the timer. A process for measuring a time window may be restarted, for example, if a timer is restarted. Other example implementations may be configured/provided to restart a measurement of a time window.

Figure 17:
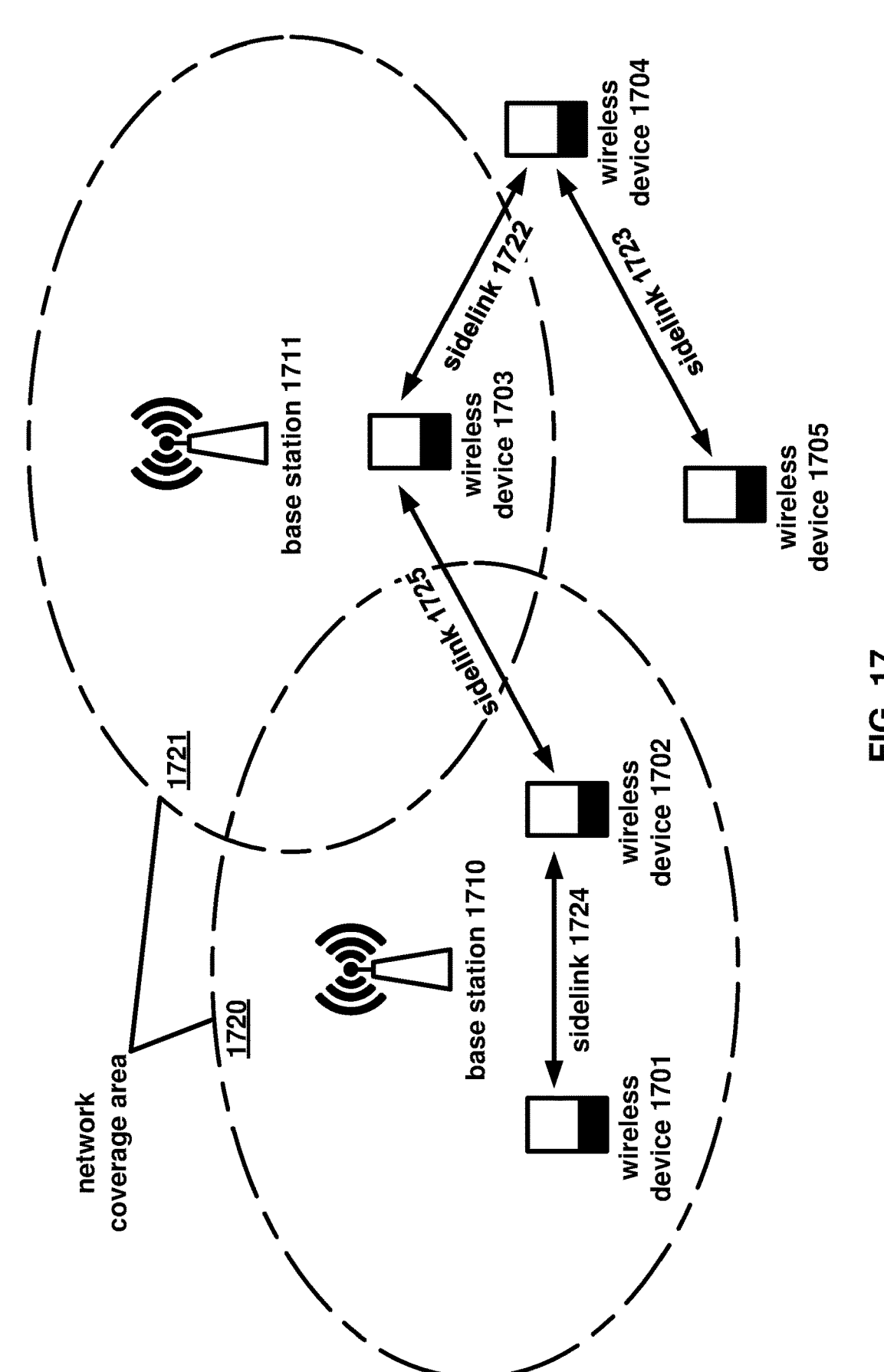
FIG. 17 shows an example of wireless communications.

FIG. 17 shows an example of wireless communications. There may be a direct communication between wireless devices, for example, in wireless communication (e.g., sidelink communications, device-to-device (D2D) communications, vehicle-to-everything (V2X) communications, etc.). The direct communication may be performed via a communications link, such as a sidelink (SL) or any other link. The wireless devices may exchange communications, such as sidelink communications, via an interface such as a sidelink interface (e.g., a PC5 interface). The direct communications, such as sidelink communications, may differ from uplink communications (e.g., in which a wireless device may communicate to a base station) and/or downlink communications (e.g., in which a base station may communicate to a wireless device). Reference made herein to sidelink, SL, and/or to sidelink communications may comprise any link and/or any link communications, including, for example, any direct link and/or any direct link communications between any user devices (e.g., wireless devices, user devices, user equipments, etc.). Although sidelink is used as an example, one skilled in the art will appreciate that any communications can use these concepts. A wireless device and a base station may exchange uplink and/or downlink communications via an interface, such as a user plane interface (e.g., a Uu interface).

A first wireless device (e.g., a wireless device 1701) and a second wireless device (e.g., a wireless device 1702) may be in a first coverage area (e.g., a coverage area 1720) of a first base station (e.g., a base station 1710). The first wireless device and the second wireless device may communicate with the first base station, for example, via a Uu interface. The coverage area may comprise any quantity of wireless devices that may communicate with the base station. A third wireless device (e.g., a wireless device 1703) may be in a second coverage area (e.g., a coverage area 1721) of a second base station (e.g., a base station 1711). The second coverage area may comprise any quantity of wireless devices that may communicate with the second base station. The first base station and the second base station may share a network and/or may jointly establish/provide a network coverage area (e.g., 1720 and 1721). A fourth wireless device (e.g., a wireless device 1704) and a fifth wireless device (e.g., a wireless device 1705) may be outside of the network coverage area (e.g., 1720 and 1721). Any quantity of wireless devices that may be outside of the network coverage area (e.g., 1720 and 1721).

Wireless communications may comprise in-coverage D2D communication. In-coverage D2D communication may be performed, for example, if two or more wireless devices share a network coverage area. The first wireless device and the second wireless device may be in the first coverage area of the first base station. The first wireless device and the second wireless device may perform a direct communication (e.g., an in-coverage intra-cell direct communication via a sidelink 1724). The second wireless device and the third wireless device may be in the coverage areas of different base stations (e.g., 1710 and 1711) and/or may share the same network coverage area (e.g., 1720 and/or 1721). The second wireless device and the third wireless device may perform a direct communication (e.g., an in-coverage inter-cell direct communication via a sidelink 1725). Partial-coverage direct communications (e.g., partial-coverage D2D communications, partial-coverage V2X communications, partial-coverage sidelink communications, etc.) may be performed. Partial-coverage direct communications may be performed, for example, if one wireless device is within the network coverage area and the other wireless device is outside the network coverage area. The third wireless device and the fourth wireless device may perform a partial-coverage direct communication (e.g., via a sidelink 1722). Out-of-coverage direct communications may be performed. Out-of-coverage direct communications may be performed, for example, if both wireless devices are outside of a network coverage area. The fourth wireless device and the fifth wireless device may perform an out-of-coverage direct communication (e.g., via a sidelink 1723).

Wireless communications, such as sidelink communications, may be configured using physical channels. Wireless communications, such as sidelink communications, may be configured using physical channels, for example, a physical sidelink broadcast channel (PSBCH), a physical sidelink feedback channel (PSFCH), a physical sidelink discovery channel (PSDCH), a physical sidelink control channel (PSCCH), and/or a physical sidelink shared channel (PSSCH). PSBCH may be used by a first wireless device to send broadcast information to a second wireless device. A PSBCH may be similar in some respects to a PBCH. The broadcast information may comprise a slot format indication, resource pool information, a sidelink system frame number, and/or any other suitable broadcast information. A PSFCH may be used by a first wireless device to send feedback information to a second wireless device. The feedback information may comprise HARQ feedback information. A PSDCH may be used by a first wireless device to send discovery information to a second wireless device. The discovery information may be used by a wireless device to signal its presence and/or the availability of services to other wireless devices in the area. A PSCCH may be used by a first wireless device to send sidelink control information (SCI) to a second wireless device. A PSCCH may be similar in some respects to PDCCH and/or PUCCH. The control information may comprise time/frequency resource allocation information (e.g., RB size, a number of retransmissions, etc.), demodulation related information (e.g., DM-RS, MCS, redundancy version (RV), etc.), identifying information for a sending (e.g., transmitting) wireless device and/or a receiving wireless device, a process identifier (e.g., HARQ, etc.), and/or any other suitable control information. The PSCCH may be used to allocate, prioritize, and/or reserve sidelink resources for sidelink transmissions. PSSCH may be used by a first wireless device to send and/or relay data and/or network information to a second wireless device. PSSCH may be similar in some respects to PDSCH and/or PUSCH. A sidelink channel may be associated with one or more demodulation reference signals. For example, each of the sidelink channels may be associated with one or more demodulation reference signals. Sidelink operations may utilize sidelink synchronization signals to establish a timing of sidelink operations. Wireless devices configured for sidelink operations may send sidelink synchronization signals, for example, with the PSBCH. The sidelink synchronization signals may include primary sidelink synchronization signals (PSSS) and/or secondary sidelink synchronization signals (SSSS).

A wireless device may be configured with wireless resources (e.g., sidelink resources). A wireless device may be configured (e.g., pre-configured) for a sidelink. A wireless device may be configured (e.g., pre-configured) with sidelink resource information. A network may broadcast system information relating to a resource pool for a sidelink. A network may configure a particular wireless device with a dedicated sidelink configuration. The configuration may identify/indicate sidelink resources to be used for sidelink operation (e.g., configure a sidelink band combination).

A wireless device may operate in one or more (e.g., different) modes. The wireless device may operate in an assisted mode (e.g., mode 1) and/or an autonomous mode (e.g., mode 2). Mode selection may be based on a coverage status of the wireless device, a radio resource control status of the wireless device, information and/or instructions from the network, and/or any other suitable factors. The wireless device may select to operate in autonomous mode. The wireless device may select to operate in autonomous mode, for example, if the wireless device is idle or inactive, or if the wireless device is outside of network coverage. The wireless device may select to operate (or be instructed by a base station to operate) in an assisted mode. The wireless device may select to operate (or be instructed by a base station to operate) in an assisted mode, for example, if the wireless device is in a connected mode (e.g., connected to a base station). The network (e.g., a base station) may instruct a connected wireless device to operate in a particular mode.

The wireless device may request scheduling from the network. The wireless device may request scheduling from the network, for example, in an assisted mode. The wireless device may send a scheduling request to the network and the network may allocate sidelink resources to the wireless device. Assisted mode may be referred to as network-assisted mode, gNB-assisted mode, or a base station-assisted mode. The wireless device may select sidelink resources. The wireless device may select sidelink resources, for example, in an autonomous mode. The wireless device may select sidelink resources, for example, based on measurements within one or more resource pools (e.g., pre-configured resource pools, network-assigned resource pools), sidelink resource selections made by other wireless devices, and/or sidelink resource usage of other wireless devices.

A wireless device may use a sensing window. A wireless device may use a selection window. A wireless device may use a sensing window and/or a selection window, for example, to determine/select sidelink resources. The wireless device may receive/determine SCI sent (e.g., transmitted) by other wireless devices using a sidelink resource pool. The wireless device may receive/determine SCI sent (e.g., transmitted) by other wireless devices using the sidelink resource pool, for example, in the sensing window. The SCIs may identify/determine resources that may be used and/or reserved for sidelink transmissions. The wireless device may determine/select resources within the selection window (e.g., resources that are different from the resources identified in the SCIs). The wireless device may determine/select resources within the selection window, for example, based on the resources identified in the SCIs. The wireless device may send (e.g., transmit) using the selected sidelink resources.

Figure 18:
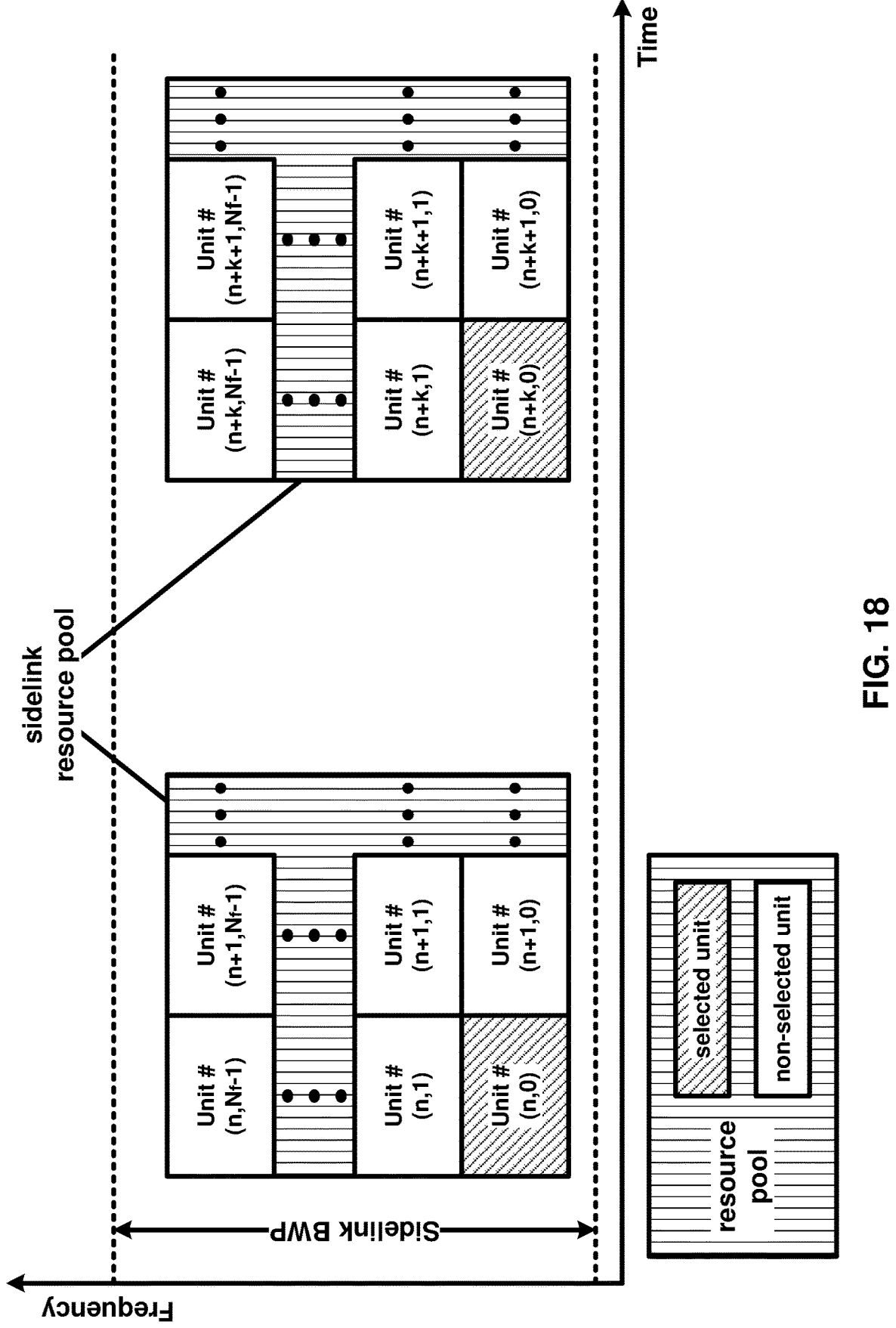
FIG. 18 shows an example of a resource pool for communication link (e.g., a sidelink).

FIG. 18 shows an example of a resource pool for sidelink operations. A wireless device may operate using one or more sidelink cells. A sidelink cell may include one or more resource pools. A resource pool (e.g., each resource pool) may be configured to operate in accordance with a particular mode (e.g., assisted mode, autonomous mode, and/or any other mode). The resource pool may be divided into one or more resource units (e.g., one or more resources). Each resource unit may comprise one or more resource blocks. Each resource unit may comprise one or more resource blocks, for example, in the frequency domain. Each resource unit may comprise one or more resource blocks, for example, which may be referred to as a sub-channel Each resource unit may comprise one or more slots, one or more subframes, and/or one or more OFDM symbols. Each resource unit may comprise one or more slots, one or more subframes, and/or one or more OFDM symbols, for example, in the time domain. The resource pool may be continuous or non-continuous in the frequency domain and/or the time domain (e.g., comprising contiguous resource units or non-contiguous resource units). The resource pool may be divided into repeating resource pool portions. The resource pool may be shared among one or more wireless devices. Each wireless device may attempt to send (e.g., transmit) using different resource units, for example, to avoid collisions.

A resource pool (e.g., a sidelink resource pool) may be arranged in any suitable manner. The resource pool may be non-contiguous in the time domain and/or confined to a single sidelink BWP, for example, as shown in FIG. 18. Frequency resources may be divided into Nf resource units per unit of time, for example, as shown in FIG. 18. Frequency resources may be numbered from zero to Nf−1, for example, as shown in FIG. 18. The example resource pool may comprise a plurality of portions (e.g., non-contiguous portions) that may repeat every k units of time. Time resources may be numbered as n, n+1 . . . n+k, n+k+1 . . . , etc., for example, as shown in FIG. 18.

A wireless device may determine/select for transmission one or more resource units from a resource pool. The wireless device may select resource unit (n,0) for sidelink transmission. The wireless device may determine/select periodic resource units in later portions of the resource pool, for example, resource unit (n+k,0), resource unit (n+2k,0), resource unit (n+3k,0), etc. The wireless device may determine/select periodic resource units, for example, based on a determination that a transmission using resource unit (n,0) will not (or is not likely) to collide with a sidelink transmission of a wireless device that shares the sidelink resource pool. The determination may be based on behavior of other wireless devices that share the resource pool. The wireless device may select resource unit (n,0), resource (n+k,0), etc., for example, if no sidelink transmissions are detected in resource unit (n−k,0). The wireless device may avoid selection of resource unit (n,1), resource (n+k,1), etc., for example, if a sidelink transmission from another wireless device is detected in resource unit (n−k,1).

Different sidelink physical channels may use different resource pools. PSCCH may use a first resource pool and PSSCH may use a second resource pool. Different resource priorities may be associated with different resource pools. Data associated with a first QoS, service, priority, and/or other characteristic may use a first resource pool and data associated with a second QoS, service, priority, and/or other characteristic may use a second resource pool. A network (e.g., a base station) may configure a priority level for each resource pool, a service to be supported for each resource pool, etc. A network (e.g., a base station) may configure a first resource pool for use by unicast wireless devices (e.g., UEs), a second resource pool for use by groupcast wireless devices (e.g., UEs), etc. A network (e.g., a base station) may configure a first resource pool for transmission of sidelink data, a second resource pool for transmission of discovery messages, etc.

A direct communication between wireless devices may include vehicle-to-everything (V2X) communications. In vehicle-to-everything (V2X) communications via a Uu interface and/or a PC5 interface, the V2X communications may be vehicle-to-vehicle (V2V) communications. The wireless device in the V2V communications may be a vehicle. The V2X communications may be vehicle-to-pedestrian (V2P) communications. A wireless device in the V2P communications may be a pedestrian equipped with a mobile phone (e.g., a handset). The V2X communications may be vehicle-to-infrastructure (V2I) communications. The infrastructure in the V2I communications may be a base station, an access point, a node, and/or a road side unit. A wireless device in the V2X communications may be a sending (e.g., transmitting) wireless device performing one or more sidelink transmissions with a receiving wireless device. The wireless device in the V2X communications may be a receiving wireless device that receives one or more sidelink transmissions from a sending (e.g., transmitting) wireless device.

Figure 19:
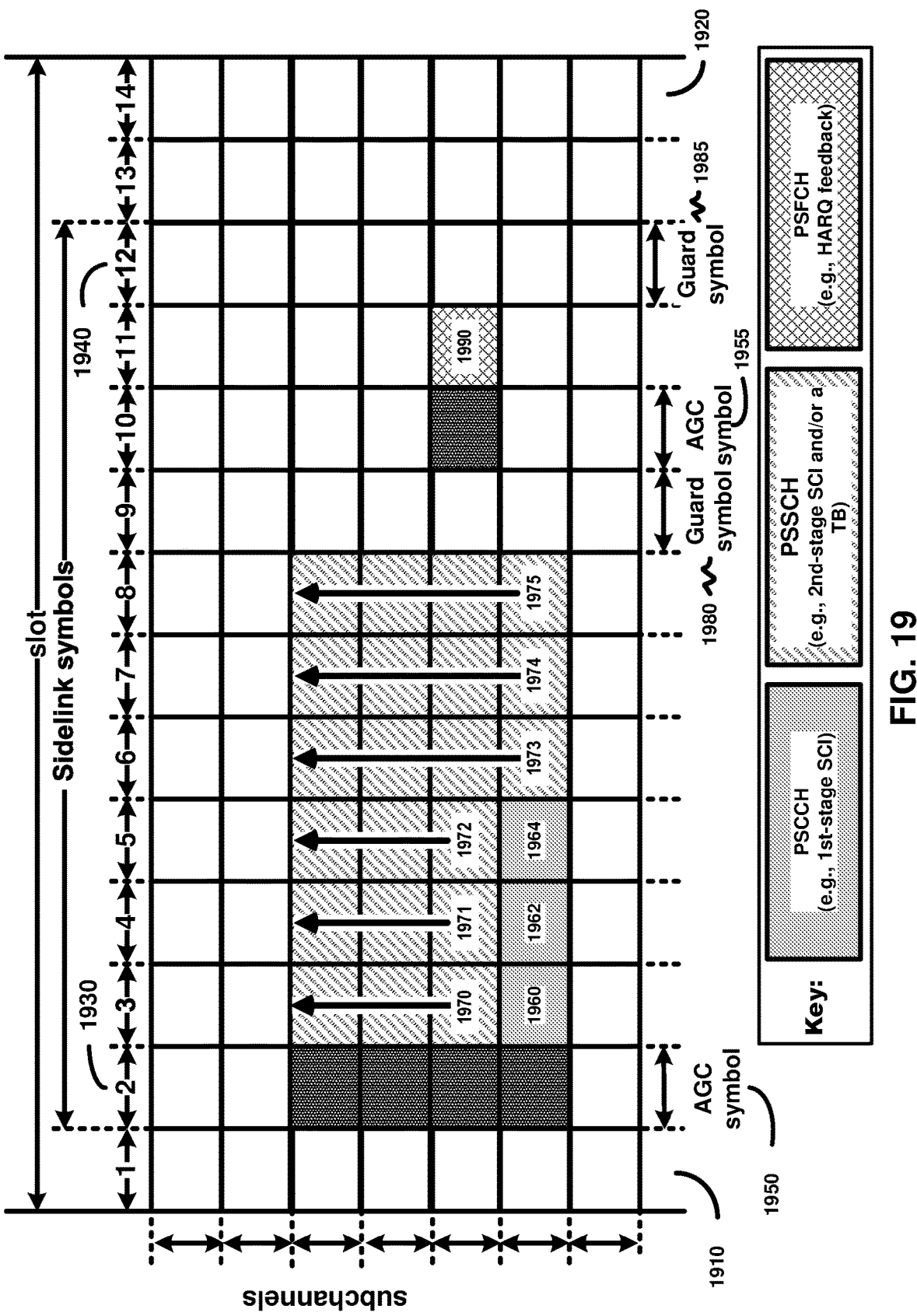
FIG. 19 shows an example of sidelink symbols in a slot.

FIG. 19 shows an example of sidelink symbols in a slot. A sidelink transmission may be sent (e.g., transmitted) in a slot in the time domain. A wireless device may send (e.g., transmit) data via sidelink. The wireless device may segment the data into one or more transport blocks (TBs). The one or more TBs may comprise different pieces of the data. A TB of the one or more TBs may be a data packet of the data. The wireless device may send (e.g., transmit) the TB (e.g., the data packet) of the one or more TBs via one or more sidelink transmissions (e.g., via PSCCH and/or PSSCH in one or more slots). A sidelink transmission (e.g., occupying a slot) may comprise SCI. The sidelink transmission may further comprise a TB. The SCI may comprise a 1$^{st}$-stage SCI and/or a 2nd-stage SCI. A PSCCH of the sidelink transmission may comprise the 1$^{st}$-stage SCI for scheduling a PSSCH (e.g., the TB). The PSSCH of the sidelink transmission may comprise the 2nd-stage SCI. The PSSCH of the sidelink transmission may further comprise the TB. Sidelink symbols in a slot may or may not start from the first symbol of the slot 1910. The sidelink symbols in the slot may or may not end at the last symbol of the slot 1920. Sidelink symbols in a slot may start from the second symbol of the slot 1930. The sidelink symbols in the slot may end at the twelfth symbol of the slot 1940. A first sidelink transmission may comprise a first automatic gain control (AGC) symbol 1950 (e.g., the second symbol in the slot 1930), a PSCCH 1960-1964 (e.g., in the third, fourth and the fifth symbols in a subchannel in the slot), a PSSCH 1970-1975 (e.g., from the third symbol to the eighth symbol in the slot), and/or a first guard symbol 1980 (e.g., the ninth symbol in the slot). A second sidelink transmission may comprise a second AGC symbol 1955 (e.g., the tenth symbol in the slot), a PSFCH 1990 (e.g., the eleventh symbol in the slot), and/or a second guard symbol 1985 for the second sidelink transmission (e.g., the twelfth symbol in the slot). One or more HARQ feedbacks (e.g., a positive acknowledgement or ACK and/or a negative acknowledgement or NACK) may be sent (e.g., transmitted) via the PSFCH 1990. The PSCCH 1960-1964, the PSSCH 1970-1975, and the PSFCH 1990 may have a different number of subchannels (e.g., a different number of frequency resources) in the frequency domain.

A 1$^{st}$-stage SCI may be SCI format 1-A. The SCI format 1-A may comprise a plurality of fields used for scheduling of a first TB on a PSSCH and a 2nd-stage SCI on the PSSCH. The following information may be sent (e.g., transmitted) by means of the SCI format 1-A:

A priority of the sidelink transmission. The priority may be a physical layer (e.g., a layer 1) priority of the sidelink transmission. The priority may be determined, for example, based on logical channel priorities of the sidelink transmission;

Frequency resource assignment of a PSSCH;

Time resource assignment of a PSSCH;

Resource reservation period/interval for a second TB;

Demodulation reference signal (DMRS) pattern;

A format of the 2$^{nd}$-stage SCI;

Beta_offset indicator;

Number of DMRS port;

Modulation and coding scheme of a PSSCH;

Additional MCS table indicator;

PSFCH overhead indication; and/or

Reserved bits.

A $2^{nd}$-stage SCI may be SCI format 2-A. The SCI format 2-A may be used for decoding of a PSSCH. The SCI format 2-A may be used with a HARQ operation when the HARQ-ACK information includes an ACK and/or a NACK. The SCI format 2-A may be used when there is no feedback of HARQ-ACK information. The SCI format 2-A may comprise a plurality of fields indicating the following information:

HARQ process number;

New data indicator;

Redundancy version;

Source ID of a transmitter (e.g., a sending (transmitting) wireless device) of a sidelink transmission;

Destination ID of a receiver (e.g., a receiving wireless device) of the sidelink transmission;

HARQ feedback enabled/disabled indicator;

Cast type indicator indicating that the sidelink transmission is a broadcast, a groupcast, and/or a unicast; and/or CSI request.

A $2^{nd}$-stage SCI may be SCI format 2-B. The SCI format 2-B may be used for decoding a PSSCH. The SCI format 2-B may be used with HARQ operation when HARQ-ACK information includes only NACK. The SCI format 2-B may be used when there is no feedback of HARQ-ACK information. The SCI format 2-B may comprise a plurality of fields indicating the following information:

HARQ process number;

New data indicator;

Redundancy version;

Source ID of a transmitter (e.g., a sending (transmitting) wireless device) of a sidelink transmission;

Destination ID of a receiver (e.g., a receiving wireless device) of the sidelink transmission;

HARQ feedback enabled/disabled indicator;

Zone ID indicating a zone where a transmitter (e.g., a sending (transmitting) wireless device) of the sidelink transmission is geographically located; and/or Communication range requirement indicating a communication range of the sidelink transmission.

Figure 20:
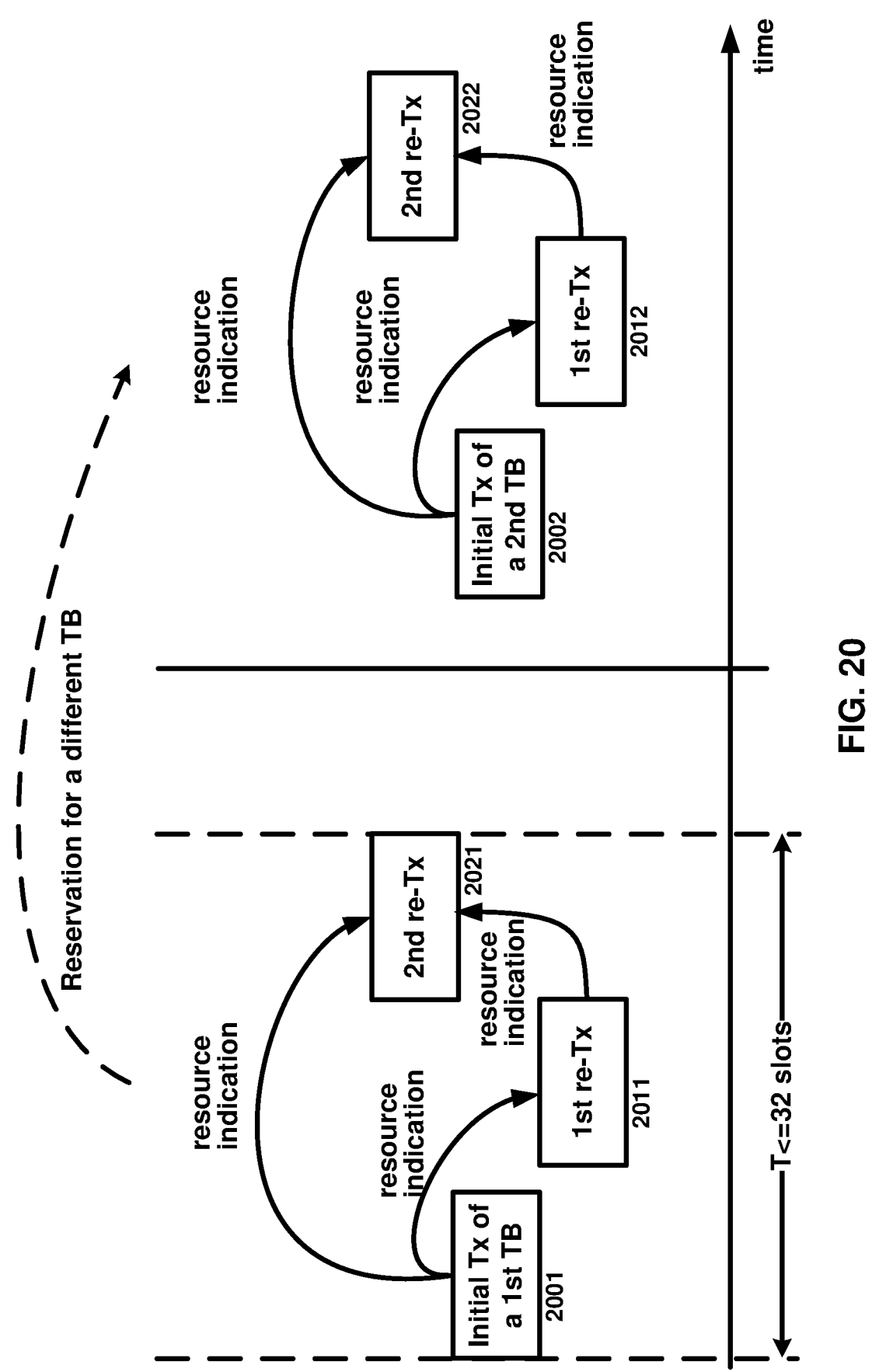
FIG. 20 shows an example of a resource indication for a transport block (TB) and a resource reservation for a TB.

FIG. 20 shows an example of resource indication for a first TB (e.g., a first data packet) and resource reservation for a second TB (e.g., a second data packet). SCI of an initial transmission (e.g., a first transmission, initial Tx of 1st TB) 2001 and/or a retransmission (e.g., 1st re-Tx, 2nd re-Tx) 2011 and 2021 of the first TB (e.g., 1st TB) may comprise one or more first parameters (e.g., Frequency resource assignment and Time resource assignment) indicating one or more first time and/or frequency (T/F) resources for transmission (e.g., initial Tx) 2001 and/or retransmission (e.g., 1st re-Tx, 2nd re-Tx) 2011 and 2021, respectively, of the first TB (e.g., 1st TB). The SCI may further comprise one or more second parameters (e.g., Resource reservation period) indicating a reservation period (interval, etc.) of one or more second T/F resources for initial transmission (e.g., initial Tx of 2nd TB) 2002 and/or retransmission (e.g., 1st re-Tx, 2nd re-Tx) 2012 and 2022 of the second TB (e.g., 2nd TB).

A wireless device may determine/select one or more first T/F resources for transmission and/or retransmission of a first TB. A wireless device may determine/select one or more first T/F resources for (initial) transmission and/or retransmission of the first TB, for example, based on triggering a resource selection procedure (e.g., as described above in FIG. 19). The wireless device may select three resources for sending (e.g., transmitting) the first TB, for example, such as shown in FIG. 20. The wireless device may send (e.g., transmit) an initial transmission (e.g., an initial Tx of a first TB in FIG. 20) of the first TB via a first resource 2001 of the three resources. The wireless device may send (e.g., transmit) a first retransmission (e.g., a 1st re-Tx in FIG. 20) of the first TB via a second resource 2011 of the three resources. The wireless device may send (e.g., transmit) a second retransmission (e.g., a 2nd re-Tx in FIG. 20) of the first TB via a third resource 2021 of the three resources. A time duration between a starting time of the initial transmission of the first TB (e.g., via the first resource 2011) and the second retransmission of the first TB (e.g., via the third resource 2021) may be smaller than or equal to 32 sidelink slots (e.g., T≤32 slots in FIG. 20) or any other quantity of sidelink slots or any other duration. A first SCI may associate with the initial transmission of the first TB. The first SCI may indicate a first T/F resource indication for the initial transmission of the first TB, the first retransmission of the first TB, and the second retransmission of the first TB. The first SCI may indicate a reservation period/interval of resource reservation for a second TB, for example, via a fourth resource 2002. A second SCI may associate with the first retransmission of the first TB. The second SCI may indicate a second T/F resource indication for the first retransmission of the first TB (e.g., via the second resource 2011) and the second retransmission of the first TB (e.g., via a fifth resource 2012). The second SCI may indicate the reservation period/interval of resource reservation for the second TB. A third SCI may associate with the second retransmission of the first TB. The third SCI may indicate a third T/F resource indication for the second retransmission of the first TB (e.g., via a sixth resource 2022). The third SCI may indicate the reservation period/interval of resource reservation for the second TB.

FIG. 21 and FIG. 22 show examples of configuration information for sidelink communication. A base station may send (e.g., transmit) one or more radio resource control (RRC) messages to a wireless device for delivering the configuration information for the sidelink communication. Specifically, FIG. 21 shows an example of configuration information for sidelink communication that may comprise a field of SL-UE-SelectedConfigRP. A parameter sl-ThresPSSCH-RSRP-List in the field may indicate a list of 64 thresholds. A wireless device may receive first sidelink control information (SCI) indicating a first priority. The wireless device may have second SCI to be sent (e.g., transmitted). The second SCI may indicate a second priority. The wireless device may select a threshold from the list based on the first priority in the first SCI and the second priority in the second SCI. The wireless device may exclude resources from candidate resource sets based on the threshold (e.g., as described herein in FIG. 26). A parameter sl-MaxNumPerReserve in the field may indicate a maximum number of reserved PSCCH and/or PSSCH resources indicated in SCI. A parameter sl-MultiReserveResource in the field may indicate that a reservation of a sidelink resource for an initial transmission of a TB by SCI associated with a different TB may be allowed, for example, based on or in response to a sensing and resource selection procedure. A parameter sl-ResourceReservePeriodList may indicate a set of possible resource reservation periods (intervals, etc.) (e.g., SL-ResourceReservePeriod) allowed in a resource pool. Up to 16 values may be configured per resource pool. A parameter sl-RS-ForSensing may indicate, for example, if DMRS of PSCCH and/or PSSCH are used for a layer 1 (e.g., physical layer) RSRP measurement in sensing operation. A parameter sl-Sensing Window may indicate the start of a sensing window. A parameter sl-SelectionWindowList may indicate the end of a selection window in a resource selection procedure for a TB with respect to a priority indicated in SCI. Value n1 may correspond to $1*2\mu$, value n5 corresponds to $5*2\mu$, and so on, where $\mu=0, 1, 2, 3$ for subcarrier spacing (SCS) of 15, 30, 60, and 120 kHz respectively. A parameter SL-SelectionWindowConfig (e.g., as described in FIG. 22) may indicate a mapping between a sidelink priority (e.g., sl-Priority) and the end of the selection window (e.g., sl-Selection Window).

Configuration information may further comprise a parameter sl-PreemptionEnable indicating a sidelink pre-emption status (e.g., disabled or enabled) in a resource pool. A priority level p_preemption may be configured, for example, if the sidelink pre-emption is enabled. The sidelink pre-emption may be applicable to all priority levels, for example, if the sidelink pre-emption is enabled, but the ppreemption is not configured.

As described in FIG. 22, configuration information may comprise a parameter sl-TxPercentageList indicating a portion of candidate single-slot PSSCH resources over total resources. A value of p20 may correspond to 20%. A parameter SL-TxPercentageConfig may indicate a mapping between a sidelink priority (e.g., sl-Priority) and a portion of candidate single-slot PSSCH resources over total resources (e.g., sl-TxPercentage).

Figure 23:
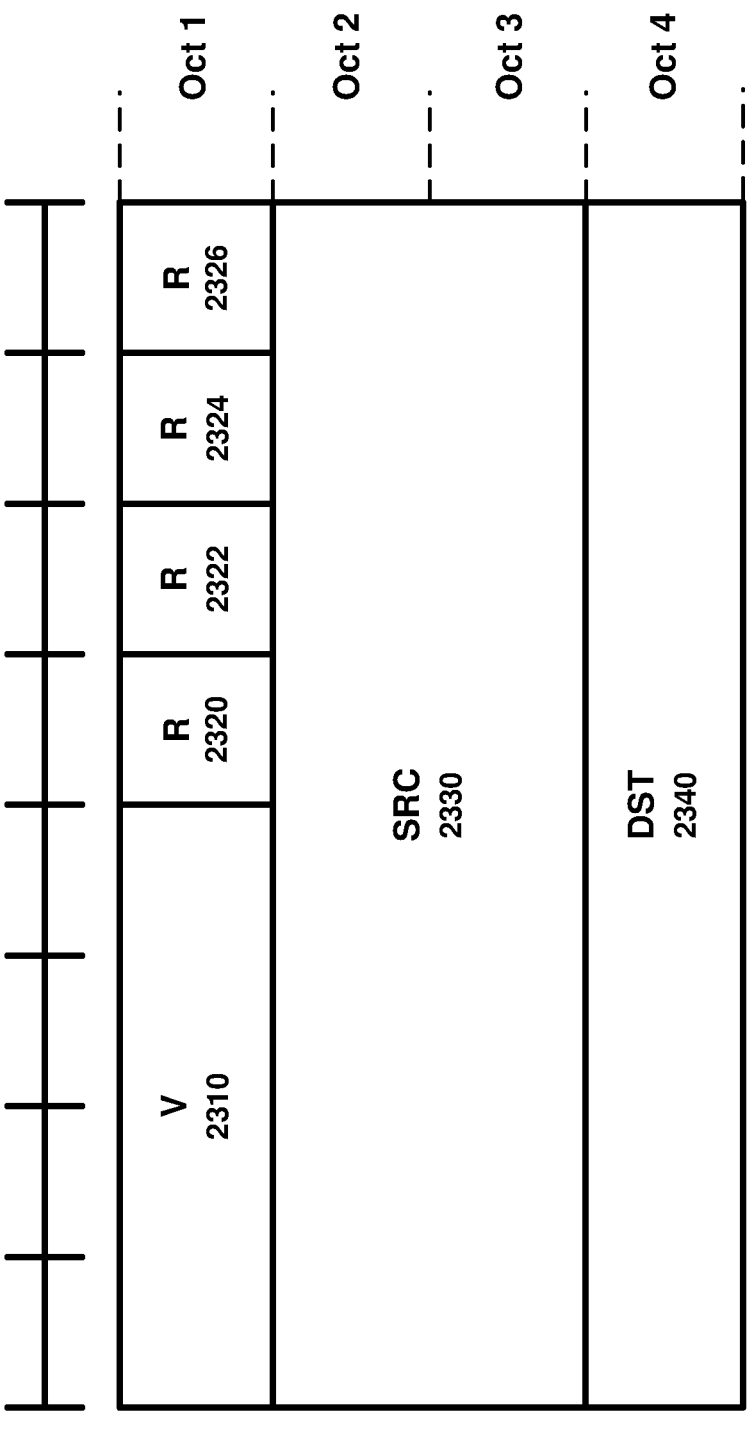
FIG. 23 shows an example format of a MAC subheader for a sidelink shared channel (SL-SCH).

FIG. 23 shows an example format of a MAC subheader for a sidelink shared channel (SL-SCH). The MAC subheader for SL-SCH may comprise seven header fields a version number (V) 2310, reserved bits (R) 2320-2326, a source ID (SRC) 2330, and a destination ID (DST) 2340. The MAC subheader is octet aligned. The V field 2310 may be a MAC protocol data units (PDU) format version number field indicating which version of the SL-SCH subheader may be used. The SRC field 2330 may carry 16 bits of a Source Layer-2 identifier (ID) field set to a first identifier provided by upper layers. The DST field 2340 may carry 8 bits of the Destination Layer-2 ID set to a second identifier provided by upper layers. The second identifier may be a unicast identifier, for example, if the V field 2310 is set to "1." The second identifier may be a groupcast identifier, for example, if the V field 2310 is set to "2." The second identifier may be a broadcast identifier, for example, if the V field 2310 is set to "3."

Figure 24:
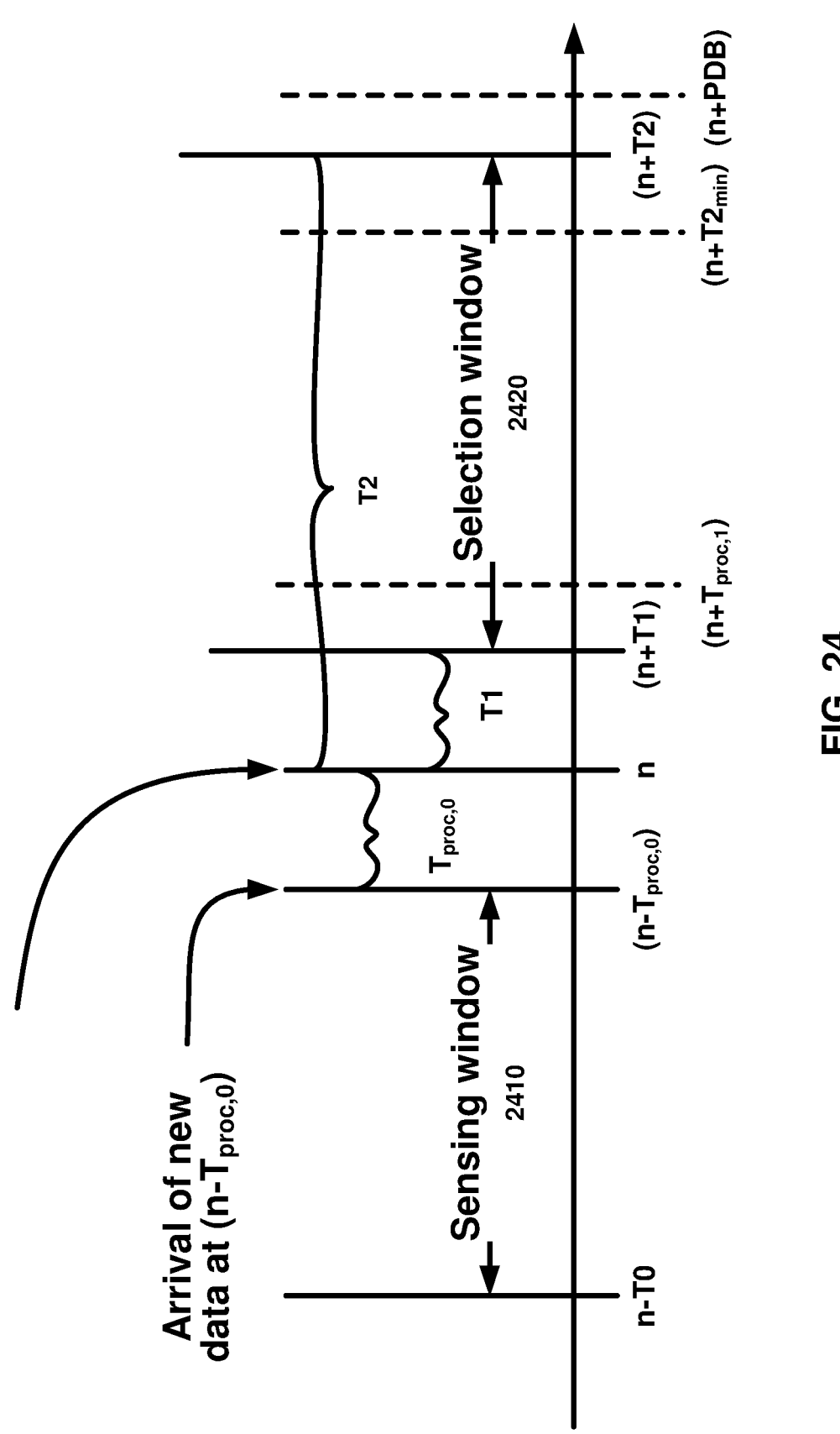
FIG. 24 shows an example timing of a resource selection procedure.

FIG. 24 shows an example timing of a resource selection procedure. A wireless device may perform a resource selection procedure to select resources for one or more sidelink transmissions. A sensing window 2410 of the resource selection procedure may start at a time $(n-T0)$ (e.g., a sl-SensingWindow parameter as described herein in FIG. 21). The sensing window 2410 may end at a time $(n-T_{proc,0})$ New data of the one or more sidelink transmissions may arrive at the wireless device at time $(n-T_{proc,0})$ The time period $T_{proc,0}$ may be a processing delay of the wireless device in determining to trigger a resource selection procedure. The wireless device may determine to trigger the resource selection procedure at a time n to select the resources for the new data that arrived at the time $(n-T_{proc,0})$. The wireless device may complete the resource selection procedure at a time $(n+T1)$. The wireless device may determine the parameter T1 based on a capability of the wireless device. The capability of the wireless device may be a processing delay of a processor of the wireless device. A selection window 2420 of the resource selection procedure may start at time $(n+T1)$. The selection window may end at time $(n+T2)$. The wireless device may determine the parameter T2min based on a parameter T2min (e.g., sl-Selection Window). The wireless device may determine the parameter T2 so that $T2min \leq T2 \leq PDB$, for example, if the PDB (packet delay budget) is the maximum allowable delay (e.g., a delay budget) for successfully sending (e.g., transmitting) new data via the one or more sidelink transmissions. The wireless device may determine the parameter T2min, for example, based on or in response to a corresponding value for a priority of the one or more sidelink transmissions (e.g., based on a parameter SL-SelectionWindowConfig indicating a mapping between a sidelink priority sl-Priority and the end of the selection window sl-Selection Window). A wireless device may set the parameter T2=PDB, for example, if the parameter T2min>PDB.

Figure 25:
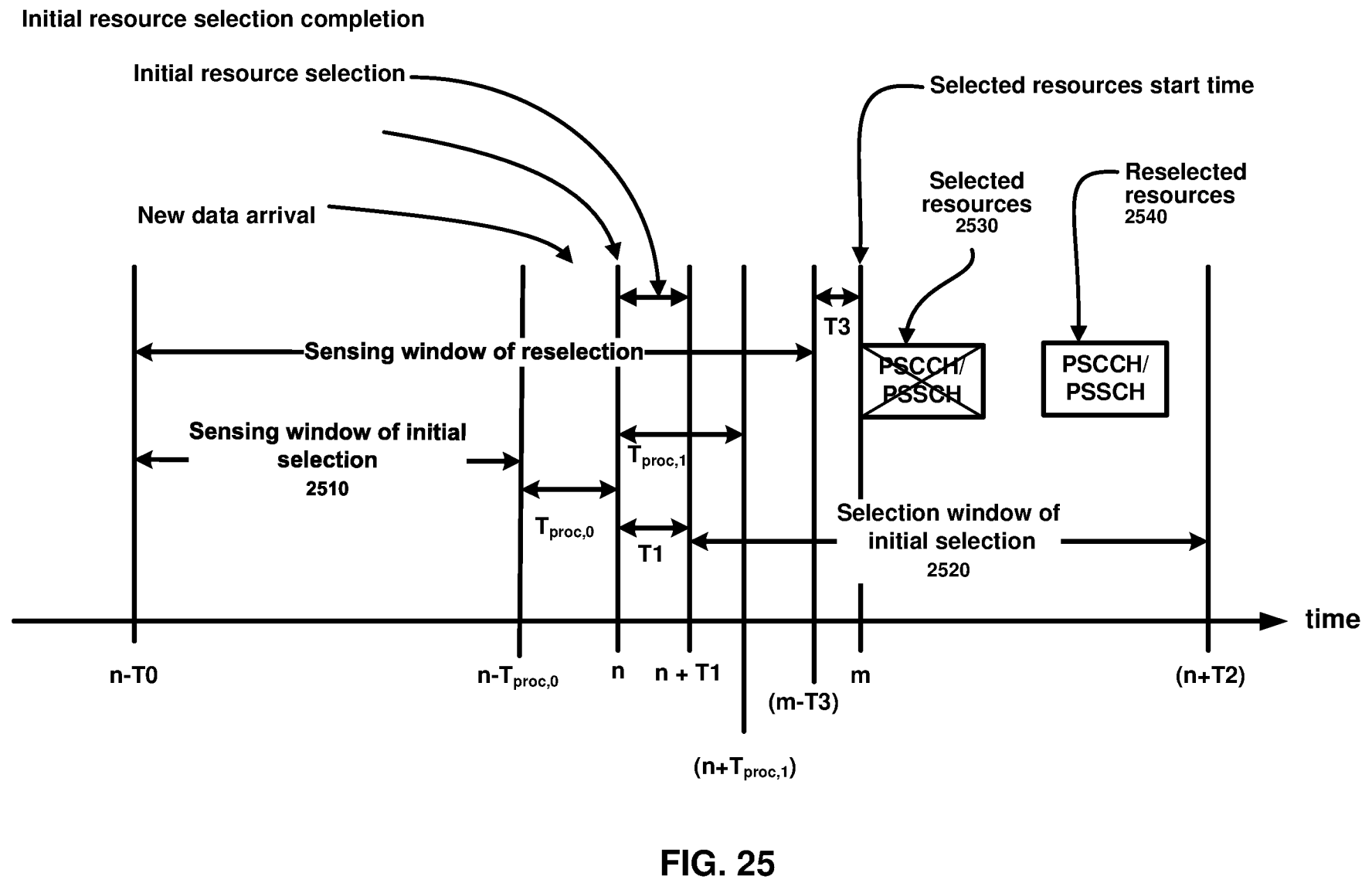

FIG. 25 shows an example timing of a resource selection procedure. A wireless device may perform the resource selection procedure for selecting resources for one or more sidelink transmissions. A sensing window of initial selection 2510 may start at a time $(n-T0)$. The sensing window of initial selection 2510 may end at a time $(n-T_{proc,0})$. New data of the one or more sidelink transmissions may arrive at the wireless device at the time $(n-T_{proc,0})$. The time period $T_{proc,0}$ may be a processing delay for the wireless device to determine to trigger the initial selection of the resources. The wireless device may determine to trigger the initial selection at a time n to select the resources for the new data arrived at the time $(n-T_{proc,0})$. The wireless device may complete the initial resource selection procedure at a time $(n+T1)$, where T1 is the processing delay for completing a resource selection procedure. The time $(n+T_{proc,1})$ may be the maximum allowable processing latency (e.g., $T_{proc,1}$, where $0<T1\leq T_{proc,1}$) for completing the resource selection procedure that was triggered at the time n. A selection window of initial selection 2520 may start at a time $(n+T1)$. The selection window of initial selection 2520 may end at a time $(n+T2)$. The parameter T2 may be configured, preconfigured, and/or determined by the wireless device.

A wireless device may determine first resources (e.g., selected resources) 2530 for one or more sidelink transmissions based on the completion of an initial resource selection procedure at a time $(n+T1)$. The wireless device may select the first resources (e.g., selected resources) 2530 from candidate resources in a selection window of initial selection 2520, for example, based on or in response to measurements in the sensing window for initial selection 2510. The wireless device may determine a resource collision between the first resources (e.g., selected resources) 2530 and other resources reserved by another wireless device. The wireless device may determine to drop first resources (e.g., selected resources) 2530 to avoid interference. The wireless device may trigger a resource reselection procedure (e.g., a second resource selection procedure) at or before a time $(m-T3)$. The time period T3 may be a processing delay for the wireless device to complete the resource reselection procedure (e.g., a second resource selection procedure). The wireless device may determine second resources (e.g., reselected resource) 2540 via the resource reselection procedure (e.g., a second resource selection procedure). The start time of the first resources (e.g., selected resources) 2530 may be the time m (e.g., the first resources may be in slot m).

At least one of time parameters T0, $T_{proc,0}$, $T_{proc,1}$, T2, and/or PDB may be configured by a base station for a wireless device. The at least one of the time parameters T0, $T_{proc,0}$, $T_{proc,1}$, T2, and PDB may be preconfigured for a wireless device. The at least one of the time parameters T0, $T_{proc,0}$, $T_{proc,1}$, T2, and PDB may be stored in a memory of the wireless device. The memory may be a Subscriber Identity Module (SIM) card. The times n, m, T0, T1, $T_{proc,0}$, $T_{proc,1}$, T2, T2min, T3, and PDB, as described herein in FIGS. 24 and 25, may be in terms of slots and/or slot index (e.g., as described herein in FIG. 19).

Figure 26:
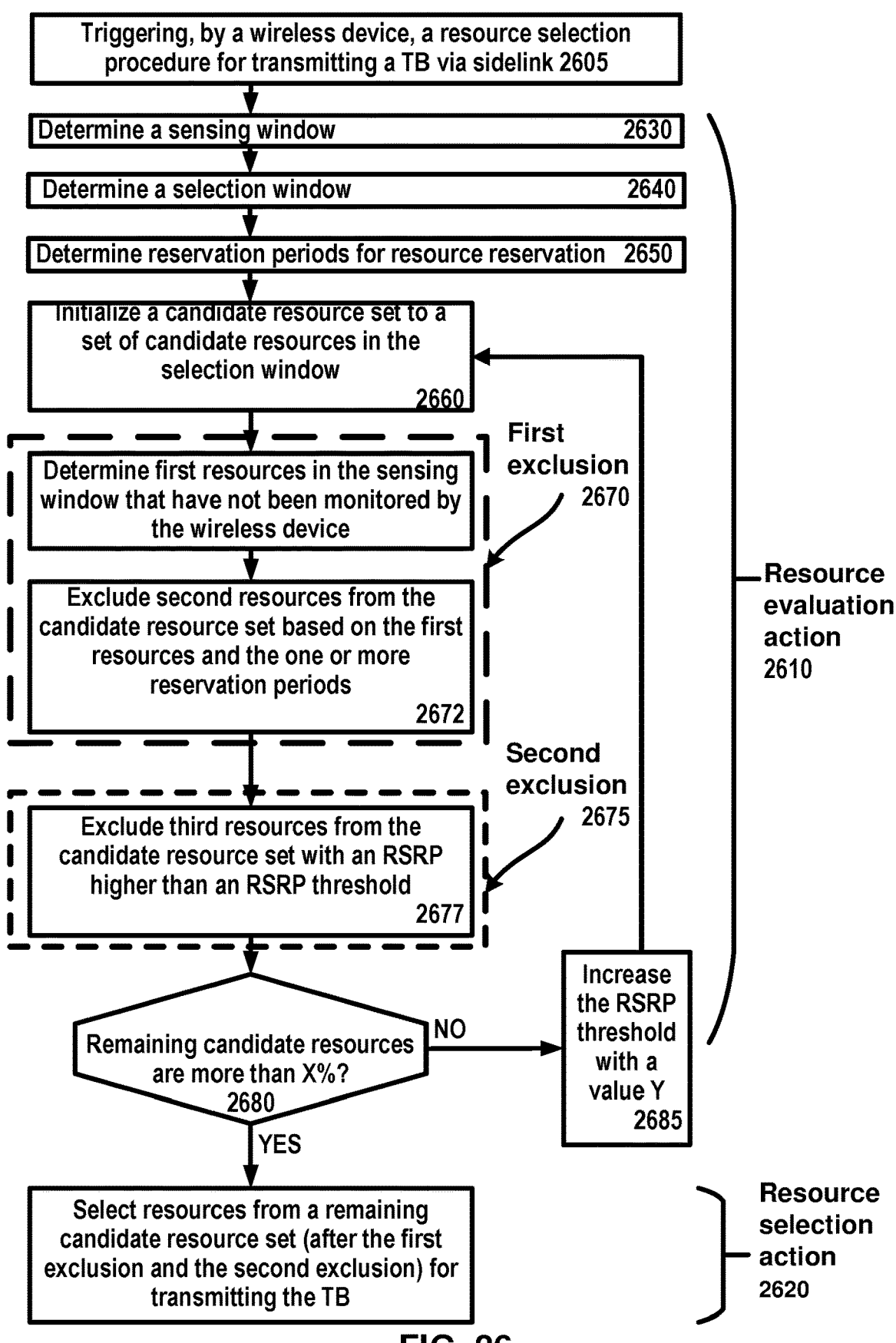
FIG. 26 shows an example flowchart of a resource selection procedure by a wireless device for sending (e.g., transmitting) a TB via sidelink.
Figure 27:
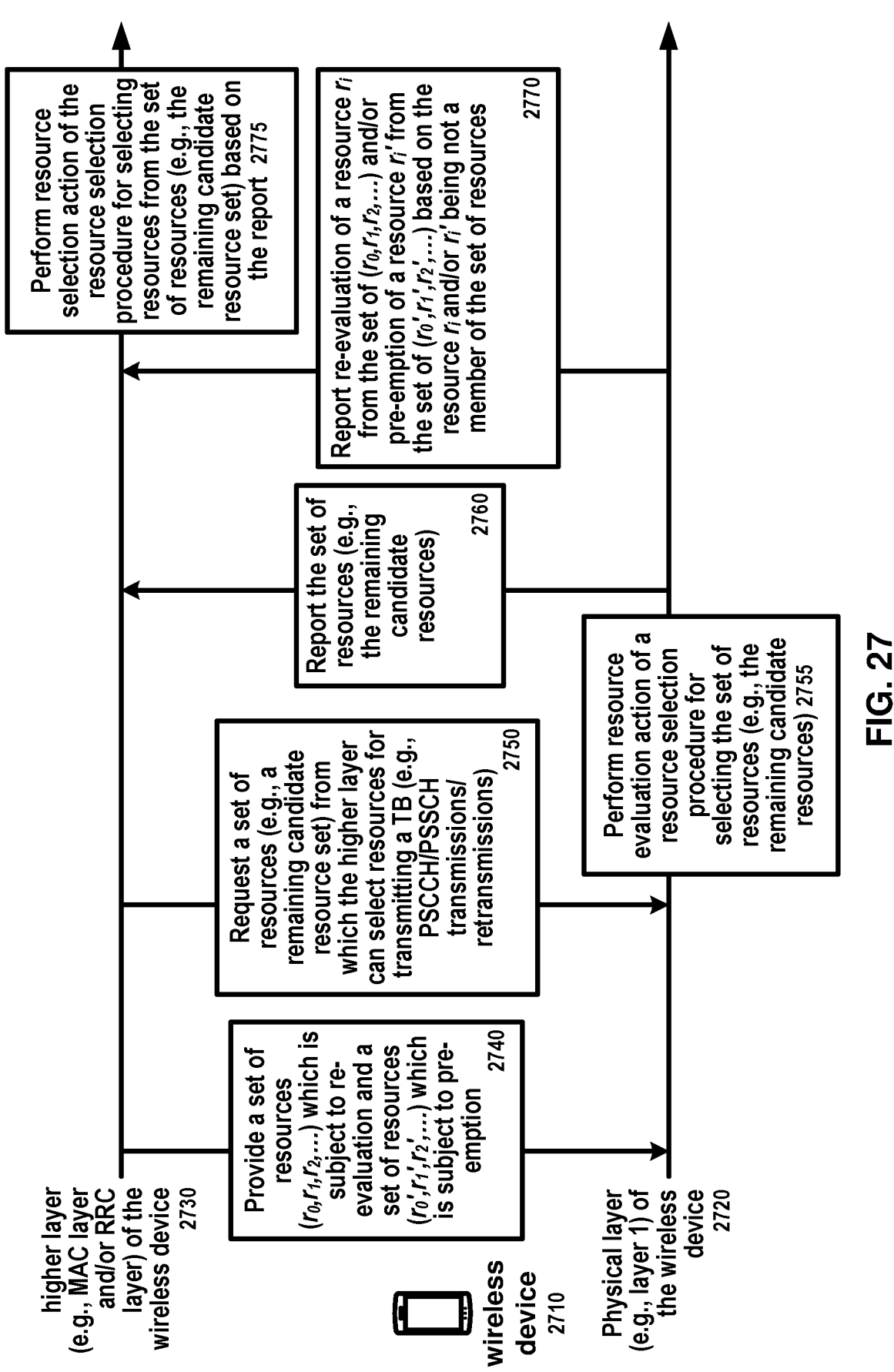
FIG. 27 shows an example diagram of the resource selection procedure among layers of the wireless device.

FIG. 26 shows an example flowchart of a resource selection procedure by a wireless device for sending (e.g., transmitting) a TB (e.g., a data packet) via sidelink. FIG. 27 shows an example diagram of the resource selection procedure among layers of the wireless device.

Referring to FIGS. 26 and 27, a wireless device 2710 may send (e.g., transmit) one or more sidelink transmissions (e.g., a first transmission of the TB and one or more retransmissions of the TB) for sending (e.g., transmitting) the TB. A sidelink transmission of the one or more sidelink transmission may comprise a PSCCH, a PSSCH, and/or a PSFCH (e.g., as described herein in FIG. 19). As described in FIG. 26, the wireless device 2710 may trigger a resource selection procedure for sending (e.g., transmitting) the TB. The resource selection procedure may comprise two actions. The first action of the two actions may be a resource evaluation action 2610. As described in FIG. 27, the physical layer (e.g., layer 1) of the wireless device 2720 may perform the resource evaluation action 2755. The physical layer of the wireless device 2720 may determine a subset of resources based on the first action and report the subset of resources to a higher layer (e.g., a MAC layer and/or a RRC layer) of the wireless device 2730. As described in FIG. 26, the second action of the two actions may be a resource selection action 2620. The higher layer (e.g., the MAC layer and/or the RRC layer) of the wireless device 2730 may perform the resource selection action 2620 based on the reported subset of resources from the physical layer (e.g., layer 1) of the wireless device 2720.

A wireless device/higher layer (e.g., a MAC layer and/or a RRC layer) of a wireless device 2730 may trigger a resource selection procedure (e.g., at step 2605) for requesting the wireless device 2710 to determine a subset of resources. The wireless device/higher layer (e.g., the MAC layer and/or the RRC layer) of the wireless device 2730 may select resources from the subset of resources for a PSSCH and/or a PSCCH transmission. The wireless device/higher layer (e.g., the MAC layer and/or the RRC layer) of the wireless device 2730 may provide the following parameters for the PSSCH and/or the PSCCH transmission to trigger the resource selection procedure (e.g., in slot n):

a resource pool, from which the wireless device may determine the subset of resources;

layer 1 priority, $prio_{TX}$ (e.g., sl-Priority as described herein in FIGS. 21 and 22), of the PSSCH and/or the PSCCH transmission;

remaining packet delay budget (PDB) of the PSSCH and/or the PSCCH transmission;

a number of sub-channels, $L_{subCH}$, for the PSSCH and/or the PSCCH transmission in a slot; and/or a resource reservation period (interval, etc.), $P_{rsvp\_TX}$, in units of millisecond (ms).

A wireless device/higher layer (e.g., a MAC layer and/or a RRC layer) of the wireless device 2730 may provide sets of resources (e.g., a set $(r_0, r_1, r_2, \ldots)$), which may be subject to a re-evaluation, and/or a set $$(r'_0, r'_1, r'_2, \ldots),$$

which may be subject to a pre-emption) 2740, for example, if the wireless device/higher layer (e.g., the MAC layer and/or the RRC layer) of the wireless device 2730 requests the wireless 2710 device to determine a subset of resources from which the higher layer will select the resources for PSSCH and/or PSCCH transmissions for re-evaluation and/or pre-emption 2750.

A base station (e.g., network) may send (e.g., transmit) a message comprising one or more parameters to a wireless device for performing a resource selection procedure. The message may be an RRC/SIB message, a MAC CE, and/or DCI. A second wireless device may send (e.g., transmit) a message comprising one or more parameters to the wireless device for performing the resource selection procedure. The message may be an RRC message, a MAC CE, and/or SCI. The one or more parameters may indicate the following information.

sl-SelectionWindowList (e.g., sl-Selection Window as described herein in FIGS. 21 and 22): an internal parameter T2min (e.g., T2min as described herein in FIG. 24) may be set to a corresponding value from the parameter sl-SelectionWindowList for a given value of $prio_{TX}$ (e.g., based on SL-SelectionWindowConfig as described herein in FIGS. 21 and 22).

sl-ThresPSSCH-RSRP-List (e.g., sl-ThresPSSCH-RSRP-List as described herein in FIGS. 21 and 22): a parameter may indicate an RSRP threshold for each combination $(p_i, p_j)$, where $p_i$ is a value of a priority field in a received SCI format 1-A and $p_j$ is a priority of a sidelink transmission (e.g., the PSSCH and/or the PSCCH transmission) of the wireless device. In a resource selection procedure, $p_j$ may be defined as $p_j=prio_{TX}$.

sl-RS-ForSensing (e.g., sl-RS-ForSensing as described herein in FIGS. 21 and 22): a parameter may indicate whether DMRS of a PSCCH and/or a PSSCH is used for layer 1 (e.g., physical layer) RSRP measurement in sensing operation by the wireless device.

sl-ResourceReservePeriodList (e.g., sl-ResourceReservePeriodList as described herein in FIGS. 21 and 22)

sl-SensingWindow (e.g., sl-SensingWindow as described herein in FIGS. 21 and 22): an internal parameter $T_0$ may be defined as a number of slots corresponding to t0_SensingWindow ms.

sl-TxPercentageList (e.g., based on SL-TxPercentageConfig as described herein in FIGS. 21 and 22): an internal parameter X (e.g., sl-TxPercentage as described herein in FIGS. 21 and 22) for a given $prio_{TX}$ (e.g., sl-Priority as described herein in FIGS. 21 and 22) may be defined as sl-xPercentage($prio_{TX}$) converted from percentage to ratio.

sl-PreemptionEnable (e.g., p_preemption as described herein in FIGS. 21 and 22): an internal parameter $prio_{pre}$ may be set to a higher layer provided parameter sl-PreemptionEnable.

A resource reservation period (interval, etc.), $P_{rsvp\_TX}$ may be converted from units of ms to units of logical slots, resulting in $P_{rsvp\_TX}'$, for example, if the resource reservation period (interval, etc.) is provided.

A notation:

$$(t_0^{SL}, t_1^{SL}, t_2^{SL}, \ldots)$$

may denote a set of slots of a sidelink resource pool.

For a resource evaluation action 2610 described in FIG. 26, a wireless device may determine a sensing window 2630 (e.g., a sensing window as described herein in FIGS. 24 and 25 based on sl-Sensing Window), for example, based on or in response to a triggering of a resource selection procedure.

The wireless device may determine a selection window 2640 (e.g., a selection window as described herein in FIGS. 24 and 25 based on sl-SelectionWindowList), for example, based on or in response to the triggering of the resource selection procedure. The wireless device may determine one or more reservation periods (intervals, etc.) 2650 (e.g., parameter sl-ResourceReservePeriodList) for resource reservation. A candidate single-slot resource for transmission $R_{x,y}$ may be defined as a set of $L_{subCH}$ contiguous sub-channels with sub-channel x+j in slot $$t_y^{SL}$$

where j=0, . . . , $L_{subCH}$−1. The wireless device may assume that a set of $L_{subCH}$ contiguous sub-channels in the resource pool within a time interval [n+$T_1$, n+$T_2$] correspond to one candidate single-slot resource (e.g., as described herein in FIGS. 24 and 25). A total number of candidate single-slot resources may be denoted by $M_{total}$. A sensing window may be defined as a number of slots in a time duration of [n−$T_0$, n−$T_{proc,0}$] (e.g., as described herein in FIGS. 24 and 25). The wireless device may monitor a first subset of the slots, of a sidelink resource pool, within the sensing window. The wireless device may not monitor a second subset of the slots different than the first subset of the slots due to half duplex. The wireless device may perform the following actions based on PSCCH decoded and RSRP measured in the first subset of the slots. An internal parameter Th($p_i$, $p_j$) may be set to the corresponding value of the RSRP threshold indicated by the i-th field in sl-ThresPSSCH-RSRP-List, where i=$p_i$+($p_j$−1)*8.

For a resource evaluation action 2610, as described in FIG. 26, a wireless device 2710 (e.g., as described herein in FIG. 27) may initialize a candidate resource set 2660 (e.g., a set $S_A$) to be a set of candidate resources. The candidate resource set may be a union of candidate resources within a selection window. A candidate resource may be a candidate single-subframe resource. A candidate resource may be a candidate single-slot resource. the set $S_A$ may be initialized to a set of all candidate single-slot resources.

For a resource evaluation action 2610 (e.g., as described herein in FIG. 26), a wireless device 2710 (e.g., as described herein in FIG. 27) may perform a first exclusion 2670 for excluding second resources from the candidate resource set based on first resources and one or more reservation periods (intervals) 2672. The wireless device 2710 may not monitor the first resources within a sensing window. The one or more reservation periods (intervals, etc.) may be configured and/ or associated with a resource pool of the second resources. The wireless device 2710 may determine the second resources within a selection window which may be reserved by a transmission sent (e.g., transmitted) via the first resources based on the one or more reservation periods (intervals, etc.). The wireless device 2710 may exclude a candidate single-slot resource $R_{x,y}$ from the set $S_A$ based on following conditions:

the wireless device has not monitored slot $$t_m^{SL}$$

in the sensing window.

for any periodicity value allowed by the parameter sl-ResourceReservePeriodList and a hypothetical SCI format 1-A received in the slot $$t_m^{SL}$$

with "Resource reservation period" field set to that periodicity value and indicating all subchannels of the resource pool in this slot, condition c of a second exclusion would be met.

For a resource evaluation action 2610 (e.g., as described herein in FIG. 26), a wireless device may perform a second exclusion 2675 for excluding third resources from the candidate resource set. SCI may indicate a resource reservation of the third resources. The SCI may further indicate a priority value (e.g., indicated by a higher layer parameter sl-Priority). The wireless device may exclude the third resources from the candidate resource set based on a reference signal received power (RSRP) of the third resources satisfying (e.g., above, higher than, greater than, etc.) an RSRP threshold 2677 (e.g., indicated by a higher layer parameter sl-ThresPSSCH-RSRP-List). The RSRP threshold may be related to the priority value based on a mapping list of RSRP thresholds to priority values configured and/or pre-configured for the wireless device. A base station may send (e.g., transmit) a message to a wireless device to configure a mapping list. The message may be a radio resource control (RRC) message. The mapping list may be pre-configured for the wireless device. The mapping list may be stored in memory of the wireless device. A priority indicated by a priority value may be a layer 1 priority (e.g., a physical layer priority). The priority value (e.g., the layer 1 priority) may be associated with a respective priority level. A higher (larger, bigger, etc.) priority value may indicate a higher priority of a sidelink transmission, and/or a lower (smaller, etc.) priority value may indicate a lower priority of the sidelink transmission. A higher (larger, bigger, etc.) priority value may indicate a lower priority of the sidelink transmission, and/or A lower (smaller, etc.) priority value may indicate a higher priority of the sidelink transmission. A wireless device may exclude a candidate single-slot resource $R_{x,y}$ from a set $S_A$ based on following conditions:

a) the wireless device receives SCI format 1-A in slot $$t_m^{SL},$$

and "Resource reservation period" field, if present, and "Priority" field in the received SCI format 1-A indicate the values $P_{rsvp\_RX}$ and $prio_{RX}$;

b) the RSRP measurement performed, for the received SCI format 1-A, is higher than Th($prio_{RX}$,$prio_{TX}$);

c) the SCI format received in slot $$t_m^{SL}$$

or the same SCI format which, if and only if the "Resource reservation period" field is present in the received SCI format 1-A, is assumed to be received in slot(s)

$$t_{m+q \times P'_{rsvp\_RX}}^{SL}$$

61                                      62 determines the set of resource blocks and slots which overlaps with $R_{x,y+j \times P_{rsvp\_TX}}$ for q=1, 2, . . . , Q and j=0, 1, . . . , $C_{resel}-1$. Here, $P_{rsvp\_RX}'$ is $P_{rsvp\_RX}$ converted to units of logical slots, $$Q = \left\lceil \frac{T_{scal}}{P_{rsvp\_RX}} \right\rceil \text{ if } P_{rsvp\_RX} < T_{scal} \text{ and } n' - m \le P_{rsvp\_RX}',$$

where $t_{n'}^{SL} = n$ if slot n belongs to the set $$(t_0^{SL}, t_1^{SL}, \dots , t_{T_{max}}^{SL}),$$

otherwise slot $$t_{n'}^{SL}$$

is the first slot after slot n belonging to the set $$(t_0^{SL}, t_1^{SL}, \dots , t_{T_{max}}^{SL});$$

otherwise Q=1. $T_{scal}$ is set to selection window size T2 converted to units of ms.

As described in FIGS. 26 and 27, in a resource evaluation action 2610, a wireless device 2710 may determine whether remaining candidate resources in a candidate resource set are sufficient for selecting resources for one or more sidelink transmissions of the TB, for example, after performing the first exclusion, the second exclusion, and/or based on or in response to a condition. The condition may be the total amount of the remaining candidate resources in the candidate resource set satisfying (e.g., above, higher than, greater than, more than, higher than or equal to, greater than or equal to, more than or equal to, larger than or equal to, etc.) X percent (e.g., as indicated by a higher layer parameter sl-TxPercentageList) of the candidate resources in the candidate resource set before performing the first exclusion and/or the second exclusion 2680. The wireless device 2710 may increase the RSRP threshold used to exclude the third resources with a value Y and iteratively re-perform the initialization, the first exclusion, and/or the second exclusion 2685, for example, until the condition is met (e.g., the number of remaining candidate single-slot resources in the set $S_A$ satisfies is X·$M_{total}$). The wireless device 2710 may report the set $S_A$ (e.g., the remaining candidate resources of the candidate resource set) 2760 to the higher layer (e.g., MAC layer and/or RRC layer) of the wireless device 2730. The wireless device 2710 may report the set $S_A$ (e.g., the remaining candidate resources of the candidate resource set when the condition is met) 2760 to the higher layer (e.g., MAC layer and/or RRC layer) of the wireless device 2730, for example, based on or in response to the number of remaining candidate single-slot resources in the set $S_A$ being equal to or satisfying (e.g., above, higher than, greater than, more, etc.) X·$M_{total}$.

As described in FIGS. 26 and 27, in a resource selection action 2620 the higher layer (e.g., MAC layer and/or RRC layer) of a wireless device 2710 may select fourth resources from the remaining candidate resources of the candidate resource set 2775 (e.g., a set $S_A$ reported by the physical layer (e.g., layer 1) of the wireless device 2720) for the one or more sidelink transmissions of the TB. The wireless device 2710 may randomly select the fourth resources from the remaining candidate resources of the candidate resource set.

As described in FIG. 27, a wireless device 2710 may report a re-evaluation of a resource $r_i$ 2770 to a higher layer (e.g., MAC layer and/or RRC layer) of the wireless device 2730, for example, if the resource $r_i$ from a set ($r_0$, $r_1$, $r_2$, . . . ) is not a member of $S_A$ (e.g., the remaining candidate resources of the candidate resource set when the condition is met).

A wireless device 2710 may report a pre-emption of a resource $$r_i'$$

2770 to a higher layers (e.g., MAC layer and/or RRC layer) of the wireless device 2730, for example, if the resource $$r_i'$$

from the set $$(r_0', r_1', r_2', \dots )$$

meets the conditions below:

$$r_i'$$

is not a member of $S_A$, and $$r_i'$$

meets the conditions for the second exclusion, with Th(prio$_{RX}$,prio$_{TX}$) set to a final threshold for reaching X·$M_{total}$, and
    the associated priority prio$_{RX}$, satisfies one of the following conditions:
        sl-PreemptionEnable is provided and is equal to 'enabled' and prio$_{TX}$>prio$_{RX}$
        sl-PreemptionEnable is provided and is not equal to 'enabled', and prio$_{RX}$<prio$_{pre}$ and prio$_{TX}$>prio$_{RX}$ A higher layer (e.g., MAC layer and/or RRC layer) of a wireless device 2730 may remove a resource $r_i$ from a set ($r_0$, $r_1$, $r_2$, . . . ), for example, if the resource $r_i$ is indicated for re-evaluation by the wireless device 2710 (e.g., the physical layer of the wireless device 2720). The higher layer of the wireless device 2730 may remove a resource $$r_i'$$

from a set $$(r'_0, r'_1, r'_2, \ldots),$$

for example, if the resource $$r'_i$$

is indicated for pre-emption by the wireless device 2710 (e.g., the physical layer of the wireless device 2720). The higher layer of the wireless device 2730 may randomly select new time and frequency resources from the remaining candidate resources of the candidate resource set (e.g., the set $S_A$ reported by the physical layer) for the removed resources $r_i$ and/or $$r'_i.$$

The higher layer of the wireless device 2730 may replace the removed resources $r_i$ and/or $$r'_i$$

by the new time and frequency resources. The wireless device 2710 may remove the resources $r_i$ and/or $$r'_i$$

from the set $(r_0, r_1, r_2, \ldots)$ and/or the set $$(r'_0, r'_1, r'_2, \ldots)$$

and add the new time and frequency resources to the set $(r_0, r_1, r_2, \ldots)$ and/or the set $$(r'_0, r'_1, r'_2, \ldots)$$

based on the removing of the resources $r_i$ and/or $$r'_i.$$

Sidelink pre-emption may happen between a first wireless device and a second wireless device. The first wireless device may select first resources for a first sidelink transmission. The first sidelink transmission may have a first priority. The second wireless device may select second resources for a second sidelink transmission. The second sidelink transmission may have a second priority. The first resources may partially or fully overlap with the second resources. The first wireless device may determine a resource collision between the first resources and the second resources, for example, based on or in response to the first resources and the second resources being partially or fully overlapped. The resource collision may imply a partial and/or a full overlap between the first resources and the second resources in time, frequency, code, power, and/or spatial domain. The first resources may comprise one or more first sidelink resource units in a sidelink resource pool (e.g., as described herein in FIG. 18). The second resources may comprise one or more second sidelink resource units in the sidelink resource pool. A partial resource collision between the first resources and the second resources may indicate that the at least one sidelink resource unit of the one or more first sidelink resource units belongs to the one or more second sidelink resource units. A full resource collision between the first resources and the second resources may indicate that the one or more first sidelink resource units may be the same as, or a subset of, the one or more second sidelink resource units. A higher (bigger, larger, greater, etc.) priority value may indicate a lower (smaller, less, etc.) priority of a sidelink transmission. A lower (smaller, less, etc.) priority value may indicate a higher (bigger, larger, greater, etc.) priority of the sidelink transmission. The first wireless device may determine the sidelink pre-emption based on the resource collision and the second priority being higher than (greater than, bigger, etc.) the first priority. The first wireless device may determine the sidelink pre-emption, for example, based on or in response to the resource collision and a value of the second priority not satisfying (e.g., being smaller than, less than, lower than, etc.) a value of the first priority. A first wireless device may determine a sidelink pre-emption, for example, based on or in response to a resource collision, a value of the second priority not satisfying (e.g., being smaller than, lower than, less than, etc.) a priority threshold, and/or the value of the second priority being less (smaller, lower, etc.) than a value of the first priority.

A first wireless device may trigger a first resource selection procedure for selecting first resources (e.g., selected resources 2530 after a resource selection with collision as described herein in FIG. 25) for a first sidelink transmission. A second wireless device may send (e.g., transmit) SCI indicating resource reservation of the first resource for a second sidelink transmission. The first wireless device may determine a resource collision of the first resources between the first sidelink transmission and the second sidelink transmission. The first wireless device may trigger a resource re-evaluation (e.g., a resource evaluation action of a second resource selection procedure) at or before time (m−T3) (e.g., as described herein in FIG. 25) based on the resource collision. The first wireless device may trigger a resource reselection (e.g., a resource selection action of the second resource selection procedure) for selecting second resources (e.g., reselected resources 2540 after resource reselection as described herein in FIG. 25) based on the resource re-evaluation. The start time of the second resources may be time m (e.g., as described herein in FIG. 25).

A wireless device may receive one or more messages (e.g., RRC messages and/or SIB messages) comprising configuration parameters of a sidelink BWP. The configuration parameters may comprise a first parameter (e.g., sl-StartSymbol) indicating a sidelink starting symbol. The first parameter may indicate a starting symbol (e.g., symbol #0, symbol #1, symbol #2, symbol #3, symbol #4, symbol #5, symbol #6, symbol #7, etc.) used for sidelink in a slot. For example, the slot may not comprise a SL-SSB (S-SSB). The wireless device may be (pre-)configured with one or more values of the sidelink starting symbol per sidelink BWP. The configuration parameters may comprise a second parameter (e.g., sl-LengthSymbols) indicating number of symbols (e.g., 7 symbols, 8 symbols, 9 symbols, 10 symbols, 11 symbols, 12 symbols, 13 symbols, 14 symbols, etc.) used sidelink in a slot. The wireless device may be (pre-)configured with one or more values of the sidelink number of symbols and/or symbol length per sidelink BWP.

The configuration parameters of the sidelink BWP may indicate one or more sidelink resource pools of the sidelink BWP (e.g., via SL-BWP-PoolConfig and/or SL-BWP-Pool-ConfigCommon). For example, a resource pool may be a sidelink receiving resource pool (e.g., indicated by sl-Rx-Pool) on the configured sidelink BWP. For example, the sidelink receiving resource pool may be used for PSFCH transmission/reception, if configured. For example, a resource pool may be a sidelink transmission resource pool (e.g., indicated by sl-TxPool, and/or sl-ResourcePool) on the configured sidelink BWP. For example, the sidelink transmission resource pool may comprise resources by which the wireless device may be allowed to transmit NR sidelink communication (e.g., in exceptional conditions and/or based on network scheduling) on the configured BWP. For example, the sidelink transmission resource pool may be used for PSFCH transmission/reception, if configured.

Configuration parameters of a resource pool may indicate a size of a sub-channel of the resource pool (e.g., via sl-SubchannelSize) in unit of PRB. For example, the sub-channel size may indicate a minimum granularity in frequency domain for sensing and/or for PSSCH resource selection. Configuration parameters of a resource pool may indicate a lowest/starting RB index of a sub-channel with a lowest index in the resource pool with respect to lowest RB index RB index of the sidelink BWP (e.g., via sl-StartRB-Subchannel). Configuration parameters of a resource pool may indicate a number of sub-channels in the corresponding resource pool (e.g., via sl-NumSubchannel). For example, the sub-channels and/or the resource pool may consist of contiguous PRBs. Configuration parameters of a resource pool may indicate configuration of one or more sidelink channels on/in the resource pool. For example, the configuration parameters may indicate that the resource pool may be configured with PSSCH, PSCCH, and/or PSFCH.

Configuration parameters of PSCCH may indicate a time resource for a PSCCH transmission in a slot. Configuration parameters of PSCCH (e.g., SL-PSCCH-Config) may indicate a number of symbols of PSCCH (e.g., 2 or 3) in the resource pool (e.g., via sl-TimeResourcePSCCH). Configuration parameters of PSCCH (e.g., SL-PSCCH-Config) may indicate a frequency resource for a PSCCH transmission in a corresponding resource pool (e.g., via sl-FreqResourceP-SCCH). For example, the configuration parameters may indicate a number of PRBs for PSCCH in a resource pool, which may not be greater than a number of PRBs of a sub-channel of the resource pool (sub-channel size). Configuration parameters of PSSCH may indicate one or more DMRS time domain patterns (e.g., PSSCH DMRS symbols in a slot) for the PSSCH that may be used in the resource pool.

A resource pool may or may not be configured with PSFCH. Configuration parameters of PSFCH may indicate a period for the PSFCH in unit/number of slots within the resource pool (e.g., via sl-PSFCH-Period). For example, a value 0 of the period may indicate that no resource for PSFCH is configured in the resource pool and/or HARQ feedback for (all) transmissions in the resource pool is disabled. For example, the period may be 1 slot or 2 slots or 4 slots, etc. Configuration parameters of PSFCH may indicate a set of PRBs that may be used for PSFCH transmission and reception (e.g., via sl-PSFCH-RB-Set). For example, a bitmap may indicate the set of PRBs, wherein a leftmost bit of the bitmap may refer to a lowest RB index in the resource pool, and so on. Configuration parameters of PSFCH may indicate a minimum time gap between PSFCH and the associated PSSCH in unit of slots (e.g., via sl-MinTimeGapPSFCH). Configuration parameters of PSFCH may indicate a number of PSFCH resources available for multiplexing HARQ-ACK information in a PSFCH transmission (e.g., via sl-PSFCH-CandidateResourceType).

A wireless device may be configured by higher layers (e.g., by RRC configuration parameters) with one or more sidelink resource pools. A sidelink resource pool may be for transmission of PSSCH and/or for reception of PSSCH. A sidelink resource pool may be associated with sidelink resource allocation mode 1 and/or sidelink resource allocation mode 2. In the frequency domain, a sidelink resource pool consists of one or more (e.g., sl-NumSubchannel) contiguous sub-channels. A sub-channel consists of one or more (e.g., sl-SubchannelSize) contiguous PRBs. For example, higher layer parameters (e.g., RRC configuration parameters) may indicate a number of sub-channels in a sidelink resource pool (e.g., sl-NumSubchannel) and/or a number of PRBs per sub-channel (e.g., sl-SubchannelSize).

A set of slots may belong to a sidelink resource pool. The set of slots may be denoted by $$\left( t_0^{SL}, t_1^{SL}, \ldots, t_{T_{max}-1}^{SL} \right),$$

$$\text{where } 0 \le t_i^{SL} < 10240 \times 2^{\mu}, 0 \le i < T_{max}.$$

The slot index may be relative to slot #0 of the radio frame corresponding to SFN 0 of the serving cell or DFN 0. The set includes all the slots except $N_{S\_SSB}$ slots in which S-SS/PSBCH block (S-SSB) may be configured. The set includes all the slots except $N_{nonSL}$ slots in each of which at least one of Y-th, (Y+1)-th, (Y+X−1)-th OFDM symbols may not be semi-statically configured as UL as per the higher layer parameter (e.g., tdd-UL-DL-Configuration-Common-r16 of the serving cell, sl-TDD-Configuration-r16, and/or sl-TDD-Config-r16 of the received PSBCH). For example, a higher layer (e.g., MAC and/or RRC) parameter may indicate a value of Y as the sidelink starting symbol of a slot (e.g., sl-StartSymbol). A higher layer (e.g., MAC and/or RRC) parameter may indicate a value of X as the number of sidelink symbols in a slot (e.g., sl-LengthSymbols). The set includes all the slots except one or more reserved slots. The slots in the set may be arranged in increasing order of slot index. The wireless device may determine the set of slots assigned to a sidelink resource pool based on a bitmap $(b_0, b_1, \ldots, b_{L_{bitmap}-1})$ associated with the resource pool, where the length of the bitmap $L_{bitmap}$ may be configured by higher layers. A slot $$t_k^{SL} \left( 0 \le k < 10240 \times 2^{\mu} - N_{S_{SSB}} - N_{nonSL} - N_{reserved} \right)$$

may belong to the set of slots, if $b_{k'} = 1$ where k'=k mod $L_{bitmap}$. The slots in the set may be re-indexed such that the subscripts i of the remaining slots $$t_i'^{SL}$$

US 12,689,994 B2

67 are successive $\{0, 1, \ldots, T'_{max}-1\}$ where $T'_{max}$ is the number of the slots remaining in the set.

The wireless device may determine the set of resource blocks assigned to a sidelink resource pool, wherein the resource pool consists of $N_{PRB}$ PRBs. The sub-channel m for m=0, 1, . . . , numSubchannel−1 may consist of a set of $n_{subCHsize}$ contiguous resource blocks with the physical resource block number $n_{PRB}=n_{subCHRBstart}+m \cdot n_{subCHsize}+j$ for j=0, 1, . . . , $n_{subCHsize}-1$, where $n_{subCHRBstart}$ and $n_{subCHsize}$ may be given by higher layer parameters sl-StartRB-Subchannel and sl-SubchannelSize, respectively. A wireless device may not be expected to use the last $N_{PRB}$ mod $n_{subCHsize}$ PRBs in the resource pool.

A wireless device may be provided/configured with a number of symbols in a resource pool for PSCCH (e.g., by sl-TimeResourcePSCCH). The PSCCH symbols may start from a second symbol that may be available for sidelink transmissions in a slot. The wireless device may be provided/configured with a number of PRBs in the resource pool for PSCCH (e.g., by sl-FreqResourcePSCCH). The PSCCH PRBs may start from the lowest PRB of the lowest sub-channel of the associated PSSCH, for example, for a PSCCH transmission with a SCI format 1-A. PSCCH resource/symbols may be configured in every slot of the resource pool. PSCCH resource/symbols may be configured in a subset of slot of the resource pool (e.g., based on a period comprising two or more slots).

Each PSSCH transmission may be associated with an PSCCH transmission. The PSCCH transmission may carry the $1^{st}$ stage of the SCI associated with the PSSCH transmission. The $2^{nd}$ stage of the associated SCI may be carried within the resource of the PSSCH. The wireless device sends (e.g., transmits) a first SCI (e.g., $1^{st}$ stage SCI, SCI format 1-A) on PSCCH according to a PSCCH resource configuration in slot n and PSCCH resource m. For the associated PSSCH transmission in the same slot, the wireless device may send (e.g., transmit) one transport block (TB) with up to two layers (e.g., one layer or two layers). The number of layers (u) may be determined according to the 'Number of DMRS port' field in the SCI. The wireless device may determine the set of consecutive symbols within the slot for transmission of the PSSCH. The wireless device may determine the set of contiguous resource blocks for transmission of the PSSCH. Transform precoding may not be supported for PSSCH transmission. For example, wideband precoding may be supported for PSSCH transmission.

The wireless device may set the contents of the second SCI (e.g., $2^{nd}$ stage SCI, SCI format 2-A). The wireless device may set values of the SCI fields comprising the 'HARQ process number' field, the 'NDI' field, the 'Source ID' field, the 'Destination ID' field, the 'HARQ feedback enabled/disabled indicator' field, the 'Cast type indicator' field, and/or the 'CSI request' field, as indicated by higher (e.g., MAC and/or RRC) layers. The wireless device may set the contents of the second SCI (e.g., $2^{nd}$ stage SCI, SCI format 2-B). The wireless device may set values of the SCI fields comprising the 'HARQ process number' field, the 'NDI' field, the 'Source ID' field, the 'Destination ID' field, the 'HARQ feedback enabled/disabled indicator' field, the 'Zone ID' field, and/or the 'Communication range requirement' field, as indicated by higher (e.g., MAC and/or RRC) layers.

One transmission scheme may be defined for the PSSCH and may be used for all PSSCH transmissions. PSSCH transmission may be performed with up to two antenna ports, for example, with antenna ports 1000-1001. In sidelink resource allocation mode 1, for PSSCH and/or PSCCH transmission, dynamic grant, configured grant type 1 and/or configured grant type 2 may be supported. The configured grant Type 2 sidelink transmission may be semi-persistently scheduled by a SL grant in valid activation DCI.

The wireless device may send (e.g., transmit) the PSSCH in the same slot as the associated PSCCH. The (minimum) resource allocation unit in the time domain may be a slot. The wireless device may send (e.g., transmit) the PSSCH in consecutive symbols within the slot. The wireless device may not send (e.g., transmit) PSSCH in symbols which are not configured for sidelink. A symbol may be configured for sidelink, according to higher layer parameters indicating the starting sidelink symbol (e.g., startSLsymbols) and a number of consecutive sidelink symbols (e.g., lengthSLsymbols). For example, startSLsymbols is the symbol index of the first symbol of lengthSLsymbols consecutive symbols configured for sidelink. Within the slot, PSSCH resource allocation may start at symbol startSLsymbols+1 (e.g., second sidelink symbol of the slot). The wireless device may not send (e.g., transmit) PSSCH in symbols which may be configured for use by PSFCH, for example, if PSFCH may be configured in this slot. The wireless device may not send (e.g., transmit) PSSCH in the last symbol configured for sidelink (e.g., last sidelink symbol of the slot). The wireless device may not send (e.g., transmit) PSSCH in the symbol immediately preceding the symbols which may be configured for use by PSFCH, if PSFCH may be configured in this slot. FIG. 19 shows an example of sidelink symbols and the PSSCH resource allocation within the slot.

A Sidelink grant may be received dynamically on the PDCCH, and/or configured semi-persistently by RRC, and/or autonomously selected by the MAC entity of the wireless device. The MAC entity may have a sidelink grant on an active SL BWP to determine a set of PSCCH duration(s) in which transmission of SCI occurs and a set of PSSCH duration(s) in which transmission of SL-SCH associated with the SCI occurs. A sidelink grant addressed to SLCS-RNTI with NDI=1 may be considered as a dynamic sidelink grant. The wireless device may be configured with Sidelink resource allocation mode 1. The wireless device may for each PDCCH occasion and for each grant received for this PDCCH occasion (e.g., for the SL-RNTI or SLCS-RNTI of the wireless device), use the sidelink grant to determine PSCCH duration(s) and/or PSSCH duration(s) for initial transmission and/or one or more retransmission of a MAC PDU for a corresponding sidelink process (e.g., associated with a HARQ buffer and/or a HARQ process ID).

The wireless device may be configured with Sidelink resource allocation mode 2 to send (e.g., transmit) using pool(s) of resources in a carrier, based on sensing and/or random selection. The MAC entity for each Sidelink process may select to create a selected sidelink grant corresponding to transmissions of multiple MAC PDUs, and SL data may be available in a logical channel. The wireless device may select a resource pool, for example, based on a parameter enabling/disabling sidelink HARQ feedback. The wireless device may perform a transmission resource (re-)selection check on the selected pool of resources. The wireless device may select the time and frequency resources for one transmission opportunity from the resources pool and/or from the resources indicated by the physical layer, according to the amount of selected frequency resources and the remaining PDB of SL data available in the logical channel(s) allowed on the carrier. The wireless device may use the selected resource to select a set of periodic resources spaced by the resource reservation interval for transmissions of PSCCH and PSSCH corresponding to the number of transmission opportunities of MAC PDUs. The wireless device may consider the first set of transmission opportunities as the initial transmission opportunities and the other set(s) of transmission opportunities as the retransmission opportunities. The wireless device may consider the sets of initial transmission opportunities and retransmission opportunities as the selected sidelink grant. The wireless device may consider the set as the selected sidelink grant. The wireless device may use the selected sidelink grant to determine the set of PSCCH durations and the set of PSSCH durations.

The wireless device may for each PSSCH duration and/or for each sidelink grant occurring in this PSSCH duration, select a MCS table allowed in the pool of resource which may be associated with the sidelink grant. The wireless device may determine/set the resource reservation interval to a selected value (e.g., 0 or more). The wireless device may set the HARQ Process ID to the HARQ Process ID associated with this PSSCH duration and/or all subsequent PSSCH duration(s) occurring in this period for the configured sidelink grant, for example, if the configured sidelink grant has been activated and this PSSCH duration corresponds to the first PSSCH transmission opportunity within this period of the configured sidelink grant. The wireless device may flush the HARQ buffer of Sidelink process associated with the HARQ Process ID. The wireless device may deliver the sidelink grant, the selected MCS, and the associated HARQ information to the Sidelink HARQ Entity for this PSSCH duration.

The MAC entity may include at most one Sidelink HARQ entity for transmission on SL-SCH, which maintains a number of parallel Sidelink processes. The (maximum) number of sending (e.g., transmitting) Sidelink processes associated with the Sidelink HARQ Entity may be a value (e.g., 16). A sidelink process may be configured for transmissions of multiple MAC PDUs. For transmissions of multiple MAC PDUs with Sidelink resource allocation mode 2, the (maximum) number of sending (e.g., transmitting) Sidelink processes associated with the Sidelink HARQ Entity may be a second value (e.g., 4). A delivered sidelink grant and its associated Sidelink transmission information may be associated with a Sidelink process. Each Sidelink process may support one TB.

For each sidelink grant and for the associated Sidelink process, the Sidelink HARQ Entity may obtain the MAC PDU to send (e.g., transmit) from the Multiplexing and assembly entity, if any. The wireless device may determine Sidelink transmission information of the TB for the source and destination pair of the MAC PDU. The wireless device may set the Source Layer-1 ID to the 8 LSB of the Source Layer-2 ID of the MAC PDU, and set the Destination Layer-1 ID to the 16 LSB of the Destination Layer-2 ID of the MAC PDU. The wireless device may set the following information of the TB: cast type indicator, HARQ feedback enabler/disabler, priority, NDI, RV. The wireless device may deliver the MAC PDU, the sidelink grant and the Sidelink transmission information of the TB to the associated Sidelink process. The MAC entity of the wireless device may instruct the associated Sidelink process to trigger a new transmission and/or a retransmission.

In sidelink resource allocation mode 1, for sidelink dynamic grant, the PSSCH transmission may be scheduled by DCI (e.g., DCI format 3_0). In sidelink resource allocation mode 1, for sidelink configured grant type 2, the configured grant may be activated by DCI (e.g., DCI format 3_0). In sidelink resource allocation mode 1, for sidelink dynamic grant and sidelink configured grant type 2 the "Time gap" field value m of the DCI may provide an index m+1 into a slot offset table (e.g., the table may be configured by higher layer parameter sl-DCI-ToSL-Trans). The table value at index m+1 may be referred to as slot offset $K_{SL}$. The slot of the first sidelink transmission scheduled by the DCI may be the first SL slot of the corresponding resource pool that starts not earlier than $$T_{DL} - \frac{T_{TA}}{2} + K_{SL} \times T_{slot},$$

where $T_{DL}$ is the starting time of the downlink slot carrying the corresponding DCI, $T_{TA}$ is the timing advance value corresponding to the TAG of the serving cell on which the DCI may be received and $K_{SL}$ is the slot offset between the slot of the DCI and the first sidelink transmission scheduled by DCI and $T_{slot}$ is the SL slot duration. The "Configuration index" field of the DCI, if provided and not reserved, may indicate the index of the sidelink configured type 2. In sidelink resource allocation mode 1, for sidelink configured grant type 1, the slot of the first sidelink transmissions may follow the higher layer configuration.

The resource allocation unit in the frequency domain may be the sub-channel. The sub-channel assignment for sidelink transmission may be determined using the "Frequency resource assignment" field in the associated SCI. The lowest sub-channel for sidelink transmission may be the sub-channel on which the lowest PRB of the associated PSCCH may be sent (e.g., transmitted). The resources corresponding to a union of the PSCCH that scheduled the PSSCH and associated PSCCH DM-RS may not be available for the PSSCH, for example, if a PSSCH scheduled by a PSCCH may overlap with resources containing the PSCCH.

The redundancy version for sending (e.g., transmitting) a TB may be given by the "Redundancy version" field in the $2^{nd}$ stage SCI (e.g., SCI format 2-A and/or 2-B). The modulation and coding scheme $I_{MCS}$ may be given by the 'Modulation and coding scheme' field in the $1^{st}$ stage SCI (e.g., SCI format 1-A). The wireless device may determine the MCS table based on the following: a pre-defined table may be used if no additional MCS table may be configured by higher layer parameter sl-MCS-Table; otherwise an MCS table may be determined based on the 'MCS table indicator' field in the $1^{st}$ stage SCI (e.g., SCI format 1-A). The wireless device may use $I_{MCS}$ and the MCS table determined according to the previous step to determine the modulation order ($Q_m$) and Target code rate (R) used in the physical sidelink shared channel.

The wireless device may determine the TB size (TBS) based on the number of REs ($N_{RE}$) within the slot. The wireless device may determine the number of REs allocated for PSSCH within a PRB $$(N'_{RE}) \text{ by } N'_{RE} = N_{sc}^{RB}\left(N_{symb}^{sh} - N_{symb}^{PSFCH}\right) - N_{oh}^{PRB} - N_{RE}^{DMRS},$$

$$\text{where } N_{SC}^{RB} = 12$$

is the number of subcarriers in a physical resource block;

$$N_{symb}^{sh} = sl - LengthSymbols - 2,$$

where sl-LengthSymbols is the number of sidelink symbols within the slot provided by higher layers;

$$N_{symb}^{PSFCH} = 3$$

if 'PSFCH overhead indication' field of SCI format 1-A indicates "1", and $$N_{symb}^{PSFCH} = 0$$

otherwise, if higher layer parameter sl-PSFCH-Period is 2 or 4.

$$N_{symb}^{PSFCH} = 0,$$

if higher layer parameter sl-PSFCH-Period is 0.

$$N_{symb}^{PSFCH} = 3,$$

if higher layer parameter sl-PSFCH-Period is 1.

$$N_{oh}^{PRB}$$

is the overhead given by higher layer parameter sl-X-Overhead.

$$N_{RE}^{DMRS}$$

may be given by higher layer parameter sl-PSSCH-DMRS-TimePattern. The wireless device may determine the total number of REs allocated for PSSCH ($N_{RE}$) by $$N_{RE} = N_{RE}' \cdot n_{PRB} - N_{RE}^{SCI,1} - N_{RE}^{SCI,2},$$

where $n_{PRB}$ is the total number of allocated PRBs for the PSSCH;

$$N_{RE}^{SCI,1}$$

is the total number of REs occupied by the PSCCH and PSCCH DM-RS;

$$N_{RE}^{SCI,2}$$

is the number of coded modulation symbols generated for $2^{nd}$-stage SCI transmission (prior to duplication for the $2^{nd}$ layer, if present). The wireless device may determine the TBS based on the total number of REs allocated for PSSCH ($N_{RE}$) and/or the modulation order ($Q_m$) and Target code rate (R) used in the physical sidelink shared channel.

For the single codeword q=0 of a PSSCH, the block of bits $$b^{(q)}(0), \ldots, b^{(q)}\big(M_{bit}^{(q)} - 1\big),$$

$$\text{where } M_{bit}^{(q)} = M_{bit,SCI2}^{(q)} + M_{bit,data}^{(q)}$$

is the number of bits in codeword q sent (e.g., transmitted) on the physical channel, may be scrambled prior to modulation (e.g., using a scrambling sequence based on a CRC of the PSCCH associated with the PSSCH). For the single codeword q=0, the block of scrambled bits may be modulated, resulting in a block of complex-valued modulation symbols $$d^{(q)}(0), \ldots, d^{(q)}\big(M_{symb}^{(q)} - 1\big)$$

$$\text{where } M_{symb}^{(q)} = M_{symb,1}^{(q)} + M_{symb,2}^{(q)}.$$

Layer mapping may be done with the number of layers $\upsilon \in \{1,2\}$, resulting in $$x(i) = \big[x^{(0)}(i) \ldots x^{(\upsilon-1)}(i)\big]^T, i = 0, 1, \ldots, M_{symb}^{layer} - 1.$$

The block of vectors $[x^{(0)}(i) \ldots x^{(\upsilon-1)}(i)]^T$ may be pre-coded where the precoding matrix W equals the identity matrix and $$M_{symb}^{ap} = M_{symb}^{layer}.$$

For each of the antenna ports used for transmission of the PSSCH, the block of complex-valued symbols $$z^{(p)}(0), \ldots, z^{(p)}\big(M_{symb}^{ap} - 1\big)$$

may be multiplied with the amplitude scaling factor $$\beta_{DMRS}^{PSCCH}$$

for conforming to the transmit power and mapped to resource elements $(k',l)_{p,\mu}$ in the virtual resource blocks assigned for transmission, where k'=0 is the first subcarrier in the lowest-numbered virtual resource block assigned for transmission. The mapping operation may be done in two steps: first, the complex-valued symbols corresponding to the bit for the $2^{nd}$-stage SCI in increasing order of first the index k' over the assigned virtual resource blocks and then the index l, starting from the first PSSCH symbol carrying an associated DM-RS, wherein the corresponding resource elements in the corresponding physical resource blocks may be not used for transmission of the associated DM-RS, PT-RS, and/or PSCCH; secondly, the complex-valued modulation symbols not corresponding to the $2^{nd}$-stage SCI shall be in increasing order of first the index k' over the assigned virtual resource blocks, and then the index l with the starting position, wherein the resource elements may be not used for $2^{nd}$-stage SCI in the first step; and/or the corresponding resource elements in the corresponding physical resource blocks may be not used for transmission of the associated DM-RS, PT-RS, CSI-RS, and/or PSCCH. The resource elements that may be used for the PSSCH in the first OFDM symbol in the mapping operation above, including DM-RS, PT-RS, and/or CSI-RS occurring in the first OFDM symbol, may be duplicated in the OFDM symbol immediately preceding the first OFDM symbol in the mapping (e.g., for AGC training purposes).

Virtual resource blocks may be mapped to physical resource blocks according to non-interleaved mapping. For non-interleaved VRB-to-PRB mapping, virtual resource block n may be mapped to physical resource block n. For a PSCCH, the block of bits $b(0), \ldots, b(M_{bit}-1)$, where $M_{bit}$ is the number of bits transmitted on the physical channel, may be scrambled prior to modulation, resulting in a block of scrambled bits $\tilde{b}(0), \ldots, \tilde{b}(M_{bit}-1)$ according to $\tilde{b}(i)=(b(i)+(0) \bmod 2$. The block of scrambled bits $\tilde{b}(0), \ldots, \tilde{b}(M_{bit}-1)$ may be modulated using QPSK, resulting in a block of complex-valued modulation symbols $d(0), \ldots, d(M_{symb}-1)$ where $M_{symb}=M_{bit}/2$. The set of complex-valued modulation symbols $d(0), \ldots, d(M_{symb}-1)$ may be multiplied with the amplitude scaling factor $$\beta_{DMRS}^{PSCCH}$$

for conforming to the transmit power and mapped in sequence starting with $d(0)$ to resource elements $(k,l)_{p,\mu}$ assigned for transmission, and not used for the demodulation reference signals associated with PSCCH, in increasing order of first the index k over the assigned physical resources, and then the index l on antenna port p (e.g., p=2000). The resource elements that may be used for the PSCCH in the first OFDM symbol in the mapping operation above, including DM-RS, PT-RS, and/or CSI-RS occurring in the first OFDM symbol, may be duplicated in the immediately preceding OFDM symbol (e.g., for AGC training purposes).

For sidelink resource allocation mode 1, a wireless device, for example, if a first SCI (e.g., SCI format 1-A) on PSCCH may be detected, may decode PSSCH according to the detected second SCI (e.g., SCI formats 2-A and/or 2-B) and associated PSSCH resource configuration configured by higher layers. The wireless device may not be required to decode more than one PSCCH at each PSCCH resource candidate. For sidelink resource allocation mode 2, a wireless device, for example, if a first SCI (e.g., SCI format 1-A) on PSCCH may be detected, may decode PSSCH according to the detected second SCI (e.g., SCI formats 2-A and/or 2-B), and associated PSSCH resource configuration configured by higher layers. The wireless device may not be required to decode more than one PSCCH at each PSCCH resource candidate. A wireless device may be required to decode neither the corresponding second SCI (e.g., SCI formats 2-A and/or 2-B) nor the PSSCH associated with a first SCI (e.g., SCI format 1-A) if the first SCI indicates an MCS table that the wireless device does not support.

Throughout this disclosure, a (sub)set of symbols of a slot, associated with a resource pool of a sidelink BWP, that may be (pre-)configured for sidelink communication (e.g., transmission and/or reception) may be referred to as 'sidelink symbols' of the slot. The sidelink symbols may be contiguous/consecutive symbols of a slot. The sidelink symbols may start from a sidelink starting symbol (e.g., indicated by an RRC parameter). For example, the sidelink starting symbol may be symbol #0 or symbol #1, and so on. The sidelink symbols may comprise one or more symbols of the slot, wherein a parameter (e.g., indicated by RRC) may indicate the number of sidelink symbols of the slot. The sidelink symbols may comprise one or more guard symbols, for example, to provide a time gap for the wireless device to switch from a transmission mode to a reception mode. For example, the OFDM symbol immediately following the last symbol used for PSSCH, PSFCH, and/or S-SSB may serve as a guard symbol. As described with respect to FIG. 19, the sidelink symbols may comprise one or more PSCCH resources/occasions, one or more PSCCH resources, and/or zero or more PSFCH resources/occasions. The sidelink symbols may comprise one or more AGC symbols.

An AGC symbol may comprise duplication of (content of) the resource elements of the immediately succeeding/following symbol (e.g., a TB and/or SCI may be mapped to the immediately succeeding symbol). The AGC symbol may be a dummy OFDM symbol. The AGC symbol may comprise a reference signal. For example, the first OFDM symbol of a PSSCH and its associated PSCCH may be duplicated (e.g., in the AGC symbol that may be immediately before the first OFDM symbol of the PSSCH). For example, the first OFDM symbol of a PSFCH may be duplicated (e.g., for AGC training purposes).

In a sidelink slot structure configuration, the first symbol may be used for automatic gain control (AGC) and the last symbol may be used for a gap. During an AGC symbol, a receiving and/or sensing wireless device may perform AGC training. For AGC training, a wireless device detects the energy/power of a signal in the channel during the AGC symbol and applies a hardware gain to maximize the signal amplitude to the dynamic range of the analog to digital convertor (ADC) at the receiver. The receiver may determine a gain for a received signal, and an AGC duration may allow time for the receiver to determine the gain and use the gain (e.g., hardware gain component). The gain of the amplifier may have already been adjusted, for example, if the receiver may receive the data (e.g., in the next symbol (s)).

For sidelink communication, the transmitter wireless device may not map data/control information to the AGC symbol. The AGC symbol may not be used for communication and sending information other than energy. The AGC symbol may be a last symbol prior to an earliest symbol of a transmission, such that a gap between AGC symbol and signal/channel transmission may be minimized and an accurate gain may be determined for receiving the following signal/channel. For example, the AGC symbol, as described with respect to FIG. 19, may be a symbol immediately preceding the first/earliest symbol of a resource used for a transmission via a channel (e.g., PSCCH, PSSCH, and/or PSFCH transmission).

The AGC symbol may comprise duplication of resource elements of the next (immediately following) OFDM symbol. The AGC symbol may comprise any signal (e.g., a per-defined signal/sequence and/or dummy information). The purpose of the AGC symbol may be to allow the receiver wireless device to perform AGC training and adjust the hardware gain for a most efficient reception of the following signal. Throughout this disclosure, the "AGC symbol" may be referred to as "duplicated symbol", "duplication", "the symbol used for duplication", and/or "the immediately preceding symbol comprising the duplication of a first symbol".

The amount of data traffic carried over cellular networks may be expected to increase for many years to come. The number of users/devices may be increasing, and each user/ device accesses an increasing number and variety of services (e.g. video delivery, large files, images). This requires not only high capacity in the network, but also provisioning of very high data rates to meet customer expectations on interactivity and responsiveness. More spectrum may be needed for cellular operators to meet the increasing demand Considering user expectations of high data rates along with seamless mobility, it may be beneficial that more spectrum be made available for deploying macro cells as well as small cells for cellular systems.

Striving to meet the market demands, there has been increasing interest from operators in deploying some complementary access utilizing unlicensed spectrum to meet the traffic growth. This may be exemplified by the large number of operator-deployed Wi-Fi networks and the 3GPP standardization of interworking solutions with Wi-Fi (e.g., LTE/WLAN interworking). This interest may indicate that unlicensed spectrum may be an effective complement to licensed spectrum for cellular operators to address the traffic explosion in some scenarios, such as hotspot areas. For example, licensed assisted access (LAA) and/or new radio on unlicensed band(s) (NR-U) may offer an alternative for operators to make use of unlicensed spectrum, manage one radio network, and/or offer new possibilities for optimizing the network's efficiency.

Similar to the LAA feature introduced in LTE, the NR-U (e.g., in Rel-16 and Rel-17), the motivation and primary use of unlicensed spectrum may be to expand 3GPP technologies into more vertical domains to support wider applications, enabling new services and creating more wireless product types. By not restricting to always rely on operator licensed carriers and/or dedicated carriers for V2X/D2D and/or Public Safety, which may not be always available depending on network deployment and availability, if devices are able to communicate directly with each other or sending out messages/signals on a frequency spectrum that may be always readily available, this may be used to create exciting new services, applications and even saving lives in disaster areas (e.g. recent devastating flooding events in the US and China).

For example, sidelink in unlicensed spectrum (SL-U) may be used in following applications and/or services. For example, for applications such as augmented reality (AR)/ virtual reality (VR) interactive and gaming services, which often demands very low latency and high data rate communication over sidelink directly between devices. In another example, SL over unlicensed may be also ideal for smart home applications, where tens of low-cost devices connecting to a central node like a customer premise equipment (CPE) within a home network to gain access to internet or just directly communicating with each other to share contents such as movies, videos, music, etc. It may not be expected that all of these devices are to be connected to the mobile network and/or need to have the capability of supporting the Uu interface, for example, if there may be hundreds or thousands of these devices located within a cell area. The making use of unlicensed bands may be the only choice, for example, for enabling these types of applications and expanding the usage of sidelink. For wearable devices such as smart watches, bands, etc., it may be already common not to have the capability to connect to a mobile network. In this case, unlicensed spectrum and sidelink connection to a smartphone may be the only way for gaining access to the Internet. In another example, out of coverage network areas, such as disaster zones, rural sites, mines, deep basements, coast lines, or dangerous areas where unmanned vehicles, robots or UAVs needs to gain access into, unlicensed spectrum and NR sidelink communication may be an ideal combination. In another example, IIoT/ smart factory application may be equally able to take an advantage of sidelink communication utilizing unlicensed spectrum. For traffic offloading from the Uu interface to sidelink in unlicensed band in a factory setting where not all communication data needs to go through a base station. Especially for coordination data messages between factory/ warehouse moving equipment such that they don't collide with each other or to perform a synchronized movement between wheels. The sidelink operation in the licensed spectrum may be dynamically control by the base station as well, if the factory/warehouse is operating NR-U. In another example, even for the cellular V2X (C-V2X) application, the current allocation of ITS spectrum in 5.9 GHz band dedicated for V2X communication only has very limited spectrum bandwidth. In some regions, total of 30 MHz and/or at most 40 MHz of bandwidth may be allocated. This allocated bandwidth may be to be shared at least between LTE and NR V2X. It is a well-known problem that this limited bandwidth allocation will not be able to support high data rate applications such as extended sensor data sharing and fully autonomous driving. With the local/regional regulators to increase the ITS bandwidth or designating additional spectrum for C-V2X, utilizing unlicensed spectrum may be a viable option via SL carrier aggregation, where a vehicle wireless device sends (e.g., transmits) its essential/safety message data on the ITS band and the high data rate imaging over the unlicensed spectrum.

Increased sidelink data rate may be motivated by applications such as sensor information (e.g., video) sharing between vehicles with high degree of driving automation. Commercial use cases may require data rates in excess of what may be currently possible. Increased data rate may be achieved with the support of sidelink carrier aggregation and/or sidelink over unlicensed spectrum. Increased data rate may be more efficiently supported on FR2, for example, by enhancing the FR2 sidelink operation. The support of new carrier frequencies and larger bandwidths may also allow to improve its data rate. The main benefit may come from making sidelink more applicable for a wider range of applications. More specifically, with the support of unlicensed spectrum and the enhancement in FR2, sidelink will be in a better position to be implemented in commercial devices since utilization of the ITS band may be limited to ITS safety related applications.

Sidelink communication(s), for example, as described with respect to FIG. 17, may use radio resource(s) in an unlicensed band. For example, a sidelink BWP may be (pre-) configured in an unlicensed band/carrier. For example, a sidelink resource pool of the sidelink BWP may be (pre-) configured in an unlicensed band. For example, a base station may configure the sidelink BWP and/or the sidelink resource pool of the sidelink BWP in an unlicensed band. A first communication (e.g., UL and/or DL transmission) between a first device (e.g., a base station) and a second device (e.g., a first wireless device) via Uu interface and a second communication (e.g., sidelink transmission) between the second device (e.g., the first wireless device) and a third device (e.g., a second wireless device) via a sidelink may be performed in a same band or in different spectrum bands. For example, a wireless device may receive, from the base station, configuration parameters of communications via Uu interface and configuration parameters of communications via a sidelink. The configuration parameters may indicate that communications via Uu interface and via a sidelink are configured/scheduled in a same unlicensed band. The configuration parameters may indicate that communications via Uu interface and via a sidelink are configured/scheduled in different unlicensed bands. The configuration parameters may indicate that communications via Uu interface are configured/scheduled in a licensed band, and/or the communications via a sidelink are configured/scheduled in an unlicensed band. The configuration parameters may indicate that communications via Uu interface are configured/scheduled in an unlicensed band, and/or the communications via a sidelink are configured/scheduled in a licensed band.

Listen-before-talk (LBT) may be required for transmission in an unlicensed/shared band. A cell configured in unlicensed/shared cell may be referred to as an unlicensed/shared cell. The unlicensed/shared cell may be referred to as a LAA cell and/or a NR-U cell. The unlicensed/shared cell may be operated as non-standalone with an anchor cell in a licensed band or standalone without an anchor cell in a licensed band. LBT may comprise a clear channel assessment (CCA). For example, a carrier that is configured in the unlicensed/shared cell may be referred to as an unlicensed carrier. The base station may configure a cell on the carrier. For example, the unlicensed/shared cell may be configured on the unlicensed carrier.

Equipment may use a CCA before using the unlicensed/shared cell or channel, for example, in an LBT procedure. The CCA may comprise an energy detection (ED) that determines the presence of other signals on a channel (e.g., channel is occupied) or absence of other signals on a channel (e.g., channel is clear). A regulation of a country may impact the LBT procedure. For example, European and Japanese regulations mandate the usage of LBT in the unlicensed/shared bands, such as the 5 GHz unlicensed/shared band. Apart from regulatory requirements, carrier sensing via LBT may be one way for fairly sharing the unlicensed/shared spectrum among different devices and/or networks attempting to utilize the unlicensed/shared spectrum.

Discontinuous transmission on an unlicensed/shared band with limited maximum transmission duration may be enabled. Some of these functions may be supported by one or more signals to be sent (e.g., transmitted) from the beginning of a discontinuous downlink transmission and/or a sidelink transmission in the unlicensed/shared band. Channel reservation may be enabled by the transmission of signals, for example, based on (e.g., after or in response to) gaining channel access based on a successful LBT operation. Other nodes may receive the signals (e.g., transmitted for the channel reservation) with an energy level above a certain threshold that may sense the channel to be occupied. Functions that may need to be supported by one or more signals for operation in unlicensed/shared band with the discontinuous downlink transmission and/or sidelink transmission may comprise one or more of the following: detection of the downlink transmission and/or sidelink transmission in unlicensed/shared band (comprising cell identification) by wireless devices; time & frequency synchronization of wireless devices.

Downlink/uplink and/or sidelink transmission and frame structure design for operation in an unlicensed/shared band may use subframe, slot, mini-slot, and/or symbol boundary alignment according to timing relationships, for example, across serving cells (e.g., configured on one or more carriers) aggregated by carrier aggregation. This may not imply that base station transmissions start at the subframe, (mini-) slot, and/or symbol boundary. The operation via the unlicensed/shared band may support sending (e.g., transmitting) PDCCH, PDSCH, PSBCH, PSCCH, PSSCH, and/or PSFCH, for example, if not all OFDM symbols may be available for transmission in a slot according to LBT.

An LBT procedure may be used for fair and friendly coexistence of a 3GPP system (e.g., LTE and/or NR) with other operators and/or radio access technologies (RATs) such as WiFi, operating in unlicensed/shared band. For example, a node attempting to send (e.g., transmit) on a carrier in unlicensed/shared band may perform a CCA as a part of an LBT procedure to determine if a channel is free (e.g., idle) for use. For example, the channel may be confined within a range of frequency. For example, a regulation of a country may indicate the range of frequency that requires the LBT procedure to use the channel in the unlicensed/shared bands. For example, the channel may be 20 MHz or a multiple of 20 MHz. The channel may be referred to as an LBT band, a subband, and/or the like. The LBT procedure may comprise an ED performed by the node to determine if the channel is being free (e.g., idle) or used (e.g., occupied) for use. The wireless device may perform the ED for the range of frequency comprising the channel. For example, regulatory requirements in some regions (e.g., in Europe) specify an ED threshold such that if a node measures, detects, and/or receives energy greater than the ED threshold, the node determines that the channel is not free/idle for use/access and/or is being used/occupied, for example, by another node(s). A node may optionally use a lower ED threshold for ED than that specified by regulatory requirements, for example, while nodes may follow such regulatory requirements. A radio access technology (e.g., WiFi, LTE and/or NR) may use a mechanism to adaptively change the ED threshold. For example, NR-U may use a mechanism to adaptively lower the ED threshold from an upper bound. An adaptation mechanism may not preclude static or semi-static setting of the ED threshold. Category 4 LBT (CAT4 LBT) mechanism or other type of LBT mechanisms may be implemented.

The device may access the channel for a period referred to as Channel Occupancy Time (COT), for example, if the detected energy during a CCA (e.g., initial CCA) period is lower than an ED threshold. Otherwise, the device may start an extended CCA period, in which the detected energy is again compared against the ED threshold until channel access is granted. The regulation may specify the CCA slot duration (e.g., 9 us in the 5 GHz band, and 5 us in the 60 GHz band), the initial and extended CCA check times (e.g., a multiple of 5 us for initial CCA and 8+m×5 µs for extended CCA in the 60 GHz band, where m controls the backoff), and the ED threshold (e.g., −72 dBm for a 20 MHz channel bandwidth in the 5 GHz band, and −47 dBm for 40 dBm of radiated power in the 60 GHz band).

An LBT failure of an LBT procedure on the channel in an unlicensed band may indicate a channel access failure on the channel. For example, an LBT failure of an LBT procedure on the channel may indicate that the channel is not idle/busy (e.g., occupied by another device(s)) during one or more sensing slot durations (e.g., CCA periods) before a transmission via the channel (e.g., or immediately before the transmission via the channel). An LBT success of an LBT procedure on the channel may indicate a channel access success of the channel. An LBT success of an LBT procedure on the channel may indicate that the channel is idle during one or more sensing slot durations (e.g., CCA periods) before a transmission via the channels (e.g., immediately before the transmission via channels).

Various example LBT mechanisms may be implemented. No LBT procedure may be performed by the sending (e.g., transmitting) entity, for example, for some signals, in some implementation scenarios, in some situations, and/or in some frequencies. For example, an LBT procedure may comprise Category 1 LBT, Category 2 LBT, Category 3 LBT, and/or Category 4 LBT. A type of an LBT (e.g., Category 1 LBT, Category 2 LBT, Category 3 LBT, and/or Category 4 LBT) may be indicated Category 1 (CAT1 LBT, e.g., no LBT) may be implemented in one or more cases. For example, a channel in unlicensed/shared band may be hold by a first device (e.g., for uplink, downlink, and/or sidelink transmissions). The first device may share the channel with a second device. A second device may take over the channel in unlicensed/shared band for uplink, downlink, and/or sidelink transmissions, for example, of a control signal (e.g., HARQ feedback of the uplink, downlink, and/or the sidelink transmissions) without performing the CAT1 LBT.

Category 2 (CAT2 LBT that may be referred to as one-shot LBT and/or a short LBT) may be implemented. The Category 2 may be an LBT without random back-off. The duration of time determining that the channel is idle may be deterministic (e.g., by a regulation). A sending (e.g., transmitting) device (e.g., a base station in Uu interface, a wireless device in Uu interface, and/or a sending (e.g., transmitting) device in a sidelink communication) may send (e.g., transmit) a grant (e.g., uplink grant and/or a sidelink grant) indicating a type of LBT (e.g., CAT2 LBT) to a receiving device (e.g., a base station in Uu interface, a wireless device in Uu interface, and/or a receiving device in a sidelink communication).

Category 3 (CAT3, e.g. LBT with random back-off with a contention window of fixed size) may be implemented. The LBT procedure may have the following procedure as one of its components. The sending (e.g., transmitting) device may draw a random number N within a contention window. The size of the contention window may be specified by the minimum and maximum value of N. The size of the contention window may be fixed. The random number N may be used in the LBT procedure to determine the duration of time that the channel is sensed to be idle before the sending (e.g., transmitting) device sends (e.g., transmits) on the channel.

Category 4 (CAT4, e.g. LBT with random back-off with a contention window of variable size) may be implemented. The sending (e.g., transmitting) device may draw a random number N within a contention window. The size of contention window may be specified by the minimum and maximum value of N. The sending (e.g., transmitting) device may vary the size of the contention window, for example, if drawing the random number N. The random number N may be used in the LBT procedure to determine the duration of time that the channel is sensed to be idle before the sending (e.g., transmitting) device sends (e.g., transmits) on the channel.

A transmission burst(s) may comprise a continuous (unicast, multicast, broadcast, and/or combination thereof) transmission on a carrier component (CC). A first transmission burst(s) may be a continuous transmission from a first device (e.g., a base station in Uu interface, a wireless device in Uu interface, and/or a sending (e.g., transmitting) device in a sidelink communication) to a second device (e.g., a base station in Uu interface, a wireless device in Uu interface, and/or a receiving device in a sidelink communication) on the channel of the CC in an unlicensed/shared band. A second transmission burst(s) may be a continuous transmission from the second device (e.g., a base station in Uu interface, a wireless device in Uu interface, and/or a sending (e.g., transmitting) device in a sidelink communication) to the first device (e.g., a base station in Uu interface, a wireless device in Uu interface, and/or a receiving device in a sidelink communication) on the channel of the CC in the unlicensed/shared band. The first transmission burst(s) and the second transmission burst(s) on the channel in the unlicensed/shared band may be scheduled in a TDM manner over the same unlicensed/shared band. Switching between the first transmission burst and the second transmission burst(s) may require an LBT (e.g., CAT1 LBT, CAT2 LBT, CAT3 LBT, and/or CAT4 LBT). For example, an instant in time may be part of the first transmission burst or the second transmission burst.

COT sharing may comprise a mechanism by which one or more devices share a channel, in an unlicensed/shared band, that is sensed as idle by at least one of the one or more devices. For example, one or more first devices may occupy the channel via an LBT (e.g., the channel is sensed as idle based on CAT4 LBT) and one or more second devices may use and/or share, for a transmission of the one or more second devices, the channel using a particular type of an LBT within a maximum COT (MCOT) limit.

Various of LBT types may be used for Channel occupancy time (COT) sharing. A sending (e.g., transmitting) device (e.g., a base station in Uu interface, a wireless device in Uu interface, and/or a sending (e.g., transmitting) device in a sidelink communication) may send (e.g., transmit) a grant (e.g., uplink grant and/or a sidelink grant) to a receiving device (e.g., a base station in Uu interface, a wireless device in Uu interface, and/or a receiving device in a sidelink communication). For example, the grant (e.g., uplink grant and/or a sidelink grant) may indicate a trigger of the COT sharing and/or a type of LBT (e.g., CAT1 LBT, CAT2 LBT, CAT2 LBT, and/or CAT2 LBT) to be used for the receiving device during the COT acquired and/or shared by the sending (e.g., transmitting) device.

A regulation of certain region(s) (e.g., Europe and/or Japan) may prohibit continuous transmission in the unlicensed band and may impose limits on the COT (e.g., the maximum continuous time a device may use the channel). The maximum continuous time in which the device gains an access based on LBT procedure and uses the channel may be referred to as a maximum channel occupancy time (MCOT). The MCOT in the 5 GHz band may be limited to a certain period (e.g., 2 ms, 4 ms, or 6 ms), depending on the channel access priority class, and it may be increased up to 8-10 ms.

The MCOT in the 60 GHz band may be 9 ms. For example, the regulation (e.g., for the 5 GHz and 60 GHz bands) may allow the device (e.g., a wireless device of a Uu interface and/or a sending (e.g., transmitting) wireless device in a sidelink communication) to share the COT with the associated devices. For example, the associated device may be a wireless device and/or a base station in the Uu interface. For example, the associated device may be a wireless device of the sidelink (e.g., unicast, multicast, and/or broadcast) communication. For example, the device may get an (e.g., initial) access to the channel through the LBT procedure (e.g., for COT and/or MCOT). The device may send (e.g., transmit), to the associated device, a control message and/or a control signal indicating sharing the COT (or MCOT) with the associated device and/or remaining time of the COT, and starting/ending times (e.g., in terms of symbol(s), slot(s), SFN(s), and/or a combination thereof) of the COT that the associated device to use/share the channel. The associated device may skip (e.g., may not perform) the CCA check and/or may perform Category 1 LBT procedure on the channel during the shared COT. The associated wireless device may send (e.g., transmit) data via the channel during the shared COT based on a particular LBT type. The particular LBT type may comprise Category 1, Category 2, Category 3, and/or Category 4. For example, the MCOT may be defined and/or configured per priority class, logical channel priority, and/or device specific.

A first device may gain an access through the LBT procedure for a first (e.g., UL, DL, and/or sidelink) transmission in an unlicensed band. The second device may perform a second (e.g., UL, DL, and/or sidelink) transmission with a dynamic grant and/or a configured grant (e.g., Type 1 and/or Type2) with a particular LBT (e.g., CAT2 LBT) that the second device performs on a channel shared by a first device, if the first device shares, with a second device, the channel. The second device may use and/or occupy the channel during the COT, for example, by performing UL, DL, and/or sidelink transmission. For example, the first device performing the first transmission based on a configured grant (e.g., Type 1, Type2, autonomous UL) may send (e.g., transmit) a control information (e.g., DCI, UCI, SCI, and/or MAC CE) indicating the COT sharing. The COT sharing may comprise switching, within a (M)COT, from the first transmission (e.g., UL, DL, and/or sidelink transmission) of the first device to the second transmission (e.g., UL, DL, and/or sidelink transmission) of the second device. A starting time of the second transmission in the COT sharing (e.g., triggered by the first device), may be indicated in one or more ways. For example, one or more parameters in the control information may indicate the starting time of the COT sharing at which the second device starts to access the channel and/or an ending time of the COT sharing at which the second device terminates/ends to use the channel. For example, resource configuration(s) of configured grant(s) may indicate the starting time and/or the ending time.

Single and/or multiple switching of transmissions within a shared COT may be supported. For example, a switching of transmissions within the shared COT may comprise switching from the first transmission (e.g., UL, DL, and/or sidelink transmission) of the first device to the second transmission (e.g., UL, DL, and/or sidelink transmission) of the second device within the shared COT. A type of LBT required/performed, by the second device, for the second transmission may be different depending on a time gap between the first transmission and the second transmission. The time gap may be referred to as a COT gap. For example, the second wireless device may perform CAT1 LBT (e.g., may not perform or may skip LBT procedure) for the second transmission switched from the first transmission within the shared COT, for example, if the time gap is less than a first time value (e.g., 16 µs). For example, the second wireless device may perform CAT2 LBT for the second transmission switched from the first transmission within the shared COT, for example, if the time gap is longer than the first time value and does not exceed a second time value (e.g., 25 µs). For example, the second wireless device may perform CAT2 LBT for the second transmission switched from the first transmission within the shared COT, for example, if the time gap exceeds the second time value. For example, the second wireless device may perform CAT4 LBT for the second transmission switched from the first transmission within the shared COT, for example, if the time gap exceeds the second time value.

A sidelink resource of a sidelink communication may be configured in an unlicensed band. For example, a first wireless device may perform, during a period in one or more symbols, an LBT procedure on a channel comprising a sidelink resource (e.g., comprising PSBCH, PSCCH, PSSCH, and/or PSFCH) via which the first wireless device may schedule (or may be scheduled) to send (e.g., transmit) a data and/or a signal to a second wireless device. For example, the LBT procedure may start during a first symbol that is at least one symbol or a certain period (e.g., in terms of µ or ms) before and/or prior to a starting symbol of the sidelink resource (and/or a starting symbol of the transmission of the data and/or the signal). For example, the LBT procedure may end before and/or prior to the starting symbol of the sidelink resource (and/or the starting symbol of the transmission of the data and/or the signal). The wireless device may not send (e.g., transmit), via the sidelink resource (e.g., comprising PSBCH, PSCCH, PSSCH, and/or PSFCH), the data and/or the signal to the second wireless device, for example, based on (e.g., after or in response to) the LBT procedure indicating the channel is busy. The wireless device may send (e.g., transmit), via the sidelink resource (e.g., comprising PSBCH, PSCCH, PSSCH, and/or PSFCH), the data and/or the signal to the second wireless device, for example, based on (e.g., after or in response to) the LBT procedure indicating the channel is idle.

The first wireless device may determine an AGC symbol located before or prior to a starting symbol of the PSBCH, PSCCH, PSSCH, and/or PSFCH via which the first wireless device may schedule (or may be scheduled) to send (e.g., transmit) the data and/or the signal to the second wireless device. For example, the AGC symbol may be located one symbol before the starting symbol of sidelink resource (e.g., PSBCH, PSCCH, PSSCH, and/or PSFCH).

The AGC symbol, for example, may be the second symbol in the slot such as one symbol before a starting symbol (e.g., the third symbol in the slot) of a PSCCH (e.g., the third, the fourth, and the fifth symbols in a subchannel in the slot), and/or one symbol before a starting symbol (e.g., the third symbol in the slot) of a PSSCH (e.g., from the third symbol to the eighth symbol in the slot) as described with respect to FIG. 19. For example, the AGC symbol may be the tenth symbol in the slot such as one symbol before a starting symbol (e.g., the eleventh symbol in the slot) of a PSFCH (e.g., the eleventh symbol in the slot).

The first wireless device may start the LBT procedure at least one symbol or a certain period (e.g., in terms of µ or ms) before and/or prior to a starting symbol of the AGC symbol. For example, the first wireless device may end the LBT procedure at least one symbol or a certain period (e.g., in terms of µ or ms) before and/or prior to a starting symbol of the AGC symbol.

The LBT procedure may start during a first symbol that may be at least one symbol or a certain period (e.g., in terms of µ or ms) before and/or prior to a starting symbol of the AGC symbol (e.g., located one symbol before the PSCCH, PSSCH, and/or PSFCH in FIG. 19). The LBT procedure may end before and/or prior to the starting symbol. The wireless device may not send (e.g., transmit), via the AGC symbol, an AGC signal (e.g., that may be for the second wireless device to determine/adjust/train parameter values of its AGC) to the second wireless device, for example, based on (e.g., after or in response to) the LBT procedure indicating the channel is busy. The wireless device may send (e.g., transmit), via the AGC symbol, the AGC signal to the second wireless device, for example, based on (e.g., after or in response to) the LBT procedure indicating the channel is idle.

A wireless device may receive message(s) comprising configuration parameters of one or more sidelink resource pools configured in an unlicensed spectrum. The wireless device may select and/or determine a sidelink resource pool from the one or more sidelink resource pools for a sidelink transmission and/or a sidelink reception in the unlicensed spectrum. The wireless device may select and/or a sidelink resource from the sidelink resource pool for the sidelink transmission and/or sidelink reception in the unlicensed spectrum A first wireless device may be a sending (e.g., transmitting) wireless device of one or more sidelink transmissions. A second wireless device may be a receiving wireless device of the one or more sidelink transmissions. For example, the second wireless device may be a desired/intended receiver of the one or more sidelink transmissions. For example, a SCI (e.g., a second-stage SCI) scheduling the one or more sidelink transmissions may comprise/indicate an ID (e.g., destination ID) of the second wireless device indicating that the second wireless device is a desired/intended/destination receiver of the one or more sidelink transmissions. The second wireless device may not be a desired/intended receiver of the one or more sidelink transmissions, for example, if a SCI (e.g., a second-stage SCI) scheduling the one or more sidelink transmissions may not comprise/indicate an ID (e.g., destination ID) of the second wireless device. The second wireless device that may not be a desired/intended receiver of the one or more sidelink transmissions may be a device that monitors and/or receives the SCI (e.g., comprising an ID (e.g., destination ID) of another wireless device) sent (e.g., transmitted) by the first wireless devices using the one or more sidelink resource pools. The one or more sidelink transmissions may comprise PSCCH and/or PSSCH transmissions. The one or more sidelink transmissions may comprise one or more unicast transmissions, one or more groupcast transmissions, and/or one or more broadcast transmissions.

A base station and/or a wireless device may send (e.g., transmit) a message to the first wireless device. The message may comprise an RRC message, SIB, a MAC CE, DCI, and/or SCI. The message may comprise a field indicating/configuring one or more sidelink resource pools in a sidelink BWP. The message may further indicate/configure (e.g., frequency location of) the sidelink BWP in a frequency band (e.g., an unlicensed band). The sidelink BWP may be in an unlicensed/shared spectrum/carrier/band/cell with a plurality of RATs (e.g., WiFi, etc.). The one or more sidelink resource pools and/or sidelink BWP may be pre-configured to the first wireless device. A bandwidth of the frequency band may be at least as wide as (e.g., wider than or equal to) a minimum regularized bandwidth in a respective unlicensed band. The message sent (e.g., transmitted) by the base station and/or the wireless device may comprise/indicate a threshold indicating a bandwidth (e.g., a minimum bandwidth). The bandwidth indicated by the threshold may be wider than or equal to the minimum regularized bandwidth in the unlicensed spectrum. The threshold indicating the bandwidth may be pre-configured to the first wireless device. The frequency band may have a frequency band identifier (ID)/index. Each of the one or more sidelink resource pools (e.g., in the frequency band) may have a sidelink resource pool ID/index. The message, received by the first wireless device and/or the second wireless device from the base station and/or the wireless device, may comprise/indicate/configure the frequency band ID/index and the sidelink resource pool ID/index for the each of the one or more sidelink resource pools in the frequency band. The message may comprise/indicate/configure a mapping (e.g., an association) between the frequency band and the one or more sidelink resource pools in the frequency band. The mapping may indicate that the ID/index of the frequency band may be associated with the IDs/Indexes of the one or more sidelink resource pools in the frequency band. The frequency ID/index, the sidelink resource pool IDs/indexes of the one or more sidelink resource pools in the frequency band, and/or the mapping between the frequency band and the one or more sidelink resource pools in the frequency band may be pre-configured to the first wireless device and/or the second wireless device. The first wireless device may select, from the one or more sidelink resource pools, a sidelink grant comprising one or more resources for the one or more sidelink transmissions. The first wireless device may select the sidelink grant based on a resource selection procedure in the frequency band (e.g., unlicensed band). The resource selection procedure may comprise at least one of sensing procedures and/or actions as described with respect to FIGS. 25, 26, and/or 27.

A sidelink resource pool may be confined within an unlicensed band. The unlicensed band may comprise a channel having a bandwidth (e.g., a range of frequency) requiring an LBT procedure. For example, a wireless device determine/select the sidelink resource pool and determine/select a sidelink resource among one or more sidelink resources of the sidelink resource pool. The wireless device may perform the LBT on the channel. The bandwidth may comprise one or more subchannel of the sidelink resource. The sidelink BWP comprising the sidelink resource pool may be confined in the unlicensed band. The sidelink BWP comprising the sidelink resource pool may be confined in the unlicensed band.

Figure 28:
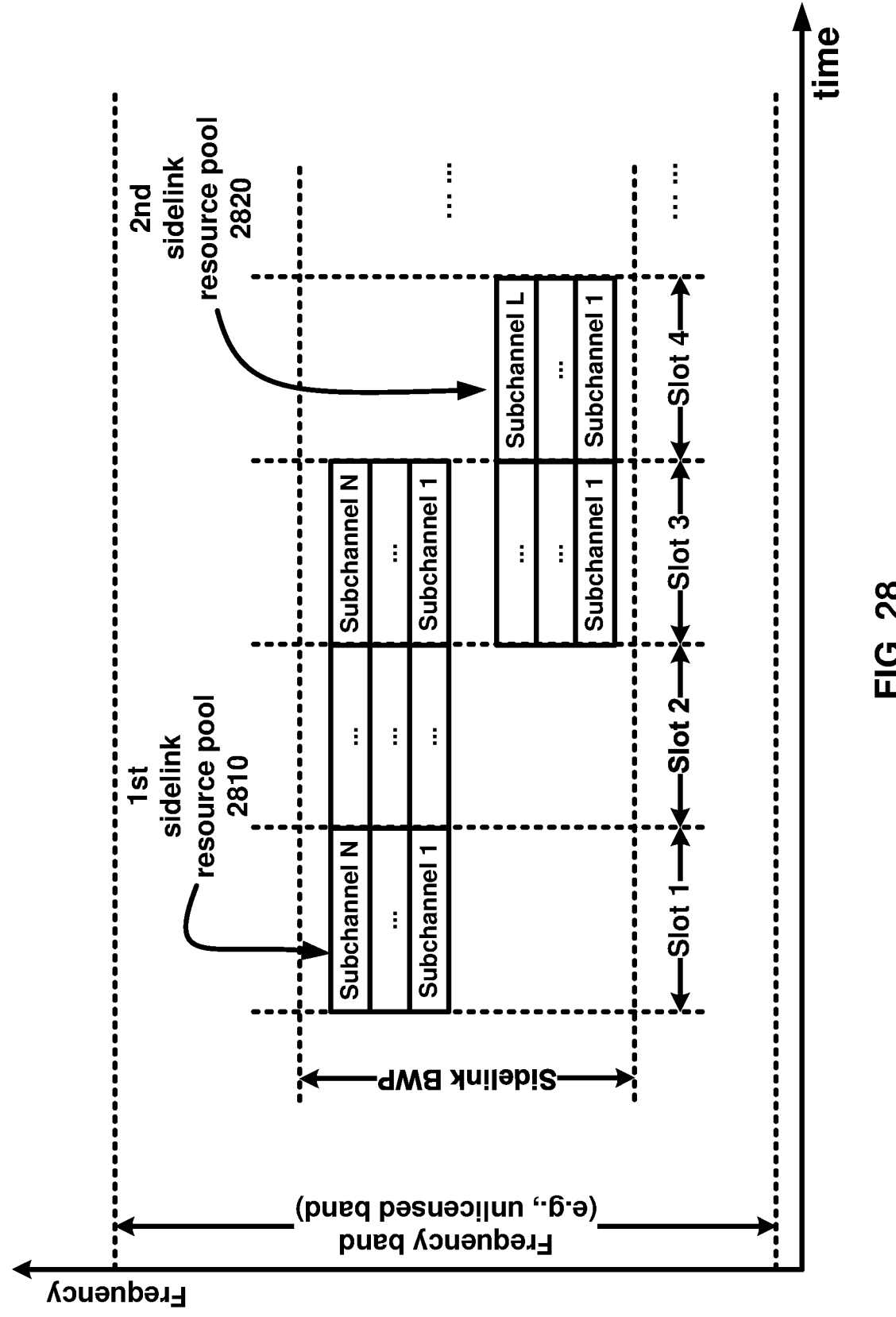
FIG. 28 shows an example configuration of a sidelink resource pool in a frequency band.

FIG. 28 shows an example configuration a sidelink resource pool in a frequency band. A sidelink resource pool as described with respect to FIG. 28 may refer to the one as described with respect to FIG. 18. For example, a wireless device may receive a message (e.g., RRC message and/or a SIB) from a base station and/or another wireless device. The message may comprise configuration parameters of sidelink BWP. The configuration parameters may indicate a bandwidth/frequency size of the sidelink BWP. The configuration parameters may indicate a first sidelink resource pool 2810 may be configured in the sidelink BWP. The configuration parameters may indicate that the sidelink BWP may be confined and/or configured in a particular frequency band (e.g., unlicensed band). For example, the size of the sidelink BWP may be equal to or smaller than a minimum regularized bandwidth for which the wireless device performs an LBT procedure to gain access on a channel. The size of the sidelink BWP may be smaller than or equal to 20 MHz or any other frequency range (e.g., the particular frequency band may be an unlicensed band such as in 5 GHz, 6 GHz, and/or FR1 band). For example, the configuration parameters may further indicate a second sidelink resource pool 2820 may be configured in the sidelink BWP. A first sidelink resource of the first sidelink resource pool 2810 may overlap in time with a second sidelink resource of the second sidelink resource pool 2820 (e.g., Slot 3 in FIG. 28).

Figure 29:
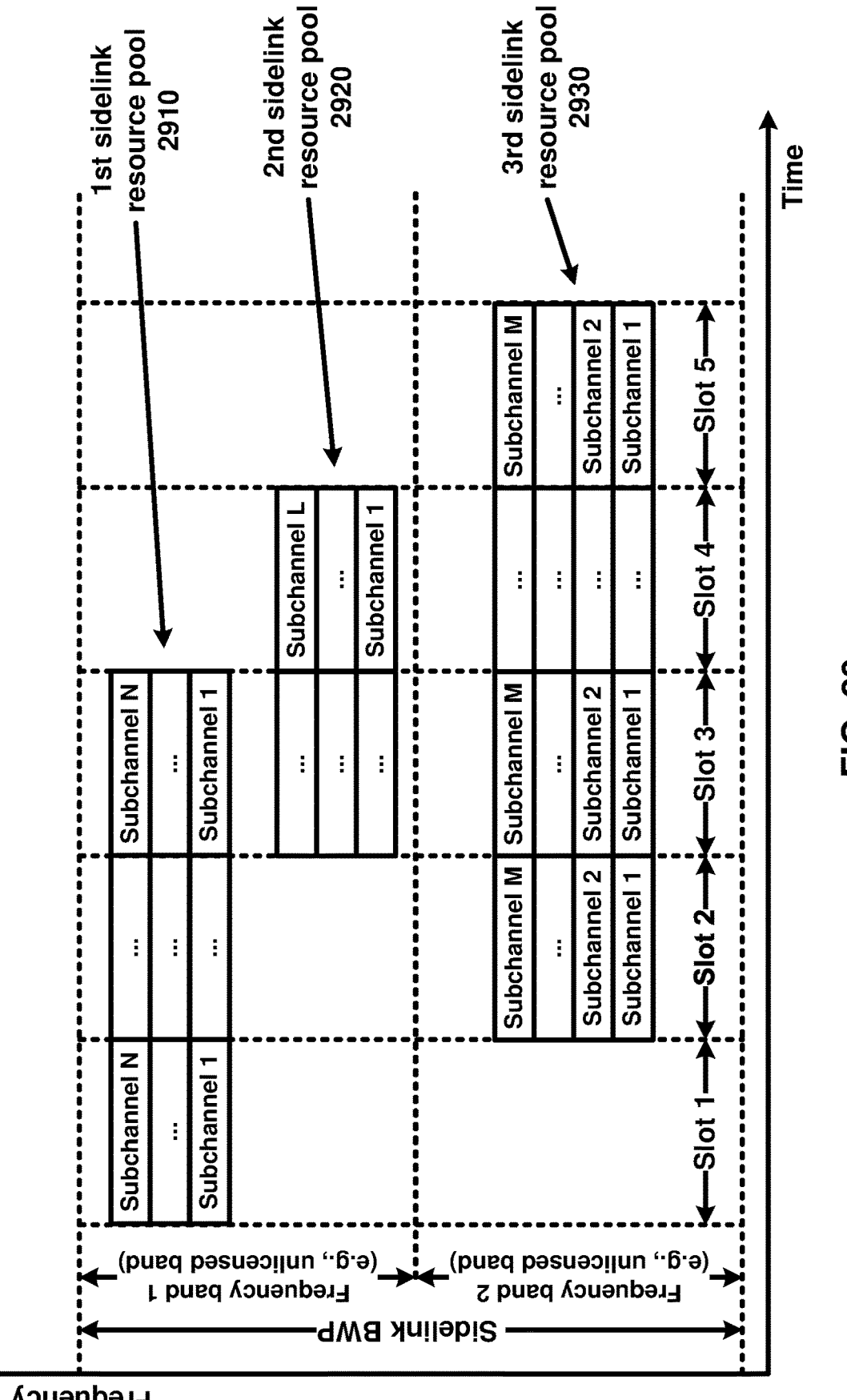
FIG. 29 shows an example configuration of a sidelink resource pool in a frequency band.

FIG. 29 shows an example configuration of a sidelink resource pool in a frequency band. A sidelink resource pool as described with respect to FIG. 29 may refer to the one as described with respect to FIG. 18. For example, a wireless device may receive a message (e.g., RRC message and/or a SIB) from a base station and/or another wireless device. The message may comprise configuration parameters of sidelink BWP. The configuration parameters may indicate a bandwidth/frequency size of the sidelink BWP. For example, the sidelink BWP may be a wideband sidelink BWP that has a bandwidth larger than a minimum regularized bandwidth for which the wireless device performs an LBT procedure to gain access on a channel. For example, the sidelink BWP may be larger than 20 MHz. The configuration parameters may indicate that one or more sidelink resource pools are configured in the sidelink BWP. The configuration parameters may indicate that each of the one or more sidelink resource pools is confined and/or configured in a respective frequency band (e.g., unlicensed band). As described with respect to FIG. 29, three sidelink resource pools 2910, 2920, 2930 are in a sidelink BWP. The sidelink BWP may comprise a frequency band 1 (e.g., unlicensed band 1) and a frequency band 2 (e.g., unlicensed band 2). The first sidelink resource pool 2910 and the second sidelink resource pool 2920 may be confined in the frequency band 1. The third sidelink resource pool 2930 may be confined in the frequency band 2. The frequency band 1 (e.g., unlicensed band 1) and the frequency band 2 (e.g., unlicensed band 2) may require different and/or independent LBT procedures. For example, the wireless device may perform a first LBT procedure that may indicate a channel of frequency band 1 being idle in Slot 3. For example, the wireless device may send (e.g., transmit), based on (e.g., in response to) the channel of frequency band 1 being idle in Slot 3, a sidelink data via a sidelink resource selected from the first sidelink resource pool 2910 and/or the second sidelink resource pool 2920 that are configured in the frequency band 1. For example, the wireless device may not send (e.g., transmit), based on (e.g., in response to) the channel of frequency band 1 being idle in Slot 3, a sidelink data via a sidelink resource selected from the third sidelink resource pool 2930 that are configured in the frequency band 2. Sending (e.g., transmitting) a sidelink data via a sidelink resource selected from the third sidelink resource pool 2930 that are configured in the frequency band 2 may require a second LBT procedure.

LBT failures may lead to a requirement for multiple transmission opportunities. For example, for unlicensed operation, it may be important and/or beneficial to provide multiple transmission opportunities to compensate for the effect of LBT failure. In at least some wireless communication systems (e.g., NR-U), the wireless device may only attempt sending (e.g., transmitting) a PUSCH transmission at a single starting position indicated in the UL grant in a PDCCH transmission or indicated by RRC parameters for this PUSCH transmission. The wireless device may not be able to send (e.g., transmit) and/or may need to wait for a next UL grant to attempt a second PUSCH transmission, for example, if the LBT performed for (e.g., at, or prior to) this starting position fails. To avoid excessive delay in such cases, multiple grants/PUSCH transmissions within a slot (e.g., mini-slot scheduling) and/or multiple grants/PUSCH transmissions across multiple slots scheduled by single DCI (e.g., multi-PUSCH scheduling or multi-slot scheduling or multi-TTI scheduling) may be enabled. At least some wireless communications for enhancing transmission opportunities in unlicensed bands may have conflicts with the sidelink channel structure and communication design. For sidelink operation in unlicensed spectrum (SL-U), since the sidelink resource allocation, sensing, and/or resource selection mechanism may be slot-based, it may not be feasible and/or desirable to use mini-slot based scheduling and/or multi-slot scheduling. Using mini-slot based scheduling and/or multi-slot scheduling may require substantial changes to the current slot-based sidelink resource allocation framework.

Wireless communications may use mini-slot based scheduling, such as to improve resource utilization (e.g., configured grant resource utilization), by aligning the transmission starting points among multiple wireless devices that may be configured/scheduled with the same time domain resources. This configuration may enable wireless device multiplexing in shared resources, and/or may avoid mutual blocking among the wireless devices during the LBT performed at different starting points. Resources may not be shared among multiple wireless devices, for example, in sidelink operations. A wireless device may perform sensing and resource selection/reservation for PSSCH/PSCCH transmission, such that other wireless devices do not use the reserved resource. Alignment of starting points of time domain resources may not be important and/or needed in SL-U, for example, because resources may not be shared.

Wireless devices may communicate with each other via a sidelink. Sidelink communications on an unlicensed spectrum may be required to enable multiple transmission opportunities in a slot. For example, due to LBT (e.g., which may be required such as by regulations), multiple transmission opportunities may be required to be enabled in a slot, such that the slot-based sidelink scheduling mechanism may be maintained. For example, multiple starting positions/points may be configured for sidelink transmissions in unlicensed bands to increase the number of LBT attempts/trials, and/or increase the chance of successful LBT for the said sidelink transmission. Multiple starting symbols within a slot may be defined/(pre-)configured as starting symbols of a PSSCH/PSCCH resource in that slot. An RRC parameter (e.g., a bitmap) may indicate a subset of sidelink symbols (i.e., symbols configured for sidelink) of a slot as starting symbols of a sidelink channel/transmission (e.g., PSSCH, PSCCH, PSFCH, and/or PSBCH). For example, one or more time offsets (e.g., in unit of symbols and/or sub-symbols) may be defined/(pre-)configured to be used to a first/earliest symbol of the sidelink channel (e.g., the starting symbol determined based on the legacy mechanism) to determine multiple candidate starting symbols for a PSSCH/PSCCH transmission in the slot. An ending symbol of the sidelink channel/transmission may be fixed (e.g., predefined and/or (pre-)configured). Multiple candidate starting points/positions/symbols may be defined/(pre-)configured for a sidelink channel resource (e.g., PSSCH/PSCCH resource, PSFCH resource, and/or PSBCH resource) in a slot. A wireless device may determine the actual starting point/symbol, based on result of one or more LBT procedures.

A transmitting wireless device may perform one or more LBTs for transmission via a sidelink channel resource, corresponding to (e.g., at or prior to) the multiple starting points/symbols of the sidelink channel resource, and determine the starting symbol of the resource correspondingly. The sidelink channel resource may end at a fixed point/position/symbol, for example, despite the variable starting point/position/symbol. Sidelink transmissions may comprise a duplicate of a starting symbol in a slot (e.g., in a first symbol in a slot). The duplicate symbol may be used by a receiving wireless device for automatic gain control (AGC). A plurality of wireless devices may send (e.g., transmit) a duplicate symbol for AGC at different time periods, for example, based on LBT results that may be successful for respective wireless devices at respectively different time periods. AGC performed by the receiving wireless device for a first sidelink transmission (e.g., having a first power level) may be inaccurate, for example, if one or more AGC symbols for one or more second sidelink transmissions may be sent (e.g., transmitted) overlapping in time with the first sidelink transmission (e.g., having a collective power level exceeding the first power level). AGC may be improved by duplicating a symbol for AGC for each instance that a sidelink transmission overlaps in time with the beginning of another sidelink transmission. For example, the first sidelink transmission may comprise a first duplicated symbol for AGC at the beginning of the first sidelink transmission during a symbol that may not overlap with another sidelink transmission, and the first sidelink transmission may comprise a second duplicated symbol for AGC during a later symbol that may overlap with the beginning of a second sidelink transmission. The receiving wireless device may update AGC for each sidelink transmission based on an overlap in time with one or more other sidelink transmissions, which may result in improved accuracy of AGC.

Figures 30A, 30B:
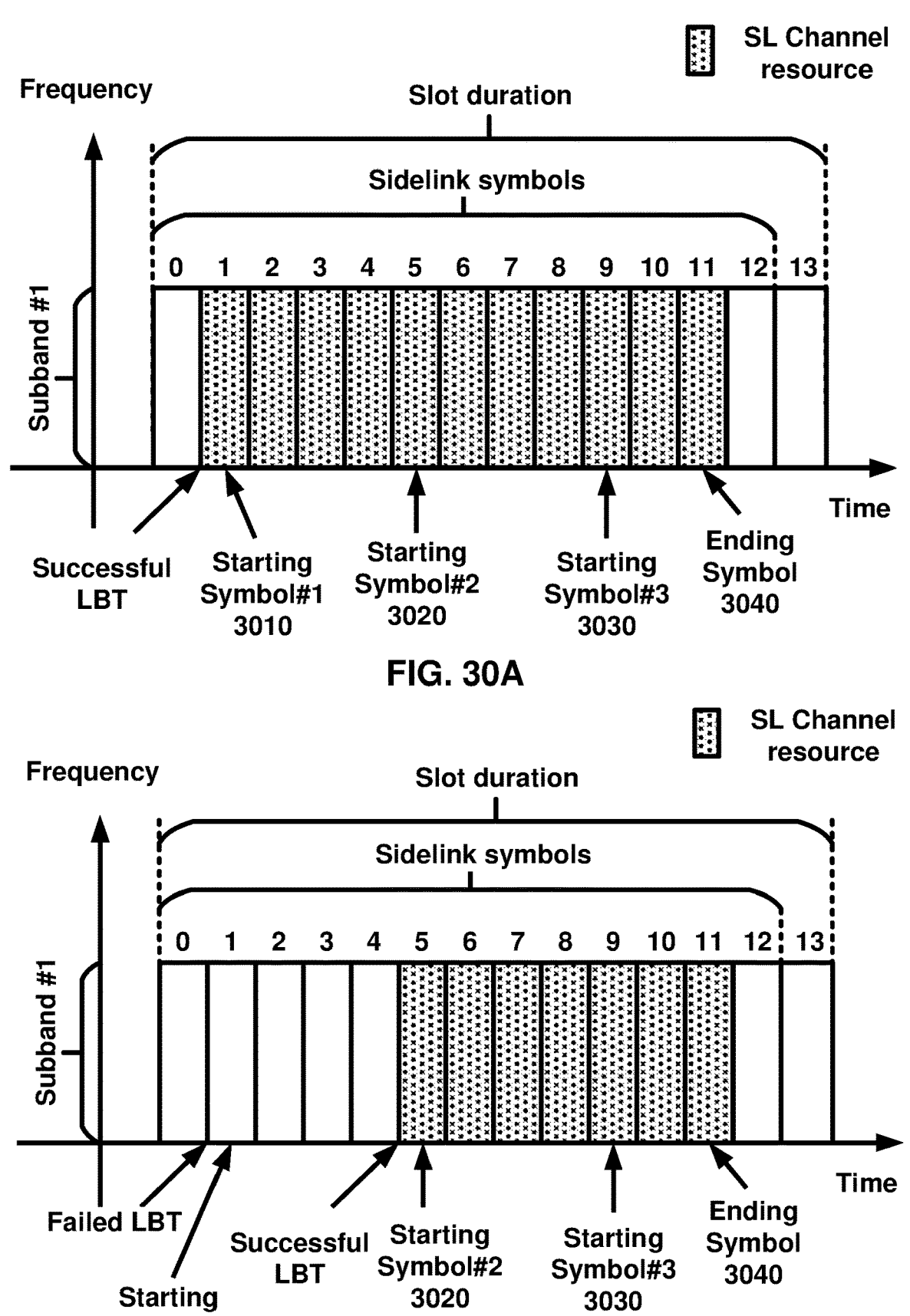
FIGS. 30A and 30B show examples of a sidelink channel resource determination based on multiple candidate starting points.

FIGS. 30A and 30B show examples of a sidelink channel resource determination based on multiple candidate starting points. As described with respect to FIG. 30A, the wireless device may determine a resource of a sidelink channel in a first frequency band (e.g., LBT subband #1) and a first slot. The sidelink channel resource may be within the sidelink symbols of the slot (e.g., symbol #0 to symbol #12 of the slot as described with respect to in FIGS. 30A and 30B). The sidelink channel may be a PSSCH, PSCCH, PSFCH, and/or PSBCH. The wireless device may determine multiple candidate starting symbols 3010, 3020, 3030 for the sidelink channel resource (e.g., starting symbol #1 3010 at symbol #1 of the slot, starting symbol #2 3020 at symbol #5 of the slot, and/or starting symbol #3 3030 at symbol #9 of the slot). Multiple starting symbols 3010, 3020, 3030 may be predefined, for example, for sidelink operation in a first unlicensed band. For example, an RRC parameter may indicate the multiple starting symbols 3010, 3020, 3030 of the sidelink channel within the slot. A first (e.g., earliest) starting symbol 3010 may be defined/(pre-)configured and/or determined by a wireless device for a sidelink channel in a slot, and the wireless device may determine the multiple candidate starting symbols 3010, 3020, 3030 based on one or more time offsets (e.g., symbol offsets). For example, the one or more time offsets may be predefined (e.g., 1 symbol, or 2 symbols, etc.). For example, the one or more time offsets may be indicated by RRC configuration. For example, the one or more time offsets may be equal. For example, the wireless device may determine a first candidate starting symbol by using a first time offset to a previous candidate starting symbol. The wireless device may determine an ending symbol 3040 for the sidelink channel (e.g., symbol #11). For example, the ending symbol 3040 may be fixed/single symbol.

The wireless device may determine time resources of the sidelink channel based on the multiple candidate starting symbols and/or one or more LBT procedures. For example, as described with respect to FIG. 30A, the wireless device may perform a first LBT for (e.g., at or prior to) a first candidate starting symbol (e.g., starting symbol #1 3010). The wireless device may determine the actual starting symbol of the sidelink channel resource based on the result of the first LBT. For example, the wireless device determines the starting symbol #1 3010 as the actual starting symbol of the sidelink channel resource, if the first LBT is successful. For example, the wireless device may determine the time resources of the sidelink channel resource in the slot to comprise consecutive symbols starting from the determined/actual starting symbol to the ending symbol 3040 (e.g., fixed). The time resources of the sidelink channel resource may comprise symbol #1 to symbol #11. The wireless device may notify the upper layers about the determined resource such that the sidelink HARQ entity may prepare a transport block (TB) and/or sidelink control information (SCI) and/or other signals and/or information for transmission via the determined sidelink channel resource.

As described with respect to FIG. 30B, the first LBT performed for the first candidate starting symbol (e.g., starting symbol #1 3010) may fail (e.g., indicate a busy channel). The wireless device may perform a second LBT for (e.g., at or prior to) a second candidate starting symbol (e.g., starting symbol #2 3020 at symbol #5 of the slot). The wireless device may determine the actual starting symbol of the sidelink channel resource based on the result of the first LBT and/or the second LBT. For example, the wireless device determines the starting symbol #2 3020 as the actual starting symbol of the sidelink channel resource, if the first LBT is failed and the second LBT is successful. For example, the wireless device may determine the time resources of the sidelink channel resource in the slot to comprise consecutive symbols starting from the determined/actual starting symbol to the ending symbol 3040 (e.g., fixed). For example, the time resources of the sidelink channel resource may comprise symbol #5 to symbol #11. The wireless device may notify the upper layers about the determined resource such that the sidelink HARQ entity may prepare a transport block (TB) and/or sidelink control information (SCI) and/or other signals and/or information for transmission via the determined sidelink channel resource.

Figures 31A, 31B:
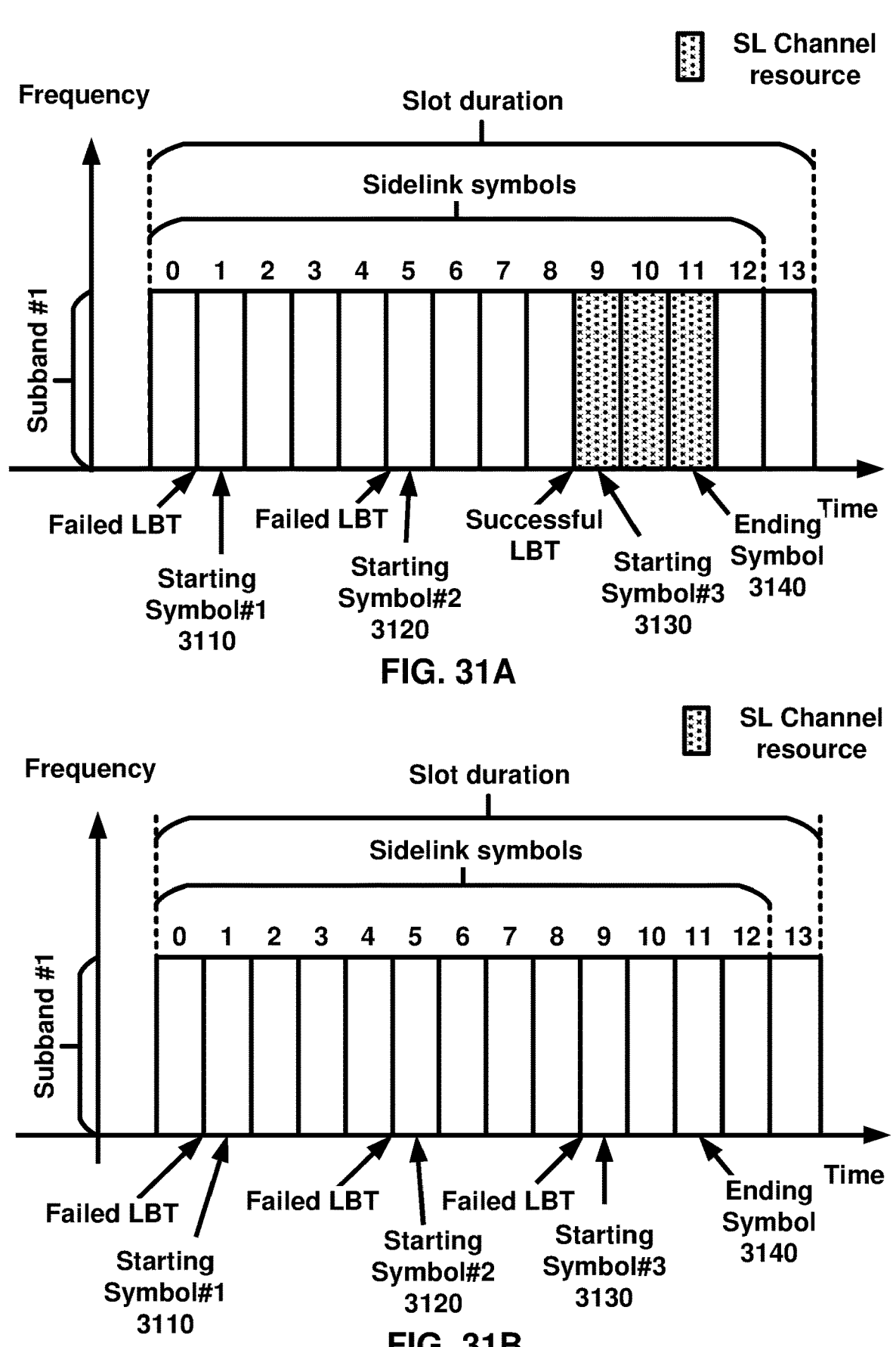
FIGS. 31A and 31B show examples of a sidelink channel resource determination based on multiple candidate starting points.

FIGS. 31A and 31B show examples of a sidelink channel resource determination based on multiple candidate starting points. As described with respect to FIG. 31A, the first LBT performed for the first candidate starting symbol (symbol #1 3110) and the second LBT performed for the second candidate starting symbol (symbol #5 3120) may fail (e.g., indicate a busy channel). The wireless device may perform a third LBT for (e.g., at or prior to) a third candidate starting symbol (e.g., starting symbol #3 3030 at symbol #9 of the slot). The wireless device may determine the actual starting symbol of the sidelink channel resource based on the result of the first LBT, the second LBT, and/or the third LBT. The wireless device may determine the starting symbol #3 3030 as the actual starting symbol of the sidelink channel resource, for example, if the first LBT is failed and the second LBT is failed and the third LBT is successful. The wireless device may determine the time resources of the sidelink channel resource in the slot to comprise consecutive symbols starting from the determined/actual starting symbol to the ending symbol 3140 (e.g., fixed). As described with respect to FIG. 31A, the time resources of the sidelink channel resource may comprise symbol #9 to symbol #11. The wireless device may notify the upper layers about the determined resource such that the sidelink HARQ entity may prepare a transport block (TB) and/or sidelink control information (SCI) and/or other signals and/or information for transmission via the determined sidelink channel resource.

As described with respect to FIG. 31B, the first LBT performed for the first candidate starting symbol 3110 (symbol #1) and the second LBT performed for the second candidate starting symbol 3120 (symbol #5) and the third LBT performed for the third candidate starting symbol 3130 (symbol #9) may fail (e.g., indicate a busy channel). The wireless device may not perform a fourth LBT as the wireless device may not be configured with a fourth starting symbol for the sidelink channel resource in the slot. The wireless device may determine that there is no resource available for transmission via the sidelink channel due to LBT failure. For example, all three chances that were provided/configured for the wireless device to acquire the unlicensed channel and perform the sidelink transmission may fail, such as in a busy channel condition. The multiple candidate starting symbols 3110, 3120, 3130 for a given sidelink channel resource/transmission may increase the likelihood of successful LBT at least by a factor of 2. The sidelink resource allocation may be still slot-based, for example, 1 sidelink channel resource of a given channel (e.g., PSSCH/PSCCH) per slot.

The wireless device may determine one of the candidate starting symbols as the actual starting symbol of a resource/transmission. The wireless device may determine a same ending symbol for the said resource/transmission. The ending symbol of the sidelink channel resource/transmission may not be fixed. For example, one or more ending symbols may be defined/(pre-)configured for the sidelink channel resource/transmission in the slot.

If multiple transmission opportunities (e.g., multiple starting symbols 3010, 3020, 3030 in a slot as described with respect to FIGS. 30A, 30B, 31A, and 31B) may be provided for a sidelink transmission (e.g., via PSSCH/PSCCH) following the existing sidelink technologies, there may be problems for the receiving wireless device to perform AGC training. For example, in the existing technologies, PSSCH transmission may be slot-based and starts at a second sidelink symbol of the slot (e.g., FIG. 19). Each PSSCH transmission may be associated with a PSCCH transmission, which may be sent (e.g., transmitted) from the first symbol allocated to the PSSCH (e.g., second sidelink symbol of the slot). The first sidelink symbol of the slot (e.g., immediately preceding the first PSSCH/PSCCH symbol) may be for AGC (e.g., AGC symbol or duplication). A receiving (Rx) wireless device may perform AGC training on the first sidelink symbol of a slot where a first stage SCI may be detected in the PSCCH. A transmitter wireless device may start the transmission on a symbol later than the second sidelink symbol of the slot based on the LBT result, for example, if multiple starting symbols may be provided for a sidelink transmission (e.g., PSSCH/PSCCH) in a slot in an unlicensed band. The receiver wireless device may be not aware of the LBT result at the receiver wireless device side. Thus, if the receiver wireless device performs AGC training on the first sidelink symbol of the slot as in existing technologies, then there may be no energy detected and/or may be a time gap between the AGC training and the start of the sidelink channel reception, which may result in inaccurate and/or inefficient receiver gain for receiving the sidelink transmission.

Figure 32:
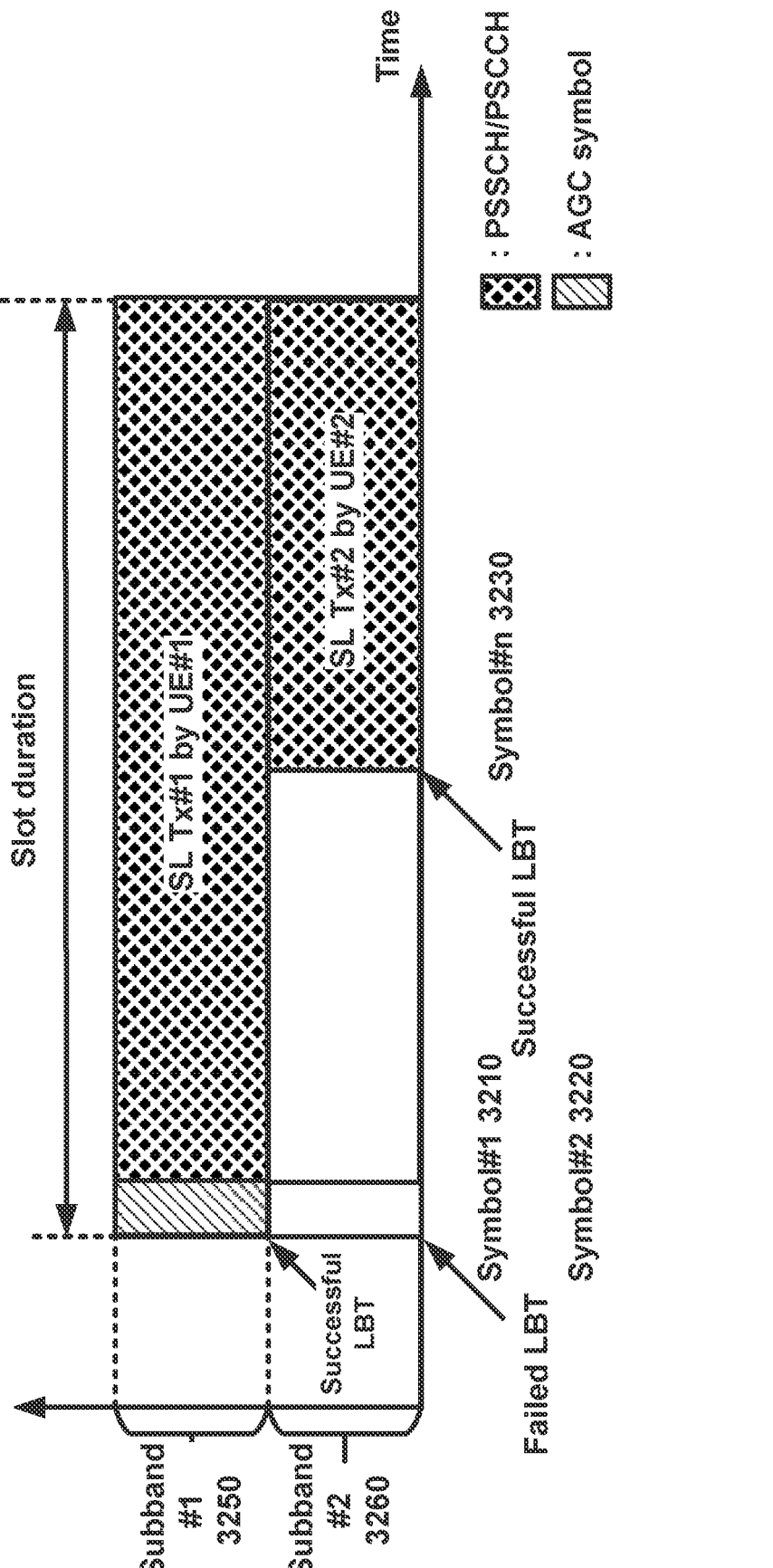
FIG. 32 shows an example AGC training based on multiple starting symbols provided for a sidelink channel in unlicensed spectrum.

FIG. 32 shows an example AGC training based on multiple starting symbols provided for a sidelink channel in unlicensed spectrum. For example, two (e.g., candidate) starting symbols may be configured/provided for a PSSCH/PSCCH transmission (symbol #2 3220 and symbol #n 3230) in a slot. For example, the two (e.g., candidate) starting symbols may be configured/provided for PSSCH/PSCCH transmission in all slots and/or all subchannels of a resource block. A first wireless device may determine a first sidelink transmission (SL Tx #1) in the slot. The first wireless device may determine a first PSSCH/PSCCH resource within the slot. The first PSSCH/PSCCH resource may comprise one or more PRBs and/or one or more subchannels of the resource pool. The one or more PRBs and/or one or more subchannels of the first PSSCH/PSCCH resource may be within a first subband (e.g., LTE subband #1 3250). The first wireless device may perform LBT corresponding to the first candidate starting symbol. For example, due to the AGC symbol preceding the first candidate starting symbol, the first wireless device may perform LBT for symbol #1 3210 in subband #1 3250. The LBT may be successful and the first wireless device may send (e.g., transmit) AGC in symbol #1 3210 and PSSCH/PSCCH in the following symbols of the slot. For example, the first PSSCH/PSCCH resource may start at symbol #2 3220 until the end of the slot. A second wireless device may determine a second sidelink transmission (SL Tx #2) in the slot. The second wireless device may determine a second PSSCH/PSCCH resource within the slot. The second PSSCH/PSCCH resource may comprise one or more PRBs and/or one or more subchannels of the resource pool. The one or more PRBs and/or one or more subchannels of the second PSSCH/PSCCH resource may be within a second subband (e.g., LTE subband #2 3260). The second wireless device may perform a first LBT corresponding to the first candidate starting symbol. For example, due to the AGC symbol preceding the first candidate starting symbol, the second wireless device may perform a first LBT for symbol #1 3210 in subband #2 3260. The first LBT may fail, and the second wireless device may perform a second LBT corresponding to the second candidate starting symbol (e.g., symbol #n 3230). The second LBT may be successful and the second wireless device may send (e.g., transmit) the second PSSCH/PSCCH in the following symbols of the slot. For example, the second PSSCH/PSCCH resource may start at symbol #n 3230 until the end of the slot. The second wireless device may not be able to send (e.g., transmit) an AGC symbol during symbol #1 3210, for example, due to LBT failure. If based on the existing technology, the corresponding receiving wireless device performs AGC training during/using symbol #1 3210, the resulting adjusted receiver gain may not be accurate for receiving the second sidelink transmission which starts in symbol #n of the slot, mainly because symbol #1 3210 dose not comprise any signal sent by the second wireless device representative of the energy sent (e.g., transmitted) by the second wireless device in symbol #1 3210. The receiving wireless device may not be able to successfully receive the second sidelink transmission.

In the unlicensed band, if the PSSCH starts on a symbol later than the second symbol of the slot due to LBT failure, based on the existing technologies, there may be a gap between the AGC symbol and the PSCCH during which the adjusted gain of the amplifiers may not be valid anymore due to the change in the received power across different subchannels of the resource pool/SL BWP with different starting points. As a result, the receiving/sensing wireless device may not be able to accurately set the amplifier gain and successfully receive the PSSCH/PSCCH. An AGC symbol may be a symbol before (e.g., immediately preceding) the actual starting symbol of a sidelink channel/transmission.

Figure 33A:
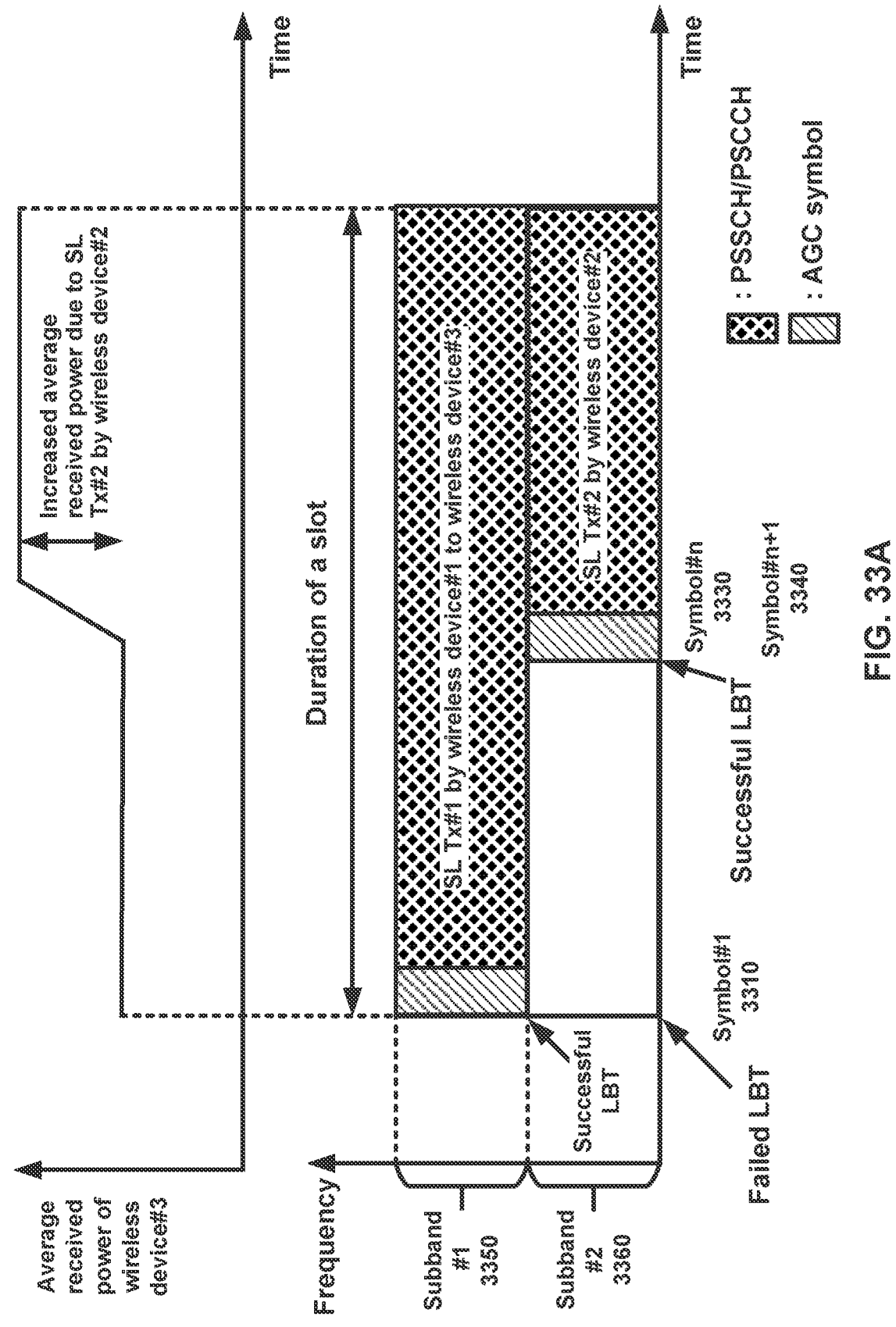
FIGS. 33A and 33B show an example AGC training based on multiple starting symbols provided for a sidelink channel in unlicensed spectrum.
Figure 33B:
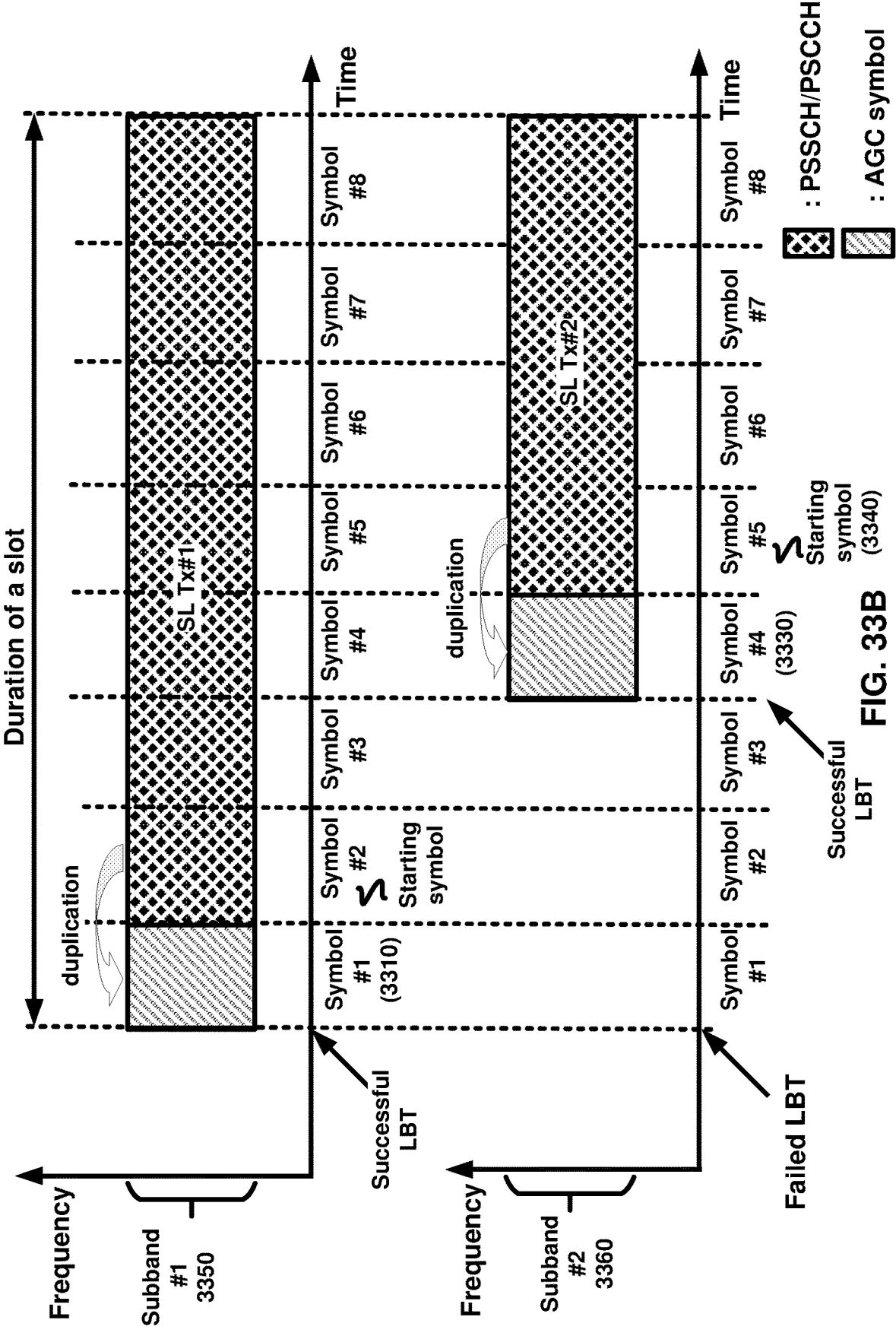

FIGS. 33A and 33B show an example AGC training based on multiple starting symbols provided for a sidelink channel in unlicensed spectrum. For example, two (e.g., candidate) starting symbols may be configured/provided for a PSSCH/PSCCH transmission (e.g., symbol #2 and symbol #n) in a slot. For example, the two (e.g., candidate) starting symbols may be configured/provided for PSSCH/PSCCH transmission in all slots and/or all subchannels of a resource block. For example, a first wireless device may determine a first sidelink transmission (SL Tx #1) in the slot. The first wireless device may determine a first PSSCH/PSCCH resource within the slot. The first PSSCH/PSCCH resource may comprise one or more PRBs and/or one or more subchannels of the resource pool. The one or more PRBs and/or one or more subchannels of the first PSSCH/PSCCH resource may be within a first subband (e.g., subband #1 3350). The first wireless device may perform LBT corresponding to the first candidate starting symbol. The first wireless device may perform LBT for symbol #1 3310 in subband #1 3350, for example, due to the AGC symbol preceding the first candidate starting symbol (e.g., a duplication of the first candidate starting symbol as an AGC symbol). The LBT may be successful and the first wireless device may send (e.g., transmit) AGC in symbol #1 3310 and PSSCH/PSCCH in the following symbols of the slot. For example, the first PSSCH/PSCCH resource may start at symbol #2 until the end of the slot. For example, a second wireless device may determine a second sidelink transmission (SL Tx #2) in the slot. The second wireless device may determine a second PSSCH/PSCCH resource within the slot. The second PSSCH/PSCCH resource may comprise one or more PRBs and/or one or more subchannels of the resource pool. The one or more PRBs and/or one or more subchannels of the second PSSCH/PSCCH resource may be within a second subband (e.g., subband #2 3360). The second wireless device may perform a first LBT corresponding to the first candidate starting symbol. The second wireless device may perform a first LBT for symbol #1 3310 in subband #2 3360, for example, due to the AGC symbol preceding the first candidate starting symbol. The first LBT may fail, and the second wireless device may perform a second LBT corresponding to the second candidate starting symbol (e.g., symbol #n+1 in FIG. 33A or symbol #5 in FIG. 33B (3340)). An AGC symbol may be located (e.g., at 3330) immediately before/preceding the actual starting symbol of a sidelink channel resource. The second wireless device may perform the second LBT for symbol #n in FIG. 33A or symbol #4 in FIG. 33B (3330) in subband #2 3360, for example, due to the AGC symbol preceding second candidate starting symbol. The second LBT may be successful and the second wireless device may send (e.g., transmit) the AGC in symbol #n 3330 and the second PSSCH/PSCCH transmission in the following symbols of the slot.

A plurality of wireless devices may send (e.g., transmit) an AGC symbol (e.g., a duplicate symbol) at different time periods, for example, based on LBT results that may be successful for respective wireless devices at respectively different time periods. For example, as described with respect to FIG. 33B, a first wireless device may send (e.g., transmit) an AGC symbol (e.g., Symbol #1), which may be a duplicate symbol of a first symbol (e.g., Symbol #2) of a sidelink channel (e.g., SL Tx #1), and/or a second wireless device may send (e.g., transmit) an AGC symbol (e.g., Symbol #4), which may be a duplicate symbol of a first symbol (e.g., Symbol #5) of a sidelink channel (e.g., SL Tx #2). AGC performed by a receiver wireless device for a first sidelink transmission (e.g., having a first power level) may be inaccurate, for example, if one or more second sidelink transmissions starting from different starting symbols are sent (e.g., transmitted) overlapping in time with the first sidelink transmission (e.g., having a collective power level exceeding the first power level). For example, an AGC may a third wireless device (e.g., wireless device #3) may be a receiver wireless device of the first sidelink transmission (e.g., SL Tx #1) as described with respect to FIG. 33A. The third wireless device may detect the 1$^{st}$ stage SCI in the PSCCH resource of the slot in the corresponding PRB(s)/subchannel(s) in subband #1 3350. The third wireless device may perform AGC training based on/using/during the earliest sidelink OFDM symbol of the slot (e.g., symbol #1 3310). The third wireless device may tune/adjust the amplifier gain based on the average received power or energy received in symbol #1 3310. The third wireless device may receive the first PSSCH comprising the first sidelink transmission (SL Tx #1) based on the tuned/adjusted gain. The second wireless device may start the second sidelink transmission (e.g., SL Tx #2) based on the second starting symbol of the slot in subband #2 3360, for example, later in the slot.

Subband #1 3350 and subband #2 3360 may correspond to different LBT channels and/or result in different LBT results. The averaged received power by the third wireless device may increase later in the slot (from symbol #n 3330 and/or symbol #n+1 3340), for example, due to the second sidelink transmission. The AGC training, which may be performed before the analog to digital conversion, may be performed across the entire bandwidth of the resource pool, sidelink BWP, and/or sidelink carrier (e.g., based on a range of the frequencies that the receiver wireless devices RF unit may cover/support at a given time), for example, even though the first sidelink transmission and the second sidelink transmission may be in different and/or disjointed frequencies/PRBs/subchannels/subbands. The second sidelink transmission starting later in the slot in the second subchannel/subband (e.g., subband #2 3360) may result in an increase of the average received power by the third wireless device in the first subband/subchannel, as described with respect to FIG. 33A. The third wireless device may not have a chance to retune/re-adjust the amplifier gain using another AGC training later in the slot, based on at least some wireless communications. The amplifier gain may not be adjusted based on the increased/fluctuated received power/energy, and the third wireless device may not be able to efficiently and/or accurately receive the entire PSSCH, for example, due to the inaccurate range set by the amplifier gain. The current gain set by the AGC training performed at the beginning of the slot may have expired, for example, due to another transmission started later in the slot. There may be a need for a solution for the AGC symbol transmission associated with a sidelink channel that may be configured with multiple starting symbols (e.g., due to LBT failure in unlicensed spectrum), for example, for enabling successful reception and/or demodulation of sidelink transmissions based on accurate gain control.

If a first sidelink transmission starts in a later symbol in a first subchannel of the resource pool/carrier/BWP (e.g., with starting symbol later than the first sidelink symbol of the slot), the receiver wireless device that may be receiving another sidelink transmission started at the beginning of the slot in another subchannel of the resource pool/carrier/BWP, which may have performed AGC at the beginning of the slot, may not have an accurate gain for the amplifier, for example, because of the jump in the received average power due to the first sidelink transmission. There may be a need for a chance for the receiver wireless device to update the AGC training later in the slot, which is missing in the existing technology. The present disclosure may propose solutions for an accurate gain control and AGC training in unlicensed bands, for example, if multiple starting symbols may be configured/provided for enhanced transmission opportunities.

A sidelink transmission may comprise a duplicate of a starting symbol in a slot (e.g., in a first symbol in a slot). For example, as described with respect to FIG. 33B, an AGC symbol (e.g., Symbol #1) may be a duplicate of a starting symbol (e.g., Symbol #2) in a slot (e.g., Symbol #1 to Symbol #8), and/or an AGC symbol (e.g., Symbol #4) may be a duplicate of a first symbol (e.g., Symbol #5) in a slot (e.g., Symbol #1 to Symbol #8). The duplicate symbol may be used by the receiver wireless device for AGC. The sidelink transmission in the slot (e.g., via PSSCH/PSCCH) may comprise one or more (e.g., multiple) AGC symbols. For example, a first symbol of the sidelink symbols of the slot and/or a second symbol of the sidelink symbols of the slot may be used for AGC. Each of the multiple (two or more) AGC symbols may correspond to a candidate starting point/symbol of the sidelink transmission. Each of the multiple AGC symbols may (e.g., immediately) precede one of the candidate starting symbols of the PSSCH/PSCCH transmission within the slot. A number/quantity of the one or more AGC symbols of the sidelink channel in the slot may be based on (e.g., may be equal to) a number of the candidate starting symbols of the sidelink channel in the slot. A transmitter wireless device may duplicate resource elements of one or more symbols of the sidelink transmission (e.g., PSSCH and/or PSCCH), associated with the candidate starting symbols, into preceding (e.g., immediately preceding) symbols (e.g., for AGC training purposes). AGC may be improved by duplicating a symbol for AGC for each instance that a sidelink transmission may overlap in time with the beginning of another sidelink transmission. For example, the first sidelink transmission may comprise a first duplicated symbol for AGC at the beginning of the first sidelink transmission during a symbol that may not overlap with another sidelink transmission, and the first sidelink transmission may comprise a second duplicated symbol for AGC during a later symbol that may overlap with the beginning of a second sidelink transmission. The receiver wireless device may update AGC for each sidelink transmission based on an overlap in time with one or more other sidelink transmissions, which may result in improved accuracy of AGC. The receiver wireless device may perform AGC training multiple times in a slot. The receiver wireless device may perform AGC training in one or more symbols preceding (e.g., immediately preceding) the candidate starting symbols configured for a sidelink transmission/channel (e.g., PSSCH/PSCCH) within a slot across the resource pool and/or sidelink BWP. The AGC training and reception/demodulation performance in the sidelink may be improved, and/or multiple starting point/symbols per sidelink transmission in a slot may be enabled.

A sidelink channel (e.g., PSSCH/PSCCH) may be configured with multiple (e.g., two or more) starting points/symbols. For example, a wireless device may determine multiple candidate starting symbols for a sidelink transmission via the sidelink channel in a slot. The wireless device may determine multiple (e.g., two or more) AGC symbols associated with the sidelink transmission via the sidelink channel. For example, for each candidate starting symbol in the slot, the transmitter and/or receiver wireless device may determine a corresponding AGC symbol. The corresponding AGC symbol may be (e.g., immediately) preceding a corresponding candidate starting symbol. For each of the multiple candidate starting symbols of the sidelink channel, resource elements of the candidate starting symbol may be duplicated in the (e.g., immediately) preceding symbol (e.g., the corresponding AGC symbol). Multi-AGC sidelink transmission may be enabled, for example, for enhanced operation in unlicensed/shared spectrum with multiple transmission opportunities.

FIGS. 34A and 34B show an example of a multi-AGC sidelink transmission. As described with respect to FIG. 34A, a wireless device (e.g., wireless device #1 3410 and/or wireless device #2 3420) may receive (e.g., from a base station 3430) configuration parameters of a sidelink carrier. The sidelink carrier may be in an unlicensed band and/or shared spectrum. The configuration parameters may indicate a sidelink BWP (e.g., associated with a first subcarrier spacing and/or numerology). The configuration parameters may indicate one or more sidelink resource pools of/in the sidelink BWP. For example, bandwidth of the sidelink BWP may comprise and/or overlap with bandwidth of the one or more resource pools. A resource pool may comprise slots that may be determined based on the subcarrier spacing/ numerology of the sidelink BWP, and/or subchannel(s) comprising one or more PRBs that may be determined based on the subcarrier spacing/numerology of the sidelink BWP.

The configuration parameters of the resource pool may indicate one or more sidelink symbols per slot for one or more sidelink transmissions. The wireless device may determine the one or more sidelink symbols of the slot based on one or more configuration parameters (e.g., a first/earliest sidelink symbol indicated by startSLsymbols and a number of consecutive sidelink symbols indicated by lengthSLsymbols).

The configuration parameters of the resource pool may indicate time and/or frequency resources of a sidelink channel (e.g., PSSCH, PSCCH, PSFCH, and/or PSBCH). The wireless device may determine, for a sidelink transmission via the sidelink channel, a resource of the channel (e.g., a sidelink channel resource), based on the configuration parameters and/or one or more criteria. The sidelink channel resource may comprise one or more (e.g., contiguous/consecutive) PRBs and/or one or more (e.g., contiguous/consecutive) subchannels of the resource pool in the frequency domain. The sidelink channel resource may comprise one or more (e.g., contiguous/consecutive) symbols of one or more (e.g., contiguous/consecutive) slots of the resource pool in the time domain.

The wireless device may determine a first resource for sending (e.g., transmitting)/receiving a TB via a PSSCH in a slot of a first resource pool. The first resource may comprise a subset, for example, one or more (e.g., consecutive) sidelink symbols of the slot. The wireless device may determine the one or more sidelink symbols for the resource, based on one or more starting symbols of PSSCH. For example, one or more candidate starting symbols may be defined/(pre-)configured for a PSSCH transmission/reception in a slot. As described with respect to FIGS. 30A, 30B, 31A, and 31B, for example, symbol #1 and symbol #5 and symbol #9 of the slot may be pre-defined/(pre-)configured for PSSCH transmission/reception. The configuration parameters of the resource pool and/or sidelink BWP may indicate the one or more candidate starting symbols of PSSCH. For example, the wireless device may determine the one or more candidate starting symbols for a PSSCH transmission/reception in any slot and/or subchannel of the resource pool. The multiple candidate starting symbols may increase a likelihood of LBT success for the PSSCH transmission in unlicensed/shared spectrum.

The wireless device (e.g., wireless device #1 3410 and/or wireless device #2 3420 in FIG. 34A) may receive one or more messages (e.g., RRC messages) indicating multiple (e.g., candidate) starting symbols for PSSCH transmission in a slot. The multiple starting symbols may be associated with a single/same TB. The multiple starting symbols may be associated with a single/same sidelink transmission. The multiple starting symbols may be associated with a single/same time resource. The multiple starting symbols may be associated with a single/same sidelink channel occasion. The multiple starting symbols may be associated with a single/same sidelink channel occasion. The multiple starting symbols may be associated with a single/same PSSCH transmission. The multiple starting symbols may be associated with a single/same PSCCH transmission. The multiple starting symbols may be associated with a single/same PSFCH transmission. The multiple starting symbols may be associated with a single/same PSBCH transmission. The multiple starting symbols may be associated with a single/same/fixed ending symbol of the sidelink transmission/ resource/channel/occasion. For example, the ending symbol may be predefined/(pre-)configured.

The wireless device may determine one or more AGC/duplicated symbols corresponding to the sidelink transmission, based on (e.g., in response to) being provided/configured with one or more starting symbols for a sidelink transmission via a sidelink channel. The wireless device may determine multiple AGC/duplicated symbols corresponding to the sidelink transmission, based on (e.g., in response to) being provided/configured with multiple starting symbols for a sidelink transmission via a sidelink channel.

A transmitter wireless device may send (e.g., transmit) sidelink transmission (e.g., TB and/or SCI) via the sidelink channel with the multiple AGC/duplicated symbols, for example, if the sidelink channel may comprise/be configured with multiple (e.g., candidate) starting symbols. The sidelink transmission may comprise multiple AGC/duplicated symbols. The sidelink transmission may be associated with multiple AGC/duplicated symbols. A receiver wireless device may receive the sidelink transmission (e.g., TB and/or SCI) via the sidelink channel with the multiple AGC/duplicated symbols, for example, if the sidelink channel may comprise/be configured with multiple (e.g., candidate) starting symbols. The receiver wireless device may perform AGC training one or more times within the reception period of the sidelink transmission, based on the multiple AGC/duplicated symbols.

As described with respect to FIG. 34B, for a sidelink transmission (e.g., SL Tx #1), the wireless device may determine four starting symbols of a PSSCH/PSCCH occasion in a slot. Correspondingly, the wireless device may determine four AGC symbols associated with the PSSCH/PSCCH occasion. For example, a first AGC symbol may be before/immediately preceding a first starting symbol. For example, the first AGC symbol may comprise one or more resource elements (REs) of the first starting symbol. For example, a second AGC symbol may be before/immediately preceding a second starting symbol. For example, the second AGC symbol may comprise one or more resource elements (REs) of the second starting symbol, and so on. The wireless device may determine the multiple starting symbols based on one or more allowed Start and Length Indicator Values (SLIVs) configured for the PSSCH of the resource pool.

Figure 35C:
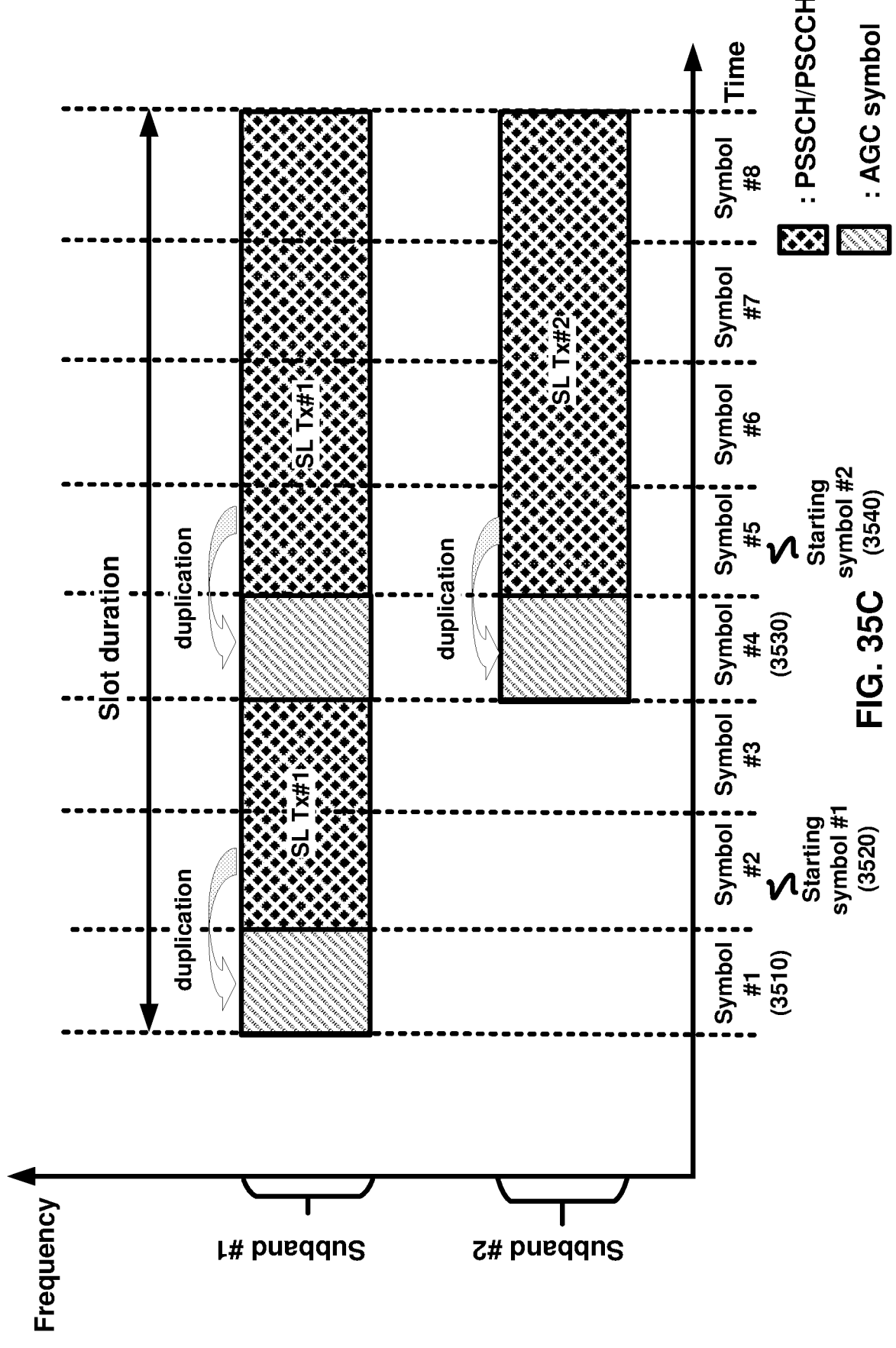

FIGS. 35A, 35B, and 35C show examples of sidelink transmission according to multi-AGC configuration. For example, a wireless device may determine two candidate starting points/symbols (e.g., symbol #2 3520 and/or symbol #n+1 3540) for a sidelink transmission (e.g., TB and/or SCI transmission via PSSCH/PSCCH) in a slot. For example, the wireless device may determine a first (e.g., candidate) PSSCH resource/grant starting from a first starting symbol (e.g., symbol #2 3520), as described with respect to FIG. 35A, and/or a second (e.g., candidate) PSSCH resource/grant starting from a second starting symbol (e.g., symbol #n+1 3540), as described with respect to FIG. 35B. The first PSSCH resource and/or the second PSSCH resource may end at/in/by the same ending symbol. For example, the first PSSCH resource and the second PSSCH resource may have different length/size. The wireless device may determine a first AGC symbol for/corresponding to the first starting symbol and/or a second AGC symbol for/corresponding to the second starting symbol. For example, the symbol #1 3510 may comprise duplication of the first starting symbol (symbol #2 3520), and/or symbol #n 3530 may comprise duplication of the second starting symbol (symbol #n+1 3540).

As described with respect to FIG. 35A, the wireless device may perform a first LBT for/prior to the first/earliest starting symbol and its corresponding AGC symbol (e.g., prior to symbol #1 3510). The wireless device may determine the actual PSSCH resource/grant based on the result of the first LBT. The wireless device may determine to use the first (e.g., candidate) PSSCH resource/grant for the sidelink transmission, for example, if the first LBT may be successful as described with respect to FIG. 35A. The first PSSCH resource/grant may start from the first candidate starting symbol and may exclude the following (e.g., second) AGC symbols. For example, the wireless device may not map the TB and/or SCI to the REs of the one or more AGC symbols. The wireless device may duplicate REs of each candidate starting symbol to the corresponding AGC symbol (e.g., immediately preceding symbol). The wireless device may duplicate symbol #2 3520 in symbol #1 3510 and symbol #n+1 3540 in symbol #n 3530, respectively, for example, if the first LBT is successful. For example, as described with respect to FIG. 35C, the wireless device may send (e.g., transmit) the sidelink transmission (e.g., SL Tx #1) with the multiple AGC/duplicated symbols (e.g., Symbol #1 (3510) and/or Symbol #4 (3530)). The receiving wireless device may be able to redo the AGC training (e.g., Symbol #4 (3530)) and readjust the amplifier gain with regards to sidelink transmissions on other subchannels of the resource pool which may potentially start later in the slot (e.g., at Symbol #4 (3530)), for example, due to LBT failure.

The wireless device may perform a second LBT for/prior to the second/next starting symbol and its corresponding AGC symbol (e.g., prior to symbol #n in FIG. 35B and/or prior to symbol #4 (3530) in FIG. 35C), for example, if the first LBT may be failed as described with respect to FIG. 35B. The wireless device may determine to use the second (e.g., candidate) PSSCH resource/grant for the sidelink transmission, for example, if the second LBT may be successful as described with respect to FIG. 35B. The second PSSCH resource/grant may start from the second candidate starting symbol. The wireless device may duplicate REs of each candidate starting symbol to the corresponding AGC symbol (e.g., immediately preceding symbol). For example, the wireless device may duplicate symbol #n+1 in symbol #n in FIG. 35B. The wireless device may duplicate symbol #5 (3540) in symbol #4 (3530) in FIG. 35C. The wireless device may send (e.g., transmit) the sidelink transmission with the associated AGC/duplicated symbol. The receiving wireless device may be able to perform AGC training, for example, despite the reception starting in the middle of the slot. The wireless device may not send (e.g., transmit) the sidelink transmission in this slot, for example, if the second LBT may also fail.

Multiple AGC symbols may be predefined/(pre-)configured for a sidelink channels. For example, the wireless device may determine that symbol #1 3510 and symbol #n 3530 are AGC symbols as described with respect to FIGS. 35A and 35B. For example, RRC parameter(s) may indicate the multiple AGC symbols within the slot. The wireless device may determine multiple candidate starting positions for a sidelink channel based on the multiple AGC symbols. For example, for each AGC symbol, a next/immediately succeeding symbol may be a candidate starting symbol of the sidelink channel. The wireless device may perform LBT for/at/prior to the AGC symbol preceding the candidate starting symbol. The wireless device may send (e.g., transmit) the sidelink transmission from the starting symbol and/or may send (e.g., transmit) the duplication of the starting symbol in the corresponding AGC symbol, for example, LBT may be successful. The wireless device may not send (e.g., transmit) the sidelink transmission (e.g., the TB/SCI) to one or more REs of the one or more AGC symbols, for example, if there may be one or more AGC symbol in the remainder of the slot (e.g., after the starting symbol). The wireless device may send (e.g., transmit) duplication of OFDM symbols, for example, after/immediately succeeding the AGC symbol in/via the AGC symbol.

Figure 36:
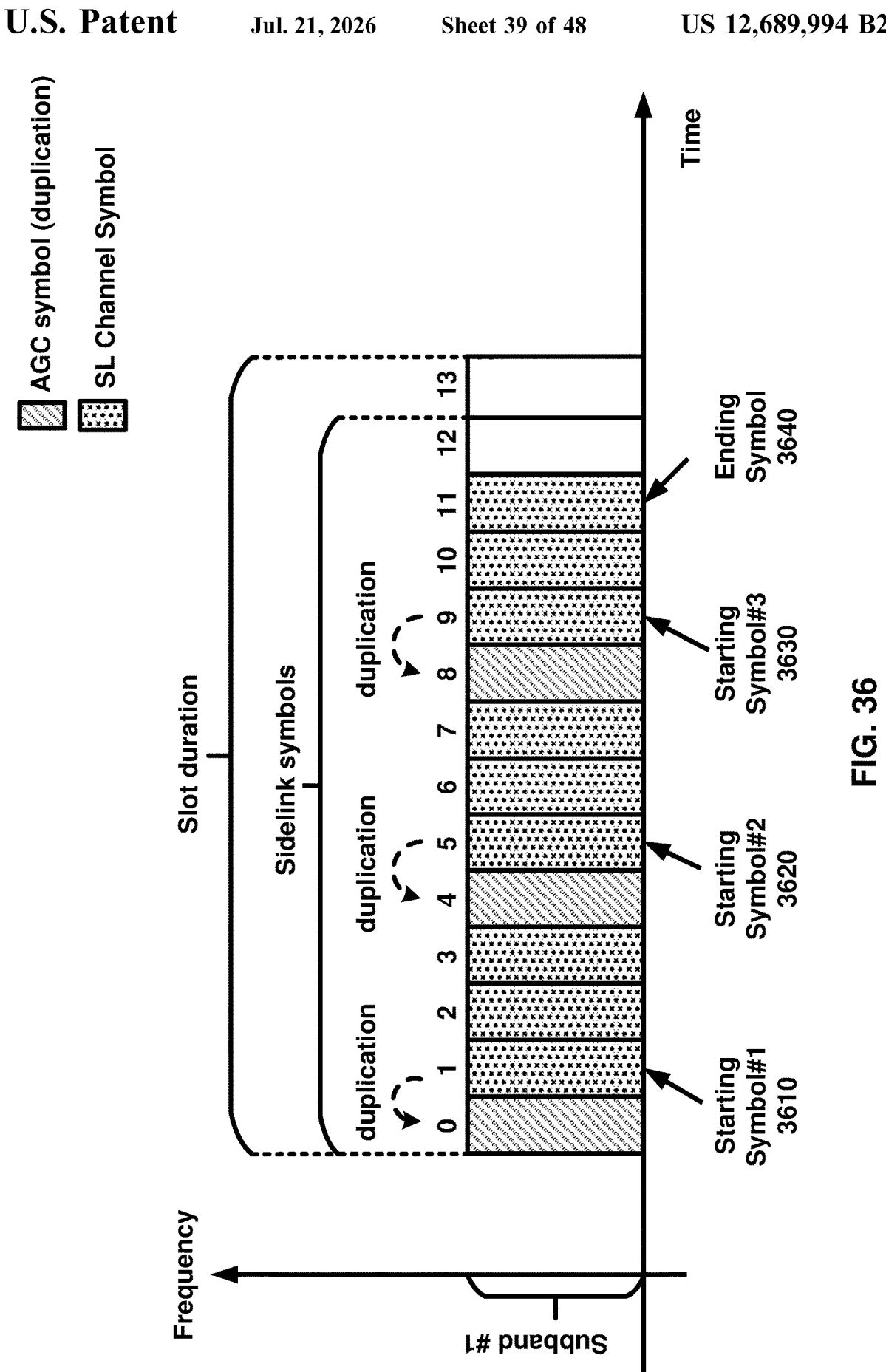
FIG. 36 shows an example multi-AGC sidelink transmission.

FIG. 36 shows an example multi-AGC sidelink transmission. The wireless device may receive configuration parameters of a sidelink BWP. The configuration parameters may indicate a plurality of symbols for sidelink transmission in a slot (e.g., the sidelink symbols comprising symbol #0, symbol #1, symbol #12 of the slot as described with respect to FIG. 36). The configuration parameters may indicate a sidelink resource pool of the sidelink BWP. For example, the slot may be associated with the sidelink BWP and/or a resource pool of the BWP. The configuration parameters may configure a sidelink channel and/or indicate resources/occasions for the sidelink channels in the slot. The sidelink channel may be PSSCH and/or PSCCH. The resources/occasions of the sidelink channel may comprise one or more symbols of the sidelink symbols of the slot.

The configuration parameters may indicate (e.g., via a bitmap and/or one or more symbols offsets) two or more (e.g., candidate) starting symbols for/of the sidelink channel. For example, the wireless device may determine the two or more (e.g., candidate) starting symbols for a resource/grant/occasion of the sidelink channel. The wireless device may send (e.g., transmit) a TB and/or SCI via the sidelink resource/grant/occasion. The symbols of the sidelink resource/grant/occasion may start from one of the two or more (e.g., candidate) starting symbols. For example, the wireless device may determine a starting symbol of the sidelink resource/grant/occasion based on one or more LBT results/procedures. For example, the starting symbol may be an earliest candidate starting symbol for/prior to which the wireless device performs a successful LBT.

For each of the two or more (e.g., candidate) starting symbols, the wireless device may consider/assume a corresponding AGC/duplicated symbol (e.g., before/immediately preceding the (e.g., candidate) starting symbol). The sidelink symbols may comprise two or more AGC/duplicated symbols. For example, three starting symbols may be provided/configured for the sidelink channel (e.g., starting symbol #1 3610 in symbol #1 of the slot, starting symbol #2 3620 in symbol #5 of the slot, and starting symbol #3 3630 in symbol #9 of the slot). The wireless device may determine AGC/duplicated symbols in symbol #0 and symbol #4 and symbol #8 of the slot.

A number/quantity of the duplicated symbols may be given by (e.g., equal to) the number of the two or more (e.g., candidate) starting symbols. The wireless device may duplicate one or more REs of the (e.g., candidate) starting symbols into the corresponding AGC/preceding symbol. For example, the wireless device may duplicate one or more REs of symbol #1 into symbol #0. The wireless device may duplicate one or more REs of symbol #5 into symbol #4. The wireless device may duplicate one or more REs of symbol #9 into symbol #8. The wireless device may determine symbol #0 and symbol #4 and symbol #8 as AGC/duplicated symbols.

The wireless device may not map the TB and/or the SCI to the two or more AGC symbols. For example, the sidelink channel may exclude the two or more AGC symbols. For example, the sidelink resource/grant/occasion may exclude the two or more AGC symbols. For example, the symbols of the resource/grant/occasion of the sidelink channel (e.g., the PSSCH/PSCCH resource) may not comprise the two or more AGC symbols. For example, the symbols of the sidelink resource/grant/occasion may be discontinuous.

The symbols of the sidelink resource/grant/occasion may or may not comprise one or more consecutive symbols, starting from the determined starting symbol, and ending at a second/ending symbol. For example, the symbols of the sidelink resource/grant/occasion may have a fixed ending symbol (e.g., symbol #11 as described with respect to FIG. 36), for example, despite the two or more candidate starting symbol. The configuration parameters may indicate two or more ending symbols for the sidelink resource/grant/occasion. For example, an ending symbol may correspond to one or more of the candidate starting symbols.

The wireless device may perform a CAT1 LBT (e.g., no LBT), a successful CAT2 LBT (e.g., short LBT), a CAT3 LBT (e.g., LBT with random back-off with a contention window of fixed size), and/or a CAT4 LBT (e.g., long LBT) for/prior to one or more symbols of the candidate two or more starting symbols. The wireless device may perform LBT prior to at least one of the two or more AGC/duplicated symbols corresponding to the two or more (e.g., candidate) starting symbols. For example, as described with respect to FIG. 36, the LBT at/prior to symbol #0 may be successful. The wireless device may determine a starting symbol of the sidelink resource/grant/occasion based on the performed LBT(s). The wireless device may determine the symbols of the sidelink resource/grant/occasion based on the determined/selected starting symbol and the ending symbol. For example, as described with respect to FIG. 36, the wireless device may determine the following symbols for the sidelink resource/grant/occasion such as symbol #1,2,3,5,6,7,9,10, 11.

The wireless device may start the sidelink transmission via the determined symbols of the sidelink resource/grant/occasion. The wireless device may determine to send (e.g., transmit) data (e.g., a transport block), control information (e.g., SCI), and/or a signal via the sidelink channel in the slot. For example, the wireless device may generate a TB based on a number of the resource elements of the symbols of the sidelink resource/grant/occasion.

The symbols of the sidelink resource/grant/occasion may comprise consecutive sidelink symbols starting from the selected/determined starting symbol of the two or more (e.g., candidate) starting symbols, for example, based on a successful LBT at/for/prior to the selected/determined starting symbol. The symbols of the sidelink resource/grant/occasion may comprise the one or more following AGC symbols. The wireless device may map the TB and/or the SCI to the two or more AGC symbols. The sidelink channel may include/comprise the one or more AGC symbols, for example, after the starting symbol of the sidelink channel/transmission. The wireless device may puncture one or more REs of the one or more following AGC symbols, and/or duplicate one or more REs of the immediately next symbol into the one or more punctured REs of the AGC symbol. The wireless device may perform rate-matching for mapping to the TB/SCI to the sidelink resource excluding the one or more REs of the one or more following AGC symbols. For example, as described with respect to FIG. 36, the wireless device may determine the following symbols for the sidelink resource/grant/occasion such as symbol #1,2,3,4,5,6,7,8,9, 10,11. The wireless device may duplicate one or more REs of symbol #1 into symbol #0, one or more REs of symbol #5 into symbol #4, and/or one or more REs of symbol #9 into symbol #8, for example, using puncturing and/or rate-matching.

The wireless device may send (e.g., transmit) the TB and/or SCI via the symbols of the sidelink channel/resource/grant/occasion. The wireless device may send (e.g., transmit) the duplicated REs/signal/information via the one or more AGC symbols. The wireless device may send (e.g., transmit) the TB and/or SCI and the duplicated REs/symbols via/on the sidelink symbols of the slot.

Figure 37:
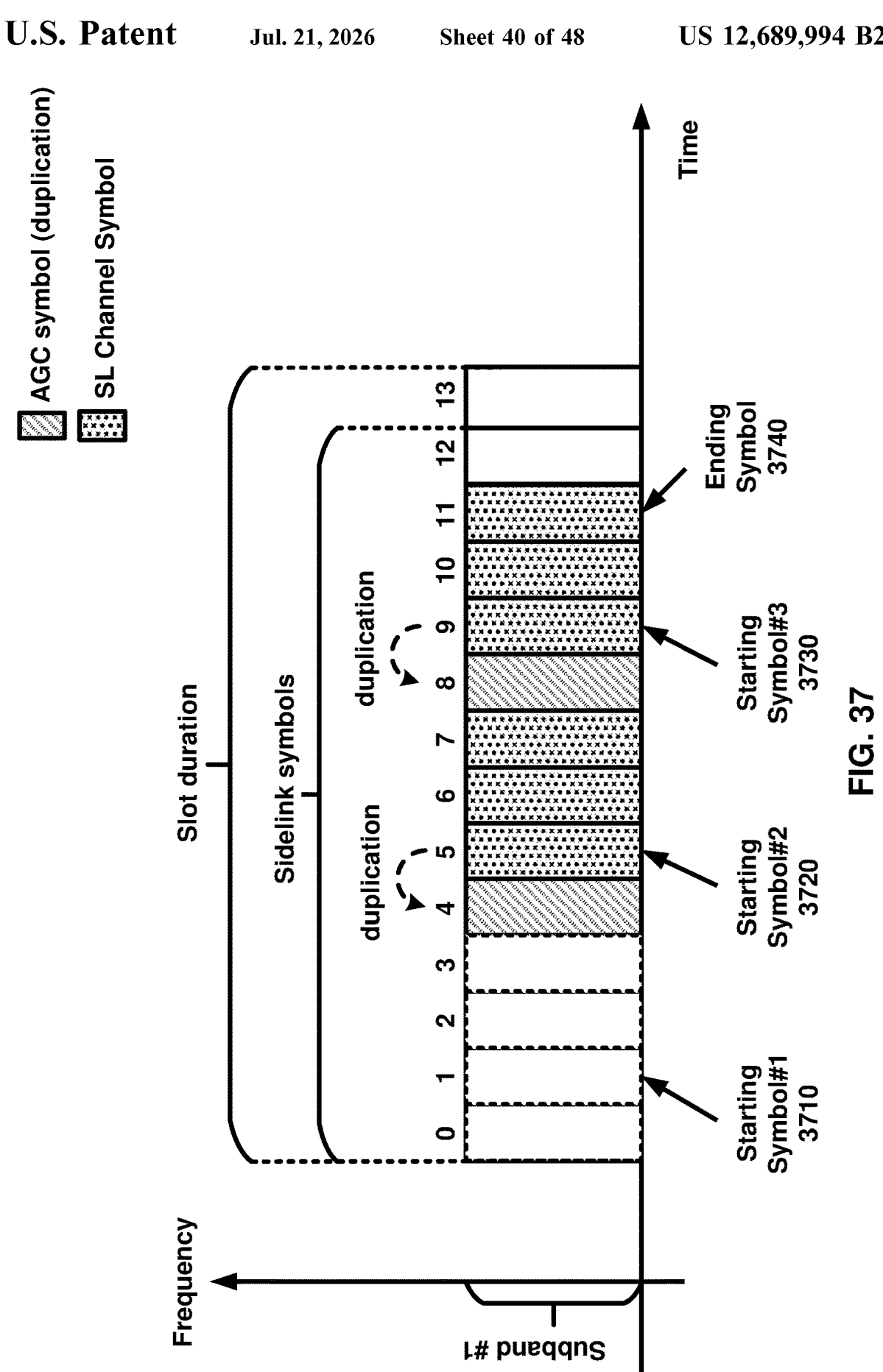
FIG. 37 shows an example multi-AGC sidelink transmission.

FIG. 37 shows an example multi-AGC sidelink transmission. The configuration parameter may be similar to the example of FIG. 36. The wireless device may perform a first LBT at/prior to symbol #0. The first LBT may fail. The wireless device may perform a second LBT at/prior to the next/second AGC symbol of the sidelink resource/channel/grant/occasion (e.g., symbol #4). The second LBT may be successful. The wireless device may determine the starting symbol of the sidelink resource/channel/grant/occasion based on the second LBT (e.g., symbol #5). The wireless device may determine the symbols of the sidelink resource/channel/grant/occasion to start from a symbol immediately after the second AGC symbol (e.g., symbol #5). The symbols of the sidelink resource/channel/grant/occasion may or may not comprise the next/third AGC symbol (e.g., symbol #8).

The wireless device may start the sidelink transmission via the determined symbols of the sidelink resource/grant/occasion. The wireless device may determine to send (e.g., transmit) data (e.g., a transport block), control information (e.g., SCI), and/or a signal via the sidelink channel in the slot. For example, the wireless device may generate a TB based on a number of the resource elements of the determined symbols of the sidelink resource/grant/occasion.

Figure 38:
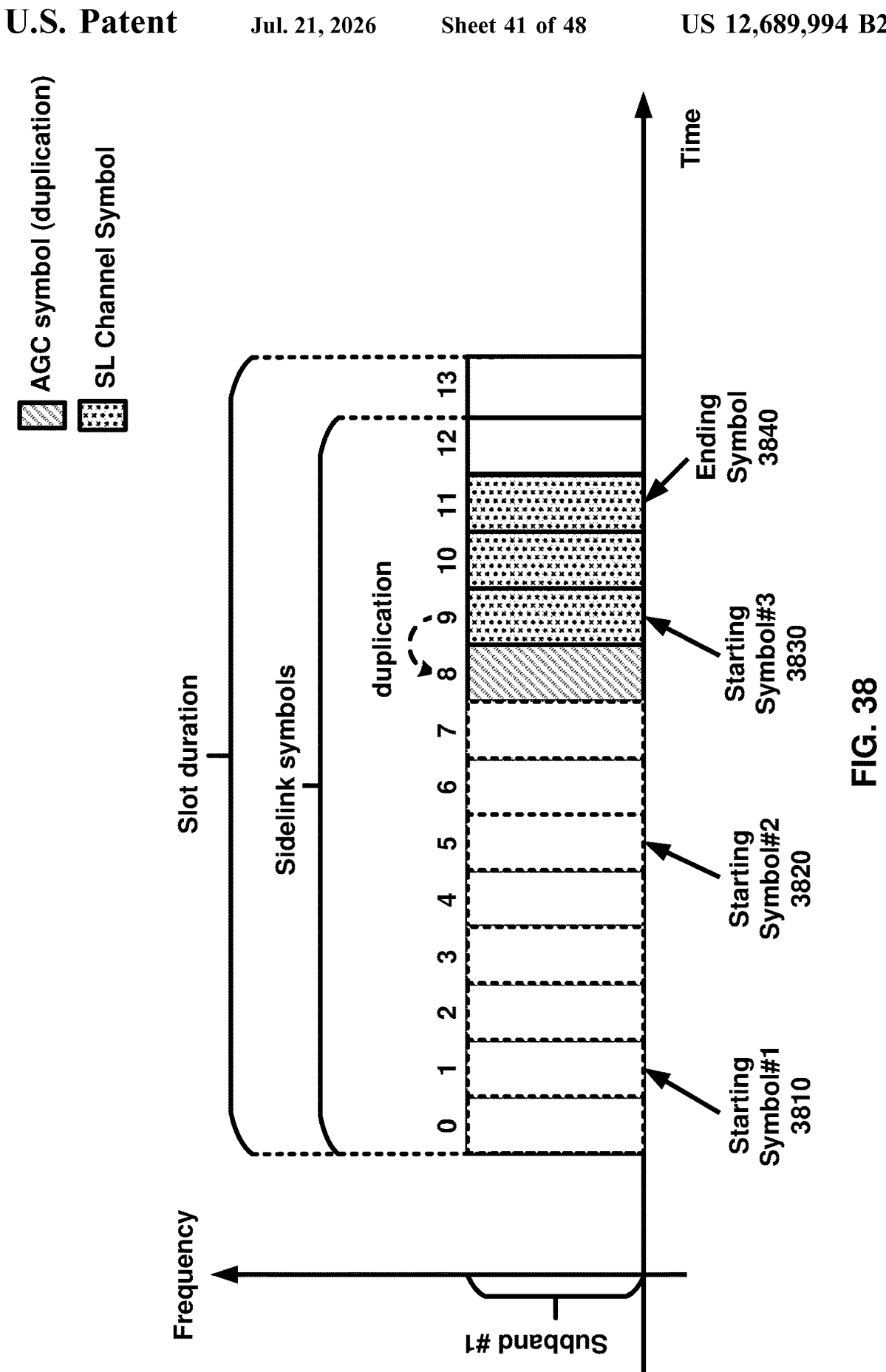
FIG. 38 shows an example multi-AGC sidelink transmission.

FIG. 38 shows an example multi-AGC sidelink transmission. The configuration parameter may be similar to the examples of FIGS. 36 and 37. The wireless device may perform a first LBT at/prior to symbol #0 and a second LBT at/prior to symbol #4. The first LBT and the second LBT may fail. The wireless device may perform a third LBT at/prior to the next/third AGC symbol of the sidelink resource/channel/grant/occasion (e.g., symbol #8). The third LBT may be successful. The wireless device may determine the starting symbol of the sidelink resource/channel/grant/occasion based on the third LBT (e.g., symbol #9). The wireless device may determine the symbols of the sidelink resource/channel/grant/occasion to start from a symbol immediately after the third AGC symbol (e.g., symbol #9).

The wireless device may start the sidelink transmission via the determined symbols of the sidelink resource/grant/occasion. The wireless device may determine to send (e.g., transmit) data (e.g., a transport block), control information (e.g., SCI), and/or a signal via the sidelink channel in the slot. For example, the wireless device may generate a TB based on a number of the resource elements of the determined symbols of the sidelink resource/grant/occasion.

A number/quantity and/or location of the AGC symbols of a sidelink channel may be based on the subcarrier spacing (SCS)/numerology of the sidelink BWP. RRC configuration may indicate the number and/or location of the AGC symbols of the sidelink channel per resource pool and/or BWP. For example, the multiple AGC symbols of the sidelink channel may be configured across all PRBs and/or subchannels of the resource pool. A resource pool may not be configured with multi-AGC sidelink transmission. For example, the sidelink channel of the resource pool may be configured with a single AGC symbol.

A number/quantity and/or location of the candidate starting symbols of a sidelink channel may be based on the SCS/numerology of the sidelink BWP. RRC configuration may indicate the number and/or location of the candidate starting symbols of the sidelink channel per resource pool and/or BWP. For example, the multiple candidate starting symbols of the sidelink channel may be configured across all PRBs and/or subchannels of the resource pool. A resource pool may not be configured with multiple candidate starting symbols for a sidelink transmission. For example, the sidelink channel of the resource pool may be configured with a single starting symbol.

Figures 39A, 39B:
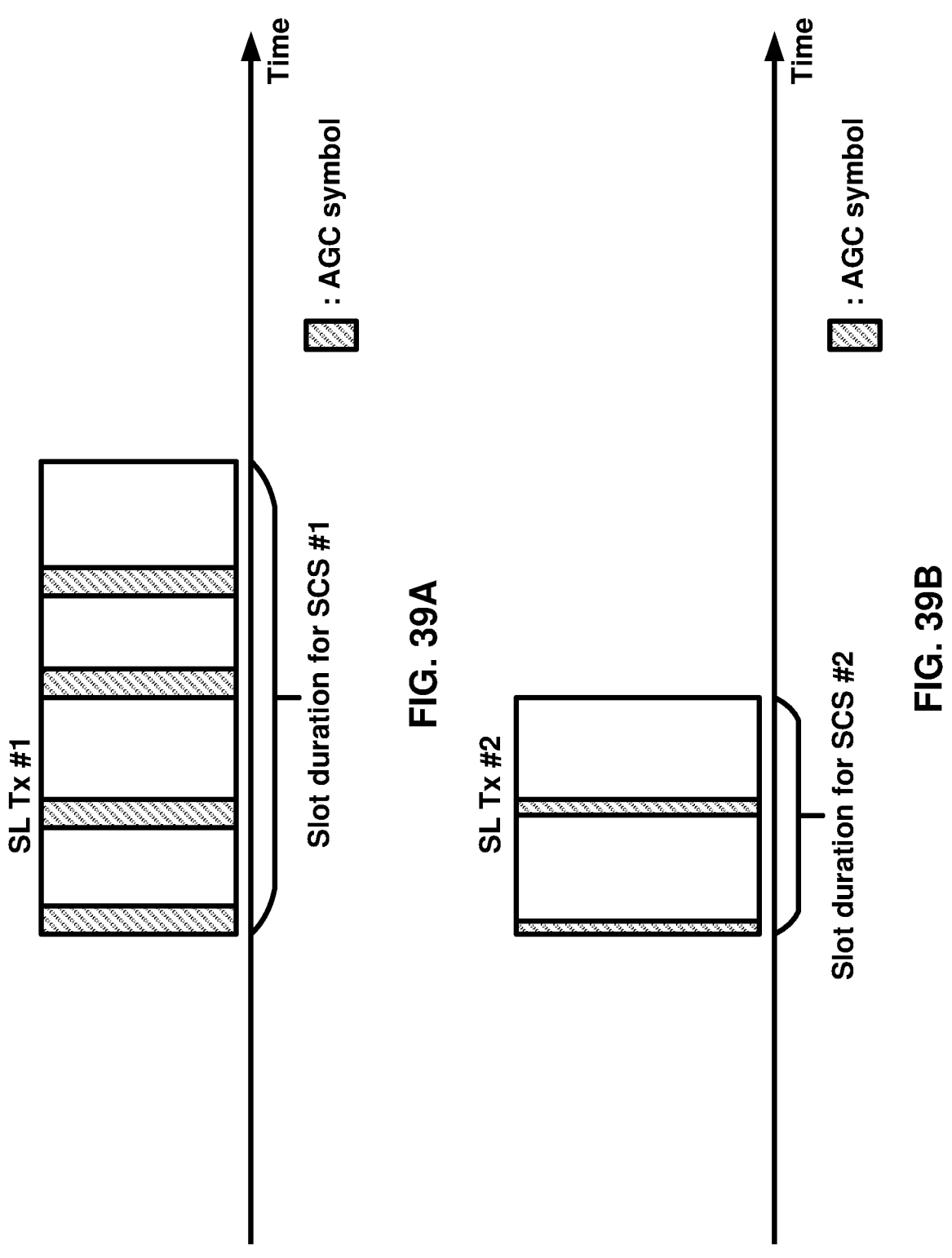
FIGS. 39A and 39B show examples of multi-AGC configuration for different SCSs.

FIGS. 39A and 39B show examples of multi-AGC configuration for different SCSs. For example, as described with respect to FIG. 39A, a first sidelink transmission may be based on a first SCS (SCS #1, e.g., 15 KHz, 30 KHz, or 60 KHz). The sidelink transmission may comprise/be associated with four AGC symbols for this SCS. For example, in FIG. 39B, a second sidelink transmission may be based on a second SCS (SCS #2, e.g., 60 KHz, 120 KHz, or 240 KHz). The second SCS may be greater than/twice the first SCS. A second slot duration associated with the second SCS may be smaller than/half a first slot duration associated with the first SCS. The second sidelink transmission may comprise/be associated with two AGC symbols for this SCS.

Overhead and resource consumption of AGC transmission may be increased based on multi-AGC configuration. For example, one or more symbols of a sidelink resource may be used for duplication for AGC training purposes, and not for data/control signal transmission. The AGC overhead in sidelink unlicensed operations may be reduced, and/or multiple starting point/symbols per sidelink transmission in a slot may be enabled. A partial/comb-like pattern in frequency domain (e.g., an interlace of REs/subcarriers/PRBs/subchannels) may be used for AGC/duplication. For example, a subset of the REs of a PSSCH/PSCCH symbol (e.g., not all REs of the symbol) may be duplicated in a subset of REs of the preceding symbol (e.g., not all REs of the symbol) for AGC training. For example, the rest of the REs of the AGC symbol(s) may be used for data/control (e.g., TB/SCI) mapping and transmission.

Figure 40:
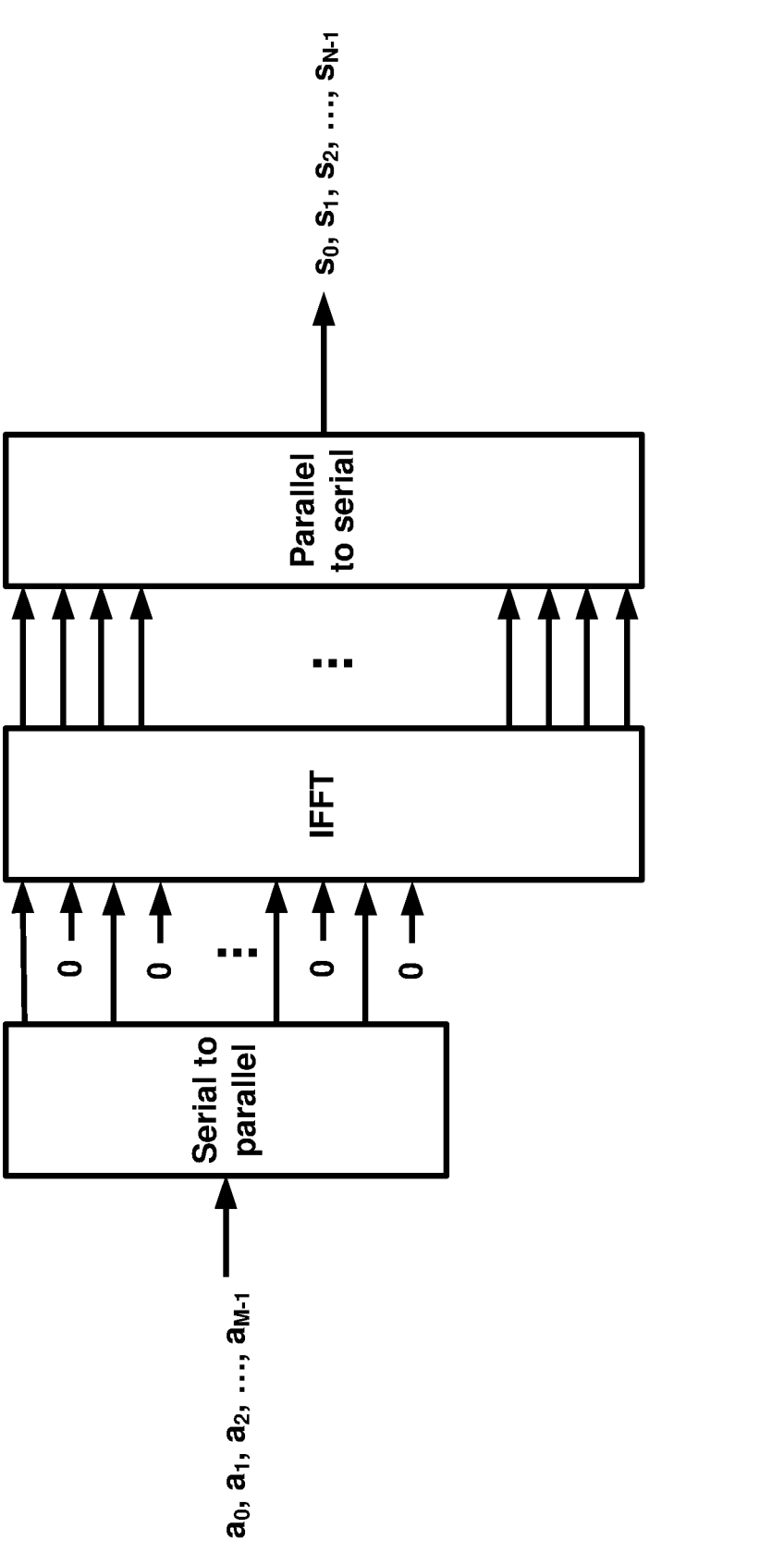
FIG. 40 shows an example comb-like AGC mapping.

FIG. 40 shows an example comb-like AGC mapping. Every other REs of the AGC symbol may be used to carry duplicated signal. For example, a first half/portion of the REs of the AGC symbol may be used for duplication and a second half/portion of the REs of the AGC symbol may be used for data/control signal transmission. A data rate of the sidelink transmission may be increased and/or duplicated REs may be provided for AGC training purposes. The AGC symbol may be any AGC symbol of the sidelink channel/transmission.

Content of M REs of a first symbol of a sidelink channel may be duplicated and used for AGC mapping (e.g., $a_0$, $a_1$, . . . , $a_{M-1}$) as described with respect to FIG. 40. These M REs may be a portion (e.g., half) of the REs of the first symbol. The M REs of the first symbol may be mapped to M REs of the AGC symbol (e.g., immediately preceding symbol of the first symbol). The wireless device may insert 0s for the rest of the REs of the symbol in the IFFT module, for example, if the time domain OFDM symbol for AGC may need to be generated. N REs may be generated for the OFDM symbol, $s_0$, $s_1$, . . . , $s_{M-1}$ (e.g., N>M, or N=2M). The resulting OFDM symbol may have a length that is smaller than (e.g., half of) the first symbol.

Figure 41:
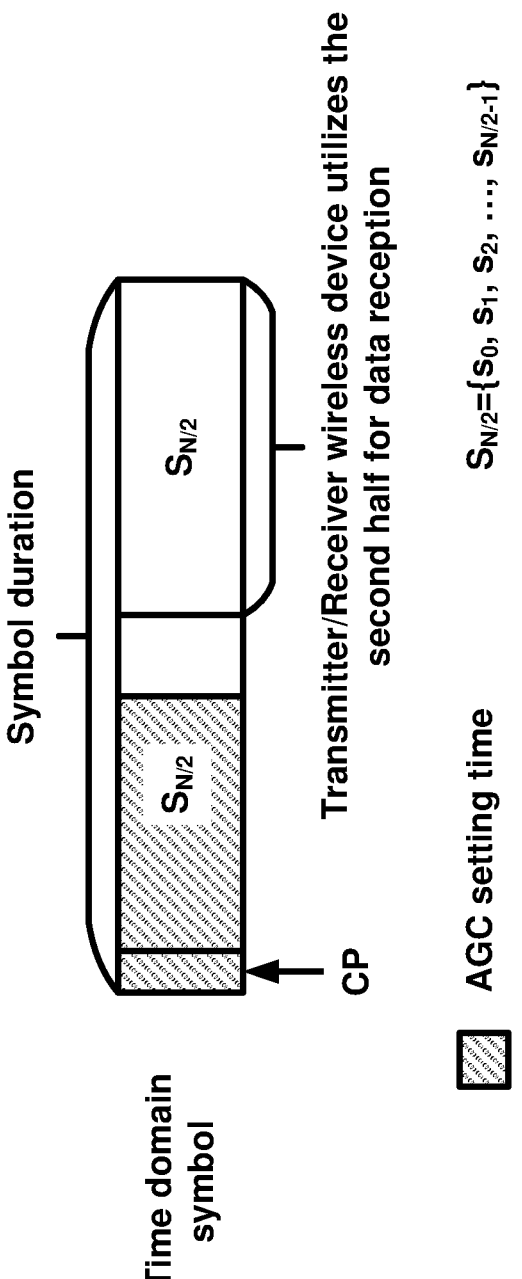
FIG. 41 shows an example time domain AGC symbol based on partial/com-like RE mapping.

FIG. 41 shows an example time domain AGC symbol based on partial/comb-like RE mapping. The resulting AGC OFDM symbol may have a length that is smaller (e.g., half of) than the OFDM symbol of the slot. The transmitter/ receiver wireless device may use the rest (e.g., the second half) of the OFDM symbol for data/control transmission/ reception, and/or the data rate may be increased.

Figure 42:
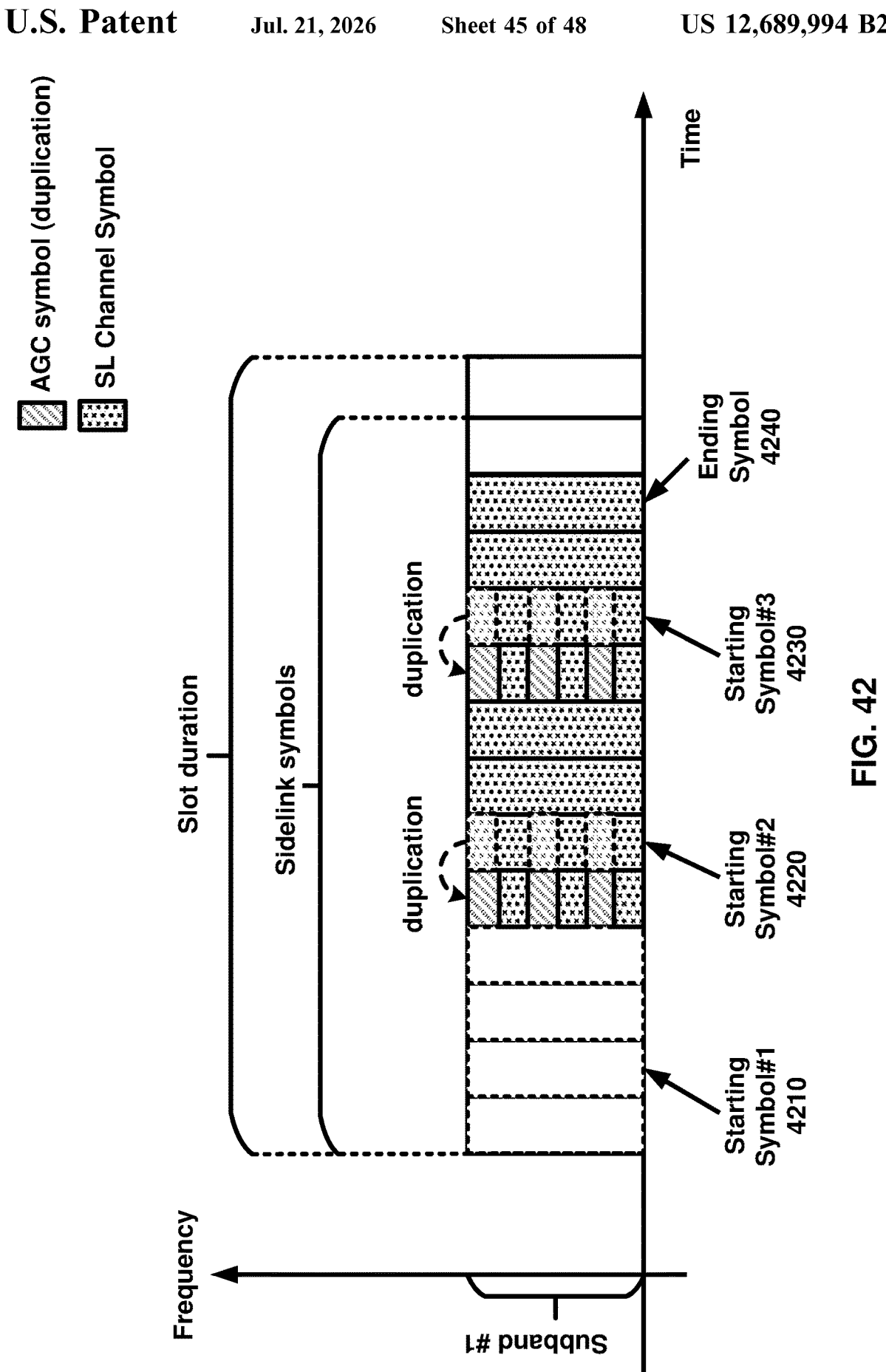
FIG. 42 shows an example comb-like AGC mapping.

FIG. 42 shows an example comb-like AGC mapping. A first portion of (e.g., half or every other) REs/subcarriers/ PRBs/subchannels of starting symbol #2 4220 and starting symbol #3 4230 may be duplicated and mapped to imme- diately preceding symbols, respectively (e.g., corresponding AGC symbols). The remainder/second portion of the REs/ subcarriers/PRBs/subchannels of the AGC/duplicated sym- bol may be used for the sidelink channel (e.g., PSSCH/ PSCCH) mapping and data/control transmission. The wireless device may count the remainder/second portion of the AGC symbols towards TBS determination, symbol gen- eration, and/or resource mapping.

Figures 43A, 43B:
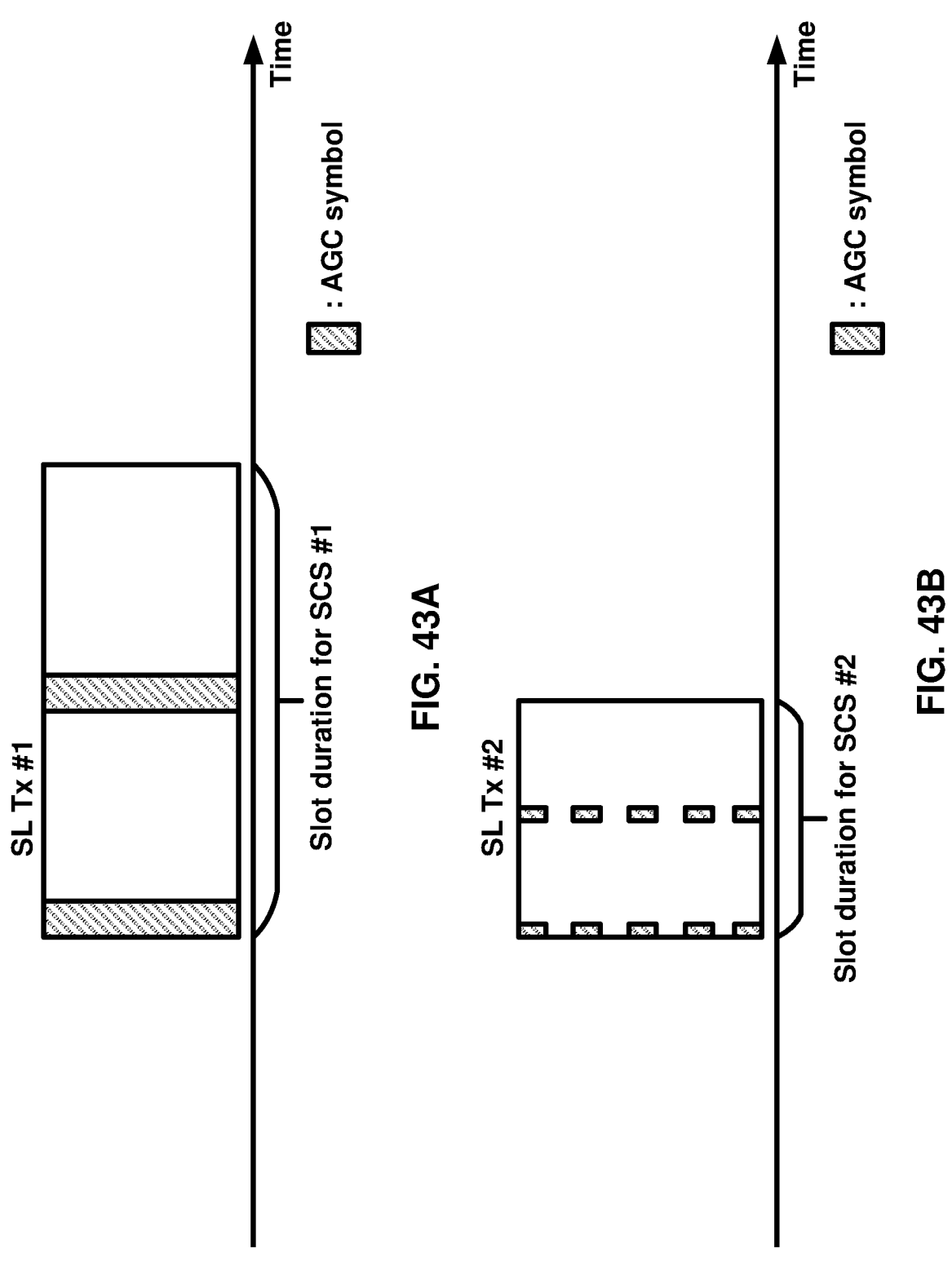
FIGS. 43A and 43B show examples of partial AGC mapping based on SCS.

FIGS. 43A and 43B show examples of partial AGC mapping based on SCS. The interlace/comb pattern in the frequency domain may depend on the subcarrier spacing of the resource pool/sidelink BWP. For example, full AGC symbol may be used for duplication (e.g., no partial map- ping) with SCS #1 as described with respect to FIG. 43A. Partial AGC symbol may be used for duplication with SCS #2>SCS #1 as described with respect to FIG. 43B. A portion of REs/PRBs/subcarriers/subchannels of the symbol may be used for duplication AGC.

The RE mapping pattern (e.g., interlace/comb-like pat- tern) may be predefined and/or (pre-)configured by RRC signaling. The interlace/comb pattern may be based on the number of AGC symbols associated with the sidelink chan- nel/transmission. For example, the wireless device may determine/use the same interlace/pattern for the one or more AGC symbols of the sidelink channel/transmission.

The interlace/comb pattern may be based on the position/ location/index of the AGC symbol within the slot or the sidelink channel/transmission. For example, the wireless device may determine/use different interlace/patterns for the one or more AGC symbols of the sidelink channel/transmis- sion. For example, one or more types of AGC symbols may be predefined-(pre-)configured.

Figure 44:
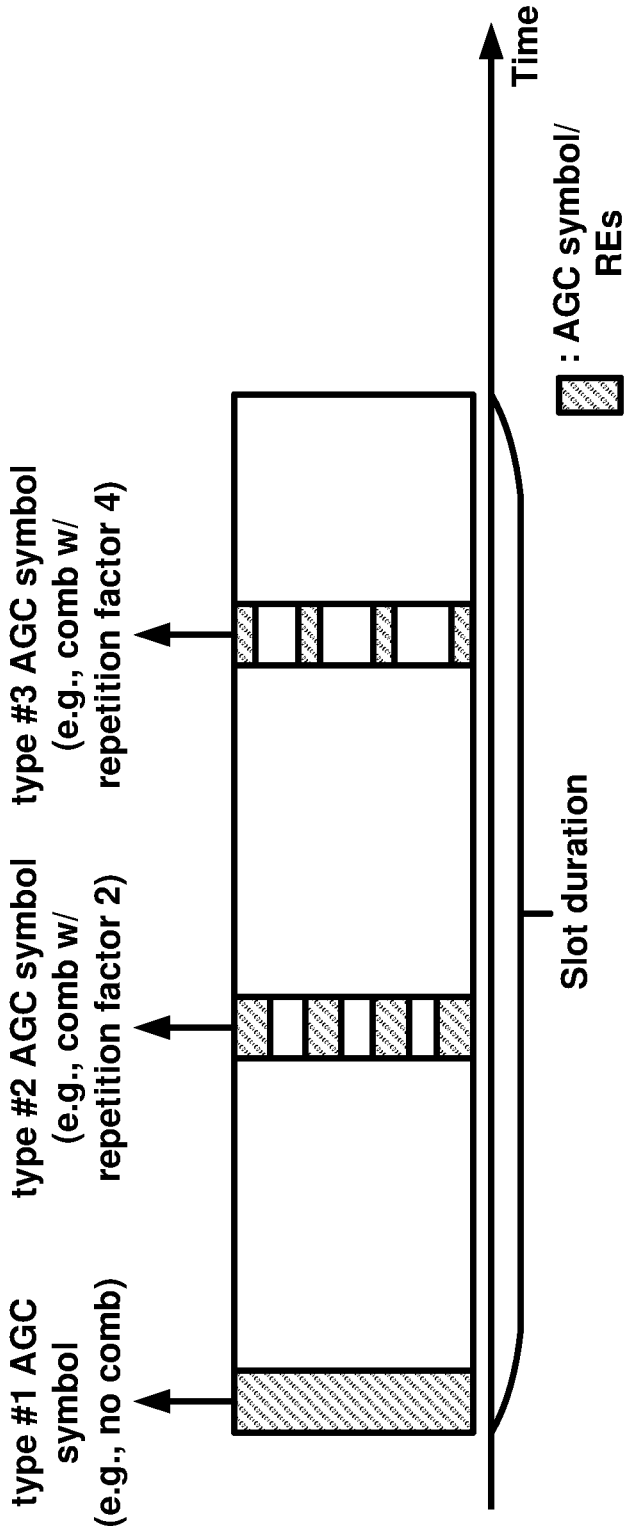
FIG. 44 shows an example of types of AGC symbols.

FIG. 44 shows an example of types of AGC symbols. The wireless device (e.g., transmitter/receiver wireless device) may determine a first type for a first AGC symbol of a sidelink channel/transmission (e.g., no comb). The wireless device (e.g., Transmitter/Receiver wireless device) may determine a second type for a second AGC symbol of the sidelink channel/transmission (e.g., comb with repetition factor 2 and/or half REs of the symbol). The wireless device (e.g., transmitter/receiver wireless device) may determine a third type for a third AGC symbol of the sidelink channel/ transmission (e.g., comb with repetition factor 4 and/or 25% REs of the symbol), and so on.

The comb-like AGC mapping may be used to a first (e.g., earliest) AGC symbol of a sidelink channel/transmission. The comb-like AGC mapping may or may not be used to a second AGC symbol of a sidelink channel/transmission.

Figure 45:
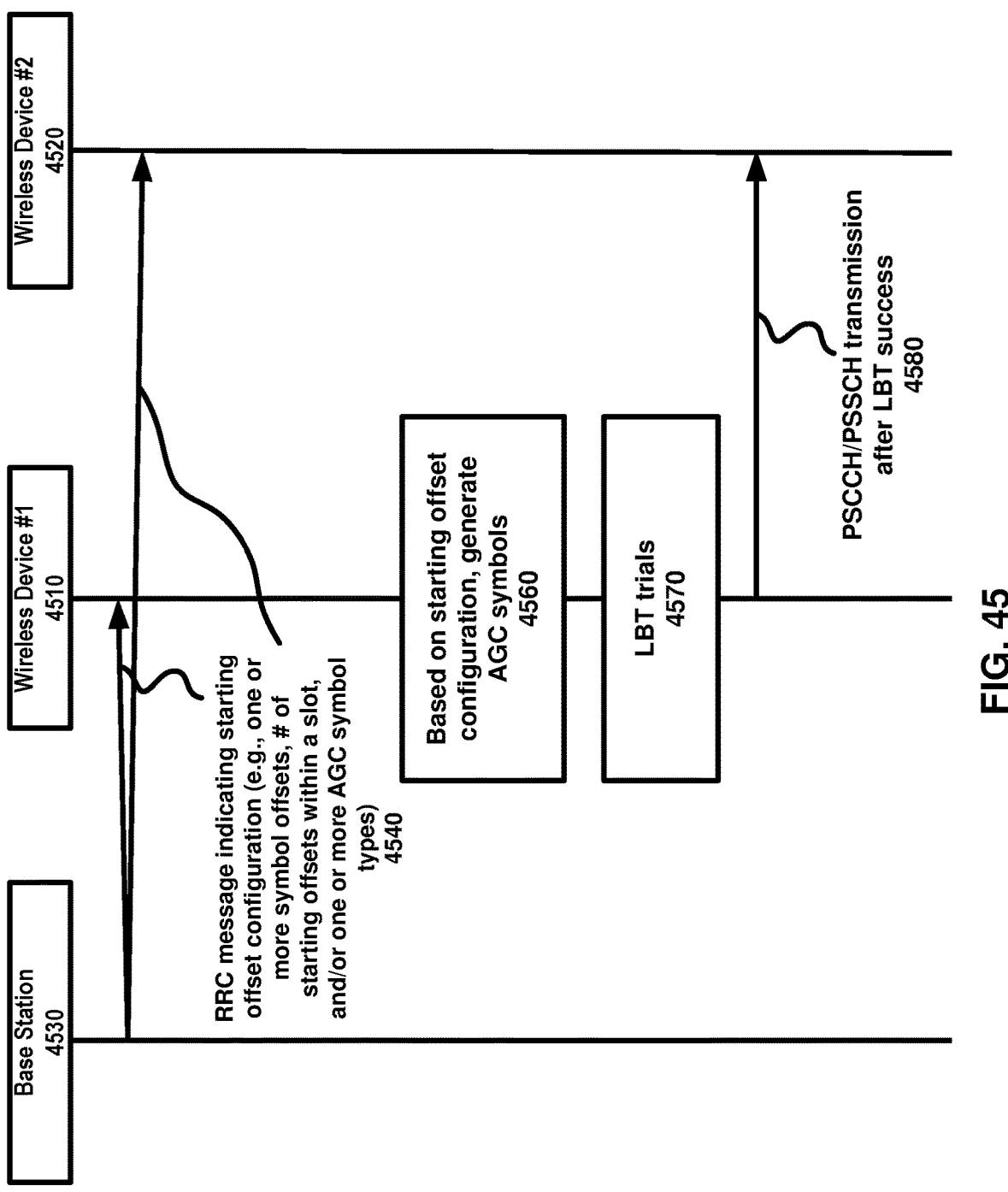
FIG. 45 shows an example signal flow between the based station and wireless devices in a sidelink operation.

FIG. 45 shows an example signal flow between the based station 4530 and wireless devices 4510, 4520 in a sidelink operation. The first wireless device (e.g., wireless device #1 4510, transmitter wireless device) and the second wireless device (e.g., wireless device #2 4520, the receiver wireless device) may receive one or more RRC messages and/or SIB messages from the base station 4530. The one or more RRC messages and/or SIB messages may comprise configuration parameters that may indicate multiple starting symbols of a sidelink channel/transmission/slot. For example, the con- figuration parameters may indicate one or more starting offsets (e.g., symbol offsets) to be used to a first/earliest symbol of a sidelink channel/slot. For example, the configu- ration parameters may indicate one or more AGC symbol types. The first wireless device generate a sidelink transmis- sion with/and/or one or more AGC symbols based on the multiple starting symbols/offsets and/or one or more AGC symbol types. The first wireless device may determine a starting symbol and/or the time resource of the sidelink grant/transmission based on one or more LBT trials per- formed on/for the sidelink channel. The first wireless device may send (e.g., transmit) to the second wireless device a sidelink transmission via the determined sidelink grant/ resource, based on (e.g., in response to) a successful LBT. For example, a TB and/or SCI may be sent via PSSCH/ PSCCH comprising/along with one or more AGC/duplicated symbols.

A wireless device may determine a subset of sidelink symbols of a slot for a sidelink transmission. As described with respect to FIGS. 36-38, the subset of symbols may comprise at least one of candidate starting symbols associ- ated with the sidelink transmission and/or an ending symbol of the sidelink transmission. The wireless device may dupli- cate one or more resource elements of the at least one candidate starting symbols, used for the sidelink transmis- sion into respective (e.g., immediately) preceding symbols.

A wireless device, for example, may receive configuration parameters of a sidelink bandwidth part (BWP) indicating a plurality of symbols for sidelink transmission in a slot associated with the sidelink BWP, two or more starting symbols of the plurality of symbols of a sidelink channel in the slot, and/or an ending symbol of the plurality of symbols of the sidelink channel in the slot. The wireless device may determine to send (e.g., transmit) a first transport block (TB) via the sidelink channel. The sidelink channel may comprise at least one of the two or more starting symbols and the ending symbol. The wireless device may map the first TB to resource elements of the sidelink channel symbols. The wireless device may duplicate one or more resource ele- ments of the at least one of the two or more starting symbols into respective (e.g., immediately) preceding symbols. The wireless device may send (e.g., transmit) the first TB and the duplicated symbols via the plurality of symbols.

A wireless device may receive one or more radio resource control (RRC) messages comprising the configuration parameters. The configuration parameters may indicate a subcarrier spacing of the sidelink BWP that may indicate a duration of the slot associated with the sidelink BWP. A minimum resource allocation unit in time domain may be a slot. The plurality of symbols may comprise a set of con- secutive symbols of the slot. The sidelink channel may comprise a physical sidelink shared channel (PSSCH), a physical sidelink control channel (PSCCH), PSFCH, and/or PSBCH.

The two or more starting symbols may be for/associated with multiple LBT opportunities for sending (e.g., transmit- ting) a sidelink transmission/TB via the sidelink channel in a shared/unlicensed spectrum. The wireless device may determine the ending symbol based on a last symbol of the plurality of symbols configured for sidelink transmission in the slot and/or one or more second symbols of the plurality of symbols configured for a second sidelink channel in the slot. The ending symbol may be after a last starting symbol of the two or more starting symbols in the slot. The two or more starting symbols may be associated with pre-config- ured symbols indexes of the slot.

The sidelink channel symbols may start at a first symbol of the two or more starting symbols and end at the ending symbol. The wireless device may determine the first symbol, based on one or more LBT procedures associated with the two or more starting symbols. The wireless device may determine an earliest of the two or more starting symbols as the first symbol, based on an indication of LBT success associated with the earliest starting symbol. The wireless device may determine a second earliest of the two or more starting symbols as the first symbol, based on an indication of LBT failure associated with the earliest starting symbol and/or an indication of LBT success associated with the second earliest starting symbol. The wireless device may determine a last of the two or more starting symbols as the first symbol, based on one or more indication of LBT failure associated with the previous starting symbols and/or an indication of LBT success associated with the last starting symbol. An LBT procedure may be performed at least one symbol before the associated starting symbol, for example, before/during the extended CP of the OFDM symbol.

The sidelink channel symbols may be consecutive symbols. The sidelink channel symbols may not be consecutive symbols. The sidelink channel symbols may exclude a second symbol (e.g., immediately) preceding a second starting symbol (e.g., AGC/duplicated symbol) of the two or more starting symbols. The second starting symbol may be after the first symbol. The sidelink channel symbols may include/comprise the second symbol (e.g., immediately) preceding a second starting symbol (e.g., AGC/duplicated symbol). The wireless device may map sidelink control information associated with the first TB to resource elements of the sidelink channel symbols, wherein each sidelink channel symbol may comprise one or more resource elements, based on a subcarrier spacing of the sidelink BWP. Mapping the first TB to the resource elements may comprise mapping modulated symbols of the coded data associated with the first TB to the resource elements. The wireless device may determine the at least one of the two or more starting symbols that occur, for example, after a first starting symbol for which LBT may be successful. The wireless device may determine a second symbol of the plurality of symbols, for example, immediately preceding a first symbol of the at least one of the two or more starting symbols. The wireless device may duplicate one or more resource elements of the first symbol, used for the sidelink channel, in the second symbol.

A wireless device may receive configuration parameters of a sidelink bandwidth part (BWP) indicating a plurality of symbols for sidelink reception in a slot associated with the sidelink BWP, two or more starting symbols of the plurality of symbols of a sidelink channel in the slot, and/or an ending symbol of the plurality of symbols of the sidelink channel in the slot. The wireless device may detect a sidelink control information (SCI) indicating reception of a transport block (TB) via the sidelink channel. The wireless device may determine, based on the SCI, sidelink channel symbols comprising at least one of the two or more starting symbols and the ending symbol, wherein one or more resource elements of the at least one of the two or more starting symbols may be duplicated into respective (e.g., immediately) preceding symbols. The wireless device may receive the TB and the duplicated symbols via the plurality of symbols.

A wireless device may perform a method comprising multiple operations. The wireless device may receive one or more configuration parameters, for example via one or more radio resource control (RRC) messages. The one or more configuration parameters may indicate a plurality of symbols associated with a plurality of signals in a slot. The one or more configuration parameters may indicate an ending symbol for a sidelink transmission occasion in the slot. The plurality of starting symbols may be associated with a plurality of listen-before-talk (LBT) opportunities for sidelink transmission in a shared spectrum. The wireless device may transmit (for example, to a second wireless device) or receive, in the slot, and via a sidelink channel, a first signal (for example via at least one of a physical sidelink shared channel (PSSCH) or a physical sidelink control channel (PSCCH)) of a plurality of signals. The first signal may comprise a first starting symbol of the plurality of starting symbols. The first signal may comprise a duplication of the first starting symbol. The duplication of the first starting symbol may be for automatic gain control (AGC). The first signal may comprise a second starting symbol of the plurality of starting symbols. The second starting symbol may be a starting symbol of a second signal of the plurality of signals. The first signal may comprise a duplication of the second starting symbol. The duplication of the second starting symbol may be for AGC. The wireless device may further receive a signal comprising a third starting symbol and a duplication of the third starting symbol, and a fourth starting symbol and a duplication of the fourth starting symbol. The duplication of the third starting symbol and/or of the fourth starting symbol may be for automatic gain control (AGC). The wireless device may further perform, based on a measurement of the duplication of the third starting symbol, a first AGC procedure, and may further perform, based on a measurement of the duplication of the fourth starting symbol, a second AGC procedure. The wireless device may map a transport block (TB) to resource elements of symbols in the slot, wherein the symbols may comprise the first starting symbol and/or the second starting symbol, wherein the duplication of the first starting symbol may be immediately preceding the first starting symbol, and wherein the duplication of the second starting symbol may be immediately preceding the second starting symbol. The wireless device may perform, for a symbol in the slot that occurs before one of the plurality of starting symbols, an LBT procedure. The wireless device may comprise one or more processors and memory, storing instructions, that when executed by the one or more processors, cause the wireless device to perform the method described herein. A system may comprise the wireless device configured to perform the described method, additional operations, and/or include the additional elements; and a base station configured to send (e.g., transmit) the one or more configuration parameters. A computer-readable medium may store instructions that, when executed, cause performance of the described method, additional operations, and/or include additional elements. A base station may perform a corresponding method comprising multiple operations. The base station may perform a corresponding method, for example, by at least sending (e.g., transmitting) the one or more configuration parameters.

A first wireless device may perform a method comprising multiple operations. The first wireless device may receive, from a second wireless device, in a slot, and via a sidelink channel, a first signal (such as via at least one of a physical sidelink shared channel (PSSCH) or a physical sidelink control channel (PSCCH)). The first signal may be a signal of a plurality of signals, and may comprise a first starting symbol of a plurality of starting symbols, a duplication of the first starting symbol, a second starting symbol of the plurality of starting symbols, and a duplication of the second starting symbol. The second starting symbol may be a starting symbol of a second signal of the plurality of signals.

The duplication of the first starting symbol and/or the second starting symbol may be for automatic gain control (AGC). The plurality of starting symbols may be associated with a plurality of listen-before-talk (LBT) opportunities for sidelink transmission in a shared spectrum. The first wireless device may perform, based on a measurement of the duplication of the first starting symbol, a first AGC procedure, and may perform, based on a measurement of the duplication of the second starting symbol, a second AGC procedure. The first wireless device may receive one or more configuration parameters indicating a plurality of symbols, in the slot, for sidelink transmission. The first wireless device may receive one or more configuration parameters indicating the plurality of starting symbols. The plurality of symbols in the slot may comprise the plurality of starting symbols. The first wireless device may receive, from a third wireless device, in the slot and via the sidelink channel, a signal comprising a third starting symbol and a duplication of the third starting symbol. The duplication of the third starting symbol may be for AGC and may overlap in time with the duplication of the second starting symbol. The performance of the second AGC procedure may be based on a combined measurement comprising the measurement of the duplication of the second starting symbol and a measurement of the duplication of the third starting symbol. The first wireless device may map a transport block (TB) to resource elements of symbols in the slot, wherein the symbols may comprise the first starting symbol and the second starting symbol, wherein the duplication of the first starting symbol is immediately preceding the first starting symbol, and wherein the duplication of the second starting symbol is immediately preceding the second starting symbol. The first wireless device may perform, for a symbol in the slot that occurs before one of the plurality of starting symbols, an LBT procedure. The first wireless device may comprise one or more processors and memory, storing instructions, that when executed by the one or more processors, cause the first wireless device to perform the method described herein. A system may comprise the first wireless device configured to perform the described method, additional operations, and/or include the additional elements; and a second wireless device configured to transmit the first signal. A computer-readable medium may store instructions that, when executed, cause performance of the described method, additional operations, and/or include additional elements. A second wireless device may perform a corresponding method comprising multiple operations. The second wireless device may perform a corresponding method, for example, by at least transmitting the first signal. A base station may perform a method comprising multiple operations. The base station may transmit one or more configuration parameters (such as via one or more radio resource control (RRC) messages) indicating a plurality of symbols, in a slot, for sidelink transmission, and a plurality of starting symbols of the plurality of symbols in the slot. The plurality of starting symbols may be associated with a plurality of listen-before-talk (LBT) opportunities for sidelink transmission in a shared spectrum. The base station may receive an indication of a sidelink transmission comprising a first starting symbol of the plurality of starting symbols, a duplication of the first starting symbol, a second starting symbol of the plurality of starting symbols, and a duplication of the second starting symbol. The duplication of the first starting symbol and/or the second starting symbol may be for automatic gain control (AGC). The one or more configuration parameters may further indicate mapping for a transport block (TB) to resource elements of first symbols of the plurality of symbols in the slot, wherein the first symbols comprise the first starting symbol and the second starting symbol, wherein the duplication of the first starting symbol is immediately preceding the first starting symbol, and wherein the duplication of the second starting symbol is immediately preceding the second starting symbol. The base station may comprise one or more processors and memory, storing instructions, that when executed by the one or more processors, cause the base station to perform the method described herein. A system may comprise the base station configured to perform the described method, additional operations, and/or include the additional elements; and a wireless device configured to transmit the indication of the sidelink transmission. A computer-readable medium may store instructions that, when executed, cause performance of the described method, additional operations, and/or include additional elements. A wireless device may perform a corresponding method comprising multiple operations. The wireless device may perform a corresponding method, for example, by at least transmitting the indication of the sidelink transmission.

A wireless device may perform a method comprising multiple operations. The wireless device may receive configuration parameters indicating: a plurality of symbols, in a slot, for sidelink transmission; and/or a plurality of starting symbols. The plurality of symbols in the slot may comprise the plurality of starting symbols. The wireless device may map a transport block (TB) to resource elements of symbols in the slot, wherein the symbols may comprise at least two of the plurality of starting symbols. The wireless device may duplicate first resource elements of each of the at least two of the plurality of starting symbols into second resource elements of a respective immediately preceding symbol. The wireless device may transmit the TB and signals of the second resource elements. The first symbols may exclude one or more second symbols, of the plurality of symbols in the slot, wherein each of the one or more second symbols immediately precedes a starting symbol of the at least two of the plurality of starting symbols. The wireless device may receive one or more radio resource control (RRC) messages comprising the configuration parameters, wherein the configuration parameters indicate a sidelink bandwidth part (BWP) comprising the slot. A resource allocation unit in time domain may be a slot. The plurality of symbols may comprise a set of consecutive symbols of the slot. The plurality of starting symbols may be for multiple listen-before-talk (LBT) opportunities for transmitting the TB in a shared spectrum. Each of the plurality of starting symbols may indicate a respective time domain resource for a respective sidelink transmission occasion in the slot, for transmission of the TB based on listen-before-talk (LBT) procedure. The wireless device may determine a first sidelink transmission occasion associated with a first time domain resource in the slot, wherein the first time domain resource starts at a first starting symbol, of the plurality of starting symbols. The wireless device may determine the first starting symbol based on one or more LBT procedures associated with the plurality of starting symbols. The sidelink transmission occasion may comprise at least one of a physical sidelink shared channel (PSSCH) resource and a physical sidelink control channel (PSCCH) resource. The configuration parameters may indicate an ending symbol, of the plurality of symbol, for the sidelink transmission occasion in the slot. The wireless device may determine the ending symbol based on at least one of: a last symbol of the plurality of symbols configured for sidelink transmission in the slot; and/or one or more second symbols, of the plurality of symbols, configured for a second sidelink channel in the slot. The ending symbol may be after a last starting symbol of the plurality of starting symbols in the slot. The first sidelink transmission occasion may be based on the ending symbol. The plurality of starting symbols may be associated with pre-configured symbol indexes of the slot. The wireless device may determine an earliest starting symbol, of the plurality of starting symbols, as the first starting symbol, based on an indication of LBT success associated with the earliest starting symbols. The wireless device may determine a second earliest starting symbol, of the plurality of starting symbols, as the first starting symbol, based on: an indication of LBT failure associated with an earliest starting symbol, of the plurality of starting symbols; and/or an indication of LBT success associated with the second earliest starting symbol, of the plurality of starting symbols. The wireless device may determine a last starting symbol, of the plurality of starting symbols, as the first starting symbol, based on: one or more indication of LBT failure associated with the previous starting symbols; and/or an indication of LBT success associated with the last starting symbol. An LBT procedure may be performed at least one symbol before the associated starting symbol. The first symbols may be consecutive symbols. The first symbols may exclude a second symbol immediately preceding a second starting symbol, of the plurality of starting symbols, wherein the second starting symbol is a next starting symbol after the first starting symbol. The wireless device may map sidelink control information associated with the TB to resource elements of the first symbols. The wireless device may map the first TB to the resource elements by mapping modulated symbols of coded data associated with the TB to the resource elements. The wireless device may determine a second symbol, of the plurality of symbols, immediately preceding a first starting symbol of the at least two of the plurality of starting symbols; and/or duplicate one or more resource elements of the first starting symbol in the second symbol. The wireless device may comprise one or more processors and memory, storing instructions, that when executed by the one or more processors, cause the wireless device to perform the method described herein. A system may comprise the wireless device configured to perform the described method, additional operations, and/or include the additional elements; and a base station configured to send (e.g., transmit) the one or more configuration parameters. A computer-readable medium may store instructions that, when executed, cause performance of the described method, additional operations, and/or include additional elements. A base station may perform a corresponding method comprising multiple operations. The base station may perform a corresponding method, for example, by at least sending (e.g., transmitting) the configuration parameters.

A wireless device may perform a method comprising multiple operations. The wireless device may determine first symbols of a plurality of symbols of a slot for a sidelink transmission, wherein the first symbols comprise at least two candidate starting symbols associated with the sidelink transmission. The wireless device may duplicate first resource elements of each of the at least two candidate starting symbols into second resource elements of a respective immediately preceding symbol. The wireless device may comprise one or more processors and memory, storing instructions, that when executed by the one or more processors, cause the wireless device to perform the method described herein. A system may comprise the wireless device configured to perform the described method, additional operations, and/or include the additional elements; and at least one of: a base station configured to send (e.g., transmit) the one or more configuration parameters; or a second wireless device. A computer-readable medium may store instructions that, when executed, cause performance of the described method, additional operations, and/or include additional elements. A base station may perform a corresponding method comprising multiple operations. The base station may perform a corresponding method, for example, by at least sending (e.g., transmitting) to the wireless device one or more configuration parameters. A second wireless device may perform a corresponding method comprising multiple operations. The second wireless device may perform a corresponding method, for example, by at least receiving the first resource elements.

A wireless device may perform a method comprising multiple operations. The wireless device may receive one or more configuration parameters indicating: a plurality of symbols, in a slot, for sidelink reception; and/or a plurality of starting symbols of the plurality of symbols in the slot. The wireless device may detect a sidelink control information (SCI) indicating reception of a transport block (TB) in the slot. The wireless device may determine based on the SCI, first symbols, of the plurality of symbols, comprising at least two of the plurality of starting symbols, wherein first resource elements of each of the at least two of the plurality of starting symbols are duplicated into second resource elements of a respective immediately preceding symbol. The wireless device may receive the TB and the signals of the second resource elements. The wireless device may comprise one or more processors and memory, storing instructions, that when executed by the one or more processors, cause the wireless device to perform the method described herein. A system may comprise the wireless device configured to perform the described method, additional operations, and/or include the additional elements; and at least one of: a base station configured to send (e.g., transmit) the one or more configuration parameters; or a second wireless device configured to send the TB and/or the signals of the second resource elements. A computer-readable medium may store instructions that, when executed, cause performance of the described method, additional operations, and/or include additional elements. A base station may perform a corresponding method comprising multiple operations. The base station may perform a corresponding method, for example, by at least sending (e.g., transmitting) the one or more configuration parameters. A second wireless device may perform a corresponding method comprising multiple operations. The second wireless device may perform a corresponding method, for example, by at least receiving the TB and/or the signals of the second resource elements.

One or more of the operations described herein may be conditional. For example, one or more operations may be performed if certain criteria are met, such as in a wireless device, a base station, a radio environment, a network, a combination of the above, and/or the like. Example criteria may be based on one or more conditions such as wireless device and/or network node configurations, traffic load, initial system set up, packet sizes, traffic characteristics, a combination of the above, and/or the like. If the one or more criteria are met, various examples may be used. It may be possible to implement any portion of the examples described herein in any order and based on any condition.

A base station may communicate with one or more of wireless devices. Wireless devices and/or base stations may support multiple technologies, and/or multiple releases of the same technology. Wireless devices may have some specific capability(ies) depending on wireless device category and/or capability(ies). A base station may comprise multiple sectors, cells, and/or portions of transmission entities. A base station communicating with a plurality of wireless devices may refer to a base station communicating with a subset of the total wireless devices in a coverage area. Wireless devices referred to herein may correspond to a plurality of wireless devices compatible with a given LTE, 5G, or other 3GPP or non-3GPP release with a given capability and in a given sector of a base station. A plurality of wireless devices may refer to a selected plurality of wireless devices, a subset of total wireless devices in a coverage area, and/or any group of wireless devices. Such devices may operate, function, and/or perform based on or according to drawings and/or descriptions herein, and/or the like. There may be a plurality of base stations and/or a plurality of wireless devices in a coverage area that may not comply with the disclosed methods, for example, because those wireless devices and/or base stations may perform based on older releases of LTE, 5G, or other 3GPP or non-3GPP technology.

One or more parameters, fields, and/or Information elements (IEs), may comprise one or more information objects, values, and/or any other information. An information object may comprise one or more other objects. At least some (or all) parameters, fields, IEs, and/or the like may be used and can be interchangeable depending on the context. If a meaning or definition is given, such meaning or definition controls.

One or more elements in examples described herein may be implemented as modules. A module may be an element that performs a defined function and/or that has a defined interface to other elements. The modules may be implemented in hardware, software in combination with hardware, firmware, wetware (e.g., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and/or complex programmable logic devices (CPLDs). Computers, microcontrollers and/or microprocessors may be programmed using languages such as assembly, C, C++ or the like. FPGAs, ASICs and CPLDs are often programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, any non-3GPP network, wireless local area networks, wireless personal area networks, wireless ad hoc networks, wireless metropolitan area networks, wireless wide area networks, global area networks, satellite networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

What is claimed is:

1. A method comprising:

receiving, by a wireless device, one or more configuration parameters indicating a plurality of starting symbols in a slot;

transmitting or receiving, in the slot, and via a sidelink channel, a first signal comprising:

a transport block mapped to a plurality of symbols of the slot, wherein:

the plurality of symbols of the slot are based on the one or more configuration parameters, the plurality of symbols of the slot comprises a first symbol and a second symbol, the plurality of symbols of the slot excludes a third symbol of the slot and a fourth symbol of the slot, the third symbol immediately precedes the first symbol, and the fourth symbol immediately precedes the second symbol;

a duplication, in the third symbol, of the first symbol; and a duplication, in the fourth symbol, of the second symbol.

2. The method of claim 1, further comprising:

receiving, via the sidelink channel, a second signal comprising:

a fifth symbol;

a duplication of the fifth symbol;

a sixth symbol; and a duplication of the sixth symbol;

performing, based on a measurement of the duplication of the fifth symbol, a first automatic gain control (AGC) procedure; and performing, based on a measurement of the duplication of the sixth symbol, a second AGC procedure.

3. The method of claim 1, wherein the duplication of the second symbol is associated with a second signal.

4. The method of claim 1, wherein the receiving the one or more configuration parameters comprises receiving one or more radio resource control (RRC) messages comprising the one or more configuration parameters.

5. The method of claim 1, wherein the plurality of starting symbols are associated with a plurality of listen-before-talk (LBT) opportunities for sidelink transmission in a shared spectrum.

6. The method of claim 1, wherein the transmitting or receiving the first signal comprises transmitting or receiving a transport block via at least one of:

a physical sidelink shared channel (PSSCH); or a physical sidelink control channel (PSCCH).

7. The method of claim 1, further comprising performing, for a symbol in the slot, a listen-before-talk (LBT) procedure.

8. The method of claim 1, wherein the transmitting or receiving the first signal comprises:

transmitting, to a second wireless device, the first signal.

9. The method of claim 1, wherein the one or more configuration parameters further indicate an ending symbol for a sidelink transmission occasion in the slot.

10. The method of claim 1, wherein the duplication of the first symbol is for automatic gain control (AGC) and the duplication of the second symbol is for AGC.

11. The method of claim 1, further comprising:

performing, based on a measurement of the duplication of the first symbol, a first automatic gain control (AGC) procedure; and performing, based on a measurement of the duplication of the second symbol, a second AGC procedure.

12. A wireless device comprising:

one or more processors; and memory storing instructions that, when executed, cause the wireless device to:

receive one or more configuration parameters indicating a plurality of starting symbols in a slot; and transmit or receive, in the slot, and via a sidelink channel, a first signal comprising:

a transport block mapped to a plurality of symbols of the slot, wherein:

the plurality of symbols of the slot are based on the one or more configuration parameters, the plurality of symbols of the slot comprises a first symbol and a second symbol, the plurality of symbols of the slot excludes a third symbol of the slot and a fourth symbol of the slot, the third symbol immediately precedes the first symbol, and the fourth symbol immediately precedes the second symbol;

a duplication, in the third symbol, of the first symbol; and a duplication, in the fourth symbol, of the second symbol.

13. The wireless device of claim 12, wherein the instructions, when executed by the one or more processors, further cause the wireless device to:

receive, via the sidelink channel, a second signal comprising:

a fifth symbol;

a duplication of the fifth symbol;

a sixth symbol; and a duplication of the sixth symbol;

perform, based on a measurement of the duplication of the fifth symbol, a first automatic gain control (AGC) procedure; and perform, based on a measurement of the duplication of the sixth symbol, a second AGC procedure.

14. The wireless device of claim 12, wherein the duplication of the second symbol is associated with a second signal.

15. The wireless device of claim 12, wherein the wherein the instructions, when executed by the one or more processors, cause the wireless device to receive the one or more configuration parameters by receiving one or more radio resource control (RRC) messages comprising the one or more configuration parameters.

16. The wireless device of claim 12, wherein the plurality of starting symbols are associated with a plurality of listen-before-talk (LBT) opportunities for sidelink transmission in a shared spectrum.

17. The wireless device of claim 12, wherein the instructions, when executed by the one or more processors, cause the wireless device to transmit or receive the first signal by transmitting or receiving a transport block via at least one of:

a physical sidelink shared channel (PSSCH); or a physical sidelink control channel (PSCCH).

18. The wireless device of claim 12, wherein the instructions, when executed by the one or more processors, further cause the wireless device to perform, for a symbol in the slot, a listen-before-talk (LBT) procedure.

19. The wireless device of claim 12, wherein the instructions, when executed by the one or more processors, cause the wireless device to transmit or receive the first signal by:

transmitting, to a second wireless device, the first signal.

20. The wireless device of claim 12, wherein the one or more configuration parameters further indicate an ending symbol for a sidelink transmission occasion in the slot.

21. The wireless device of claim 12, wherein the duplication of the first symbol is for automatic gain control (AGC) and the duplication of the second symbol is for AGC.

22. The wireless device of claim 12, wherein the instructions, when executed by the one or more processors, further cause the wireless device to:

perform, based on a measurement of the duplication of the first symbol, a first automatic gain control (AGC) procedure; and perform, based on a measurement of the duplication of the second symbol, a second AGC procedure.

23. A non-transitory computer-readable medium storing instructions that, when executed, configure a wireless device to:

receive one or more configuration parameters indicating a plurality of starting symbols in a slot; and transmit or receive, in the slot, and via a sidelink channel, a first signal comprising:

a transport block mapped to a plurality of symbols of the slot, wherein:

the plurality of symbols of the slot are based on the one or more configuration parameters, the plurality of symbols of the slot comprises a first symbol and a second symbol, the plurality of symbols of the slot excludes a third symbol of the slot and a fourth symbol of the slot, the third symbol immediately precedes the first symbol, and the fourth symbol immediately precedes the second symbol;

a duplication, in the third symbol, of the first symbol; and a duplication, in the fourth symbol, of the second symbol.

24. The non-transitory computer-readable medium of claim 23, wherein the instructions, when executed, further configure the wireless device to:

receive, via the sidelink channel, a second signal comprising:

a fifth symbol;

a duplication of the fifth symbol;

a sixth symbol; and a duplication of the sixth symbol;

perform, based on a measurement of the duplication of the fifth symbol, a first automatic gain control (AGC) procedure; and perform, based on a measurement of the duplication of the sixth symbol, a second AGC procedure.

25. The non-transitory computer-readable medium of claim 23, wherein the duplication of the second symbol is associated with a second signal.

26. The non-transitory computer-readable medium of claim 23, wherein the wherein the instructions, when executed, configure the wireless device to receive the one or more configuration parameters by receiving one or more radio resource control (RRC) messages comprising the one or more configuration parameters.

27. The non-transitory computer-readable medium of claim 23, wherein the plurality of starting symbols are associated with a plurality of listen-before-talk (LBT) opportunities for sidelink transmission in a shared spectrum.

28. The non-transitory computer-readable medium of claim 23, wherein the instructions, when executed, configure the wireless device to transmit or receive the first signal by transmitting or receiving a transport block via at least one of:

a physical sidelink shared channel (PSSCH); or a physical sidelink control channel (PSCCH).

29. The non-transitory computer-readable medium of claim 23, wherein the instructions, when executed, further configure the wireless device to perform, for a symbol in the slot, a listen-before-talk (LBT) procedure.

30. The non-transitory computer-readable medium of claim 23, wherein the instructions, when executed, configure the wireless device to transmit or receive the first signal by:

transmitting, to a second wireless device, the first signal.

31. The non-transitory computer-readable medium of claim 23, wherein the one or more configuration parameters further indicate an ending symbol for a sidelink transmission occasion in the slot.

32. The non-transitory computer-readable medium of claim 23, wherein the duplication of the first symbol is for automatic gain control (AGC) and the duplication of the second symbol is for AGC.

33. The non-transitory computer-readable medium of claim 23, wherein the instructions, when executed, further configure the wireless device to:

perform, based on a measurement of the duplication of the first symbol, a first automatic gain control (AGC) procedure; and perform, based on a measurement of the duplication of the second symbol, a second AGC procedure.

\*    \*    \*    \*    \*